(12) United States Patent
Holder et al.

(10) Patent No.: US 12,443,273 B2
(45) Date of Patent: Oct. 14, 2025

(54) METHODS FOR PRESENTING AND SHARING CONTENT IN AN ENVIRONMENT

(71) Applicant: Apple Inc., Cupertino, CA (US)

(72) Inventors: Wesley M. Holder, Union, CA (US); Christopher D. McKenzie, Burlingame, CA (US); Israel Pastrana Vicente, Spring, TX (US); Connor A. Smith, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/424,644

(22) Filed: Jan. 26, 2024

(65) Prior Publication Data

US 2024/0256032 A1    Aug. 1, 2024

Related U.S. Application Data

(63) Continuation of application No. 17/650,775, filed on Feb. 11, 2022, now Pat. No. 11,995,230.

(60) Provisional application No. 63/148,539, filed on Feb. 11, 2021.

(51) Int. Cl.
| | |
|---|---|
| G06F 1/00 | (2006.01) |
| G06F 1/3218 | (2019.01) |
| G06F 3/01 | (2006.01) |
| G06F 3/0354 | (2013.01) |
| G06F 3/04815 | (2022.01) |
| G06T 19/00 | (2011.01) |
| G06F 1/3203 | (2019.01) |
| G06F 1/3215 | (2019.01) |

(52) U.S. Cl.
CPC ............ *G06F 3/013* (2013.01); *G06F 1/3218* (2013.01); *G06F 3/017* (2013.01); *G06F 3/03547* (2013.01); *G06F 3/04815* (2013.01); *G06T 19/006* (2013.01); *G06F 1/3203* (2013.01); *G06F 1/3215* (2013.01)

(58) Field of Classification Search
USPC ......................................................... 713/323
See application file for complete search history.

(56) References Cited

U.S. PATENT DOCUMENTS

| | | |
|---|---|---|
| 1,173,824 A | 2/1916 | Mckee |
| 5,015,188 A | 5/1991 | Pellosie et al. |
| 5,422,812 A | 6/1995 | Knoll et al. |

(Continued)

FOREIGN PATENT DOCUMENTS

| | | |
|---|---|---|
| CA | 3033344 A1 | 2/2018 |
| CN | 102298493 A | 12/2011 |

(Continued)

OTHER PUBLICATIONS

Corrected Notice of Allowability received for U.S. Appl. No. 17/479,791, mailed on May 19, 2023, 2 pages.

(Continued)

*Primary Examiner* — Volvick Derose
(74) *Attorney, Agent, or Firm* — Kubota & Basol LLP

(57) ABSTRACT

In some embodiments, an electronic device selectively de-emphasizes a three-dimensional environment in which content is presented. In some embodiments, an electronic device modifies the boundaries of content in a user interface. In some embodiments, an electronic device shares content with users in a three-dimensional environment.

57 Claims, 40 Drawing Sheets

(56) References Cited

U.S. PATENT DOCUMENTS

| | | |
|---|---|---|
| 5,515,488 A | 5/1996 | Hoppe et al. |
| 5,524,195 A | 6/1996 | Clanton et al. |
| 5,610,828 A | 3/1997 | Kodosky et al. |
| 5,731,805 A | 3/1998 | Tognazzini et al. |
| 5,737,553 A | 4/1998 | Bartok |
| 5,740,440 A | 4/1998 | West |
| 5,751,287 A | 5/1998 | Hahn et al. |
| 5,758,122 A | 5/1998 | Corda et al. |
| 5,794,178 A | 8/1998 | Caid et al. |
| 5,809,267 A | 9/1998 | Moran et al. |
| 5,877,766 A | 3/1999 | Bates et al. |
| 5,900,849 A | 5/1999 | Gallery |
| 5,933,143 A | 8/1999 | Kobayashi |
| 5,990,886 A | 11/1999 | Serdy et al. |
| 6,061,060 A | 5/2000 | Berry et al. |
| 6,078,310 A | 6/2000 | Tognazzini |
| 6,108,004 A | 8/2000 | Medl |
| 6,112,015 A | 8/2000 | Planas et al. |
| 6,154,559 A | 11/2000 | Beardsley |
| 6,167,433 A | 12/2000 | Maples et al. |
| 6,295,069 B1 | 9/2001 | Shirur |
| 6,323,846 B1 | 11/2001 | Westerman et al. |
| 6,426,745 B1 | 7/2002 | Isaacs et al. |
| 6,456,296 B1 | 9/2002 | Cataudella et al. |
| 6,570,557 B1 | 5/2003 | Westerman et al. |
| 6,584,465 B1 | 6/2003 | Zhu et al. |
| 6,677,932 B1 | 1/2004 | Westerman |
| 6,750,873 B1 | 6/2004 | Bernardini et al. |
| 6,756,997 B1 | 6/2004 | Ward et al. |
| 7,035,903 B1 | 4/2006 | Baldonado |
| 7,096,120 B2 | 8/2006 | Hull |
| 7,134,130 B1 | 11/2006 | Thomas |
| 7,137,074 B1 | 11/2006 | Newton et al. |
| 7,230,629 B2 | 6/2007 | Reynolds et al. |
| 7,298,370 B1 | 11/2007 | Middler et al. |
| 7,580,576 B2 | 8/2009 | Wang et al. |
| 7,614,008 B2 | 11/2009 | Ording |
| 7,633,076 B2 | 12/2009 | Huppi et al. |
| 7,634,718 B2 | 12/2009 | Nakajima |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,706,579 B2 | 4/2010 | Oijer |
| 7,721,226 B2 | 5/2010 | Barabe et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,341,541 B2 | 12/2012 | Holecek et al. |
| 8,381,135 B2 | 2/2013 | Hotelling et al. |
| 8,436,872 B2 | 5/2013 | Wright et al. |
| 8,479,122 B2 | 7/2013 | Hotelling et al. |
| 8,593,558 B2 | 11/2013 | Gardiner et al. |
| 8,724,856 B1 | 5/2014 | King |
| 8,730,156 B2 | 5/2014 | Weising et al. |
| 8,793,620 B2 | 7/2014 | Stafford |
| 8,793,729 B2 | 7/2014 | Adimatyam et al. |
| 8,803,873 B2 | 8/2014 | Yoo et al. |
| 8,866,880 B2 | 10/2014 | Tan et al. |
| 8,896,632 B2 | 11/2014 | Macdougall et al. |
| 8,947,323 B1 | 2/2015 | Raffle et al. |
| 8,970,478 B2 | 3/2015 | Johansson |
| 8,970,629 B2 | 3/2015 | Kim et al. |
| 8,994,718 B2 | 3/2015 | Latta et al. |
| 9,007,301 B1 | 4/2015 | Raffle et al. |
| 9,108,109 B2 | 8/2015 | Pare et al. |
| 9,158,115 B1 | 10/2015 | Worley et al. |
| 9,164,975 B2 | 10/2015 | Milewski et al. |
| 9,183,672 B1 | 11/2015 | Hickman et al. |
| 9,185,062 B1 | 11/2015 | Yang et al. |
| 9,189,611 B2 | 11/2015 | Wssingbo |
| 9,196,072 B2 | 11/2015 | Oh et al. |
| 9,201,500 B2 | 12/2015 | Srinivasan et al. |
| 9,214,137 B2 | 12/2015 | Bala et al. |
| 9,230,368 B2 | 1/2016 | Keane et al. |
| 9,237,334 B2 | 1/2016 | Cheng et al. |
| 9,241,149 B2 | 1/2016 | Redmann |
| 9,245,388 B2 | 1/2016 | Poulos et al. |
| 9,256,785 B2 | 2/2016 | Qvarfordt |
| 9,293,118 B2 | 3/2016 | Matsui |
| 9,294,757 B1 | 3/2016 | Lewis et al. |
| 9,298,334 B1 | 3/2016 | Zimmerman et al. |
| 9,316,827 B2 | 4/2016 | Lindley et al. |
| 9,348,458 B2 | 5/2016 | Hotelling et al. |
| 9,383,189 B2 | 7/2016 | Bridges et al. |
| 9,384,594 B2 | 7/2016 | Maciocci et al. |
| 9,396,580 B1 | 7/2016 | Nowrouzezahrai et al. |
| 9,400,559 B2 | 7/2016 | Latta et al. |
| 9,426,193 B2 | 8/2016 | Goodman |
| 9,436,357 B2 | 9/2016 | Pallakoff et al. |
| 9,437,047 B2 | 9/2016 | Chang et al. |
| 9,448,635 B2 | 9/2016 | Macdougall et al. |
| 9,448,687 B1 | 9/2016 | Mckenzie et al. |
| 9,465,479 B2 | 10/2016 | Cho et al. |
| 9,491,374 B1 | 11/2016 | Avrahami et al. |
| 9,519,371 B2 | 12/2016 | Nishida |
| 9,526,127 B1 | 12/2016 | Taubman et al. |
| 9,544,257 B2 | 1/2017 | Ogundokun et al. |
| 9,563,331 B2 | 2/2017 | Poulos et al. |
| 9,575,559 B2 | 2/2017 | Andrysco |
| 9,588,651 B1 | 3/2017 | Buchanan et al. |
| 9,612,722 B2 | 4/2017 | Miller et al. |
| 9,619,105 B1 | 4/2017 | Dal Mutto |
| 9,619,519 B1 | 4/2017 | Dorner |
| 9,672,588 B1 | 6/2017 | Doucette et al. |
| 9,681,112 B2 | 6/2017 | Son |
| 9,684,372 B2 | 6/2017 | Xun et al. |
| 9,704,230 B2 | 7/2017 | Hofmann et al. |
| 9,734,402 B2 | 8/2017 | Jang et al. |
| 9,778,814 B2 | 10/2017 | Ambrus et al. |
| 9,779,512 B2 | 10/2017 | Tomlin et al. |
| 9,829,708 B1 | 11/2017 | Asada |
| 9,851,866 B2 | 12/2017 | Goossens et al. |
| 9,864,498 B2 | 1/2018 | Olsson et al. |
| 9,870,130 B2 | 1/2018 | Schubert et al. |
| 9,886,087 B1 | 2/2018 | Wald et al. |
| 9,911,232 B2 | 3/2018 | Shapira et al. |
| 9,933,833 B2 | 4/2018 | Tu et al. |
| 9,933,937 B2 | 4/2018 | Lemay et al. |
| 9,934,614 B2 | 4/2018 | Ramsby et al. |
| 9,952,042 B2 | 4/2018 | Abovitz et al. |
| 10,026,209 B1 | 7/2018 | Dagley et al. |
| 10,049,460 B2 | 8/2018 | Romano et al. |
| 10,101,803 B2 | 10/2018 | Faaborg et al. |
| 10,175,483 B2 | 1/2019 | Salter et al. |
| 10,192,347 B2 | 1/2019 | Bui et al. |
| 10,203,764 B2 | 2/2019 | Katz et al. |
| 10,307,671 B2 | 6/2019 | Barney et al. |
| 10,339,721 B1 | 7/2019 | Dascola et al. |
| 10,353,532 B1 | 7/2019 | Holz et al. |
| 10,373,381 B2 | 8/2019 | Nuernberger et al. |
| 10,394,320 B2 | 8/2019 | George-Svahn et al. |
| 10,448,189 B2 | 10/2019 | Link |
| 10,488,941 B2 | 11/2019 | Lam et al. |
| 10,499,044 B1 | 12/2019 | Giokaris et al. |
| 10,534,439 B2 | 1/2020 | Raffa et al. |
| 10,545,584 B2 | 1/2020 | Tome et al. |
| 10,564,714 B2 | 2/2020 | Marggraff et al. |
| 10,565,448 B2 | 2/2020 | Bell et al. |
| 10,642,368 B2 | 5/2020 | Chen |
| 10,664,043 B2 | 5/2020 | Ikuta et al. |
| 10,664,048 B2 | 5/2020 | Cieplinski et al. |
| 10,664,050 B2 | 5/2020 | Alcaide et al. |
| 10,671,241 B1 | 6/2020 | Jia et al. |
| 10,678,403 B2 | 6/2020 | Duarte et al. |
| 10,691,216 B2 | 6/2020 | Geisner et al. |
| 10,699,488 B1 | 6/2020 | Terrano |
| 10,701,661 B1 | 6/2020 | Coelho et al. |
| 10,708,965 B1 | 7/2020 | Subramanian et al. |
| 10,712,900 B2 | 7/2020 | Osman et al. |
| 10,732,721 B1 * | 8/2020 | Clements .............. B66B 1/468 |
| 10,754,434 B2 | 8/2020 | Hall et al. |
| 10,762,716 B1 | 9/2020 | Paul et al. |

(56) References Cited

U.S. PATENT DOCUMENTS

| | | |
|---|---|---|
| 10,768,421 B1 | 9/2020 | Rosenberg et al. |
| 10,768,693 B2 | 9/2020 | Powderly et al. |
| 10,776,933 B2 | 9/2020 | Faulkner |
| 10,846,864 B2 | 11/2020 | Kim et al. |
| 10,852,814 B1 | 12/2020 | Caron et al. |
| 10,861,242 B2 | 12/2020 | Lacey et al. |
| 10,890,967 B2 | 1/2021 | Stellmach et al. |
| 10,922,744 B1 | 2/2021 | Mahajan |
| 10,929,099 B2 | 2/2021 | Querze et al. |
| 10,936,148 B1 | 3/2021 | Merkl et al. |
| 10,956,724 B1 | 3/2021 | Terrano |
| 10,983,663 B2 * | 4/2021 | Iglesias ................. G06F 3/0487 |
| 11,003,308 B1 | 5/2021 | Dryer et al. |
| 11,023,035 B1 | 6/2021 | Atlas et al. |
| 11,055,920 B1 | 7/2021 | Bramwell et al. |
| 11,079,995 B1 | 8/2021 | Hulbert et al. |
| 11,082,463 B2 | 8/2021 | Felman |
| 11,112,875 B1 | 9/2021 | Zhou et al. |
| 11,138,798 B2 | 10/2021 | Paul et al. |
| 11,146,909 B1 | 10/2021 | Pinto et al. |
| 11,175,791 B1 | 11/2021 | Patnaikuni et al. |
| 11,176,755 B1 | 11/2021 | Tichenor et al. |
| 11,199,898 B2 | 12/2021 | Blume et al. |
| 11,200,742 B1 | 12/2021 | Post et al. |
| 11,204,678 B1 | 12/2021 | Baker et al. |
| 11,232,643 B1 | 1/2022 | Stevens et al. |
| 11,243,734 B2 | 2/2022 | Boissière et al. |
| 11,249,556 B1 | 2/2022 | Schwarz et al. |
| 11,262,885 B1 | 3/2022 | Burckel |
| 11,294,472 B2 | 4/2022 | Tang et al. |
| 11,294,475 B1 | 4/2022 | Pinchon et al. |
| 11,307,653 B1 | 4/2022 | Qian et al. |
| 11,340,756 B2 | 5/2022 | Faulkner et al. |
| 11,343,420 B1 | 5/2022 | Herz et al. |
| 11,347,319 B2 | 5/2022 | Goel et al. |
| 11,348,300 B2 | 5/2022 | Zimmermann et al. |
| 11,379,033 B2 | 7/2022 | O'hern et al. |
| 11,380,323 B2 | 7/2022 | Shin et al. |
| 11,409,363 B2 | 8/2022 | Chen et al. |
| 11,416,080 B2 | 8/2022 | Heo et al. |
| 11,432,095 B1 | 8/2022 | Satongar et al. |
| 11,461,973 B2 | 10/2022 | Pinchon |
| 11,496,571 B2 | 11/2022 | Berliner et al. |
| 11,531,402 B1 | 12/2022 | Stolzenberg |
| 11,531,459 B2 | 12/2022 | Poupyrev et al. |
| 11,557,102 B2 | 1/2023 | Palangie et al. |
| 11,567,625 B2 | 1/2023 | Faulkner et al. |
| 11,573,363 B2 | 2/2023 | Zou et al. |
| 11,574,452 B2 | 2/2023 | Berliner et al. |
| 11,599,239 B2 | 3/2023 | Rockel et al. |
| 11,615,596 B2 | 3/2023 | Faulkner et al. |
| 11,641,460 B1 | 5/2023 | Geusz et al. |
| 11,669,155 B2 | 6/2023 | Bowman et al. |
| 11,720,171 B2 | 8/2023 | Pastrana Vicente et al. |
| 11,726,577 B2 | 8/2023 | Katz |
| 11,730,226 B2 | 8/2023 | Stolarz et al. |
| 11,733,824 B2 | 8/2023 | Iskandar et al. |
| 11,762,457 B1 | 9/2023 | Ikkai et al. |
| 11,762,473 B2 | 9/2023 | Cipoletta et al. |
| 11,768,544 B2 | 9/2023 | Schwarz et al. |
| 11,847,748 B2 | 12/2023 | Liu et al. |
| 11,861,136 B1 | 1/2024 | Faulkner et al. |
| 11,875,013 B2 | 1/2024 | Lemay et al. |
| 11,886,643 B2 | 1/2024 | Irie et al. |
| 11,899,845 B2 | 2/2024 | Chung et al. |
| 11,909,453 B2 | 2/2024 | Javaudin et al. |
| 11,914,759 B2 | 2/2024 | Klein et al. |
| 11,922,588 B2 | 3/2024 | Fillhardt et al. |
| 11,928,263 B2 | 3/2024 | Jung et al. |
| 11,934,569 B2 | 3/2024 | Pastrana Vicente et al. |
| 11,954,242 B2 | 4/2024 | Dascola et al. |
| 11,983,326 B2 | 5/2024 | Lacey |
| 11,988,832 B2 | 5/2024 | Singh et al. |
| 11,989,965 B2 | 5/2024 | Tarighat Mehrabani |
| 11,995,301 B2 | 5/2024 | Hylak et al. |
| 12,032,803 B2 | 7/2024 | Pastrana Vicente et al. |
| 12,062,127 B2 * | 8/2024 | Park ........................ G06F 3/011 |
| 12,099,653 B2 | 9/2024 | Chawda et al. |
| 12,099,695 B1 | 9/2024 | Smith et al. |
| 12,112,011 B2 | 10/2024 | Smith et al. |
| 12,113,948 B1 | 10/2024 | Smith et al. |
| 12,118,200 B2 | 10/2024 | Shutzberg et al. |
| 12,154,236 B1 | 11/2024 | Herman et al. |
| 12,236,546 B1 | 2/2025 | Lipton |
| 2001/0047250 A1 | 11/2001 | Schuller et al. |
| 2002/0015024 A1 | 2/2002 | Westerman et al. |
| 2002/0024675 A1 | 2/2002 | Foxlin |
| 2002/0030692 A1 | 3/2002 | Griesert |
| 2002/0044152 A1 | 4/2002 | Abbott et al. |
| 2002/0065778 A1 | 5/2002 | Bouet et al. |
| 2003/0038754 A1 | 2/2003 | Goldstein et al. |
| 2003/0151611 A1 | 8/2003 | Turpin et al. |
| 2003/0222924 A1 | 12/2003 | Baron |
| 2004/0059784 A1 | 3/2004 | Caughey |
| 2004/0104806 A1 | 6/2004 | Yui et al. |
| 2004/0230912 A1 | 11/2004 | Clow et al. |
| 2004/0243926 A1 | 12/2004 | Trenbeath et al. |
| 2005/0044510 A1 | 2/2005 | Yi |
| 2005/0062738 A1 | 3/2005 | Handley et al. |
| 2005/0073136 A1 * | 4/2005 | Larsson ................. A61B 5/11 180/272 |
| 2005/0100210 A1 | 5/2005 | Rice et al. |
| 2005/0138572 A1 | 6/2005 | Good et al. |
| 2005/0144570 A1 | 6/2005 | Loverin et al. |
| 2005/0144571 A1 | 6/2005 | Loverin et al. |
| 2005/0175218 A1 | 8/2005 | Vertegaal et al. |
| 2005/0190059 A1 | 9/2005 | Wehrenberg |
| 2005/0198143 A1 | 9/2005 | Moody et al. |
| 2005/0216866 A1 | 9/2005 | Rosen et al. |
| 2005/0248299 A1 | 11/2005 | Chemel et al. |
| 2006/0017692 A1 | 1/2006 | Wehrenberg et al. |
| 2006/0028400 A1 | 2/2006 | Lapstun et al. |
| 2006/0033724 A1 | 2/2006 | Chaudhri et al. |
| 2006/0034590 A1 | 2/2006 | Teramoto |
| 2006/0080702 A1 | 4/2006 | Diez et al. |
| 2006/0156228 A1 | 7/2006 | Gallo et al. |
| 2006/0197753 A1 | 9/2006 | Hotelling |
| 2006/0256083 A1 | 11/2006 | Rosenberg |
| 2006/0283214 A1 | 12/2006 | Donadon et al. |
| 2007/0259716 A1 | 11/2007 | Mattice et al. |
| 2008/0181502 A1 | 7/2008 | Yang |
| 2008/0186255 A1 | 8/2008 | Cohen et al. |
| 2008/0211771 A1 | 9/2008 | Richardson |
| 2008/0310707 A1 | 12/2008 | Kansal et al. |
| 2009/0037844 A1 | 2/2009 | Kim et al. |
| 2009/0049408 A1 | 2/2009 | Naaman et al. |
| 2009/0064035 A1 | 3/2009 | Shibata et al. |
| 2009/0146779 A1 | 6/2009 | Kumar et al. |
| 2009/0231356 A1 | 9/2009 | Barnes et al. |
| 2009/0254843 A1 | 10/2009 | Van et al. |
| 2009/0319181 A1 | 12/2009 | Khosravy et al. |
| 2010/0097375 A1 | 4/2010 | Tadaishi et al. |
| 2010/0115459 A1 | 5/2010 | Kinnunen et al. |
| 2010/0177049 A1 | 7/2010 | Levy et al. |
| 2010/0185949 A1 | 7/2010 | Jaeger |
| 2010/0188503 A1 | 7/2010 | Tsai et al. |
| 2010/0188572 A1 | 7/2010 | Card, II |
| 2010/0269145 A1 | 10/2010 | Ingrassia et al. |
| 2010/0293504 A1 | 11/2010 | Hachiya |
| 2010/0302245 A1 | 12/2010 | Best |
| 2010/0328432 A1 | 12/2010 | Tanaka |
| 2010/0332196 A1 | 12/2010 | Fisker et al. |
| 2011/0018895 A1 | 1/2011 | Buzyn et al. |
| 2011/0018896 A1 | 1/2011 | Buzyn et al. |
| 2011/0098029 A1 | 4/2011 | Rhoads et al. |
| 2011/0142321 A1 | 6/2011 | Huffman |
| 2011/0156879 A1 | 6/2011 | Matsushita et al. |
| 2011/0164163 A1 | 7/2011 | Bilbrey et al. |
| 2011/0169927 A1 | 7/2011 | Mages et al. |
| 2011/0175932 A1 | 7/2011 | Yu et al. |
| 2011/0216060 A1 | 9/2011 | Weising et al. |
| 2011/0243448 A1 | 10/2011 | Kawabuchi et al. |
| 2011/0254865 A1 | 10/2011 | Yee et al. |
| 2011/0289691 A1 | 12/2011 | LaflÈche et al. |

(56) References Cited

U.S. PATENT DOCUMENTS

| | | |
|---|---|---|
| 2011/0310001 A1 | 12/2011 | Madau et al. |
| 2011/0320969 A1 | 12/2011 | Hwang et al. |
| 2012/0038751 A1 | 2/2012 | Yuan et al. |
| 2012/0066638 A1 | 3/2012 | Ohri |
| 2012/0075496 A1 | 3/2012 | Akifusa et al. |
| 2012/0086624 A1 | 4/2012 | Thompson et al. |
| 2012/0124525 A1 | 5/2012 | Kang |
| 2012/0131631 A1 | 5/2012 | Bhogal et al. |
| 2012/0170089 A1 | 7/2012 | Kim et al. |
| 2012/0170840 A1 | 7/2012 | Caruso et al. |
| 2012/0184372 A1 | 7/2012 | Laarakkers et al. |
| 2012/0194547 A1 | 8/2012 | Johnson et al. |
| 2012/0249741 A1 | 10/2012 | Maciocci et al. |
| 2012/0256956 A1 | 10/2012 | Kasahara |
| 2012/0256967 A1 | 10/2012 | Baldwin et al. |
| 2012/0257035 A1 | 10/2012 | Larsen |
| 2012/0272179 A1 | 10/2012 | Stafford |
| 2012/0290401 A1* | 11/2012 | Neven .................... G06V 20/20 382/103 |
| 2012/0304087 A1 | 11/2012 | Walkin et al. |
| 2013/0010062 A1 | 1/2013 | Redmann |
| 2013/0027860 A1 | 1/2013 | Masaki et al. |
| 2013/0088516 A1 | 4/2013 | Ota et al. |
| 2013/0093727 A1 | 4/2013 | Eriksson et al. |
| 2013/0127850 A1 | 5/2013 | Bindon |
| 2013/0148850 A1 | 6/2013 | Matsuda et al. |
| 2013/0169533 A1 | 7/2013 | Jahnke |
| 2013/0190044 A1 | 7/2013 | Kulas |
| 2013/0211843 A1 | 8/2013 | Clarkson |
| 2013/0222227 A1 | 8/2013 | Johansson et al. |
| 2013/0222410 A1 | 8/2013 | Kameyama et al. |
| 2013/0229345 A1 | 9/2013 | Day et al. |
| 2013/0246955 A1 | 9/2013 | Schwesig et al. |
| 2013/0249922 A1 | 9/2013 | Hachiya |
| 2013/0263016 A1 | 10/2013 | Lehtiniemi et al. |
| 2013/0265227 A1 | 10/2013 | Julian |
| 2013/0271397 A1 | 10/2013 | Hildreth et al. |
| 2013/0278501 A1 | 10/2013 | Bulzacki |
| 2013/0286004 A1 | 10/2013 | Mcculloch et al. |
| 2013/0293456 A1 | 11/2013 | Son et al. |
| 2013/0300648 A1 | 11/2013 | Kim et al. |
| 2013/0300654 A1 | 11/2013 | Seki |
| 2013/0307945 A1 | 11/2013 | Cheng et al. |
| 2013/0321462 A1 | 12/2013 | Salter et al. |
| 2013/0325326 A1 | 12/2013 | Blumenberg et al. |
| 2013/0326341 A1 | 12/2013 | Nonaka |
| 2013/0326364 A1 | 12/2013 | Latta et al. |
| 2013/0328925 A1 | 12/2013 | Latta et al. |
| 2013/0332890 A1 | 12/2013 | Ramic et al. |
| 2013/0335301 A1* | 12/2013 | Wong .................... G06T 19/006 345/8 |
| 2013/0342564 A1 | 12/2013 | Kinnebrew et al. |
| 2013/0342570 A1 | 12/2013 | Kinnebrew et al. |
| 2013/0345975 A1 | 12/2013 | Vulcano et al. |
| 2014/0002338 A1 | 1/2014 | Raffa et al. |
| 2014/0002444 A1 | 1/2014 | Bennett et al. |
| 2014/0028548 A1 | 1/2014 | Bychkov et al. |
| 2014/0040832 A1 | 2/2014 | Regelous |
| 2014/0049462 A1 | 2/2014 | Weinberger et al. |
| 2014/0063058 A1 | 3/2014 | Fialho et al. |
| 2014/0068692 A1 | 3/2014 | Archibong et al. |
| 2014/0071241 A1 | 3/2014 | Yang et al. |
| 2014/0075361 A1 | 3/2014 | Reynolds et al. |
| 2014/0078176 A1 | 3/2014 | Kim et al. |
| 2014/0104206 A1 | 4/2014 | Anderson |
| 2014/0108942 A1 | 4/2014 | Freeman et al. |
| 2014/0114845 A1 | 4/2014 | Rogers et al. |
| 2014/0125584 A1 | 5/2014 | Xun et al. |
| 2014/0125585 A1* | 5/2014 | Song ...................... G06F 3/013 345/156 |
| 2014/0126782 A1 | 5/2014 | Takai et al. |
| 2014/0129990 A1 | 5/2014 | Xin et al. |
| 2014/0132499 A1 | 5/2014 | Schwesinger et al. |
| 2014/0139426 A1 | 5/2014 | Kryze et al. |
| 2014/0164928 A1 | 6/2014 | Kim |
| 2014/0168267 A1 | 6/2014 | Kim et al. |
| 2014/0168453 A1 | 6/2014 | Shoemake et al. |
| 2014/0198017 A1 | 7/2014 | Lamb et al. |
| 2014/0232639 A1 | 8/2014 | Hayashi et al. |
| 2014/0237366 A1 | 8/2014 | Poulos et al. |
| 2014/0247208 A1 | 9/2014 | Henderek et al. |
| 2014/0247210 A1 | 9/2014 | Henderek et al. |
| 2014/0258942 A1 | 9/2014 | Kutliroff et al. |
| 2014/0267400 A1 | 9/2014 | Mabbutt et al. |
| 2014/0268054 A1 | 9/2014 | Olsson et al. |
| 2014/0282272 A1 | 9/2014 | Kies et al. |
| 2014/0285641 A1 | 9/2014 | Kato et al. |
| 2014/0298273 A1 | 10/2014 | Blackstone et al. |
| 2014/0304612 A1 | 10/2014 | Collin |
| 2014/0320404 A1 | 10/2014 | Kasahara |
| 2014/0331187 A1 | 11/2014 | Hicks et al. |
| 2014/0333666 A1 | 11/2014 | Poulos et al. |
| 2014/0347391 A1 | 11/2014 | Keane et al. |
| 2014/0351727 A1 | 11/2014 | Danton et al. |
| 2014/0351753 A1 | 11/2014 | Shin et al. |
| 2014/0362111 A1 | 12/2014 | Kim |
| 2014/0363074 A1 | 12/2014 | Dolfing et al. |
| 2014/0368537 A1 | 12/2014 | Salter et al. |
| 2014/0368620 A1 | 12/2014 | Li et al. |
| 2014/0372957 A1 | 12/2014 | Keane et al. |
| 2014/0375541 A1* | 12/2014 | Nister .................... A61B 3/113 345/156 |
| 2014/0375683 A1 | 12/2014 | Salter et al. |
| 2015/0009118 A1 | 1/2015 | Thomas et al. |
| 2015/0035822 A1 | 2/2015 | Arsan et al. |
| 2015/0042679 A1 | 2/2015 | Järvenpää |
| 2015/0058718 A1 | 2/2015 | Kim et al. |
| 2015/0067580 A1 | 3/2015 | Um et al. |
| 2015/0077335 A1 | 3/2015 | Taguchi et al. |
| 2015/0082180 A1 | 3/2015 | Ames et al. |
| 2015/0095844 A1 | 4/2015 | Cho et al. |
| 2015/0121466 A1 | 4/2015 | Brands et al. |
| 2015/0123890 A1 | 5/2015 | Kapur et al. |
| 2015/0123901 A1 | 5/2015 | Schwesinger et al. |
| 2015/0128075 A1 | 5/2015 | Kempinski |
| 2015/0131850 A1 | 5/2015 | Qvarfordt |
| 2015/0135108 A1 | 5/2015 | Pope et al. |
| 2015/0145887 A1 | 5/2015 | Forutanpour et al. |
| 2015/0149929 A1* | 5/2015 | Shepherd ............ H04L 12/1822 715/753 |
| 2015/0153833 A1 | 6/2015 | Pinault et al. |
| 2015/0169506 A1 | 6/2015 | Leventhal et al. |
| 2015/0177937 A1 | 6/2015 | Poletto et al. |
| 2015/0193982 A1 | 7/2015 | Mihelich et al. |
| 2015/0205106 A1 | 7/2015 | Norden |
| 2015/0212576 A1 | 7/2015 | Ambrus et al. |
| 2015/0220152 A1 | 8/2015 | Tait et al. |
| 2015/0221132 A1 | 8/2015 | Kruglick |
| 2015/0242095 A1 | 8/2015 | Sonnenberg |
| 2015/0254905 A1 | 9/2015 | Ramsby et al. |
| 2015/0262428 A1 | 9/2015 | Tatzgern et al. |
| 2015/0317831 A1 | 11/2015 | Ebstyne et al. |
| 2015/0317832 A1 | 11/2015 | Ebstyne et al. |
| 2015/0331240 A1 | 11/2015 | Poulos et al. |
| 2015/0331576 A1 | 11/2015 | Piya et al. |
| 2015/0332091 A1* | 11/2015 | Kim ...................... H04N 5/2621 382/103 |
| 2015/0370323 A1* | 12/2015 | Cieplinski ........ H04N 21/42203 345/156 |
| 2015/0381974 A1 | 12/2015 | Hoffman et al. |
| 2016/0012642 A1 | 1/2016 | Lee et al. |
| 2016/0015470 A1 | 1/2016 | Border |
| 2016/0018898 A1 | 1/2016 | Tu et al. |
| 2016/0018900 A1 | 1/2016 | Tu et al. |
| 2016/0025971 A1 | 1/2016 | Crow et al. |
| 2016/0026242 A1 | 1/2016 | Burns et al. |
| 2016/0026243 A1 | 1/2016 | Bertram et al. |
| 2016/0026253 A1 | 1/2016 | Bradski et al. |
| 2016/0041391 A1 | 2/2016 | Van et al. |
| 2016/0050642 A1 | 2/2016 | Brown et al. |
| 2016/0062636 A1 | 3/2016 | Jung et al. |
| 2016/0085301 A1 | 3/2016 | Lopez |
| 2016/0093108 A1* | 3/2016 | Mao .................... G02B 27/017 345/633 |

(56) References Cited

U.S. PATENT DOCUMENTS

| | | |
|---|---|---|
| 2016/0098093 A1 | 4/2016 | Cheon et al. |
| 2016/0098094 A1 | 4/2016 | Minkkinen |
| 2016/0127690 A1 | 5/2016 | Kaehler et al. |
| 2016/0133044 A1 | 5/2016 | Lynch |
| 2016/0133052 A1 | 5/2016 | Choi et al. |
| 2016/0171304 A1 | 6/2016 | Golding et al. |
| 2016/0179191 A1 | 6/2016 | Kim et al. |
| 2016/0179336 A1 | 6/2016 | Ambrus et al. |
| 2016/0189426 A1 | 6/2016 | Thomas et al. |
| 2016/0193104 A1* | 7/2016 | Du .................... A61B 3/14 351/203 |
| 2016/0196692 A1 | 7/2016 | Kjallstrom et al. |
| 2016/0210784 A1 | 7/2016 | Ramsby et al. |
| 2016/0216768 A1 | 7/2016 | Goetz et al. |
| 2016/0224122 A1 | 8/2016 | Dietz et al. |
| 2016/0225012 A1 | 8/2016 | Ha et al. |
| 2016/0225164 A1 | 8/2016 | Tomlin et al. |
| 2016/0227267 A1 | 8/2016 | Tsurutani et al. |
| 2016/0253063 A1 | 9/2016 | Critchlow |
| 2016/0253821 A1 | 9/2016 | Romano et al. |
| 2016/0275702 A1 | 9/2016 | Reynolds et al. |
| 2016/0291922 A1 | 10/2016 | Montgomerie et al. |
| 2016/0306434 A1 | 10/2016 | Ferrin |
| 2016/0309081 A1* | 10/2016 | Frahm .................... G06F 3/013 |
| 2016/0313890 A1 | 10/2016 | Walline et al. |
| 2016/0334940 A1 | 11/2016 | Kandadai et al. |
| 2016/0350973 A1 | 12/2016 | Shapira et al. |
| 2016/0357266 A1 | 12/2016 | Patel et al. |
| 2016/0370858 A1 | 12/2016 | Leppänen et al. |
| 2016/0373647 A1 | 12/2016 | García Morate et al. |
| 2016/0373714 A1 | 12/2016 | Lee et al. |
| 2016/0379409 A1 | 12/2016 | Gavriliuc et al. |
| 2017/0032568 A1 | 2/2017 | Gharpure et al. |
| 2017/0038829 A1 | 2/2017 | Lanier et al. |
| 2017/0038837 A1* | 2/2017 | Faaborg ................ G06F 3/017 |
| 2017/0038849 A1 | 2/2017 | Hwang |
| 2017/0039770 A1 | 2/2017 | Lanier et al. |
| 2017/0052393 A1 | 2/2017 | Kweon |
| 2017/0052595 A1 | 2/2017 | Poulos et al. |
| 2017/0053383 A1 | 2/2017 | Heo |
| 2017/0060230 A1 | 3/2017 | Faaborg et al. |
| 2017/0061694 A1 | 3/2017 | Giraldi et al. |
| 2017/0090566 A1 | 3/2017 | George-Svahn et al. |
| 2017/0109930 A1 | 4/2017 | Holzer et al. |
| 2017/0115728 A1 | 4/2017 | Park et al. |
| 2017/0123487 A1 | 5/2017 | Hazra et al. |
| 2017/0131964 A1 | 5/2017 | Baek et al. |
| 2017/0132694 A1 | 5/2017 | Damy |
| 2017/0132822 A1 | 5/2017 | Marschke et al. |
| 2017/0146801 A1* | 5/2017 | Stempora ............ G06Q 10/063 |
| 2017/0147180 A1 | 5/2017 | Yoon et al. |
| 2017/0148339 A1 | 5/2017 | Van Curen et al. |
| 2017/0153866 A1 | 6/2017 | Grinberg et al. |
| 2017/0154326 A1 | 6/2017 | Jo et al. |
| 2017/0162177 A1 | 6/2017 | Lebeck et al. |
| 2017/0169616 A1 | 6/2017 | Wiley et al. |
| 2017/0178392 A1 | 6/2017 | Zuccarino et al. |
| 2017/0206691 A1 | 7/2017 | Harrises et al. |
| 2017/0206692 A1 | 7/2017 | Sheaffer et al. |
| 2017/0212583 A1 | 7/2017 | Krasadakis |
| 2017/0213388 A1 | 7/2017 | Margolis et al. |
| 2017/0221264 A1 | 8/2017 | Perry |
| 2017/0228130 A1 | 8/2017 | Palmaro |
| 2017/0236332 A1 | 8/2017 | Kipman et al. |
| 2017/0243352 A1 | 8/2017 | Kutliroff et al. |
| 2017/0251143 A1 | 8/2017 | Peruch et al. |
| 2017/0256096 A1 | 9/2017 | Faaborg et al. |
| 2017/0270715 A1 | 9/2017 | Lindsay et al. |
| 2017/0285737 A1 | 10/2017 | Khalid et al. |
| 2017/0287215 A1 | 10/2017 | Lalonde et al. |
| 2017/0287225 A1* | 10/2017 | Powderly ............ G06F 3/04815 |
| 2017/0302903 A1 | 10/2017 | Ng et al. |
| 2017/0308163 A1 | 10/2017 | Cieplinski et al. |
| 2017/0315715 A1 | 11/2017 | Fujita et al. |
| 2017/0326457 A1 | 11/2017 | Tilton et al. |
| 2017/0344223 A1 | 11/2017 | Holzer et al. |
| 2017/0351094 A1 | 12/2017 | Poulos et al. |
| 2017/0357389 A1 | 12/2017 | Fleizach et al. |
| 2017/0358141 A1 | 12/2017 | Stafford et al. |
| 2017/0364198 A1 | 12/2017 | Yoganandan et al. |
| 2018/0005433 A1 | 1/2018 | Kohler et al. |
| 2018/0024681 A1* | 1/2018 | Bernstein ............ G06F 3/0414 345/174 |
| 2018/0045963 A1 | 2/2018 | Hoover et al. |
| 2018/0075658 A1* | 3/2018 | Lanier .................. G06T 11/001 |
| 2018/0077383 A1 | 3/2018 | Akao et al. |
| 2018/0081519 A1 | 3/2018 | Kim |
| 2018/0084287 A1 | 3/2018 | Shimura |
| 2018/0088787 A1 | 3/2018 | Bereza et al. |
| 2018/0095634 A1* | 4/2018 | Alexander ............ G06T 15/20 |
| 2018/0095636 A1 | 4/2018 | Valdivia et al. |
| 2018/0095649 A1* | 4/2018 | Valdivia ................ H04N 7/157 |
| 2018/0101223 A1* | 4/2018 | Ishihara ............ G02B 27/0172 |
| 2018/0103209 A1 | 4/2018 | Fischler et al. |
| 2018/0114364 A1 | 4/2018 | Mcphee et al. |
| 2018/0120944 A1 | 5/2018 | Wang et al. |
| 2018/0122138 A1 | 5/2018 | Piya et al. |
| 2018/0130255 A1 | 5/2018 | Hazeghi et al. |
| 2018/0136815 A1 | 5/2018 | Tomizuka et al. |
| 2018/0143693 A1 | 5/2018 | Calabrese et al. |
| 2018/0150204 A1 | 5/2018 | Macgillivray |
| 2018/0150997 A1 | 5/2018 | Austin |
| 2018/0157332 A1 | 6/2018 | Nie |
| 2018/0158222 A1 | 6/2018 | Hayashi |
| 2018/0165853 A1 | 6/2018 | Inagi et al. |
| 2018/0173404 A1 | 6/2018 | Smith |
| 2018/0181199 A1 | 6/2018 | Harvey et al. |
| 2018/0181272 A1 | 6/2018 | Olsson et al. |
| 2018/0188802 A1 | 7/2018 | Okumura |
| 2018/0197336 A1 | 7/2018 | Rochford et al. |
| 2018/0197341 A1 | 7/2018 | Loberg et al. |
| 2018/0210628 A1 | 7/2018 | Mcphee et al. |
| 2018/0218214 A1 | 8/2018 | Pestun et al. |
| 2018/0220195 A1 | 8/2018 | Panchaksharaiah et al. |
| 2018/0239144 A1 | 8/2018 | Woods et al. |
| 2018/0247449 A1 | 8/2018 | Park et al. |
| 2018/0275753 A1 | 9/2018 | Publicover et al. |
| 2018/0286126 A1 | 10/2018 | Schwarz et al. |
| 2018/0300023 A1 | 10/2018 | Hein |
| 2018/0300952 A1 | 10/2018 | Evans et al. |
| 2018/0302687 A1 | 10/2018 | Bhattacharjee et al. |
| 2018/0315248 A1 | 11/2018 | Bastov et al. |
| 2018/0322701 A1 | 11/2018 | Pahud et al. |
| 2018/0330544 A1 | 11/2018 | Corso et al. |
| 2018/0348861 A1 | 12/2018 | Uscinski et al. |
| 2018/0348986 A1 | 12/2018 | Sawaki |
| 2018/0350099 A1 | 12/2018 | Yerkes et al. |
| 2018/0350119 A1 | 12/2018 | Kocharlakota et al. |
| 2019/0012060 A1 | 1/2019 | Moore et al. |
| 2019/0018479 A1 | 1/2019 | Minami |
| 2019/0018498 A1 | 1/2019 | West et al. |
| 2019/0034076 A1 | 1/2019 | Vinayak et al. |
| 2019/0043259 A1 | 2/2019 | Wang et al. |
| 2019/0050062 A1 | 2/2019 | Chen et al. |
| 2019/0056785 A1 | 2/2019 | Suk |
| 2019/0065027 A1 | 2/2019 | Hauenstein et al. |
| 2019/0073109 A1 | 3/2019 | Zhang et al. |
| 2019/0080572 A1 | 3/2019 | Kim et al. |
| 2019/0088149 A1 | 3/2019 | Fink et al. |
| 2019/0094963 A1 | 3/2019 | Nijs |
| 2019/0094979 A1 | 3/2019 | Hall et al. |
| 2019/0096134 A1 | 3/2019 | Amacker et al. |
| 2019/0101991 A1 | 4/2019 | Brennan |
| 2019/0102953 A1 | 4/2019 | Lindsay et al. |
| 2019/0130622 A1 | 5/2019 | Hoover et al. |
| 2019/0130633 A1 | 5/2019 | Haddad et al. |
| 2019/0138183 A1 | 5/2019 | Rosas et al. |
| 2019/0146128 A1 | 5/2019 | Cao et al. |
| 2019/0155495 A1 | 5/2019 | Klein et al. |
| 2019/0164340 A1 | 5/2019 | Pejic et al. |
| 2019/0172261 A1 | 6/2019 | Alt et al. |
| 2019/0172262 A1 | 6/2019 | Mchugh et al. |
| 2019/0188895 A1 | 6/2019 | Miller et al. |
| 2019/0188918 A1 | 6/2019 | Brewer et al. |

(56) References Cited

U.S. PATENT DOCUMENTS

| | | |
|---|---|---|
| 2019/0204906 A1 | 7/2019 | Ross et al. |
| 2019/0212827 A1 | 7/2019 | Kin et al. |
| 2019/0213389 A1 | 7/2019 | Peruch et al. |
| 2019/0227763 A1 | 7/2019 | Kaufthal |
| 2019/0228503 A1 | 7/2019 | Tokuchi |
| 2019/0228589 A1 | 7/2019 | Dascola et al. |
| 2019/0238818 A1 | 8/2019 | Held et al. |
| 2019/0251884 A1 | 8/2019 | Burns et al. |
| 2019/0258365 A1 | 8/2019 | Zurmoehle et al. |
| 2019/0266774 A1 | 8/2019 | Sommerlade et al. |
| 2019/0279407 A1 | 9/2019 | Mchugh et al. |
| 2019/0294312 A1 | 9/2019 | Rohrbacher |
| 2019/0302977 A1 | 10/2019 | Pendergast et al. |
| 2019/0310757 A1 | 10/2019 | Lee et al. |
| 2019/0324529 A1 | 10/2019 | Stellmach et al. |
| 2019/0325654 A1 | 10/2019 | Stisser et al. |
| 2019/0332244 A1 | 10/2019 | Beszteri et al. |
| 2019/0333278 A1 | 10/2019 | Palangie et al. |
| 2019/0339770 A1 | 11/2019 | Kurlethimar et al. |
| 2019/0340816 A1 | 11/2019 | Rogers |
| 2019/0340832 A1 | 11/2019 | Srinivasan et al. |
| 2019/0346678 A1 | 11/2019 | Nocham |
| 2019/0346922 A1 | 11/2019 | Young et al. |
| 2019/0349575 A1 | 11/2019 | Knepper et al. |
| 2019/0354259 A1 | 11/2019 | Park |
| 2019/0361521 A1 | 11/2019 | Stellmach et al. |
| 2019/0362557 A1 | 11/2019 | Lacey et al. |
| 2019/0362560 A1 | 11/2019 | Choi et al. |
| 2019/0369569 A1 | 12/2019 | Olsen et al. |
| 2019/0370492 A1 | 12/2019 | Falchuk et al. |
| 2019/0371072 A1 | 12/2019 | Lindberg et al. |
| 2019/0371279 A1 | 12/2019 | Mak |
| 2019/0377487 A1 | 12/2019 | Bailey et al. |
| 2019/0379765 A1 | 12/2019 | Fajt et al. |
| 2019/0384406 A1 | 12/2019 | Smith et al. |
| 2020/0004401 A1* | 1/2020 | Hwang ............... G06F 3/04815 |
| 2020/0005539 A1 | 1/2020 | Hwang et al. |
| 2020/0012341 A1 | 1/2020 | Stellmach et al. |
| 2020/0020157 A1 | 1/2020 | Powers et al. |
| 2020/0026349 A1 | 1/2020 | Fontanel et al. |
| 2020/0038120 A1 | 2/2020 | Ziraknejad et al. |
| 2020/0043243 A1 | 2/2020 | Bhushan et al. |
| 2020/0045249 A1 | 2/2020 | Francois et al. |
| 2020/0048825 A1 | 2/2020 | Schultz et al. |
| 2020/0051527 A1 | 2/2020 | Ngo |
| 2020/0081526 A1 | 3/2020 | Walker et al. |
| 2020/0082602 A1 | 3/2020 | Jones |
| 2020/0089314 A1 | 3/2020 | Poupyrev et al. |
| 2020/0092537 A1 | 3/2020 | Sutter et al. |
| 2020/0098140 A1 | 3/2020 | Jagnow et al. |
| 2020/0098173 A1 | 3/2020 | Mccall |
| 2020/0099989 A1 | 3/2020 | Niemirska et al. |
| 2020/0106965 A1 | 4/2020 | Malia et al. |
| 2020/0117213 A1 | 4/2020 | Tian et al. |
| 2020/0126291 A1 | 4/2020 | Nguyen et al. |
| 2020/0128227 A1 | 4/2020 | Chavez et al. |
| 2020/0128232 A1 | 4/2020 | Hwang et al. |
| 2020/0129850 A1 | 4/2020 | Ohashi |
| 2020/0135141 A1 | 4/2020 | Day et al. |
| 2020/0159017 A1 | 5/2020 | Lin et al. |
| 2020/0214682 A1 | 7/2020 | Zaslavsky et al. |
| 2020/0218074 A1 | 7/2020 | Hoover et al. |
| 2020/0225735 A1 | 7/2020 | Schwarz |
| 2020/0225746 A1 | 7/2020 | Bar-zeev et al. |
| 2020/0225747 A1 | 7/2020 | Bar-zeev et al. |
| 2020/0225830 A1 | 7/2020 | Tang et al. |
| 2020/0226814 A1 | 7/2020 | Tang et al. |
| 2020/0226823 A1 | 7/2020 | Stachniak et al. |
| 2020/0242844 A1 | 7/2020 | Bae et al. |
| 2020/0257245 A1 | 8/2020 | Linville et al. |
| 2020/0257484 A1 | 8/2020 | Qian et al. |
| 2020/0272303 A1 | 8/2020 | Jia et al. |
| 2020/0285314 A1 | 9/2020 | Cieplinski et al. |
| 2020/0286299 A1 | 9/2020 | Wang et al. |
| 2020/0319704 A1 | 10/2020 | Kathuria et al. |
| 2020/0322178 A1 | 10/2020 | Wang et al. |
| 2020/0322575 A1 | 10/2020 | Valli |
| 2020/0328913 A1 | 10/2020 | Wyas et al. |
| 2020/0356221 A1 | 11/2020 | Behzadi et al. |
| 2020/0357374 A1 | 11/2020 | Verweij et al. |
| 2020/0363867 A1 | 11/2020 | Azimi et al. |
| 2020/0371602 A1 | 11/2020 | Kanda |
| 2020/0371673 A1* | 11/2020 | Faulkner ............... G06F 3/017 |
| 2020/0379626 A1 | 12/2020 | Guyomard et al. |
| 2020/0387214 A1 | 12/2020 | Ravasz et al. |
| 2020/0387228 A1* | 12/2020 | Ravasz ............... G06F 3/011 |
| 2020/0387287 A1 | 12/2020 | Ravasz et al. |
| 2020/0410960 A1 | 12/2020 | Saito et al. |
| 2021/0011556 A1 | 1/2021 | Atlas et al. |
| 2021/0034163 A1 | 2/2021 | Goel et al. |
| 2021/0034319 A1 | 2/2021 | Wang et al. |
| 2021/0055789 A1 | 2/2021 | Tsai et al. |
| 2021/0067418 A1 | 3/2021 | Ely et al. |
| 2021/0074062 A1* | 3/2021 | Madonna ............... G06T 15/503 |
| 2021/0090337 A1 | 3/2021 | Ravasz et al. |
| 2021/0090348 A1 | 3/2021 | Croxford et al. |
| 2021/0096726 A1 | 4/2021 | Faulkner et al. |
| 2021/0097766 A1 | 4/2021 | Palangie et al. |
| 2021/0097776 A1 | 4/2021 | Faulkner et al. |
| 2021/0102820 A1 | 4/2021 | Le et al. |
| 2021/0103333 A1 | 4/2021 | Cieplinski et al. |
| 2021/0125414 A1 | 4/2021 | Berkebile |
| 2021/0142552 A1 | 5/2021 | Kimura et al. |
| 2021/0158624 A1 | 5/2021 | Moon et al. |
| 2021/0165484 A1 | 6/2021 | Suguhara et al. |
| 2021/0165923 A1 | 6/2021 | Johnston |
| 2021/0166437 A1 | 6/2021 | Legendre et al. |
| 2021/0173340 A1 | 6/2021 | Kim |
| 2021/0173536 A1 | 6/2021 | Kondo |
| 2021/0191600 A1 | 6/2021 | Lemay et al. |
| 2021/0225043 A1 | 7/2021 | Tang et al. |
| 2021/0227601 A1 | 7/2021 | Eom et al. |
| 2021/0241483 A1 | 8/2021 | Dryer et al. |
| 2021/0248674 A1 | 8/2021 | Ogunbunmi |
| 2021/0272367 A1 | 9/2021 | Richter |
| 2021/0279967 A1 | 9/2021 | Gernoth et al. |
| 2021/0286502 A1 | 9/2021 | Lemay et al. |
| 2021/0287439 A1 | 9/2021 | Goodrich et al. |
| 2021/0295592 A1 | 9/2021 | Von Cramon |
| 2021/0295602 A1 | 9/2021 | Scapel et al. |
| 2021/0303074 A1 | 9/2021 | Vanblon et al. |
| 2021/0303107 A1 | 9/2021 | Pla I Conesa et al. |
| 2021/0312684 A1 | 10/2021 | Zimmermann et al. |
| 2021/0312713 A1 | 10/2021 | Peri et al. |
| 2021/0312717 A1 | 10/2021 | Mao |
| 2021/0326094 A1 | 10/2021 | Buerli et al. |
| 2021/0327140 A1* | 10/2021 | Rothkopf ............... G06T 13/205 |
| 2021/0331069 A1 | 10/2021 | Gustafson et al. |
| 2021/0333864 A1 | 10/2021 | Harvey et al. |
| 2021/0350564 A1 | 11/2021 | Peuhkurinen et al. |
| 2021/0350604 A1 | 11/2021 | Pejsa et al. |
| 2021/0358294 A1 | 11/2021 | Parashar et al. |
| 2021/0365108 A1 | 11/2021 | Burns et al. |
| 2021/0366440 A1 | 11/2021 | Burns et al. |
| 2021/0368136 A1 | 11/2021 | Chalmers et al. |
| 2021/0374221 A1 | 12/2021 | Markhasin et al. |
| 2021/0375022 A1 | 12/2021 | Lee et al. |
| 2021/0383097 A1 | 12/2021 | Guerard et al. |
| 2021/0400744 A1 | 12/2021 | Chen et al. |
| 2021/0402306 A1 | 12/2021 | Huang |
| 2021/0405760 A1 | 12/2021 | Schoen |
| 2022/0011577 A1 | 1/2022 | Lawver et al. |
| 2022/0011855 A1 | 1/2022 | Hazra et al. |
| 2022/0012002 A1 | 1/2022 | Bar-zeev et al. |
| 2022/0028108 A1 | 1/2022 | Haapoja et al. |
| 2022/0030197 A1 | 1/2022 | Ishimoto |
| 2022/0070241 A1 | 3/2022 | Yerli |
| 2022/0076496 A1 | 3/2022 | Palangie et al. |
| 2022/0083145 A1 | 3/2022 | Matsunaga et al. |
| 2022/0083197 A1 | 3/2022 | Rockel et al. |
| 2022/0084279 A1 | 3/2022 | Lindmeier et al. |
| 2022/0091722 A1 | 3/2022 | Faulkner et al. |
| 2022/0091723 A1 | 3/2022 | Faulkner et al. |
| 2022/0092862 A1 | 3/2022 | Faulkner et al. |

(56) References Cited

U.S. PATENT DOCUMENTS

| | | |
|---|---|---|
| 2022/0100265 A1 | 3/2022 | Kies et al. |
| 2022/0100270 A1 | 3/2022 | Pastrana Vicente et al. |
| 2022/0101593 A1 | 3/2022 | Rockel et al. |
| 2022/0101612 A1 | 3/2022 | Palangie et al. |
| 2022/0104910 A1 | 4/2022 | Shelton et al. |
| 2022/0121275 A1* | 4/2022 | Balaji ................ G06T 19/006 |
| 2022/0121344 A1 | 4/2022 | Pastrana Vicente et al. |
| 2022/0124286 A1 | 4/2022 | Punwani et al. |
| 2022/0130107 A1 | 4/2022 | Lindh |
| 2022/0130126 A1 | 4/2022 | Delgado et al. |
| 2022/0137701 A1 | 5/2022 | Bowman et al. |
| 2022/0137705 A1 | 5/2022 | Hashimoto et al. |
| 2022/0148257 A1 | 5/2022 | Boubekeur et al. |
| 2022/0155853 A1 | 5/2022 | Fan et al. |
| 2022/0155909 A1 | 5/2022 | Kawashima et al. |
| 2022/0157083 A1 | 5/2022 | Jandhyala et al. |
| 2022/0165013 A1 | 5/2022 | Velez et al. |
| 2022/0179503 A1 | 6/2022 | Timonen et al. |
| 2022/0187907 A1 | 6/2022 | Lee et al. |
| 2022/0191570 A1 | 6/2022 | Reid et al. |
| 2022/0197403 A1 | 6/2022 | Hughes et al. |
| 2022/0198755 A1 | 6/2022 | Pinchon |
| 2022/0206298 A1 | 6/2022 | Goodman |
| 2022/0214743 A1 | 7/2022 | Dascola et al. |
| 2022/0221976 A1 | 7/2022 | Agarwal et al. |
| 2022/0229524 A1 | 7/2022 | Mckenzie et al. |
| 2022/0229534 A1 | 7/2022 | Terre et al. |
| 2022/0232191 A1 | 7/2022 | Kawakami et al. |
| 2022/0239718 A1 | 7/2022 | Song et al. |
| 2022/0244536 A1 | 8/2022 | Sha et al. |
| 2022/0245888 A1 | 8/2022 | Singh et al. |
| 2022/0253125 A1 | 8/2022 | Wallen et al. |
| 2022/0253136 A1* | 8/2022 | Holder ................ G06F 3/017 |
| 2022/0253149 A1 | 8/2022 | Berliner et al. |
| 2022/0253194 A1 | 8/2022 | Berliner et al. |
| 2022/0255995 A1 | 8/2022 | Berliner et al. |
| 2022/0276720 A1 | 9/2022 | Yasui |
| 2022/0279303 A1 | 9/2022 | Marculescu et al. |
| 2022/0287676 A1 | 9/2022 | Steines et al. |
| 2022/0291808 A1 | 9/2022 | Stevens et al. |
| 2022/0292783 A1 | 9/2022 | Jayaram et al. |
| 2022/0292784 A1 | 9/2022 | Jayaram et al. |
| 2022/0292785 A1 | 9/2022 | Jayaram et al. |
| 2022/0295032 A1 | 9/2022 | Jayaram et al. |
| 2022/0295040 A1 | 9/2022 | Jayaram et al. |
| 2022/0295139 A1 | 9/2022 | Jayaram et al. |
| 2022/0301264 A1 | 9/2022 | O'leary et al. |
| 2022/0303680 A1 | 9/2022 | Ahmed et al. |
| 2022/0311950 A1 | 9/2022 | Ith et al. |
| 2022/0317776 A1 | 10/2022 | Sundstrom et al. |
| 2022/0319453 A1 | 10/2022 | Llull et al. |
| 2022/0326837 A1 | 10/2022 | Dessero et al. |
| 2022/0335697 A1 | 10/2022 | Harding et al. |
| 2022/0350463 A1 | 11/2022 | Walkin et al. |
| 2022/0365595 A1 | 11/2022 | Cieplinski et al. |
| 2022/0365740 A1 | 11/2022 | Chang et al. |
| 2022/0374136 A1 | 11/2022 | Chang et al. |
| 2022/0382385 A1 | 12/2022 | Chen et al. |
| 2022/0383592 A1 | 12/2022 | Hare et al. |
| 2022/0397962 A1 | 12/2022 | Goel et al. |
| 2022/0408164 A1 | 12/2022 | Lee et al. |
| 2022/0413691 A1 | 12/2022 | Becker et al. |
| 2022/0414975 A1 | 12/2022 | Becker et al. |
| 2022/0414999 A1 | 12/2022 | Ravasz et al. |
| 2022/0415094 A1 | 12/2022 | Kim et al. |
| 2023/0004216 A1 | 1/2023 | Rodgers et al. |
| 2023/0007335 A1 | 1/2023 | Gupta et al. |
| 2023/0008537 A1 | 1/2023 | Henderson et al. |
| 2023/0021861 A1 | 1/2023 | Fujiwara et al. |
| 2023/0027040 A1 | 1/2023 | Wang et al. |
| 2023/0030699 A1 | 2/2023 | Zion et al. |
| 2023/0031832 A1 | 2/2023 | Lipton et al. |
| 2023/0032545 A1 | 2/2023 | Mindlin et al. |
| 2023/0032771 A1 | 2/2023 | Zion et al. |
| 2023/0068660 A1 | 3/2023 | Brent et al. |
| 2023/0069764 A1 | 3/2023 | Jonker et al. |
| 2023/0074080 A1 | 3/2023 | Miller et al. |
| 2023/0076326 A1 | 3/2023 | Xu et al. |
| 2023/0086766 A1* | 3/2023 | Olwal ............ H04N 21/41407 725/10 |
| 2023/0092282 A1 | 3/2023 | Boesel et al. |
| 2023/0092874 A1 | 3/2023 | Krivoruchko et al. |
| 2023/0093979 A1 | 3/2023 | Stauber et al. |
| 2023/0094522 A1 | 3/2023 | Stauber et al. |
| 2023/0100610 A1 | 3/2023 | Pastrana Vicente et al. |
| 2023/0100689 A1 | 3/2023 | Chiu et al. |
| 2023/0103161 A1 | 3/2023 | Li et al. |
| 2023/0114080 A1 | 4/2023 | Yang et al. |
| 2023/0119162 A1 | 4/2023 | Lipton et al. |
| 2023/0120052 A1 | 4/2023 | Wallen et al. |
| 2023/0133579 A1 | 5/2023 | Chang et al. |
| 2023/0152889 A1 | 5/2023 | Cieplinski et al. |
| 2023/0152935 A1 | 5/2023 | Mckenzie et al. |
| 2023/0154122 A1 | 5/2023 | Dascola et al. |
| 2023/0163987 A1 | 5/2023 | Young et al. |
| 2023/0168745 A1 | 6/2023 | Yoda |
| 2023/0168788 A1 | 6/2023 | Faulkner et al. |
| 2023/0176806 A1 | 6/2023 | Chen et al. |
| 2023/0185426 A1 | 6/2023 | Rockel et al. |
| 2023/0186577 A1 | 6/2023 | Rockel et al. |
| 2023/0206572 A1 | 6/2023 | Pazmino et al. |
| 2023/0221833 A1 | 7/2023 | Holder et al. |
| 2023/0244857 A1 | 8/2023 | Weiss et al. |
| 2023/0259265 A1 | 8/2023 | Krivoruchko et al. |
| 2023/0260240 A1 | 8/2023 | Jayaram et al. |
| 2023/0266859 A1 | 8/2023 | Day et al. |
| 2023/0273706 A1 | 8/2023 | Smith et al. |
| 2023/0274504 A1 | 8/2023 | Ren et al. |
| 2023/0290042 A1 | 9/2023 | Casella et al. |
| 2023/0308610 A1 | 9/2023 | Henderson et al. |
| 2023/0315270 A1 | 10/2023 | Hylak et al. |
| 2023/0316634 A1 | 10/2023 | Chiu et al. |
| 2023/0316658 A1 | 10/2023 | Smith et al. |
| 2023/0325004 A1 | 10/2023 | Burns et al. |
| 2023/0325046 A1 | 10/2023 | De Almeida E De Vincenzo et al. |
| 2023/0333646 A1 | 10/2023 | Pastrana Vicente et al. |
| 2023/0334808 A1 | 10/2023 | Sundstrom et al. |
| 2023/0341932 A1 | 10/2023 | Silva et al. |
| 2023/0343049 A1 | 10/2023 | Boesel et al. |
| 2023/0351702 A1 | 11/2023 | Tan et al. |
| 2023/0353398 A1 | 11/2023 | White |
| 2023/0359199 A1 | 11/2023 | Adachi et al. |
| 2023/0377259 A1 | 11/2023 | Becker et al. |
| 2023/0377295 A1 | 11/2023 | Angevine et al. |
| 2023/0377299 A1 | 11/2023 | Becker et al. |
| 2023/0377300 A1 | 11/2023 | Becker et al. |
| 2023/0384907 A1 | 11/2023 | Boesel et al. |
| 2023/0388357 A1 | 11/2023 | Faulkner et al. |
| 2023/0394755 A1 | 12/2023 | Negoita et al. |
| 2023/0396854 A1 | 12/2023 | Sanders et al. |
| 2024/0037886 A1 | 2/2024 | Chiu et al. |
| 2024/0062279 A1 | 2/2024 | Scully et al. |
| 2024/0070948 A1 | 2/2024 | Bradley et al. |
| 2024/0086031 A1 | 3/2024 | Palangie et al. |
| 2024/0086032 A1 | 3/2024 | Palangie et al. |
| 2024/0087256 A1 | 3/2024 | Hylak et al. |
| 2024/0094863 A1 | 3/2024 | Smith et al. |
| 2024/0094866 A1 | 3/2024 | Lemay et al. |
| 2024/0094882 A1 | 3/2024 | Brewer et al. |
| 2024/0095984 A1 | 3/2024 | Ren et al. |
| 2024/0102821 A1 | 3/2024 | Vallet et al. |
| 2024/0103613 A1 | 3/2024 | Chawda et al. |
| 2024/0103616 A1 | 3/2024 | Yerkes et al. |
| 2024/0103636 A1 | 3/2024 | Lindmeier et al. |
| 2024/0103676 A1 | 3/2024 | Pastrana Vicente et al. |
| 2024/0103684 A1 | 3/2024 | Yu et al. |
| 2024/0103685 A1 | 3/2024 | Pazmino et al. |
| 2024/0103686 A1 | 3/2024 | Pazmino et al. |
| 2024/0103687 A1 | 3/2024 | Pastrana Vicente et al. |
| 2024/0103701 A1 | 3/2024 | Pastrana Vicente et al. |
| 2024/0103704 A1 | 3/2024 | Pastrana Vicente et al. |
| 2024/0103707 A1 | 3/2024 | Henderson et al. |
| 2024/0103716 A1 | 3/2024 | Pastrana Vicente et al. |

(56) References Cited

U.S. PATENT DOCUMENTS

| | | |
|---|---|---|
| 2024/0103803 A1 | 3/2024 | Krivoruchko et al. |
| 2024/0104836 A1 | 3/2024 | Dessero et al. |
| 2024/0104843 A1 | 3/2024 | Mckenzie et al. |
| 2024/0104870 A1 | 3/2024 | Fuste Lleixa et al. |
| 2024/0104873 A1 | 3/2024 | Pastrana Vicente et al. |
| 2024/0104875 A1 | 3/2024 | Couche et al. |
| 2024/0104876 A1 | 3/2024 | Couche et al. |
| 2024/0104877 A1 | 3/2024 | Henderson et al. |
| 2024/0119682 A1 | 4/2024 | Rudman et al. |
| 2024/0135612 A1 | 4/2024 | Hold-geoffroy et al. |
| 2024/0152256 A1 | 5/2024 | Dascola et al. |
| 2024/0185514 A1 | 6/2024 | Singh et al. |
| 2024/0192764 A1 | 6/2024 | Dascola et al. |
| 2024/0193892 A1 | 6/2024 | Lutter et al. |
| 2024/0200967 A1 | 6/2024 | Arroyo et al. |
| 2024/0203066 A1 | 6/2024 | Kawashima et al. |
| 2024/0205509 A1 | 6/2024 | Kim et al. |
| 2024/0221273 A1 | 7/2024 | Dusseau et al. |
| 2024/0221291 A1 | 7/2024 | Henderson et al. |
| 2024/0233097 A1 | 7/2024 | Ngo et al. |
| 2024/0233288 A1 | 7/2024 | Stauber et al. |
| 2024/0265656 A1 | 8/2024 | Victor-faichney et al. |
| 2024/0265796 A1* | 8/2024 | Ippadi Veerabhadre Gowda ........ G08B 21/18 |
| 2024/0272722 A1 | 8/2024 | Gitter et al. |
| 2024/0272782 A1 | 8/2024 | Pastrana Vicente et al. |
| 2024/0273838 A1 | 8/2024 | Palangie et al. |
| 2024/0281108 A1 | 8/2024 | Krivoruchko et al. |
| 2024/0281109 A1 | 8/2024 | Manjunath et al. |
| 2024/0291953 A1 | 8/2024 | Cerra et al. |
| 2024/0302948 A1 | 9/2024 | Hylak et al. |
| 2024/0310971 A1 | 9/2024 | Kawashima et al. |
| 2024/0338104 A1 | 10/2024 | Salter et al. |
| 2024/0338921 A1 | 10/2024 | Burgner et al. |
| 2024/0361832 A1 | 10/2024 | Calderone et al. |
| 2024/0361833 A1 | 10/2024 | Calderone et al. |
| 2024/0361835 A1 | 10/2024 | Hylak et al. |
| 2024/0361901 A1 | 10/2024 | Ravasz et al. |
| 2024/0393876 A1 | 11/2024 | Chawda et al. |
| 2024/0402800 A1 | 12/2024 | Shutzberg et al. |
| 2024/0402821 A1 | 12/2024 | Meyer et al. |
| 2024/0403080 A1 | 12/2024 | Laurita et al. |
| 2024/0404206 A1 | 12/2024 | Chiu et al. |
| 2024/0404207 A1 | 12/2024 | Laurita et al. |
| 2024/0404232 A1 | 12/2024 | Rockwell et al. |
| 2024/0404233 A1 | 12/2024 | Boesel et al. |
| 2024/0411444 A1 | 12/2024 | Shutzberg et al. |
| 2024/0420435 A1 | 12/2024 | Gitter et al. |
| 2024/0428488 A1 | 12/2024 | Ren et al. |
| 2025/0005855 A1 | 1/2025 | Holder et al. |
| 2025/0005864 A1 | 1/2025 | Dessero et al. |
| 2025/0008057 A1 | 1/2025 | Chiu et al. |
| 2025/0013343 A1 | 1/2025 | Smith et al. |
| 2025/0013344 A1 | 1/2025 | Smith et al. |
| 2025/0024008 A1 | 1/2025 | Cerra et al. |
| 2025/0028423 A1 | 1/2025 | Dessero et al. |
| 2025/0029319 A1 | 1/2025 | Boesel et al. |
| 2025/0029328 A1 | 1/2025 | Smith et al. |
| 2025/0031002 A1 | 1/2025 | Hawkins et al. |
| 2025/0036253 A1 | 1/2025 | Stauber et al. |
| 2025/0036255 A1 | 1/2025 | Pastrana Vicente et al. |
| 2025/0069328 A1 | 2/2025 | Herscher et al. |
| 2025/0077060 A1 | 3/2025 | Becker et al. |
| 2025/0077066 A1 | 3/2025 | Lutter |
| 2025/0078420 A1 | 3/2025 | Dessero et al. |
| 2025/0078429 A1 | 3/2025 | Dascola et al. |
| 2025/0103132 A1 | 3/2025 | Rickwald et al. |
| 2025/0104335 A1 | 3/2025 | Huang et al. |
| 2025/0104367 A1 | 3/2025 | Huang et al. |
| 2025/0106581 A1 | 3/2025 | Lutter et al. |
| 2025/0106582 A1 | 3/2025 | Lutter et al. |
| 2025/0110605 A1 | 4/2025 | Huang et al. |
| 2025/0111472 A1 | 4/2025 | Lutter et al. |
| 2025/0111605 A1 | 4/2025 | Huang et al. |
| 2025/0111622 A1 | 4/2025 | Stern et al. |
| 2025/0117079 A1 | 4/2025 | Chiu et al. |
| 2025/0118038 A1 | 4/2025 | Sorrentino et al. |
| 2025/0130707 A1 | 4/2025 | Stauber et al. |
| 2025/0156031 A1 | 5/2025 | Holder et al. |
| 2025/0157136 A1 | 5/2025 | Lindmeier et al. |
| 2025/0165069 A1 | 5/2025 | Calderone et al. |

FOREIGN PATENT DOCUMENTS

| | | |
|---|---|---|
| CN | 104714771 A | 6/2015 |
| CN | 104981681 A | 10/2015 |
| CN | 105264461 A | 1/2016 |
| CN | 105264478 A | 1/2016 |
| CN | 106990838 A | 7/2017 |
| CN | 108519818 A | 9/2018 |
| CN | 108633307 A | 10/2018 |
| CN | 110413171 A | 11/2019 |
| CN | 110476142 A | 11/2019 |
| CN | 110543230 A | 12/2019 |
| CN | 110673718 A | 1/2020 |
| CN | 111580652 A | 8/2020 |
| CN | 111641843 A | 9/2020 |
| CN | 111913565 A | 11/2020 |
| CN | 112068757 A | 12/2020 |
| CN | 109491508 B | 8/2022 |
| CN | 115309271 A | 11/2022 |
| CN | 116132905 A | 5/2023 |
| CN | 117043722 A | 11/2023 |
| CN | 117857981 A | 4/2024 |
| CN | 118102204 A | 5/2024 |
| DE | 102016125811 A1 | 11/2017 |
| DE | 102020128536 A1 | 5/2021 |
| EP | 0816983 A2 | 1/1998 |
| EP | 1530115 A2 | 5/2005 |
| EP | 1562021 A1 | 8/2005 |
| EP | 2393056 A1 | 12/2011 |
| EP | 2458486 A1 | 5/2012 |
| EP | 2551763 A1 | 1/2013 |
| EP | 2741175 A2 | 6/2014 |
| EP | 2893297 A1 | 7/2015 |
| EP | 2947545 A1 | 11/2015 |
| EP | 3088997 A1 | 11/2016 |
| EP | 3118722 A1 | 1/2017 |
| EP | 3249497 A1 | 11/2017 |
| EP | 3316075 A1 | 5/2018 |
| EP | 3336805 A1 | 6/2018 |
| EP | 3451135 A1 | 3/2019 |
| EP | 3503101 A1 | 6/2019 |
| EP | 3506151 A1 | 7/2019 |
| EP | 3570144 A1 | 11/2019 |
| EP | 3588255 A1 | 1/2020 |
| EP | 3654147 A1 | 5/2020 |
| EP | 4155867 A1 | 3/2023 |
| EP | 3688726 B1 | 8/2023 |
| GB | 2540791 A | 2/2017 |
| JP | H06-4596 A | 1/1994 |
| JP | H10-51711 A | 2/1998 |
| JP | H10-78845 A | 3/1998 |
| JP | H11-289555 A | 10/1999 |
| JP | 2005-215144 A | 8/2005 |
| JP | 2005-333524 A | 12/2005 |
| JP | 2006-4093 A | 1/2006 |
| JP | 2006-107048 A | 4/2006 |
| JP | 2006-146803 A | 6/2006 |
| JP | 2006-295236 A | 10/2006 |
| JP | 2011-203880 A | 10/2011 |
| JP | 2012-234550 A | 11/2012 |
| JP | 2013-178639 A | 9/2013 |
| JP | 2013-196158 A | 9/2013 |
| JP | 2013-254358 A | 12/2013 |
| JP | 2013-257716 A | 12/2013 |
| JP | 2014-21565 A | 2/2014 |
| JP | 2014-59840 A | 4/2014 |
| JP | 2014-71663 A | 4/2014 |
| JP | 2014-99184 A | 5/2014 |
| JP | 2014-514652 A | 6/2014 |
| JP | 2014-514653 A | 6/2014 |
| JP | 2015-56173 A | 3/2015 |
| JP | 2015-515040 A | 5/2015 |

(56) References Cited

FOREIGN PATENT DOCUMENTS

| | | |
|---|---|---|
| JP | 2015-118332 A | 6/2015 |
| JP | 2016-96513 A | 5/2016 |
| JP | 2016-194744 A | 11/2016 |
| JP | 2017-27206 A | 2/2017 |
| JP | 2017-58528 A | 3/2017 |
| JP | 2017-126009 A | 7/2017 |
| JP | 2017-531221 A | 10/2017 |
| JP | 2018-5516 A | 1/2018 |
| JP | 2018-5517 A | 1/2018 |
| JP | 2018-41477 A | 3/2018 |
| JP | 2018-514005 A | 5/2018 |
| JP | 2018-88118 A | 6/2018 |
| JP | 2018-101019 A | 6/2018 |
| JP | 2018-106499 A | 7/2018 |
| JP | 6438869 B2 | 12/2018 |
| JP | 2019-40333 A | 3/2019 |
| JP | 2019-169154 A | 10/2019 |
| JP | 2019-175449 A | 10/2019 |
| JP | 2019-527881 A | 10/2019 |
| JP | 2019-532382 A | 11/2019 |
| JP | 2019-536131 A | 12/2019 |
| JP | 2020-503595 A | 1/2020 |
| JP | 2020-86913 A | 6/2020 |
| JP | 2022-53334 A | 4/2022 |
| JP | 2022-175629 A | 11/2022 |
| JP | 2023-52278 A | 4/2023 |
| KR | 10-2011-0017236 A | 2/2011 |
| KR | 10-2014-0097654 A | 8/2014 |
| KR | 10-2016-0012139 A | 2/2016 |
| KR | 10-2017-0027240 A | 3/2017 |
| KR | 10-2018-0102171 A | 9/2018 |
| KR | 10-2019-0100957 A | 8/2019 |
| KR | 10-2020-0010296 A | 1/2020 |
| KR | 10-2020-0035103 A | 4/2020 |
| KR | 10-2020-0110788 A | 9/2020 |
| KR | 10-2020-0135496 A | 12/2020 |
| KR | 10-2021-0083016 A | 7/2021 |
| WO | 2010/026519 A1 | 3/2010 |
| WO | 2011/008638 A1 | 1/2011 |
| WO | 2012/145180 A1 | 10/2012 |
| WO | 2013/169849 A2 | 11/2013 |
| WO | 2014/105276 A1 | 7/2014 |
| WO | 2014/203301 A1 | 12/2014 |
| WO | 2015/130150 A1 | 9/2015 |
| WO | 2015/192117 A1 | 12/2015 |
| WO | 2015/195216 A1 | 12/2015 |
| WO | 2016/118344 A1 | 7/2016 |
| WO | 2017/024142 A1 | 2/2017 |
| WO | 2017/088487 A1 | 6/2017 |
| WO | 2018/046957 A2 | 3/2018 |
| WO | 2018/090060 A1 | 5/2018 |
| WO | 2018/175735 A1 | 9/2018 |
| WO | 2019/067902 A1 | 4/2019 |
| WO | 2019/074771 A1 | 4/2019 |
| WO | 2019/142560 A1 | 7/2019 |
| WO | 2019/172678 A1 | 9/2019 |
| WO | 2019/213111 A1 | 11/2019 |
| WO | 2019/217163 A1 | 11/2019 |
| WO | 2020/066682 A1 | 4/2020 |
| WO | 2020/121483 A1 | 6/2020 |
| WO | 2020/179027 A1 | 9/2020 |
| WO | 2020/247256 A1 | 12/2020 |
| WO | 2021/061349 A1 | 4/2021 |
| WO | 2021/061351 A1 | 4/2021 |
| WO | 2021/133053 A1 | 7/2021 |
| WO | 2021/173839 A1 | 9/2021 |
| WO | 2021/202783 A1 | 10/2021 |
| WO | 2022/046340 A1 | 3/2022 |
| WO | 2022/055821 A1 | 3/2022 |
| WO | 2022/055822 A1 | 3/2022 |
| WO | 2022/066399 A1 | 3/2022 |
| WO | 2022/066535 A2 | 3/2022 |
| WO | 2022/067075 A1 | 3/2022 |
| WO | 2022/067343 A2 | 3/2022 |
| WO | 2022/072187 A2 | 4/2022 |
| WO | 2022/146936 A1 | 7/2022 |
| WO | 2022/146938 A1 | 7/2022 |
| WO | 2022/147146 A1 | 7/2022 |
| WO | 2022/164881 A1 | 8/2022 |
| WO | 2022/192040 A1 | 9/2022 |
| WO | 2022/208797 A1 | 10/2022 |
| WO | 2022/225795 A1 | 10/2022 |
| WO | 2023/043646 A1 | 3/2023 |
| WO | 2023/096940 A2 | 6/2023 |
| WO | 2023/141535 A1 | 7/2023 |

OTHER PUBLICATIONS

Corrected Notice of Allowability received for U.S. Appl. No. 17/932,655, mailed on Oct. 12, 2023, 2 pages.
Extended European Search Report received for European Patent Application No. 23158818.7, mailed on Jul. 3, 2023, 12 pages.
Extended European Search Report received for European Patent Application No. 23158929.2, mailed on Jun. 27, 2023, 12 pages.
Final Office Action received for U.S. Appl. No. 17/659,147, mailed on Oct. 4, 2023, 17 pages.
International Search Report for PCT Application No. PCT/US2022/076608, mailed Feb. 24, 2023, 8 pages.
International Search Report received for PCT Application No. PCT/US2022/076719, mailed on Mar. 3, 2023, 8 pages.
International Search Report received for PCT Patent Application No. PCT/US2021/071518, mailed on Feb. 25, 2022, 7 pages.
International Search Report received for PCT Patent Application No. PCT/US2021/071596, mailed on Apr. 8, 2022, 7 pages.
International Search Report received for PCT Patent Application No. PCT/US2022/071704, mailed on Aug. 26, 2022, 6 pages.
Non-Final Office Action received for U.S Appl. No. 17/659,147, mailed on Mar. 16, 2023, 19 pages.
Non-Final Office Action received for U.S. Appl. No. 17/932,655, mailed on Apr. 20, 2023, 10 pages.
Non-Final Office Action received for U.S. Appl. No. 17/479,791, mailed on May 11, 2022, 18 pages.
Notice of Allowance received for U.S. Appl. No. 17/448,876, mailed on Apr. 7, 2022, 9 pages.
Notice of Allowance received for U.S. Appl. No. 17/448,876, mailed on Jul. 20, 2022, 8 pages.
Notice of Allowance received for U.S. Appl. No. 17/479,791, mailed on Mar. 13, 2023, 9 pages.
Notice of Allowance received for U.S. Appl. No. 17/479,791, mailed on Nov. 17, 2022, 9 pages.
Notice of Allowance received for U.S. Appl. No. 17/650,775, mailed on Sep. 18, 2023, 10 pages.
Notice of Allowance received for U.S. Appl. No. 17/932,655, mailed on Sep. 29, 2023, 7 pages.
Simple Modal Window With Background Blur Effect, Available online at: <http://web.archive.org/web/20160313233427/https://www.cssscript.com/simple-modal-window-with-background-blur-effect/ >, Mar. 13, 2016, 5 pages.
Yamada, Yoshihiro, "How to generate a modal window with ModalPopup control", Available online at: <http://web.archive.org/web/20210920015801/https://atmarkit.itmedia.co.jp/fdotnet/dotnettips/580aspajaxmodalpopup/aspajaxmodalpopup.html >, Sep. 20, 2021, 7 Pages (Official Copy Only).
Non-Final Office Action received for U.S. Appl. No. 18/473,197, mailed on May 1, 2025, 14 pages.
Non-Final Office Action received for U.S. Appl. No. 18/317,886, mailed on Apr. 30, 2025, 34 pages.
3D Flow, "Coloring a Point Cloud Using 3DF Zephyr Pro", Wayback Machine, https://webarchive.org/web/20170522233043/http://www_3dflow.net:80/techndogy/documents/3df-zephyr-tutorials/point-cloud-coloring-using-3df-zephyr/, May 22, 2017, 1 page.
Capturing Reality, "Data Sheet RealityCapture TARASQUE 1.2", Wayback Machine, https://web.archive.org/web/20220327110303/https://www.capturingreality.com/assets/DocumenWdatasheet_TARASQUE_1.2.pdf, Mar. 27, 2022, 5 pages.
Capturing Reality, "Realitycapture tutorial: Complete model in PPI", Youtube, https://www.youtube.com/watch?v=tw6wNNEbH_M, Oct. 14, 2021, 2 Pages.

(56) References Cited

OTHER PUBLICATIONS

Lachambre, et al., "Unity Photogrammetry Workflow", https://unity3d.com/files/solutions/photogrammetry/Unity-Photogrammetry-Workflow_2017-07_v2.pdf, Jun. 23, 2017, pp. 55-64.
Lor Cas, "Reality Capture: Exportng Mesh", Youtube, https://www.youtube.com/watch?v=PdvTRa2B_s0, Dec. 10, 2020, 2 pages.
PI3DSCAN, "Process a 3D scan projection in Reality capture (RC)", wayback Machine, https://web.archive.org/web/20200116135047/http:http:/www.pi3dscan.com/index.php/instructions/item/process-a-3d-scan-with-projection-in-reality-capture-rc, Jan. 16, 2020, 1 page.
Schuetz, Markus, "Interactive Exploration of point Clouds", Technische Universitat Wien, reposiTUm, https://doi.org/10.34725/hss.2021.91568, Mar. 8, 2021, 119 pages.
Notice of Allowance received for U.S. Appl. No. 18/322,469, mailed on Mar. 19, 2025, 14 pages.
Corrected Notice of Allowability received for U.S. Appl. No. 18/146,234, mailed on Mar. 20, 2025, 2 pages.
Corrected Notice of Allowability received for U.S. Appl. No. 18/473,180, mailed on Apr. 1, 2025, 2 pages.
Non-Final Office Action received for U.S. Appl. No. 18/174,403, mailed on Mar. 20, 2025, 26 pages.
Non-Final Office Action received for U.S. Appl. No. 18/317,890, mailed on Apr. 17, 2025, 26 pages.
Non-Final Office Action received for U.S. Appl. No. 18/327,844, mailed on Mar. 24, 2025, 27 pages.
International Search Report received for PCT Patent Application No. PCT/US2024/012828, mailed on May 6, 2024, 4 pages.
International Search Report received for PCT Patent Application No. PCT/US2024/032109, mailed on Sep. 13, 2024, 4 pages.
International Search Report received for PCT Patent Application No. PCT/US2024/032153, mailed on Nov. 11, 2024, 6 pages.
Notice of Allowance received for U.S Appl. No. 18/473,182, mailed on Apr. 23, 2025, 8 pages.
Notice of Allowance received for U.S. Appl. No. 18/427,434, mailed on Apr. 17, 2025, 9 pages.
Notice of Allowance received for U.S. Appl. No. 18/515,188, mailed on Mar. 20, 2025, 9 pages.
Adding Environments, Available online at: https://manual.keyshot.com/manual/environments/adding-environments/, [retrieved on Jun. 9, 2023], 2 pages.
Applicant-Initiated Interview Summary received for U.S. Appl. No. 18/119,219, mailed on May 21, 2024, 3 pages.
AquaSnap Window Manager: dock, snap, tile, organize [online], Nurgo Software, Available online at: <https://www.nurgo-software.com/products/aquasnap>, [retrieved on Jun. 27, 2023], 5 pages.
Area Light, Available online at: https://manual.keyshot.com/manual/materials/material-types/light-sources/area-light/, [retrieved on Jun. 9, 2023], 24 pages.
Artec Leo, Artec 3D [online], 2018 [retrieved on Apr. 25, 2024]. Retrieved from the Internet: <URL: https://artec3d.com/portable-3d-scanners/artec-leo>, 39 pages.
Artec Leo Full 3D Scanning Demo w/ Sample Data, Digitize Designs, LLC, Available online at: <https://www.youtube.com/watch?v=ecBKo_h3Pug>, [retrieved on Sep. 1, 2022], Feb. 22, 2019, 3 pages.
Corrected Notice of Allowability received for U.S. Appl. No. 17/448,875, mailed on Apr. 24, 2024, 4 pages.
Corrected Notice of Allowability received for U.S. Appl. No. 17/469,788, mailed on Feb. 12, 2025, 2 pages.
Corrected Notice of Allowability received for U.S. Appl. No. 17/659,147, mailed on Feb. 14, 2024, 6 pages.
Corrected Notice of Allowability received for U.S. Appl. No. 17/932,999, mailed on Feb. 20, 2025, 2 pages.
Corrected Notice of Allowability received for U.S. Appl. No. 17/932,999, mailed on Jan. 23, 2025, 9 pages.
Corrected Notice of Allowability received for U.S. Appl. No. 17/935,095, mailed on Oct. 18, 2024, 3 pages.
Corrected Notice of Allowability received for U.S. Appl. No. 18/146,234, mailed on Feb. 6, 2025, 2 pages.
Corrected Notice of Allowability received for U.S. Appl. No. 18/154,757, mailed on Aug. 30, 2024, 2 pages.
Corrected Notice of Allowability received for U.S. Appl. No. 18/174,337, mailed on Jan. 15, 2025, 2 pages.
Corrected Notice of Allowability received for U.S. Appl. No. 18/421,827, mailed on Aug. 29, 2024, 2 pages.
Corrected Notice of Allowability received for U.S. Appl. No. 18/463,739, mailed on Oct. 4, 2024, 2 pages.
Corrected Notice of Allowability received for U.S. Appl. No. 18/465,098, mailed on Mar. 13, 2024, 3 pages.
Corrected Notice of Allowance received for U.S. Appl. No. 17/407,675, mailed on Dec. 24, 2024, 2 pages.
Corrected Notice of Allowance received for U.S. Appl. No. 17/478,593, mailed on Dec. 21, 2022, 2 pages.
Corrected Notice of Allowance received for U.S. Appl. No. 18/119,219, mailed on Sep. 11, 2024, 2 pages.
Corrected Notice of Allowance received for U.S. Appl. No. 18/152,656, mailed on Dec. 20, 2024, 5 pages.
Curious Blocks Alternatives 12, progsoft [online]. Profsoft, Available Online at: <URL: https://progsoft.net/en/software/curious-blocks>, [retrieved on Apr. 25, 2024], 2024, 7 pages.
European Search Report received for European Patent Application No. 21791153.6, mailed on Mar. 22, 2024, 5 pages.
European Search Report received for European Patent Application No. 21801378.7, mailed on Jul. 10, 2024, 5 pages.
European Search Report received for European Patent Application No. 22703771.0, mailed on Feb. 26, 2025, 4 pages.
Ex Parte Quayle Action received for U.S. Appl. No. 17/655,347, mailed on Jul. 8, 2024, 6 pages.
Extended European Search Report received for European Patent Application No. 23197572.3, mailed on Feb. 19, 2024, 7 pages.
Extended European Search Report received for European Patent Application No. 24158036.4, mailed on Jul. 18, 2024, 12 pages.
Extended European Search Report received for European Patent Application No. 24159868.9, mailed on Oct. 9, 2024, 13 pages.
Extended European Search Report received for European Patent Application No. 24171800.6, mailed on Sep. 5, 2024, 15 pages.
Extended European Search Report received for European Patent Application No. 24171804.8, mailed on Sep. 5, 2024, 13 pages.
Extended European Search Report received for European Patent Application No. 24178730.8, mailed on Oct. 14, 2024, 8 pages.
Extended European Search Report received for European Patent Application No. 24178752.2, mailed on Oct. 4, 2024, 8 pages.
Extended European Search Report received for European Patent Application No. 24179233.2, mailed on Oct. 2, 2024, 10 pages.
Extended European Search Report received for European Patent Application No. 24179830.5, mailed on Nov. 5, 2024, 11 pages.
Extended European Search Report received for European Patent Application No. 24190323.6, mailed on Dec. 12, 2024, 9 pages.
Extended European Search Report received for European Patent Application No. 24217335.9, mailed on Feb. 24, 2025, 8 pages.
Eye-supported target positioning in MRTK, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/EyeTracking/EyeTracking_Positioning.html>, 2 pages.
Feature Highlights, Available online at: https://manual.keyshot.com/manual/whats-new/feature-highlights/, [retrieved on Jun. 9, 2023], 28 pages.
Final Office Action received for U.S. Appl. No. 14/531,874, mailed on Nov. 4, 2016, 10 pages.
Final Office Action received for U.S. Appl. No. 15/644,639, mailed on Sep. 19, 2019, 12 pages.
Final Office Action received for U.S. Appl. No. 17/202,034, mailed on May 4, 2023, 41 pages.
Final Office Action received for U.S. Appl. No. 17/202,034, mailed on Nov. 4, 2024, 50 pages.
Final Office Action received for U.S. Appl. No. 17/407,675, mailed on May 22, 2024, 18 pages.
Final Office Action received for U.S. Appl. No. 17/448,875, mailed on Mar. 16, 2023, 24 pages.
Final Office Action received for U.S. Appl. No. 17/469,788, mailed on Nov. 16, 2023, 24 pages.

(56) References Cited

OTHER PUBLICATIONS

Final Office Action received for U.S. Appl. No. 17/580,495, mailed on Feb. 12, 2025, 29 pages.
Final Office Action received for U.S. Appl. No. 17/580,495, mailed on May 13, 2024, 29 pages.
Final Office Action received for U.S. Appl. No. 17/807,226, mailed on Nov. 30, 2023, 23 pages.
Final Office Action received for U.S. Appl. No. 17/812,965, mailed on Jan. 31, 2024, 9 pages.
Final Office Action received for U.S. Appl. No. 17/814,462, mailed on Nov. 1, 2024, 44 pages.
Final Office Action received for U.S. Appl. No. 17/816,314, mailed on Jan. 20, 2023, 11 pages.
Final Office Action received for U.S. Appl. No. 17/905,483, mailed on Jan. 8, 2025, 19 pages.
Final Office Action received for U.S. Appl. No. 17/934,104, mailed on Oct. 18, 2024, 28 pages.
Final Office Action received for U.S. Appl. No. 17/935,095, mailed on Dec. 29, 2023, 15 pages.
Final Office Action received for U.S. Appl. No. 18/157,040, mailed on Dec. 2, 2024, 25 pages.
Final Office Action received for U.S. Appl. No. 18/182,300, mailed on Feb. 16, 2024, 32 pages.
Final Office Action received for U.S. Appl. No. 18/182,300, mailed on Oct. 31, 2024, 34 pages.
Final Office Action received for U.S. Appl. No. 18/327,844, mailed on Nov. 29, 2024, 25 pages.
Final Office Action received for U.S. Appl. No. 18/375,280, mailed on Jul. 12, 2024, 19 pages.
Final Office Action received for U.S. Appl. No. 18/473,196, mailed on Dec. 6, 2024, 22 pages.
Home | Virtual Desktop [online], Virtual Desktop, Available online at: <https://www.vrdesktop.net>, [retrieved on Jun. 29, 2023], 4 pages.
How to Use Your Phone or Tablet in VR! | iOS and Android, YouTube [online]. YouTube, Dec. 20, 2017, Available online at <https://www.youtube.com/watch?v=QhfZjbVUxZE>, [Retrieved from Internet on Dec. 23, 2022], 4 pages.
International Search Report received for PCT Application No. PCT/US2022/076603, mailed on Jan. 9, 2023, 4 pages.
International Search Report received for PCT Application No. PCT/US2023/018213, mailed on Jul. 26, 2023, 6 pages.
International Search Report received for PCT Application No. PCT/US2023/060052, mailed on May 24, 2023, 6 pages.
International Search Report received for PCT Application No. PCT/US2023/060943, mailed on Jun. 6, 2023, 7 pages.
International Search Report received for PCT Application No. PCT/US2023/074962, mailed on Jan. 19, 2024, 9 pages.
International Search Report received for PCT Application No. PCT/US2024/030107, mailed on Oct. 23, 2024, 9 pages.
International Search Report received for PCT Application No. PCT/US2024/032314, mailed on Nov. 11, 2024, 6 pages.
International Search Report received for PCT Application No. PCT/US2024/032451, mailed on Nov. 15, 2024, 6 pages.
International Search Report received for PCT Application No. PCT/US2024/032456, mailed on Nov. 14, 2024, 6 pages.
International Search Report received for PCT Patent Application No. PCT/US2015/029727, mailed on Nov. 2, 2015, 6 pages.
International Search Report received for PCT Patent Application No. PCT/US2021/022413, mailed on Aug. 13, 2021, 7 pages.
Yue et al., "Optimal Region Selection for Stereoscopic Video Subtitle Insertion", IEEE Transactions on Circuits and Systems for Video Technology, vol. 28, No. 11, Nov. 2018, 13 pages.
International Search Report received for PCT Patent Application No. PCT/US2021/049520, mailed on Apr. 8, 2022, 8 pages.
International Search Report received for PCT Patent Application No. PCT/US2021/050948, mailed on Mar. 4, 2022, 6 pages.
International Search Report received for PCT Patent Application No. PCT/US2021/071595, mailed on Mar. 17, 2022, 7 pages.
International Search Report received for PCT Patent Application No. PCT/US2022/013208, mailed on Apr. 26, 2022, 7 pages.
International Search Report received for PCT Patent Application No. PCT/US2022/071208, mailed on Aug. 18, 2022, 9 pages.
Writtenhouse Sandy, "How to Use Live View on Google Maps", Available online at <https://www.lifewire.com/use-live-view-google-maps-5323691>, [Retrieved from Internet on Jun. 27, 2024], Jul. 5, 2022, 6 pages.
International Search Report received for PCT Patent Application No. PCT/US2022/076808, mailed on Mar. 28, 2023, 6 pages.
International Search Report received for PCT Patent Application No. PCT/US2022/076985, mailed on Feb. 20, 2023, 5 pages.
International Search Report received for PCT Patent Application No. PCT/US2022/082379, mailed on May 30, 2023, 7 pages.
International Search Report received for PCT Patent Application No. PCT/US2023/019309, mailed on Sep. 1, 2023, 6 pages.
International Search Report received for PCT Patent Application No. PCT/US2023/060429, mailed on Jun. 28, 2023, 7 pages.
International Search Report received for PCT Patent Application No. PCT/US2023/060592, mailed on Jun. 14, 2023, 7 pages.
International Search Report received for PCT Patent Application No. PCT/US2023/074257, mailed on Nov. 21, 2023, 5 pages.
International Search Report received for PCT Patent Application No. PCT/US2023/074793, mailed on Feb. 6, 2024, 6 pages.
International Search Report received for PCT Patent Application No. PCT/US2023/074950, mailed on Jan. 3, 2024, 7 pages.
International Search Report received for PCT Patent Application No. PCT/US2023/074955, mailed on Feb. 1, 2024, 6 pages.
International Search Report received for PCT Patent Application No. PCT/US2023/074957, mailed on Jan. 30, 2024, 7 pages.
International Search Report received for PCT Patent Application No. PCT/US2023/074968, mailed on Feb. 26, 2024, 7 pages.
International Search Report received for PCT Patent Application No. PCT/US2023/074979, mailed on Feb. 26, 2024, 6 pages.
International Search Report received for PCT Patent Application No. PCT/US2024/013602, mailed on Apr. 29, 2024, 4 pages.
International Search Report received for PCT Patent Application No. PCT/US2024/026102, mailed on Aug. 26, 2024, 5 pages.
International Search Report received for PCT Patent Application No. PCT/US2024/030661, mailed on Nov. 4, 2024, 5 pages.
International Search Report received for PCT Patent Application No. PCT/US2024/032455, mailed on Sep. 25, 2024, 4 pages.
International Search Report received for PCT Patent Application No. PCT/US2024/039190, mailed on Nov. 22, 2024, 5 pages.
International Search Report received for PCT Patent Application No. PCT/US2024/039204, mailed on Nov. 14, 2024, 4 pages.
Kitasenju Design, X [online], X Corp., Available Online at: <URL: https://twitter.com/kitasenjudesign/status/1282665402812608513>, [retrieved on Apr. 25, 2024], 2024, 1 page.
Letter Restarting Period for Response received for U.S. Appl. No. 15/644,639, mailed on Sep. 28, 2018, 8 pages.
Light Manager, Available online at: https://manual.keyshot.com/manual/lighting/lighting-manager/, [retrieved on Jun. 9, 2023], 3 pages.
MagicaVoxel 0.99.5 Review, YouTube [online], Google LLC, Available Online at: <URL: https://www.youtube.com/watch?v=WPPFnHQWwFk>, [retrieved on Apr. 25, 2024], 2024, 2 pages.
Non-Final Office Action received for U.S. Appl. No. 14/531,874, mailed on May 18, 2016, 11 pages.
Non-Final Office Action received for U.S. Appl. No. 15/644,639, mailed on Apr. 12, 2019, 11 pages.
Non-Final Office Action received for U.S. Appl. No. 15/644,639, mailed on Sep. 10, 2018, 9 pages.
Non-Final Office Action received for U.S. Appl. No. 16/881,599, mailed on Apr. 28, 2021, 8 pages.
Non-Final Office Action received for U.S. Appl. No. 17/123,000, mailed on Nov. 12, 2021, 8 pages.
Non-Final Office Action received for U.S. Appl. No. 17/202,034, mailed on Jan. 19, 2024, 44 pages.
Non-Final Office Action received for U.S. Appl. No. 17/202,034, mailed on Jul. 20, 2022, 38 pages.
Non-Final Office Action received for U.S. Appl. No. 17/407,675, mailed on Sep. 11, 2023, 16 pages.

(56) References Cited

OTHER PUBLICATIONS

Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023, 30 pages.
Non-Final Office Action received for U.S. Appl. No. 17/469,788, mailed on Mar. 2, 2023, 22 pages.
Non-Final Office Action received for U.S. Appl. No. 17/469,788, mailed on Mar. 21, 2024, 24 pages.
Non-Final Office Action received for U.S. Appl. No. 17/580,495, mailed on Aug. 15, 2024, 28 pages.
Non-Final Office Action received for U.S. Appl. No. 17/580,495, mailed on Dec. 11, 2023, 27 pages.
Non-Final Office Action received for U.S. Appl. No. 17/807,226, mailed on Jun. 26, 2023, 21 pages.
Non-Final Office Action received for U.S. Appl. No. 17/812,965, mailed on Jun. 8, 2023, 8 pages.
Non-Final Office Action received for U.S. Appl. No. 17/814,455, mailed on Feb. 16, 2024, 24 pages.
Non-Final Office Action received for U.S. Appl. No. 17/814,462, mailed on Feb. 1, 2024, 30 pages.
Non-Final Office Action received for U.S. Appl. No. 17/816,314, mailed on Jul. 6, 2023, 10 pages.
Non-Final Office Action received for U.S. Appl. No. 17/816,314, mailed on Sep. 23, 2022, 10 pages.
Non-Final Office Action received for U.S. Appl. No. 17/905,483, mailed on Mar. 27, 2024, 16 pages.
Non-Final Office Action received for U.S. Appl. No. 17/932,999, mailed on Feb. 23, 2024, 22 pages.
Non-Final Office Action received for U.S. Appl. No. 17/933,020, mailed on Jan. 30, 2025, 26 pages.
Non-Final Office Action received for U.S. Appl. No. 17/934,104, mailed on Mar. 25, 2024, 26 pages.
Non-Final Office Action received for U.S. Appl. No. 17/935,095, mailed on Jun. 22, 2023, 15 pages.
Non-Final Office Action received for U.S. Appl. No. 18/119,219, mailed on Mar. 28, 2024, 15 pages.
Non-Final Office Action received for U.S. Appl. No. 18/149,640, mailed on Jan. 15, 2025, 17 pages.
Non-Final Office Action received for U.S. Appl. No. 18/153,943, mailed on Dec. 31, 2024, 33 pages.
Non-Final Office Action received for U.S. Appl. No. 18/154,697, mailed on Nov. 24, 2023, 10 pages.
Non-Final Office Action received for U.S. Appl. No. 18/157,040, mailed on May 2, 2024, 25 pages.
Non-Final Office Action received for U.S. Appl. No. 18/182,300, mailed on May 29, 2024, 33 pages.
Non-Final Office Action received for U.S. Appl. No. 18/182,300, mailed on Oct. 26, 2023, 29 pages.
Non-Final Office Action received for U.S. Appl. No. 18/298,994, mailed on Mar. 7, 2025, 26 pages.
Non-Final Office Action received for U.S. Appl. No. 18/304,290, mailed on Mar. 5, 2025, 111 pages.
Non-Final Office Action received for U.S. Appl. No. 18/317,893, mailed on Apr. 25, 2024, 18 pages.
Non-Final Office Action received for U.S. Appl. No. 18/322,469, mailed on Nov. 15, 2024, 34 pages.
Non-Final Office Action received for U.S. Appl. No. 18/327,844, mailed on May 17, 2024, 20 pages.
Non-Final Office Action received for U.S. Appl. No. 18/336,770, mailed on Jun. 5, 2024, 12 pages.
Non-Final Office Action received for U.S. Appl. No. 18/375,280, mailed on Nov. 27, 2024, 17 pages.
Non-Final Office Action received for U.S. Appl. No. 18/427,434, mailed on Nov. 21, 2024, 17 pages.
Non-Final Office Action received for U.S. Appl. No. 18/429,301, mailed on Jun. 12, 2024, 28 pages.
Non-Final Office Action received for U.S. Appl. No. 18/473,196, mailed on Aug. 16, 2024, 21 pages.
Non-Final Office Action received for U.S. Appl. No. 18/473,196, mailed on Feb. 28, 2025, 20 pages.
Non-Final Office Action received for U.S. Appl. No. 18/645,292, mailed on Feb. 21, 2025, 39 pages.
Non-Final Office Action received for U.S. Appl. No. 18/988,115, mailed on Feb. 24, 2025, 40 pages.
Notice of Allowability received for U.S. Appl. No. 17/812,965, mailed on Jan. 15, 2025, 3 pages.
Notice of Allowability received for U.S. Appl. No. 17/814,455, mailed on Jan. 13, 2025, 7 pages.
Notice of Allowance received for U.S. Appl. No. 17/407,675, mailed on Aug. 20, 2024, 7 pages.
Notice of Allowance received for U.S. Appl. No. 18/154,757, mailed on Aug. 26, 2024, 12 pages.
Notice of Allowance received for U.S. Appl. No. 14/531,874, mailed on Mar. 28, 2017, 9 pages.
Notice of Allowance received for U.S. Appl. No. 15/644,639, mailed on Jan. 16, 2020, 16 pages.
Notice of Allowance received for U.S. Appl. No. 16/881,599, mailed on Dec. 17, 2021, 7 pages.
Notice of Allowance received for U.S. Appl. No. 17/123,000, mailed on May 27, 2022, 8 pages.
Notice of Allowance received for U.S. Appl. No. 17/123,000, mailed on Sep. 19, 2022, 7 pages.
Notice of Allowance received for U.S. Appl. No. 17/407,675, mailed on Dec. 11, 2024, 8 pages.
Notice of Allowance received for U.S. Appl. No. 17/448,875, mailed on Apr. 17, 2024, 8 pages.
Notice of Allowance received for U.S. Appl. No. 17/448,875, mailed on Jul. 12, 2024, 8 pages.
Notice of Allowance received for U.S. Appl. No. 17/469,788, mailed on Feb. 5, 2025, 5 pages.
Notice of Allowance received for U.S. Appl. No. 17/469,788, mailed on Oct. 15, 2024, 7 pages.
Notice of Allowance received for U.S. Appl. No. 17/478,593, mailed on Aug. 31, 2022, 10 pages.
Notice of Allowance received for U.S. Appl. No. 17/580,495, mailed on Jun. 6, 2023, 6 pages.
Notice of Allowance received for U.S. Appl. No. 17/580,495, mailed on Nov. 30, 2022, 12 pages.
Notice of Allowance received for U.S. Appl. No. 17/650,775, mailed on Jan. 25, 2024, 10 pages.
Notice of Allowance received for U.S. Appl. No. 17/655,347, mailed on Feb. 20, 2025, 7 pages.
Notice of Allowance received for U.S. Appl. No. 17/655,347, mailed on Oct. 9, 2024, 7 pages.
Notice of Allowance received for U.S. Appl. No. 17/659,147, mailed on Jan. 26, 2024, 13 pages.
Notice of Allowance received for U.S. Appl. No. 17/659,147, mailed on May 29, 2024, 13 pages.
Notice of Allowance received for U.S. Appl. No. 17/807,226, mailed on Jul. 3, 2024, 9 pages.
Notice of Allowance received for U.S. Appl. No. 17/807,236, mailed on Feb. 5, 2024, 13 pages.
Notice of Allowance received for U.S. Appl. No. 17/807,236, mailed on Jul. 10, 2024, 9 pages.
Notice of Allowance received for U.S. Appl. No. 17/812,965, mailed on Jul. 26, 2024, 6 pages.
Notice of Allowance received for U.S. Appl. No. 17/812,965, mailed on Nov. 15, 2024, 6 pages.
Notice of Allowance received for U.S. Appl. No. 17/814,455, mailed on Oct. 7, 2024, 10 pages.
Notice of Allowance received for U.S. Appl. No. 17/814,462, mailed on Feb. 26, 2025, 8 pages.
Notice of Allowance received for U.S. Appl. No. 17/816,314, mailed on Jan. 4, 2024, 6 pages.
Notice of Allowance received for U.S. Appl. No. 17/932,655, mailed on Jan. 24, 2024, 7 pages.
Notice of Allowance received for U.S. Appl. No. 17/932,999, mailed on Sep. 12, 2024, 9 pages.
Notice of Allowance received for U.S. Appl. No. 17/933,707, mailed on Jun. 28, 2024, 8 pages.

(56) References Cited

OTHER PUBLICATIONS

Notice of Allowance received for U.S. Appl. No. 17/933,707, mailed on Mar. 6, 2024, 9 pages.
Notice of Allowance received for U.S. Appl. No. 17/935,095, mailed on Jul. 3, 2024, 9 pages.
Notice of Allowance received for U.S. Appl. No. 18/119,219, mailed on Jul. 22, 2024, 7 pages.
Notice of Allowance received for U.S. Appl. No. 18/146,234, mailed on Jan. 24, 2025, 12 pages.
Notice of Allowance received for U.S. Appl. No. 18/152,656, mailed on Dec. 17, 2024, 12 pages.
Notice of Allowance received for U.S. Appl. No. 18/154,697, mailed on Aug. 6, 2024, 8 pages.
Notice of Allowance received for U.S. Appl. No. 18/154,697, mailed on Dec. 3, 2024, 7 pages.
Notice of Allowance received for U.S. Appl. No. 18/154,757, mailed on Jan. 23, 2024, 10 pages.
Notice of Allowance received for U.S. Appl. No. 18/154,757, mailed on Jan. 23, 2025, 12 pages.
Notice of Allowance received for U.S. Appl. No. 18/154,757, mailed on May 10, 2024, 12 pages.
Notice of Allowance received for U.S. Appl. No. 18/174,337, mailed on Jan. 2, 2025, 8 pages.
Notice of Allowance received for U.S. Appl. No. 18/182,304, mailed on Jan. 24, 2024, 9 pages.
Notice of Allowance received for U.S. Appl. No. 18/182,304, mailed on Oct. 2, 2023, 9 pages.
Notice of Allowance received for U.S. Appl. No. 18/317,893, mailed on Jan. 13, 2025, 11 pages.
Notice of Allowance received for U.S. Appl. No. 18/317,893, mailed on Mar. 6, 2024, 8 pages.
Notice of Allowance received for U.S. Appl. No. 18/317,893, mailed on Nov. 22, 2023, 9 pages.
Notice of Allowance received for U.S. Appl. No. 18/336,770, mailed on Nov. 29, 2024, 9 pages.
Notice of Allowance received for U.S. Appl. No. 18/421,675, mailed on Apr. 11, 2024, 9 pages.
Notice of Allowance received for U.S. Appl. No. 18/421,675, mailed on Jul. 31, 2024, 8 pages.
Notice of Allowance received for U.S. Appl. No. 18/421,827, mailed on Aug. 14, 2024, 10 pages.
Notice of Allowance received for U.S. Appl. No. 18/423,187, mailed on Jun. 5, 2024, 9 pages.
Notice of Allowance received for U.S. Appl. No. 18/429,294, mailed on Jun. 21, 2024, 10 pages.
Notice of Allowance received for U.S. Appl. No. 18/429,294, mailed on Oct. 31, 2024, 10 pages.
Notice of Allowance received for U.S. Appl. No. 18/429,301, mailed on Nov. 22, 2024, 8 pages.
Notice of Allowance received for U.S. Appl. No. 18/463,739, mailed on Feb. 1, 2024, 10 pages.
Notice of Allowance received for U.S. Appl. No. 18/463,739, mailed on Jun. 17, 2024, 9 pages.
Notice of Allowance received for U.S. Appl. No. 18/463,739, mailed on Oct. 30, 2023, 11 pages.
Notice of Allowance received for U.S. Appl. No. 18/465,098, mailed on Jun. 20, 2024, 8 pages.
Notice of Allowance received for U.S. Appl. No. 18/465,098, mailed on Mar. 4, 2024, 6 pages.
Notice of Allowance received for U.S. Appl. No. 18/465,098, mailed on Nov. 17, 2023, 8 pages.
Notice of Allowance received for U.S. Appl. No. 18/473,180, mailed on Aug. 22, 2024, 13 pages.
Notice of Allowance received for U.S. Appl. No. 18/473,180, mailed on Jan. 2, 2025, 12 pages.
Notice of Allowance received for U.S. Appl. No. 18/515,188, mailed on Nov. 27, 2024, 9 pages.
Notice of Allowance received for U.S. Appl. No. 18/668,032, mailed on Jan. 16, 2025, 9 pages.
Notice of Allowance received for U.S. Appl. No. 18/671,936, mailed on Jan. 15, 2025, 9 pages.
Notice of Allowance received for U.S. Appl. No. 18/671,936, mailed on Mar. 5, 2025, 7 pages.
Open Source Voxel Editor for Windows, Mac, Linux, iOS, and Android, GOXEL [online]. Goxel by Guillaume Chereau, Available Online at: <URL: https://goxel.xyz/>, [retrieved on Apr. 25, 2024], 2024, 3 pages.
POP 2 3D Scanner (Infrared Light | Precision 0.05mm), Revpoint [online]. Revopoint 3D,, <URL: https://global.revopoint3d.com/products/face-3d-scanner-pop2?_ga=2.182721893.277596832.1650264227-586470518.1640327512&ref=dh0L07OOzRuqo&utm_campaign=pop2_banner&utm_medium=referral&utm_source=Official_Website>, [retrieved on Apr. 25, 2024], 2014, 16 pages.
Restriction Requirement received for U.S. Appl. No. 17/905,483, mailed on Dec. 7, 2023, 7 pages.
Restriction Requirement received for U.S. Appl. No. 17/932,999, mailed on Oct. 3, 2023, 6 pages.
Restriction Requirement received for U.S. Appl. No. 18/473,187, mailed on Dec. 30, 2024, 5 pages.
Search Report received for Chinese Patent Application No. 202310873465.7, mailed on Feb. 1, 2024, 5 pages (2 pages of English Translation and 3 pages of Official Copy).
Search Report received for United Kingdom Patent Application No. GB2210885.6, mailed on Jan. 27, 2023, 1 page.
ShareVOX, Phoria [online]. Phoria PTY LTD, Available Online at: <URL: https://www.phoria.com.au/projects/sharevox/>, [retrieved on Apr. 25, 2024], 2024, 2 pages.
Sliders, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/README_Sliders.html>, 3 pages.
Spatial Audio Head Tracking on Apple Tv Automatically Resets when You Get Up from the Couc . . . , AppleInsider [online]. Jun. 10, 2021 [retrieved on Dec. 20, 2024]. Retrieved from the Internet: <https://forums.appleinsider.com/discussion/222259/spatial-audio-head-tracking-on-apple-tv-automatically-resets-when-you-get-up-from-the-couc>, 2024, 6 pages.
Supplemental Notice of Allowability received for U.S. Appl. No. 18/317,893, mailed on Jan. 29, 2025, 3 pages.
Supplemental Notice of Allowance received for U.S. Appl. No. 14/531,874, mailed on Jul. 26, 2017, 5 pages.
Supplemental Notice of Allowance received for U.S. Appl. No. 18/515,188, mailed on Dec. 12, 2024, 2 pages.
VoxEdit Beta Tutorial—Introduction and How to Animate Voxel Creations, YouTube [online], Google LLC, Available Online at: <URL: https://www.youtube.com/watch?v=fqcArJWtyqM>, [retrieved on Apr. 25, 2024], 2024, 2 pages.
Voxel World Lens, Snapchat [online]. Snapchat Inc., Available Online at: <URL: https://www.snapchat.com/lens/689751dd6a7d446280d903d15d79f104?locale=en-US>, [retrieved on Apr. 25, 2024], 2024, 1 page.
Voxelize, Rossiev [online]. Denis Rossiev 2018-2024, Available Online at: <URL: https://www.rossiev.pro/voxelize/>, [retrieved on Apr. 25, 2024], 2024, 16 pages.
Your PC in VR, Virtual Desktop [online]. Virtual Desktop, Inc., 2023 [retrieved on Apr. 17, 2024]. Retrieved from the Internet: <URL: https://www.vrdesktop.net/>, 4 pages.
Apple, "Use Continuity to Connect Your Mac, iPhone, iPad, and Apple Watch", Apple Support, Available online at <https://support.apple.com/en-us/HT204681>, [Retrieved from Internet on Dec. 23, 2022], 4 pages.
Apple, "Use Message Effects with iMessage on Your iPhone, iPad, and iPod Touch", Apple Support, Available online at: <https://support.apple.com/en-us/HT206894>, [retrieved on Feb. 22, 2024], 5 pages.
Bhowmick Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Bohn Dieter, "Rebooting WebOS: How LG Rethought the Smart TV", The Verge, Available online at: <http://www.theverge.com/

(56) References Cited

OTHER PUBLICATIONS

2014/1/6/5279220/rebooting-webos-how-lg-rethought-the-smart-tv>, [Retrieved Aug. 26, 2019], Jan. 6, 2014, 5 pages.
Bolt et al., "Two-Handed Gesture in Multi-Modal Natural Dialog", Uist '92, 5th Annual Symposium on User Interface Software and Technology. Proceedings of the ACM Symposium on User Interface Software and Technology, Monterey, Nov. 15-18, 1992, pp. 7-14.
Brennan Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.
Cas and Chary XR, "Oculus Go & Your Phone as 2nd Controller !!—An Inexpensive Way to Play PC VR Games", posted on Mar. 8, 2019, https://www.youtube.com/watch?v=i_iRVa0kemw, 2019, 4 pages.
Chatterjee et al., "Gaze+Gesture: Expressive, Precise and Targeted Free-Space Interactions", ICMI '15, Nov. 9-13, 2015, 8 pages.
Choe et al., "Augmented-Reality-Based 3D Emotional Messenger for Dynamic User Communication with Smart Devices", Electronics, vol. 9, No. 1127, Jul. 10, 2020, 15 pages.
Didehkhorshid et al., "Text Input in Virtual Reality Using a Tracked Drawing Tablet", HCII 2020, LNCS 12428, 2020, pp. 314-329.
Edmiston et al., "Touch-Enabled Input Devices for Controlling Virtual Environments", 12th IFAC Symposium on Analysis, Design and Evaluation of Human-Machine Systems, Las Vegas, NV, USA, Aug. 11-15, 2013, pp. 349-356.
Fatima et al., "Eye Movement Based Human Computer Interaction", 3rd International Conference on Recent Advances in Information Technology (RAIT), Mar. 3, 2016, pp. 489-494.
Gamedbharat, "I Want to Rotate a Object on Double Tap, Can Any One Help Me With This?", posted on Jul. 26, 2017, https://discussions.unity.com/t/i-want-to-rotate-a-object-on-double-tap-can-any-one-help-me-with-this/192010, 2017, 3 pages.
Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
Huang et al., "Proxy-Based Security Audit System for Remote Desktop Access", Computer Communications and Networks, ICCCN 2009. Proceedings of 18th International Conference on, IEEE, Piscataway, NJ, USA, Aug. 3, 2009, 5 pages.
Jones et al., "The Future of Virtual Museums: On-Line, Immersive, 3D Environments", ProQuest (Technology Collection Database, Dissertations and Theses Database): Technical Literature Search, Jul. 26, 2002, 12 pages.
Lin et al., "Towards Naturally Grabbing and Moving Objects in VR", IS&T International Symposium on Electronic Imaging and the Engineering Reality of Virtual Reality, 2016, 6 pages.
Lin et al., "Ubii: Physical World Interaction Through Augmented Reality", Publisher: IEEE, DOI:10.1109/TMC.2016.2567378, May 13, 2016.
Locher et al., "Mobile Phone and Cloud—a Dream Team for 3D Reconstruction", 2016 IEEE Winter Conference on Applications of Computer Vision (WACV), 2016, pp. 1-8.
Macmostvideo, "A Beginner's Guide to Selecting Items on Your Mac (#1566)", Bibliographic Information, Jan. 4, 2018, Retrieved from <URL:https://www.youtube.com/watch?v=a6MDAuh7M0Q&ab_channel=macmostvideo/>, [retrieved on Feb. 19, 2025], Most relevant passage of the video is 00:10 to 00:30, 2 pages.
McGill et al., "Expanding the Bounds of Seated Virtual Workspaces", University of Glasgow, Available online at: <https://core.ac.uk/download/pdf/323988271.pdf>, [retrieved on Jun. 27, 2023], Jun. 5, 2020, 44 pages.
Metalnwood, "Using a Tablet for Touch Control, with VR Headset on. (Demo Vid)", Virtual Reality, ED Forums, Jun. 12, 2020, Available online at <https://forum.dcs.world/topic/237992-using-a-tablet-for-touch-control-with-vr-headset-on-demo-vid/>, [Retrieved from Internet on Jan. 2, 2024], 9 pages.
Pfeuffer et al., "Gaze + Pinch Interaction in Virtual Reality", In Proceedings of SUI '17, Brighton, United Kingdom, Oct. 16-17, 2017, pp. 99-108.
Pfeuffer et al., "Gaze and Touch Interaction on Tablets", UIST '16, Tokyo, Japan, ACM, Oct. 16-19, 2016, pp. 301-311.
Qi et al., "PointNet++: Deep Hierarchical Feature Learning on Point Sets in a Metric Space", Stanford University, Jun. 7, 2017, 14 pages.
Ro et al., "AR Pointer: Advanced Ray-Casting Interface Using Laser Pointer Metaphor for Object Manipulation in 3D Augmented Reality Environment", Applied Sciences, vol. 9, No. 3078, [retrieved on Jul. 27, 2020], Jul. 30, 2019, 18 pages.
Schenk et al., "Spock: A Smooth Pursuit Oculomotor Control Kit", CHI'16 Extended Abstracts, San Jose, CA, USA, ACM, May 7-12, 2016, pp. 2681-2687.
Schubert Martin, "Design Sprints at Leap Motion: A Playground of 3D User Interfaces", Ultraleap for Developers [online]. Nov. 8, 2017 [retrieved on Mar. 21, 2025]. Retrieved from the Internet: <URL: https://blog.leapmotion.com/design-playground-3d-user-interfaces/>, 17 pages.
Slambekova Dana, "Gaze and Gesture Based Object Interaction in Virtual World", [retrieved on Dec. 17, 2015]. Retrieved from the Internet: <URL:https://www.cs.rit.edu/~dxs4659/Report.pdf>, May 31, 2012, 54 pages.
Strand Robin, "Surface Skeletons in Grids With Non-cubic Voxels", 2004 IEEE Xplore, Available Online at: <DOI: 10.1109/ICPR.2004.1334195>, Sep. 2004, 5 pages.
Sun et al., "MagicHand: Interact with IoT Devices in Augmented Reality Environment", 2019 IEEE Conference on Virtual Reality and 3D User Interfaces, Osaka, Japan, Mar. 23-27, 2019, [retrieved on Dec. 4, 2020], 6 pages.
Wood Tyriel, "The HoloLens 2 Tour!—Discovering a World of Holograms", YouTube [online]. YouTube, Mar. 23, 2021 [retrieved on Dec. 7, 2023], Retrieved from the Internet: <URL: https://www.youtube.com/watch?v=rMks7sMzPxI>, 2 pages.
Extended European Search Report received for European Patent Application No. 25169060.8, mailed on May 12, 2025, 10 pages.
Extended European Search Report received for European Patent Application No. 25169059.0, mailed on May 12, 2025, 11 pages.
Non-Final Office Action received for U.S. Appl. No. 18/896,227, mailed on May 29, 2025, 14 pages.
Non-Final Office Action received for U.S. Appl. No. 18/473,187, mailed on May 16, 2025, 15 pages.
Non-Final Office Action received for U.S. Appl. No. 18/473,176, mailed on May 14, 2025, 23 pages.
Final Office Action received for U.S. Appl. No. 18/149,640, mailed on May 21, 2025, 24 pages.
Final Office Action received for U.S. Appl. No. 17/933,020, mailed on May 21, 2025, 28 pages.
European Search Report received for European Patent Application No. 22723527.2, mailed on May 12, 2025, 4 pages.
International Search Report received for PCT Patent Application No. PCT/US2023/074978, mailed on Apr. 4, 2024, 4 pages.
International Search Report received for PCT Patent Application No. PCT/US2024/043470, mailed on Oct. 29, 2024, 4 pages.
Non-Final Office Action received for U.S. Appl. No. 17/202,034, mailed on Jun. 4, 2025, 40 pages.
Final Office Action received for U.S. Appl. No. 18/645,292, mailed on Jun. 2, 2025, 41 pages.
International Search Report received for PCT Patent Application No. PCT/US2023/074960, mailed on Feb. 12, 2024, 6 pages.
Extended European Search Report received for European Patent Application No. 24221722.2, mailed on Apr. 17, 2025, 7 pages.
International Search Report received for PCT Patent Application No. PCT/US2023/074973, mailed on Mar. 7, 2024, 7 pages.
Non-Final Office Action received for U.S. Appl. No. 18/882,622, mailed on May 22, 2025, 8 pages.
Notice of Allowance received for U.S. Appl. No. 17/655,521, mailed on Apr. 16, 2025, 8 pages.
Notice of Allowance received for U.S. Appl. No. 18/473,179, mailed on May 8, 2025, 9 pages.
Final Office Action received for U.S. Appl. No. 17/655,521, mailed on Apr. 10, 2024, 18 pages.

(56) References Cited

OTHER PUBLICATIONS

International Search Report received for PCT Patent Application No. PCT/US2022/071228, mailed on Aug. 25, 2022, 6 pages.
International Search Report received for PCT Patent Application No. PCT/US2024/032140, mailed on Sep. 10, 2024, 4 pages.
International Search Report received for PCT Patent Application No. PCT/US2024/032423, mailed on Sep. 25, 2024, 5 pages.
Non-Final Office Action received for U.S. Appl. No. 17/655,521, mailed on Aug. 23, 2023, 13 pages.
Non-Final Office Action received for U.S. Appl. No. 17/655,521, mailed on Nov. 27, 2024, 17 pages.
Berard, Francois, "A Study on Two-Dimensional Scrolling with Head Motion", CLIPS-IMAG Technical Report. France, Ref: <TR-IMAG-CLIPS-IHM-199901>, Retrieved from: <http://iihm.imag.fr/publs/1999/TR199901_PWindowRate.pdf>, Retrieved on Dec. 26, 2024, Jan. 8, 1999, 7 pages.
Headmaster Introduction, "If You Can Move Your Head, You Can Move Your World", Retrieved from: <https:// www.microsoft.com/buxtoncollection/a/pdf/HeadMaster%20Introduction.pdf)>, Retrieved on Dec. 26, 2024, 4 pages.
Tolle et al., "Design of Head Movement Controller System (HEMOCS) for Control Mobile Application through Head Pose Movement Detection", Retrieved from :<https://www.google.com/url?sa=t&source=web&rct=j&opi=89978449&url=https://online-journals.org/index.php/i-jim/article/ download/5552/4029/19224&ved=2ahUKEwj-w86vga-HAxUJJDQIHYMNDNw4HhAWegQILhAB&usg=AOvVaw3HR1t7v8Rx7osc1lp0UfOh>, DOI: <httpdx.doi.org/10.3991/.

* cited by examiner

METHODS FOR PRESENTING AND SHARING CONTENT IN AN ENVIRONMENT

CROSS-REFERENCE TO RELATED APPLICATIONS

This application is a continuation of U.S. application Ser. No. 17/650,775, filed Feb. 11, 2022, and published on Aug. 11, 2022 as U.S. Publication No. 2022-0253136, which claims the benefit of U.S. Provisional Application No. 63/148,539, filed Feb. 11, 2021, the contents of which are herein incorporated by reference in their entireties for all purposes.

TECHNICAL FIELD

This relates generally to computer systems with a display generation component and one or more input devices that present graphical user interfaces, including but not limited to electronic devices that present interactive user interface elements via the display generation component.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects include digital images, video, text, icons, and control elements such as buttons and other graphics.

But methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious and error-prone, create a significant cognitive burden on a user, and detract from the experience with the virtual/augmented reality environment. In addition, these methods take longer than necessary, thereby wasting energy. This latter consideration is particularly important in battery-operated devices.

SUMMARY

Accordingly, there is a need for computer systems with improved methods and interfaces for providing computer generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems with a display generation component and one or more input devices are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with content in a three-dimensional environment. Such methods and interfaces may complement or replace conventional methods for interacting with content in a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, an electronic device selectively deemphasizes a three-dimensional environment in which content is presented. In some embodiments, an electronic device modifies the boundaries of content in a user interface. In some embodiments, an electronic device shares content with users in a three-dimensional environment.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1:
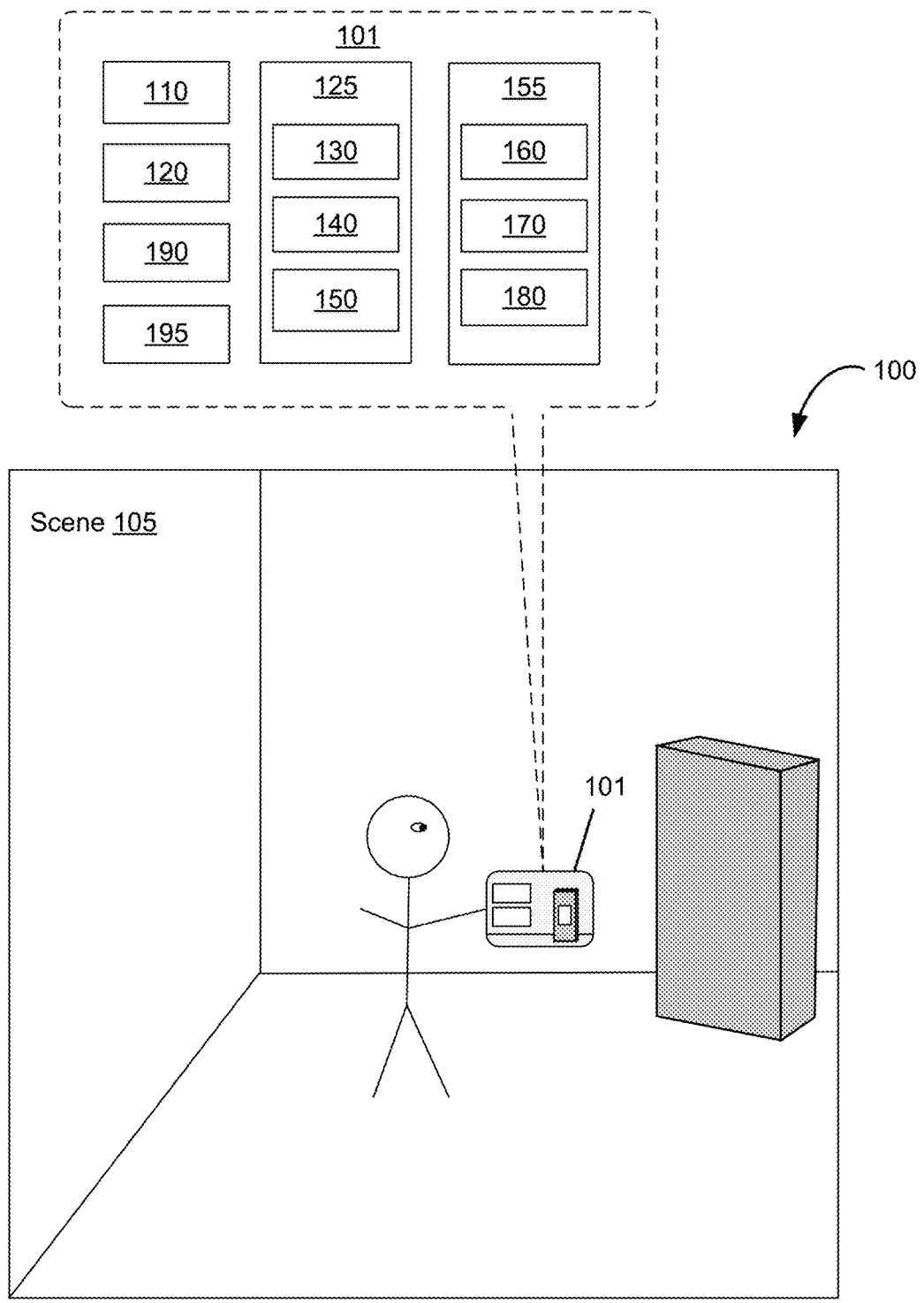
FIG. 1 is a block diagram illustrating an operating environment of a computer system for providing XR experiences in accordance with some embodiments.

The present disclosure relates to user interfaces for providing a extended reality (XR) experience to a user, in accordance with some embodiments.

The systems, methods, and GUIs described herein provide improved ways for an electronic device to interact with and manipulate objects in a three-dimensional environment.

In some embodiments, an electronic device displays content in a three-dimensional environment and de-emphasizes the three-dimensional environment relative to the content in response to detecting the gaze of the user directed to the content. In some embodiments, in response to detecting the gaze of the user directed to a region of the three-dimensional environment other than the content, the electronic device decreases the degree to which the three-dimensional environment is de-emphasized relative to the content. In some embodiments, de-emphasizing the three-dimensional environment relative to the content includes one or more of blurring and/or darkening the three-dimensional environment relative to the content. Selectively de-emphasizing the three-dimensional environment relative to the content while the gaze of the user is directed to the content provides a way of reducing distractions while the user is looking at the content and improving visibility of the three-dimensional environment while the user is not looking at the content without requiring user inputs dedicated to changing the amount of de-emphasis of the three-dimensional environment relative to the content.

In some embodiments, an electronic device displays content with a boundary having a first shape in a three-dimensional environment while the content is playing and not being moved within the three-dimensional environment and displays the content item with a boundary having a second shape while the content is paused and/or being moved within the three-dimensional environment. In some embodiments, the content is accessible to a second electronic device in communication with the electronic device and the shape of the boundary of the content is synchronized between the electronic device and the second electronic device. Changing the shape of the boundary of the content depending on the playback state and/or movement state of the content reduced conflicts with other objects in the three-dimensional environment while the content is not playing or being moved and enables the electronic device to automatically display the full content while the content is playing and not being moved.

In some embodiments, an electronic device displays a three-dimensional environment that includes representations of content and representations of users of other electronic devices with access to the three-dimensional environment. In some embodiments, content in the three-dimensional environment is private and accessible to only the user of the electronic device. In some embodiments, the user of the electronic can initiate a process to share content that is currently private with other users in the three-dimensional environment. In some embodiments, the electronic device can initiate a process to make an object in a three-dimensional accessible to a particular user by moving the content towards a location corresponding to a representation of the particular user in the three-dimensional environment. In some embodiments, in response to the user moving the content towards the representation of the particular user, the content becomes accessible to that particular user. Making content accessible to a particular user via movement of the content towards that particular user enables a user to efficiently share content without the need for a user to manually select dedicated user interface elements.

Figure 8A:
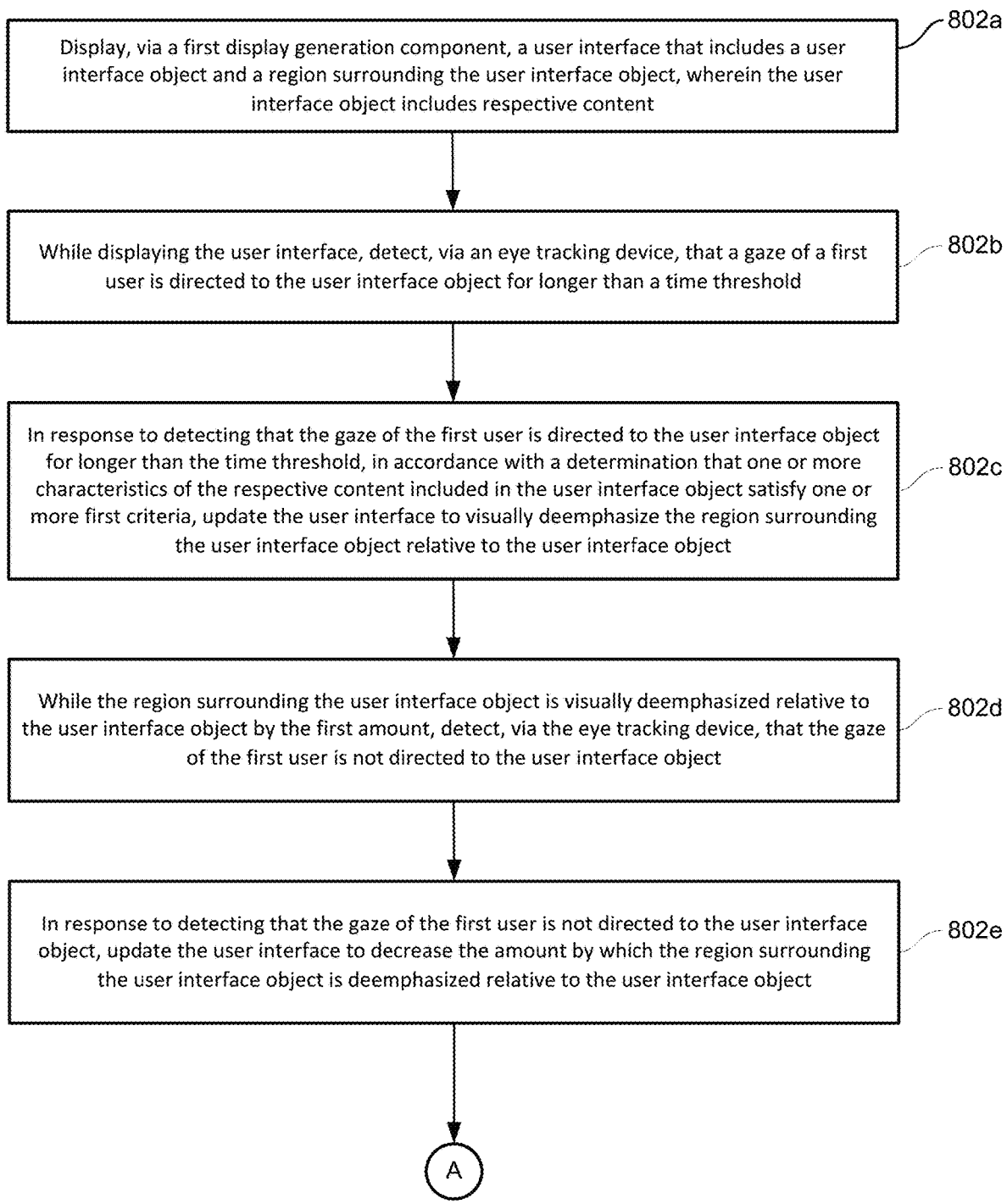
FIGS. 8A-8K is a flowchart illustrating a method of selectively de-emphasizing a three-dimensional environment in which content is presented in accordance with some embodiments.
Figure 8B:
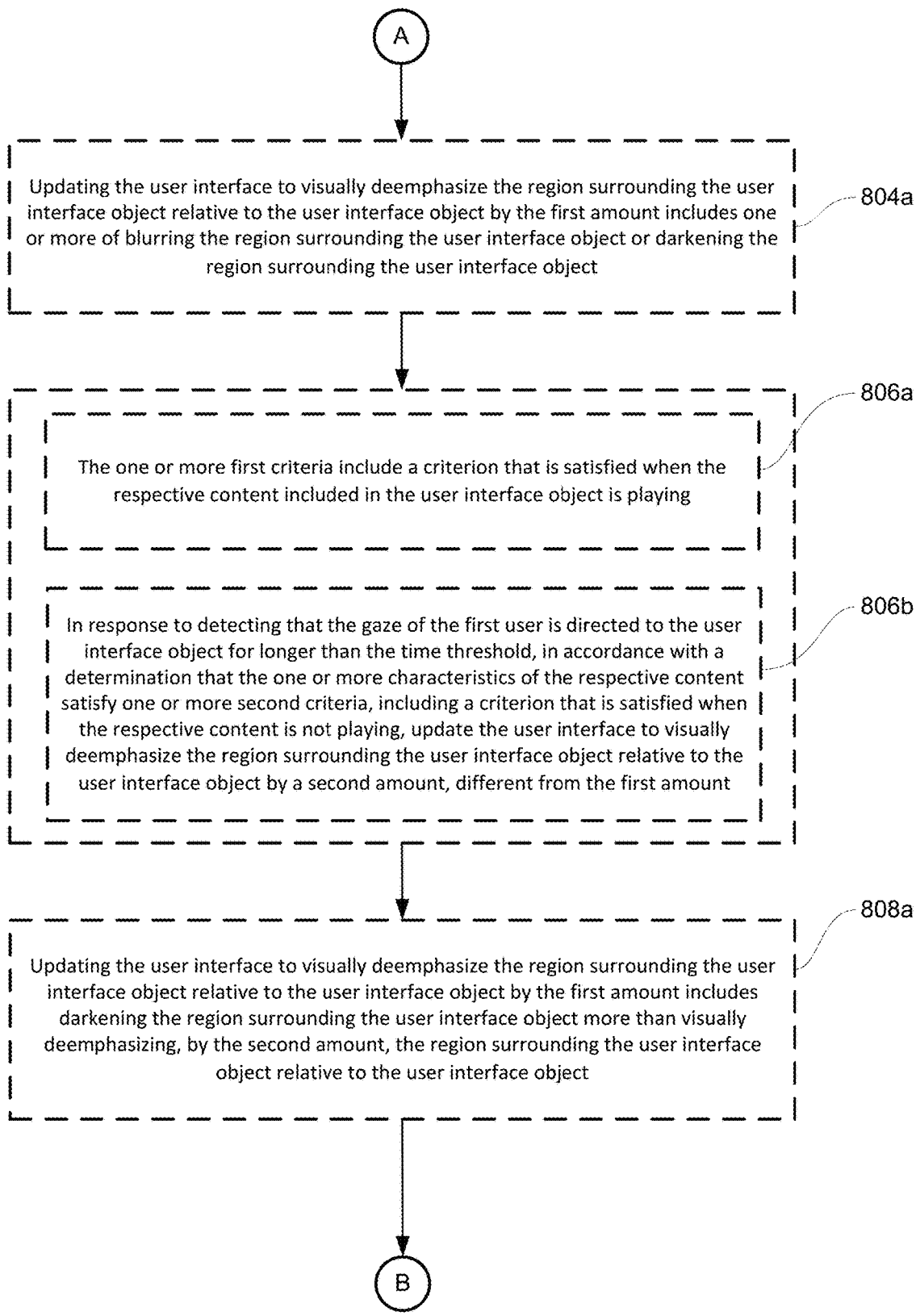
Figure 8C:
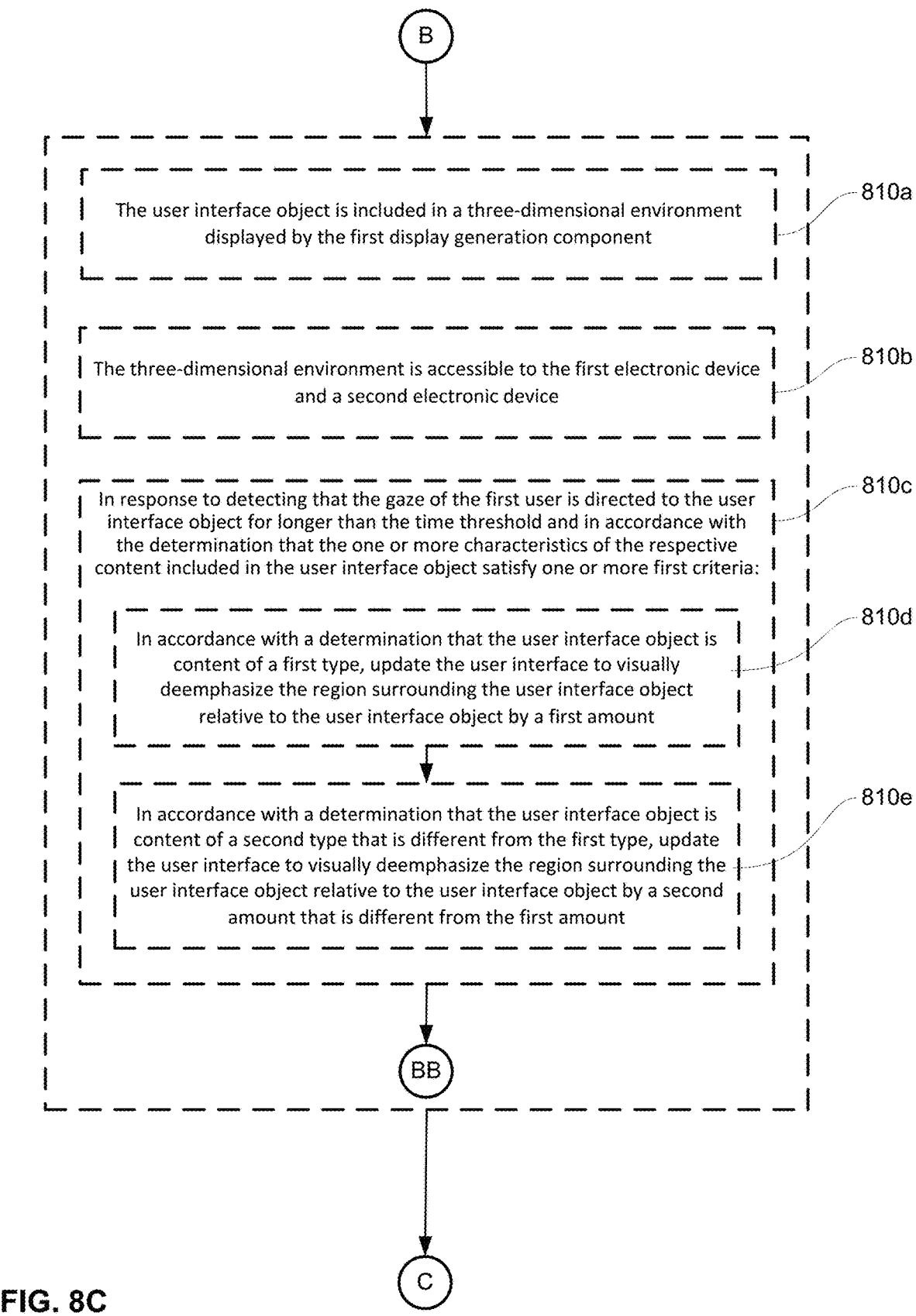
Figure 8D:
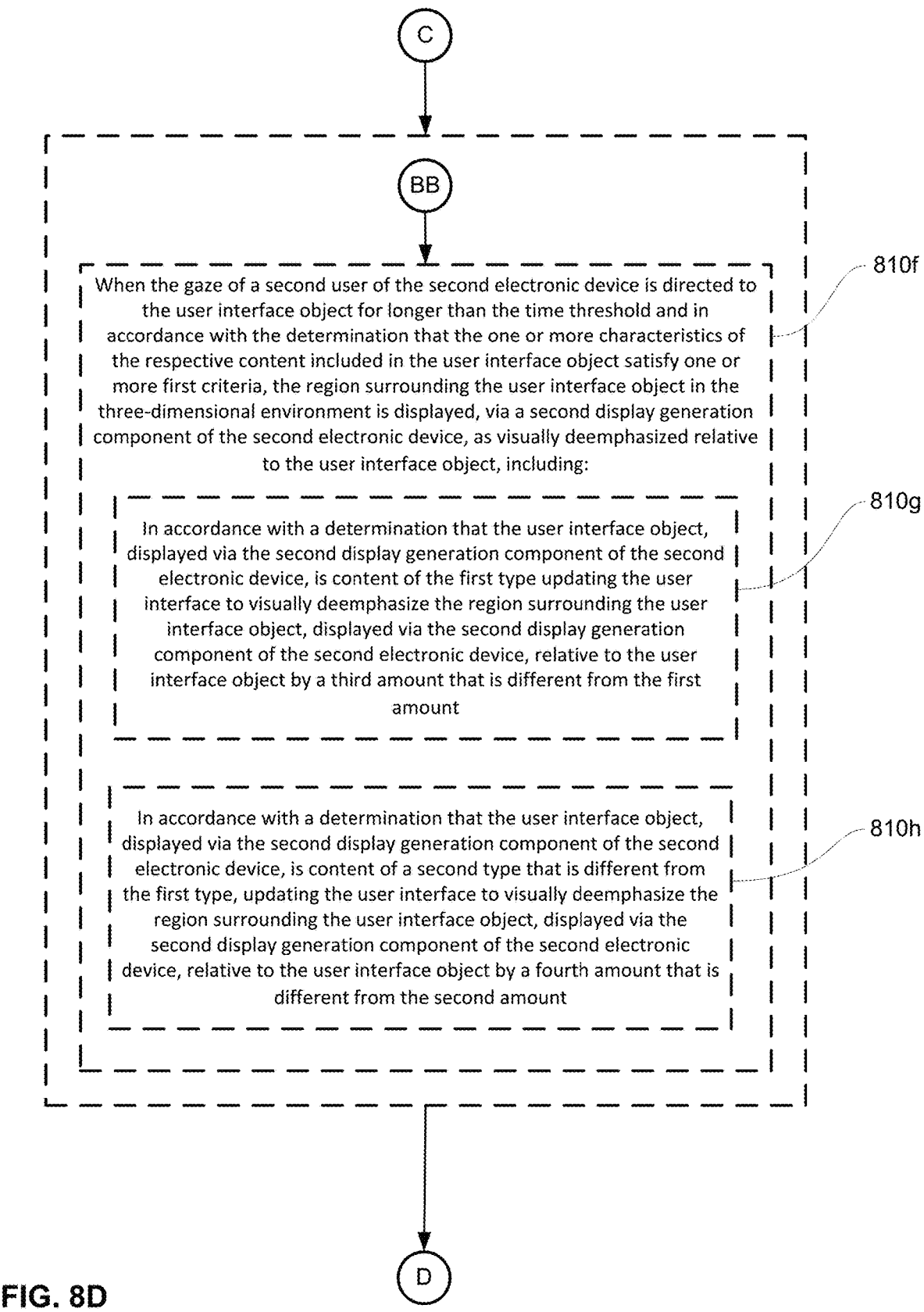
Figure 8E:
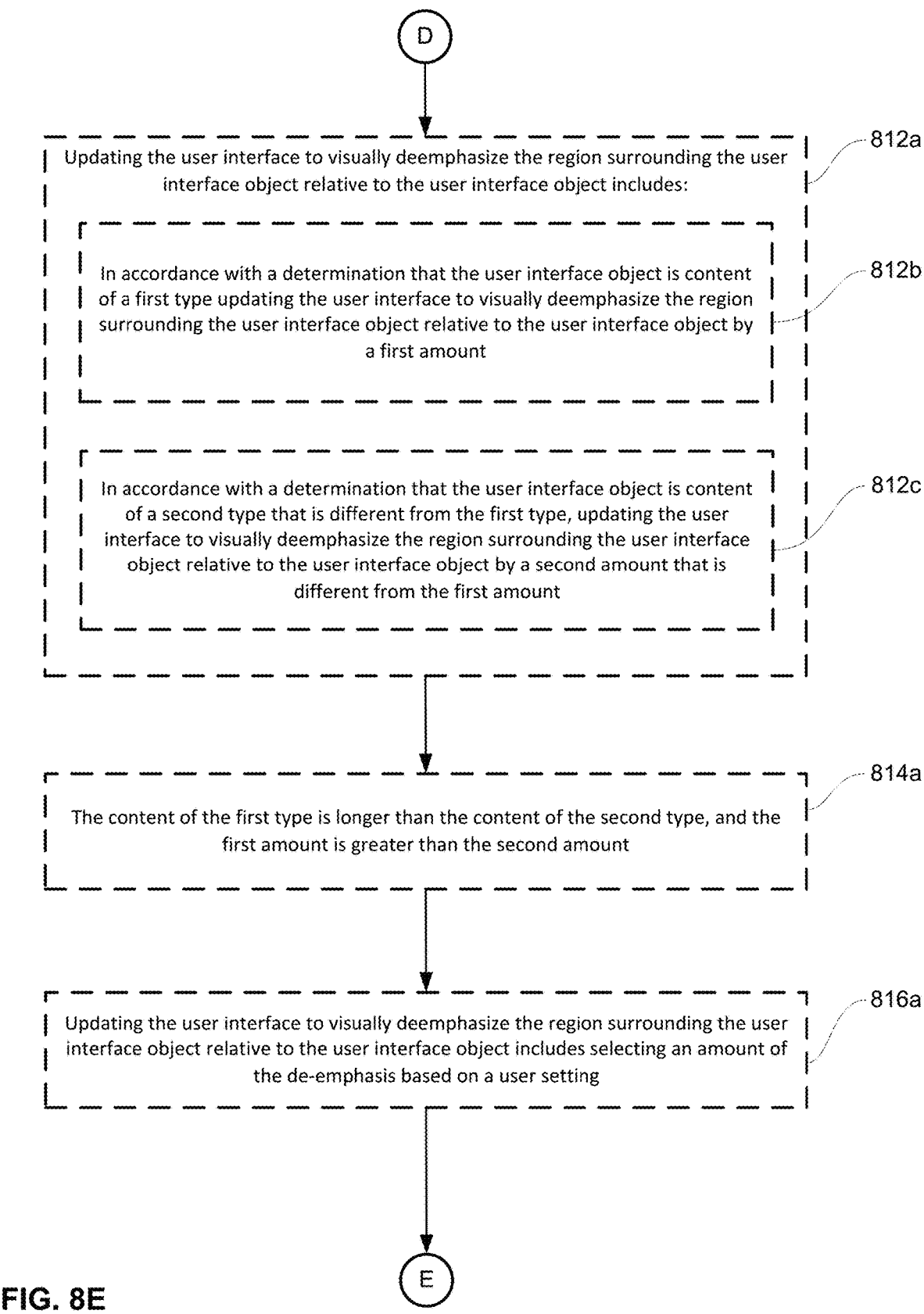
Figure 8F:
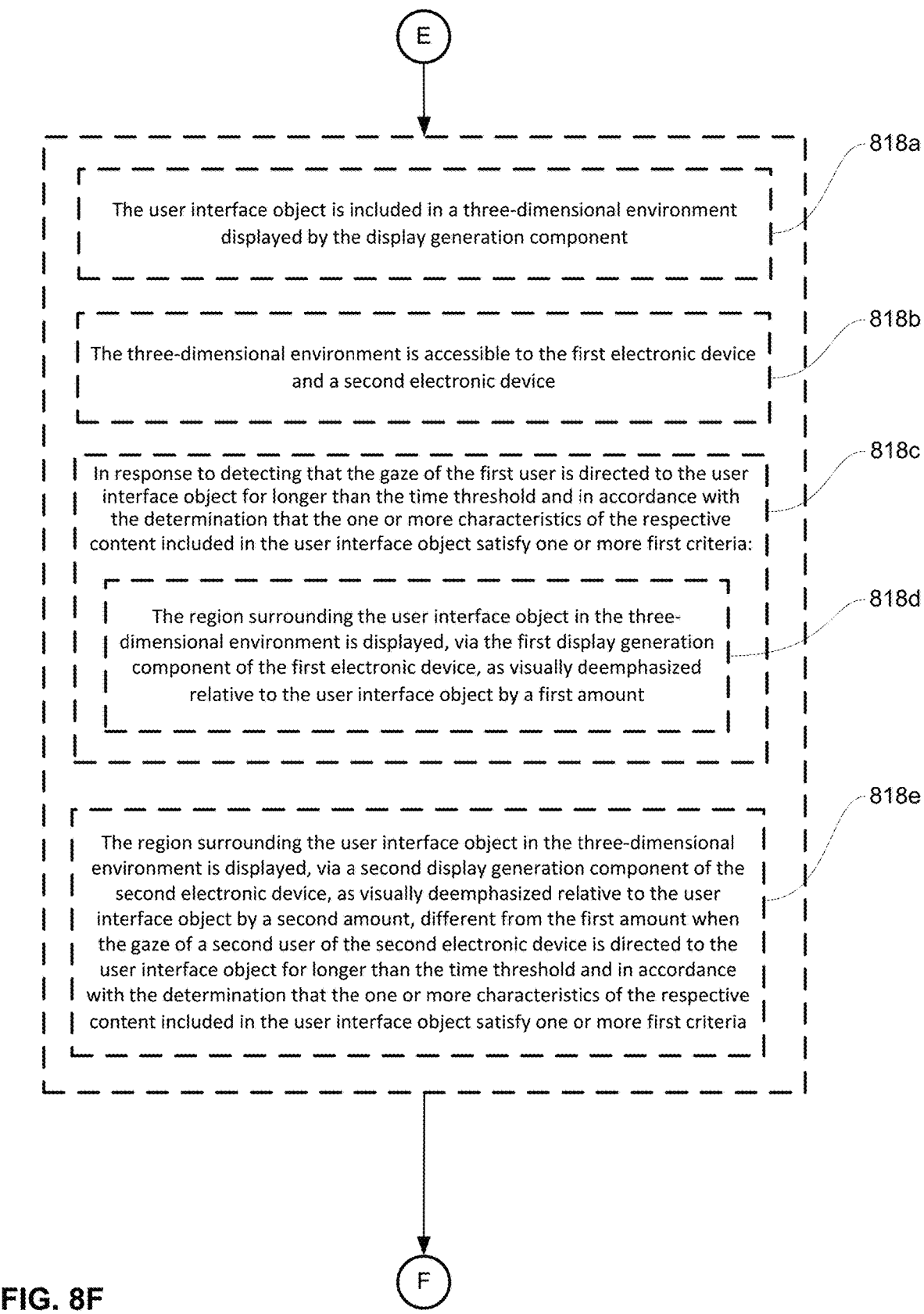
Figure 8G:
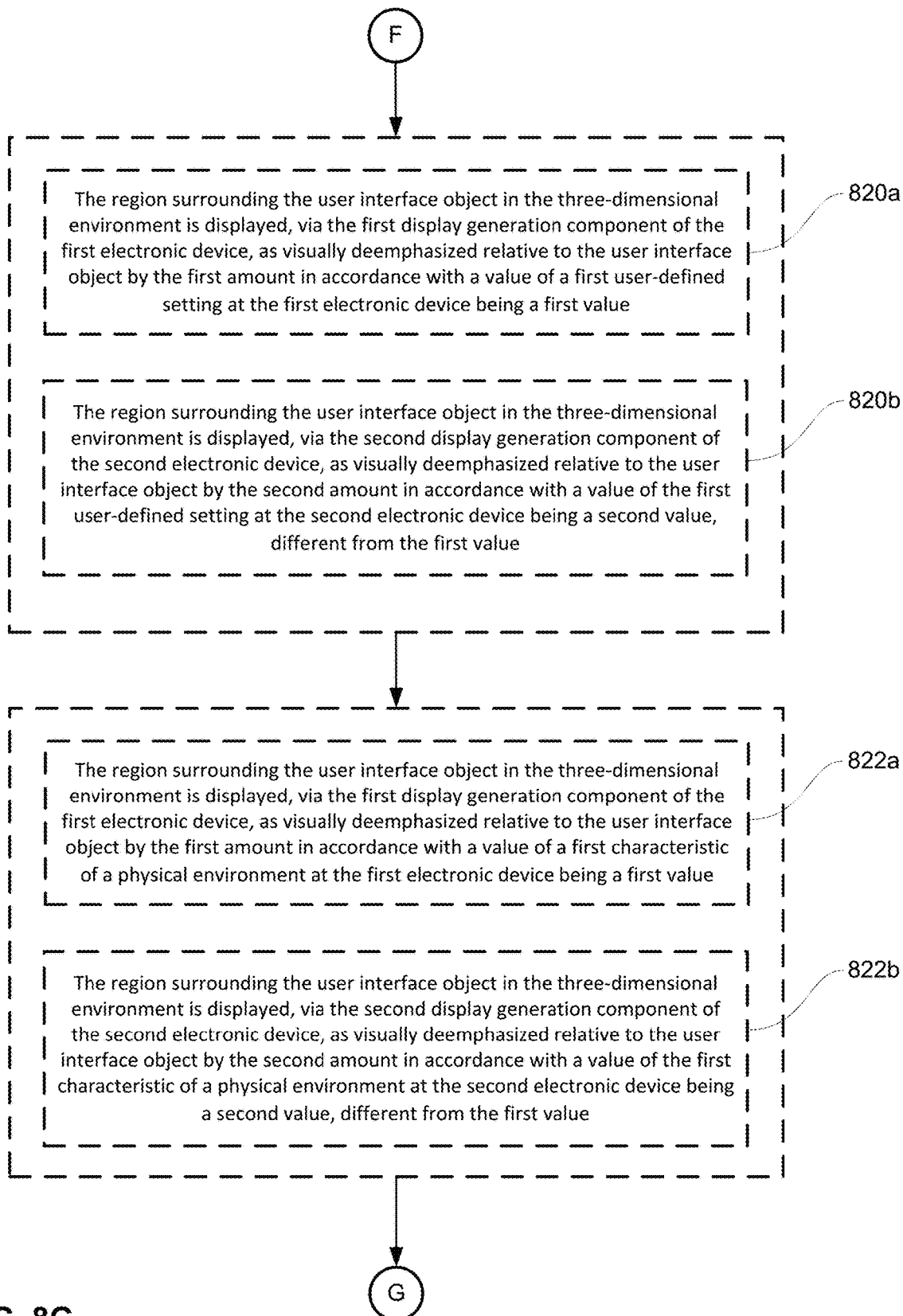
Figure 8H:
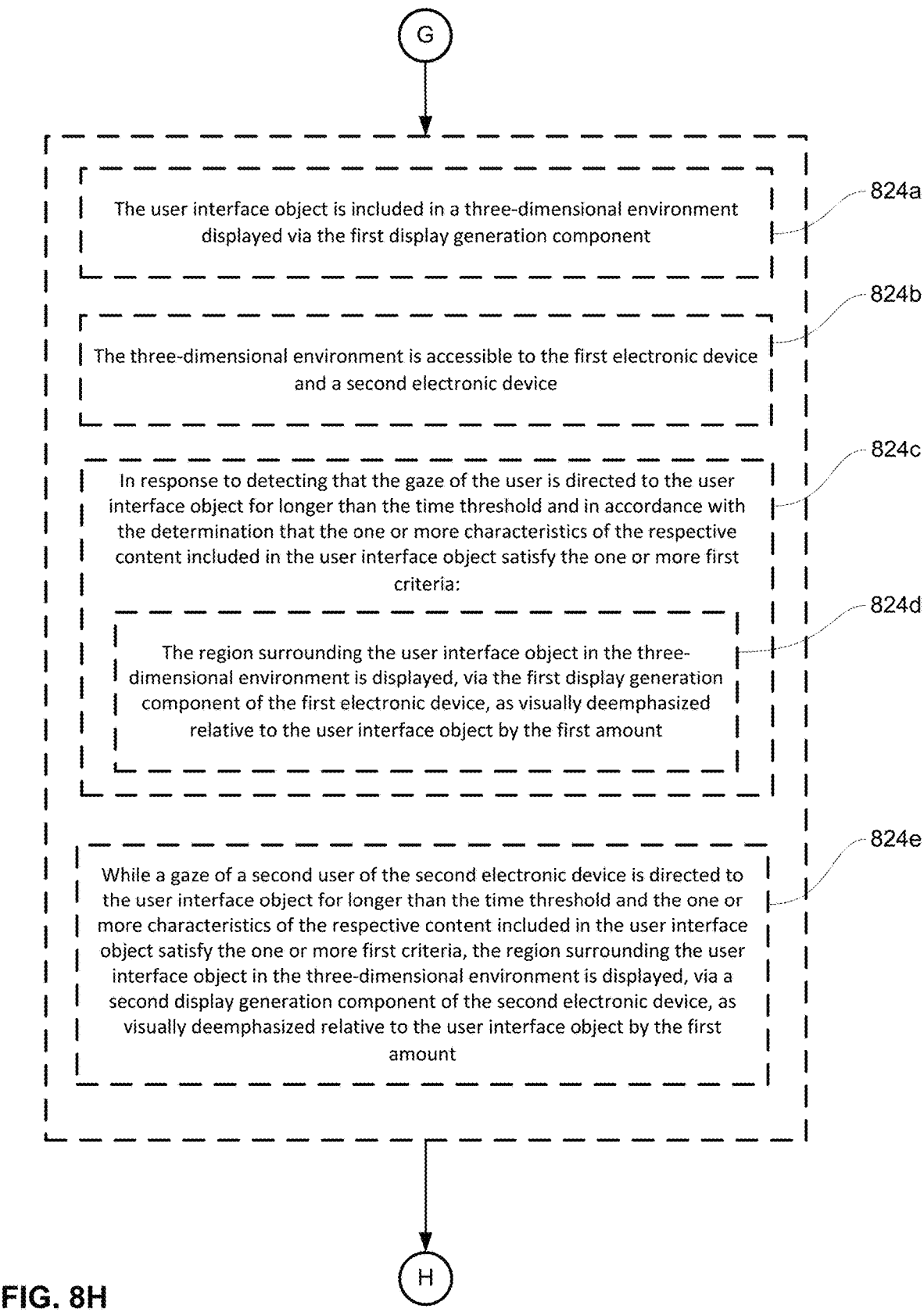
Figure 8I:
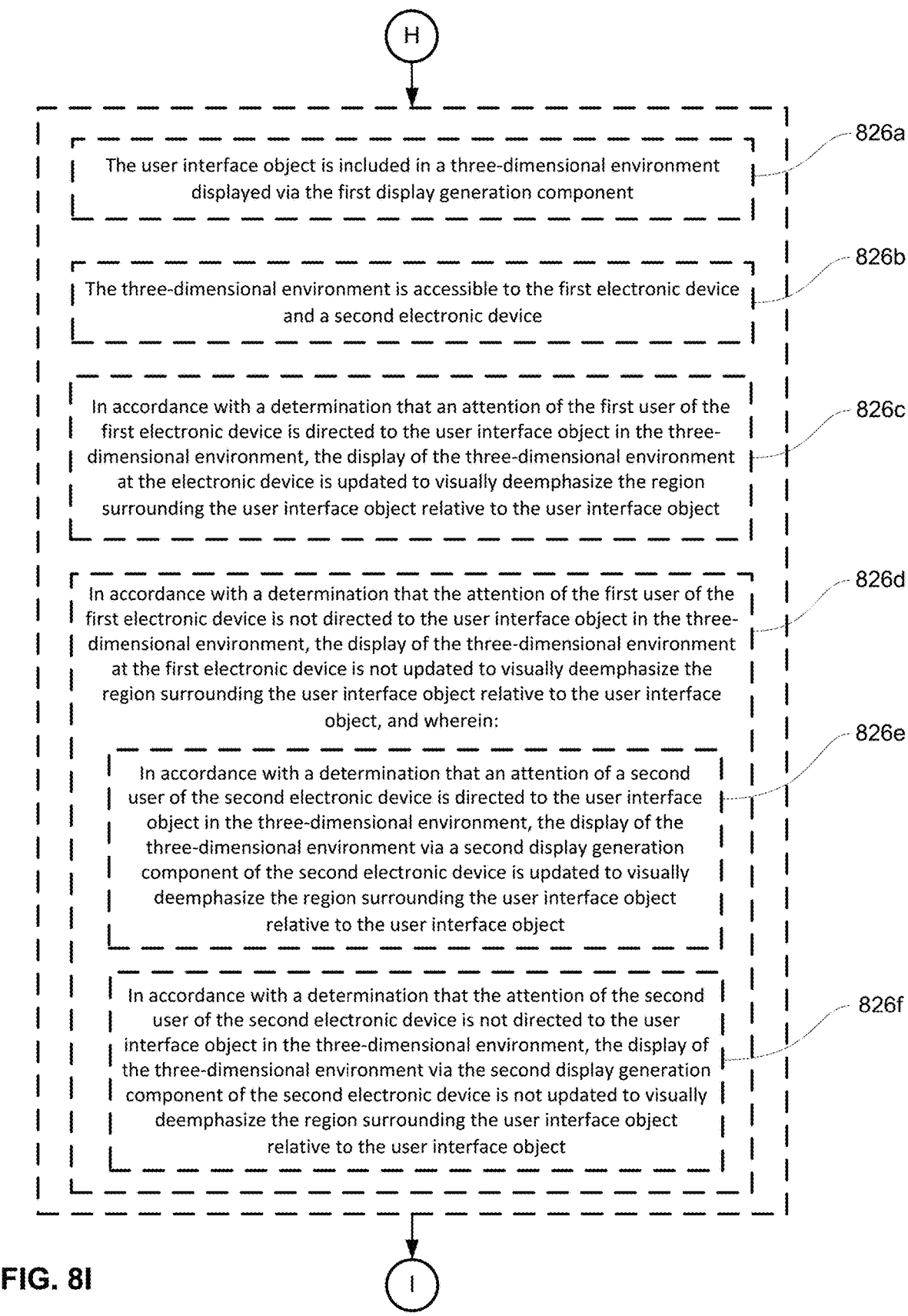
Figure 8J:
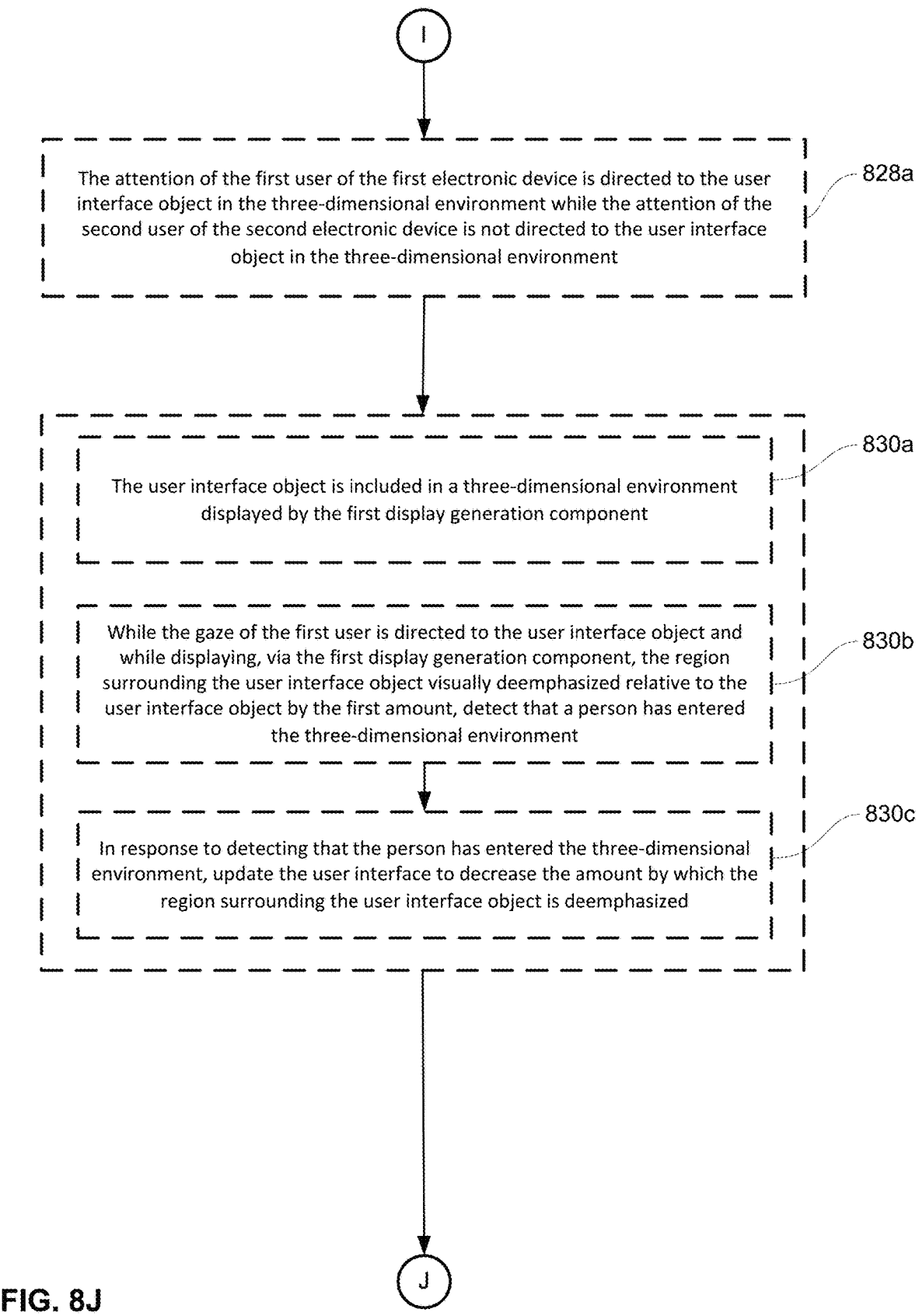
Figure 8K:
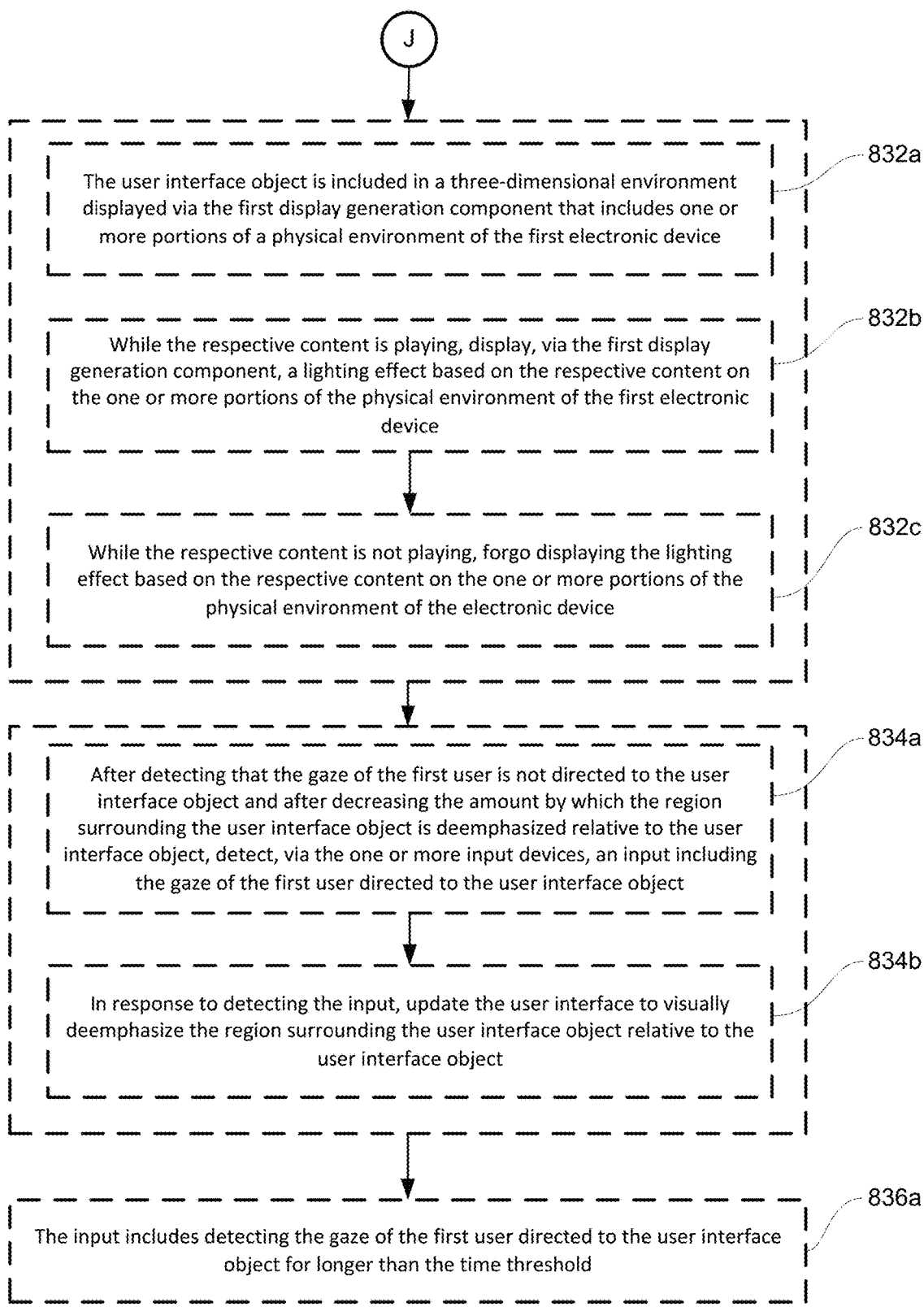
Figure 9A:
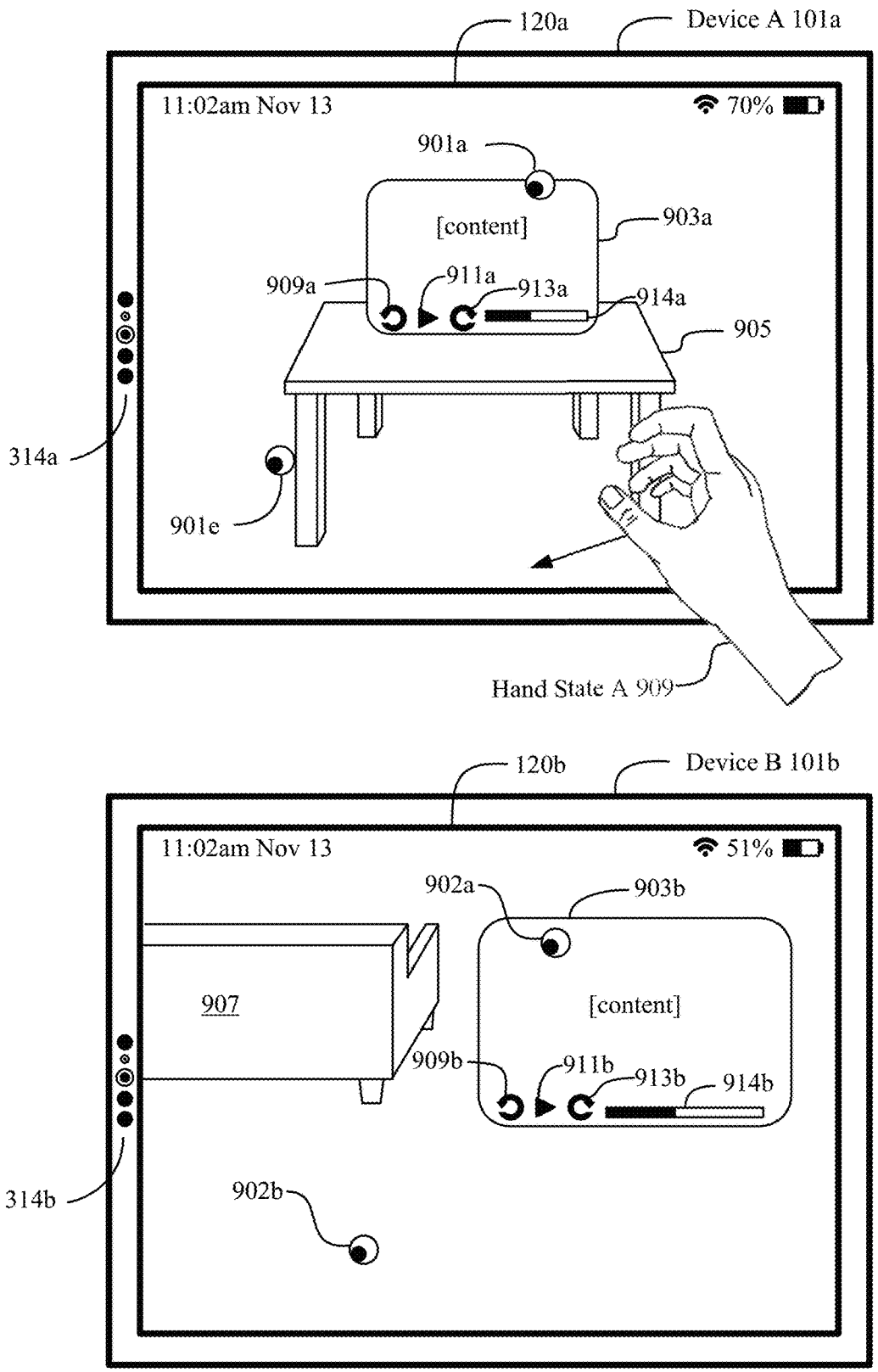
FIGS. 9A-9C illustrate exemplary ways in which electronic devices modify the boundaries of content in a user interface according to some embodiments.
Figure 9B:
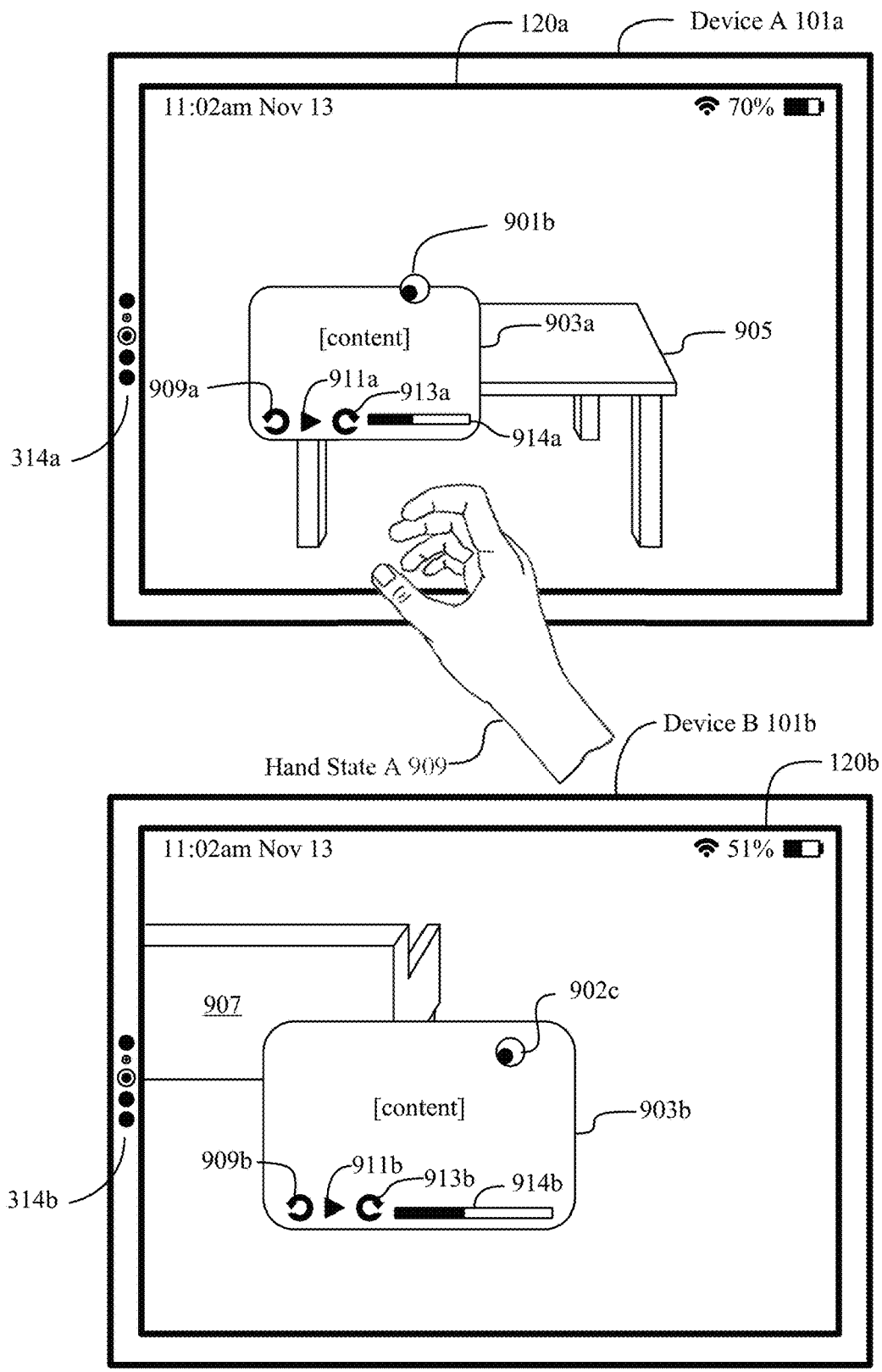
Figure 9C:
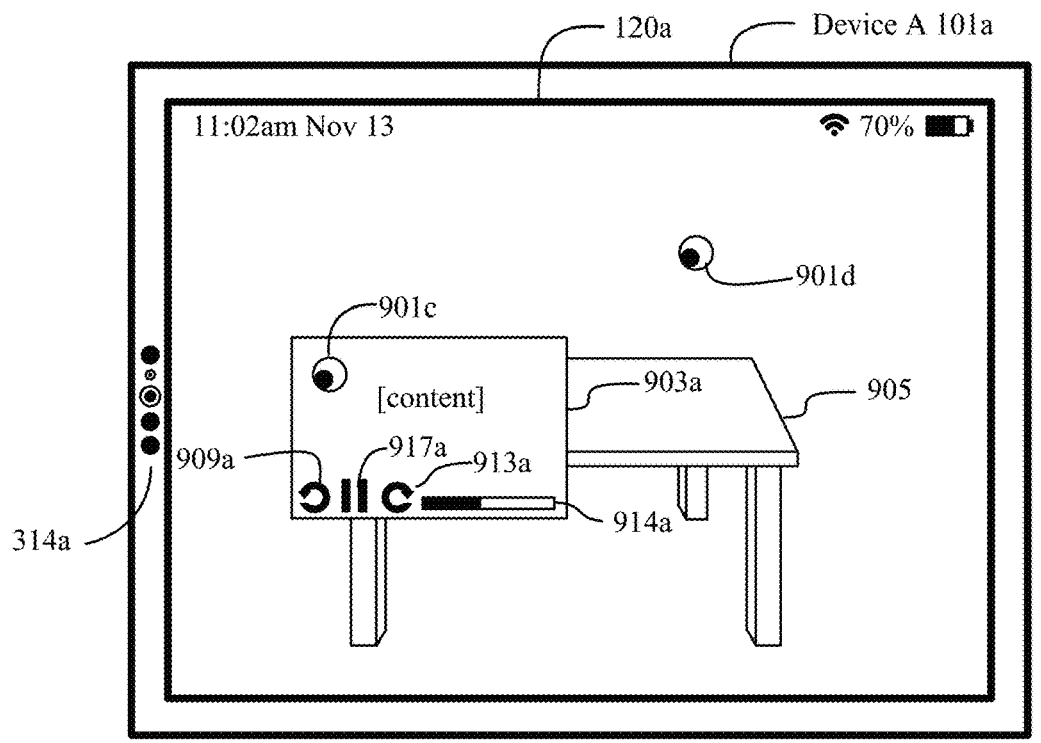
Figure 9C:
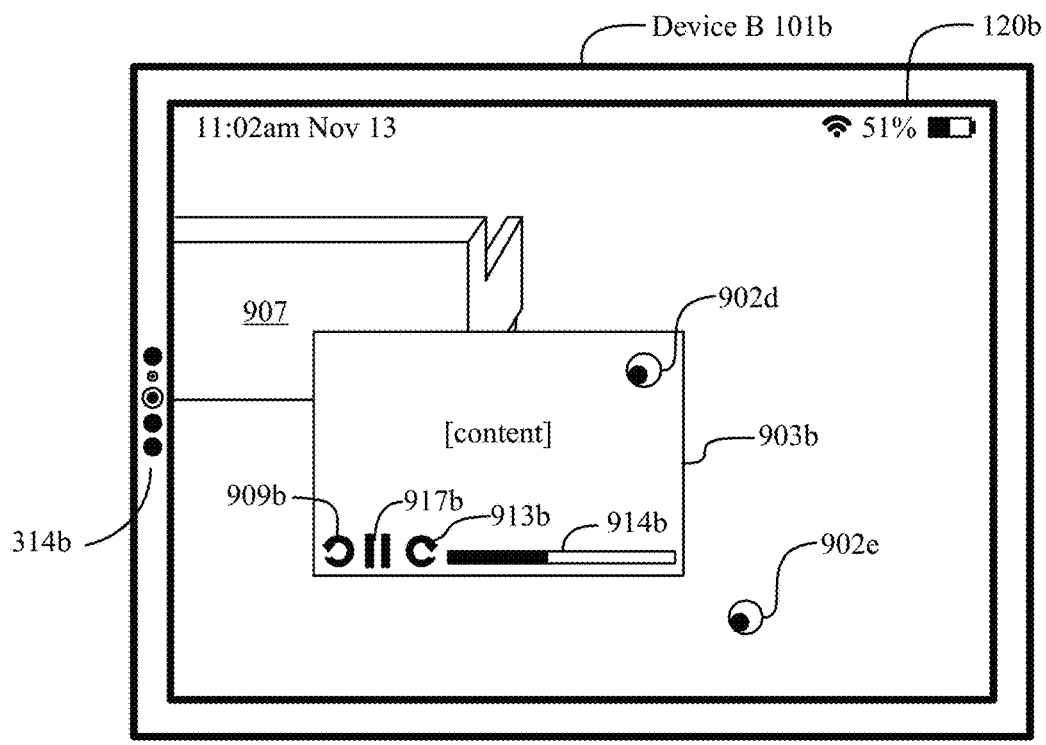
Figure 10A:
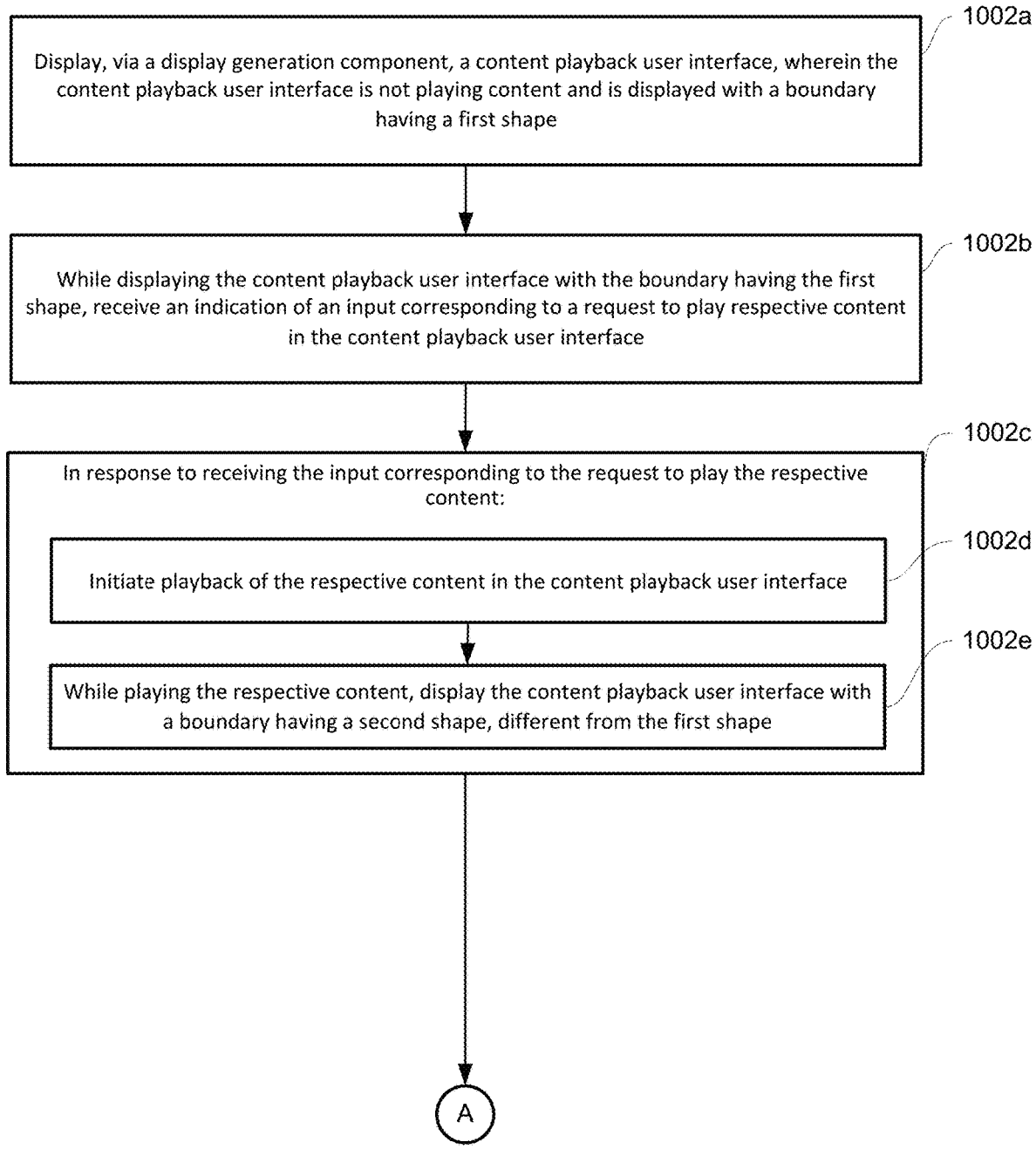
FIGS. 10A-10D is a flowchart illustrating a method of modifying the boundaries of content in a user interface according to some embodiments.
Figure 10B:
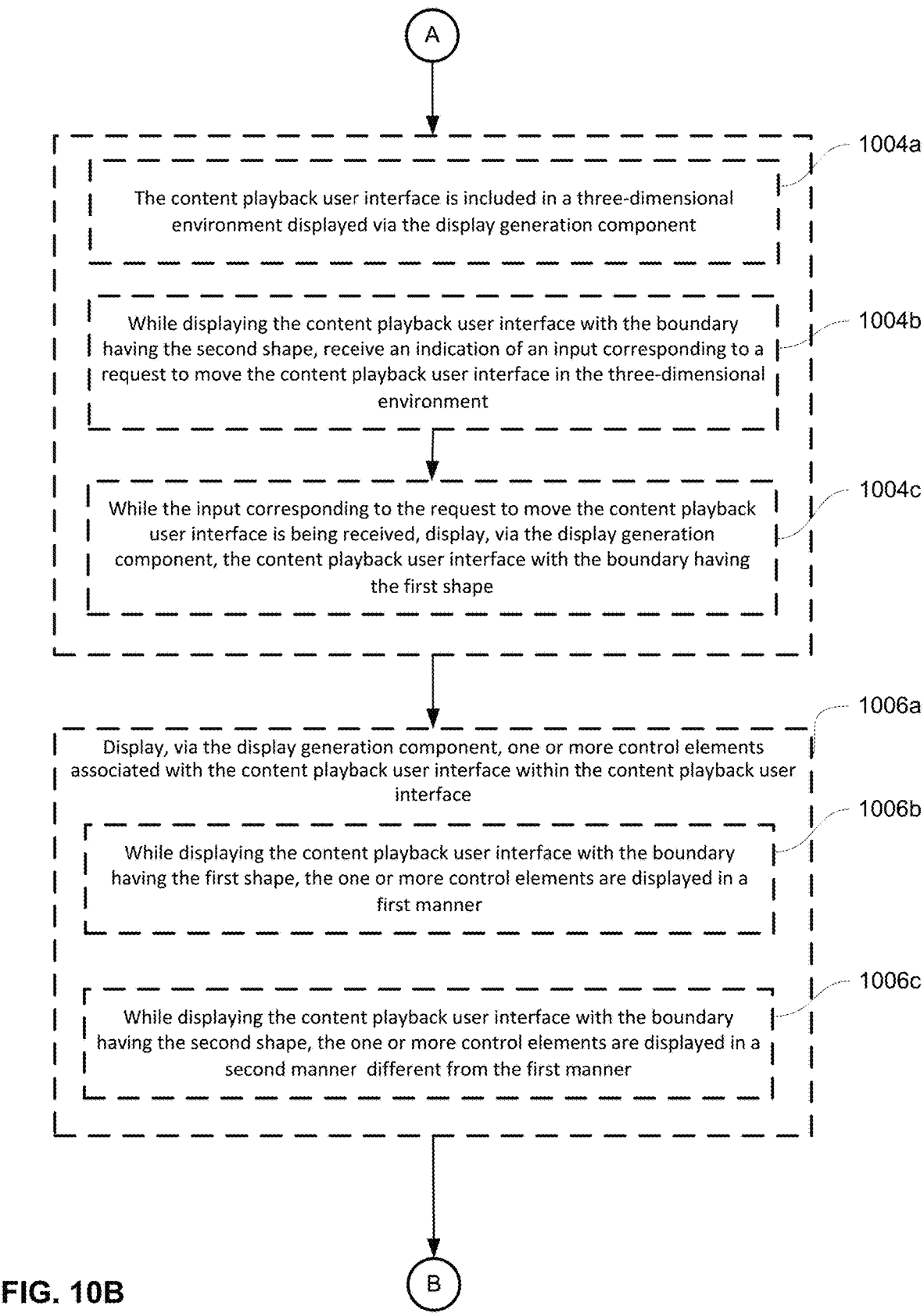
Figure 10C:
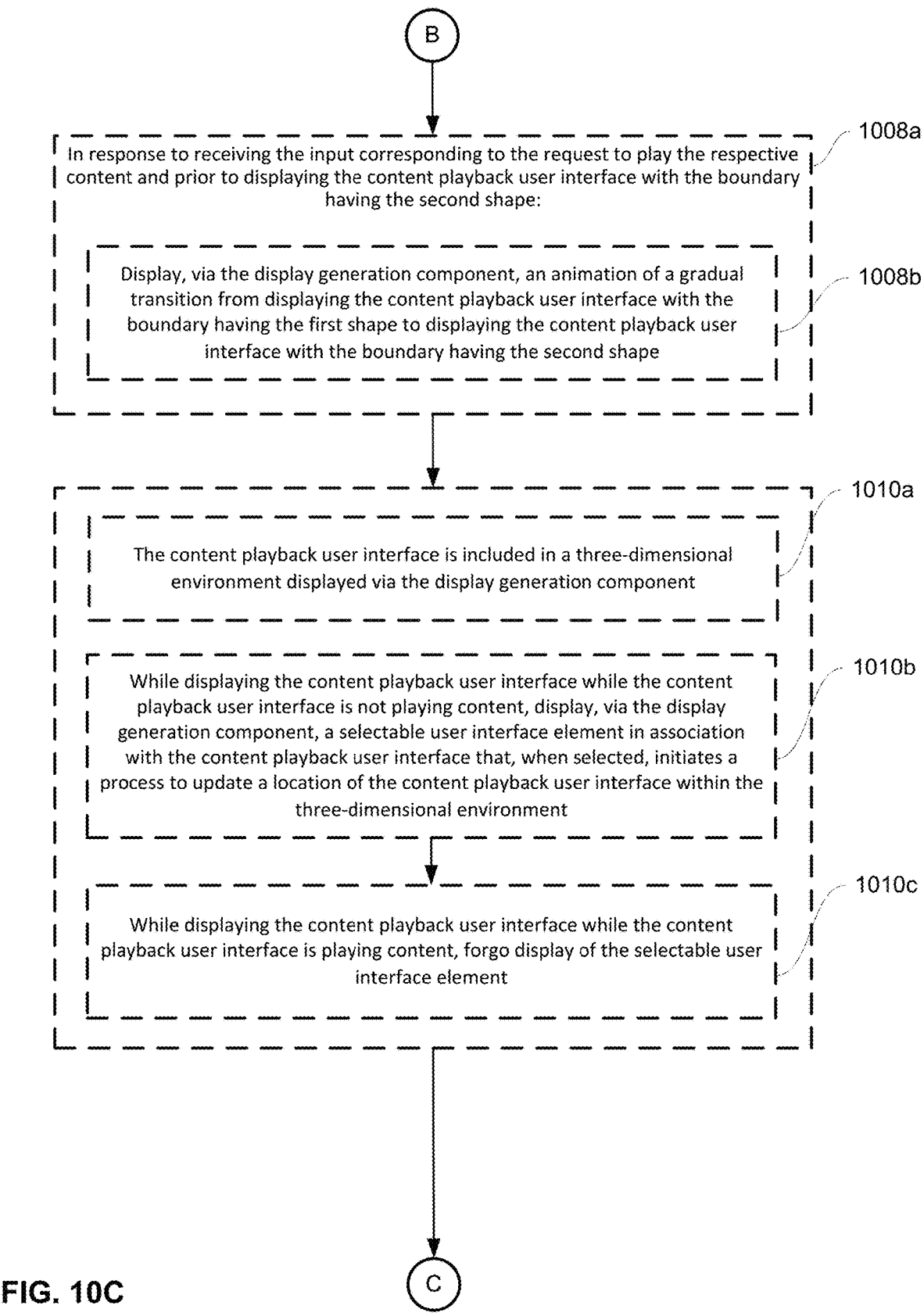
Figure 10D:
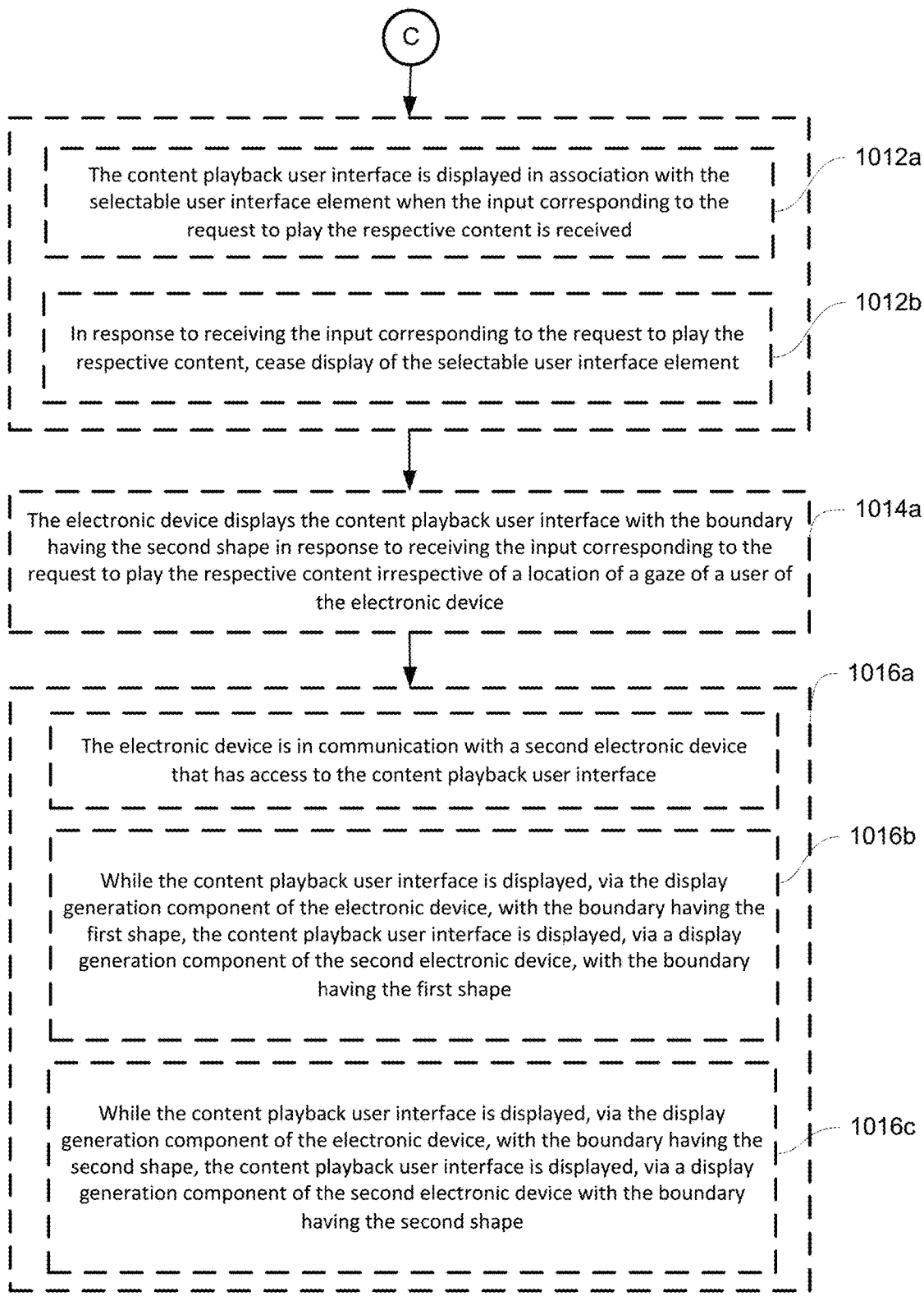

FIGS. 1-6 provide a description of example computer systems for providing XR experiences to users (such as described below with respect to methods 800, 1000, 1200, and 1400). FIGS. 7A-7D illustrate exemplary ways in which electronic devices selectively de-emphasize a three-dimensional environment in which content is presented in accordance with some embodiments. FIGS. 8A-8K is a flowchart illustrating a method of selectively de-emphasizing a three-dimensional environment in which content is presented in accordance with some embodiments. The user interfaces in FIGS. 7A-7D are used to illustrate the processes in FIGS. 8A-8K. FIGS. 9A-9C illustrate exemplary ways in which electronic devices modify the boundaries of content in a user interface according to some embodiments. FIGS. 10A-10D is a flowchart illustrating a method of modifying the boundaries of content in a user interface according to some embodiments. The user interfaces in FIGS. 9A-8C are used to illustrate the processes in FIGS. 10A-10D. FIGS. 11A-11D illustrate exemplary ways in which electronic devices share content in a three-dimensional environment according to some embodiments. FIGS. 12A-12H is a flowchart illustrating a method for sharing content in a three-dimensional environment according to some embodiments. The user interfaces in FIGS. 11A-11D are used to illustrate the processes in FIGS. 12A-12H.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or extended environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
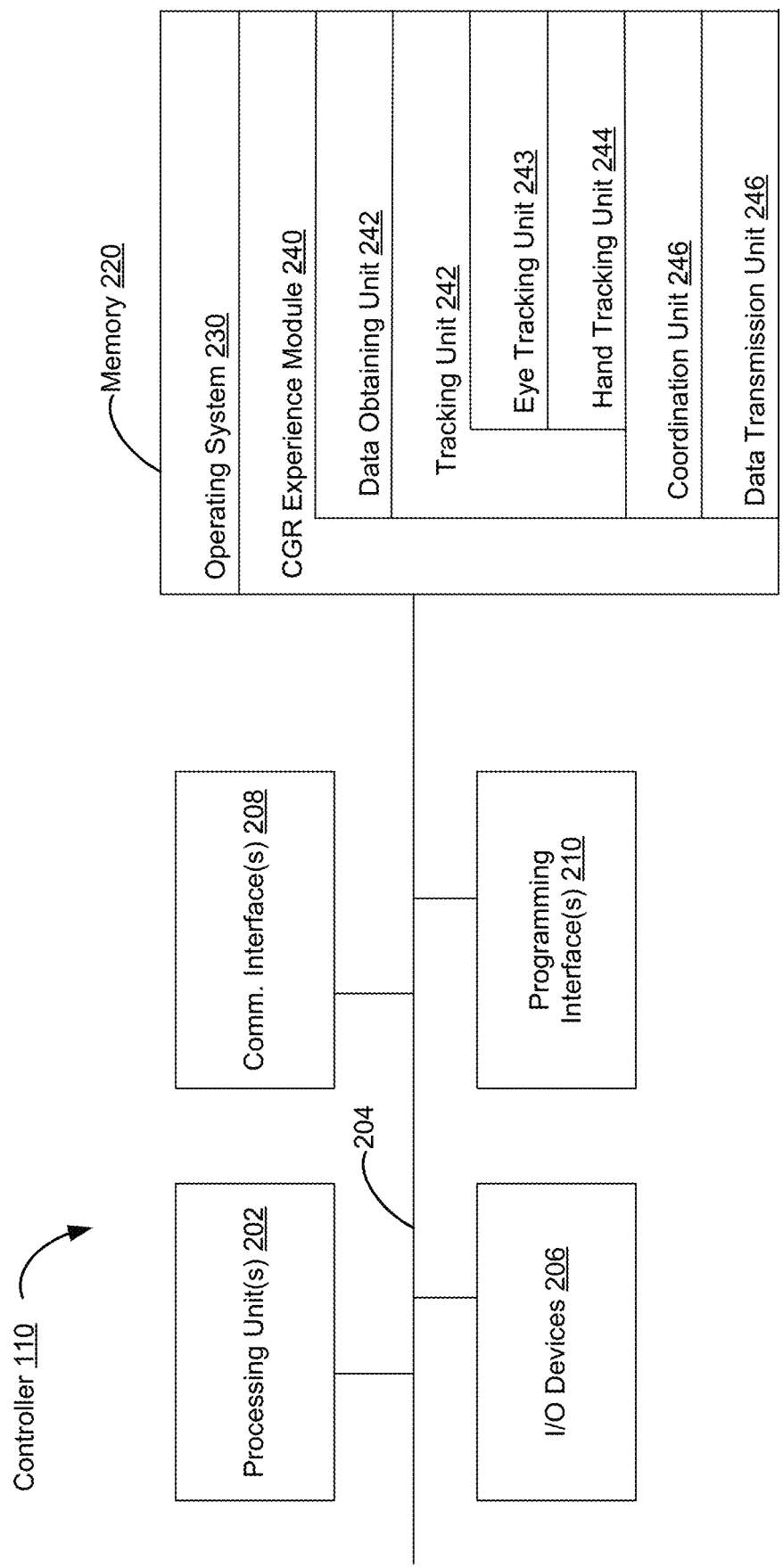
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
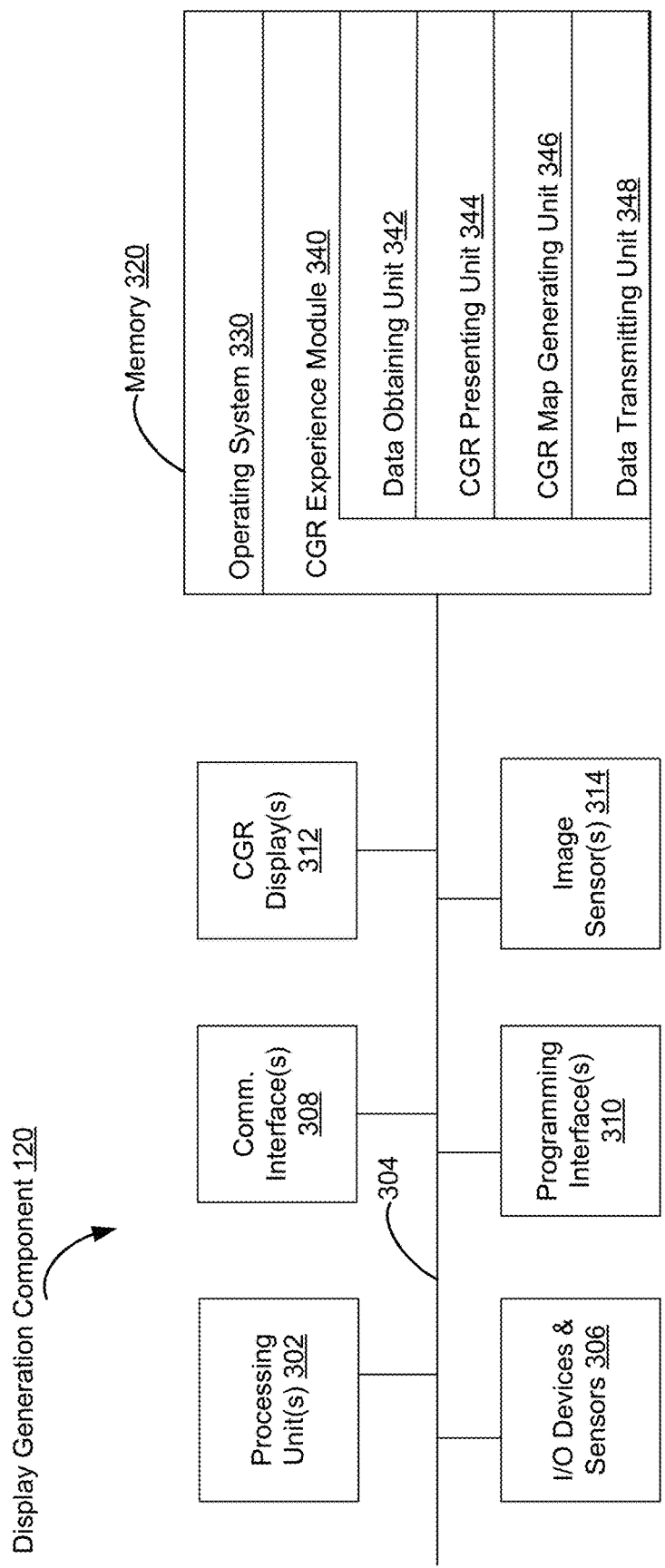
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., an HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
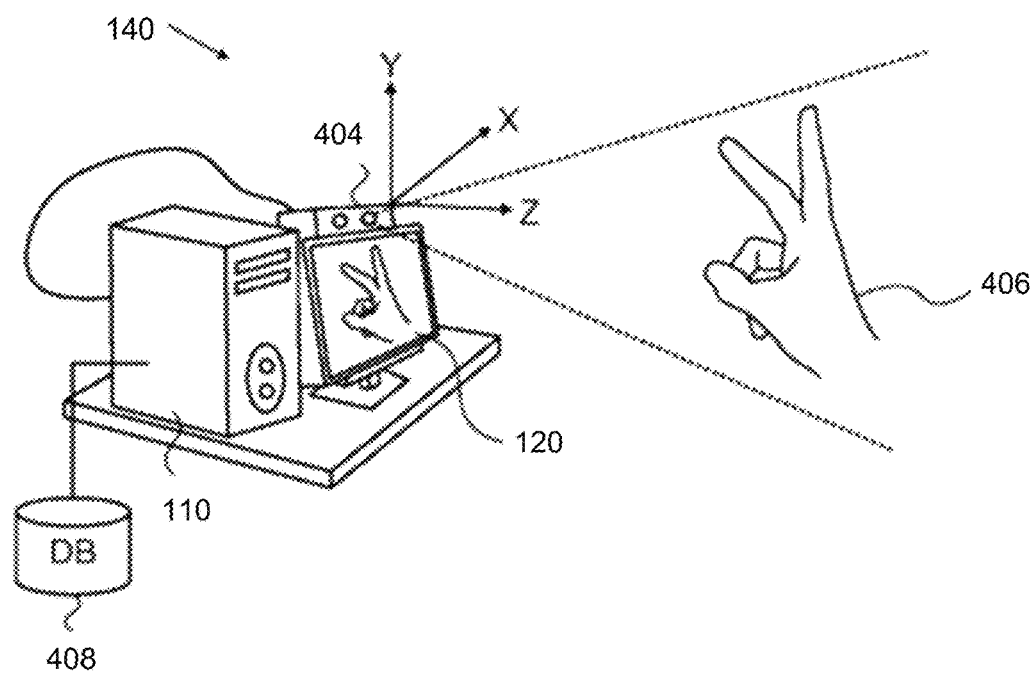
FIG. 4 is a block diagram illustrating a hand tracking unit of a computer system that is configured to capture gesture inputs of the user in accordance with some embodiments.
Figure 4:
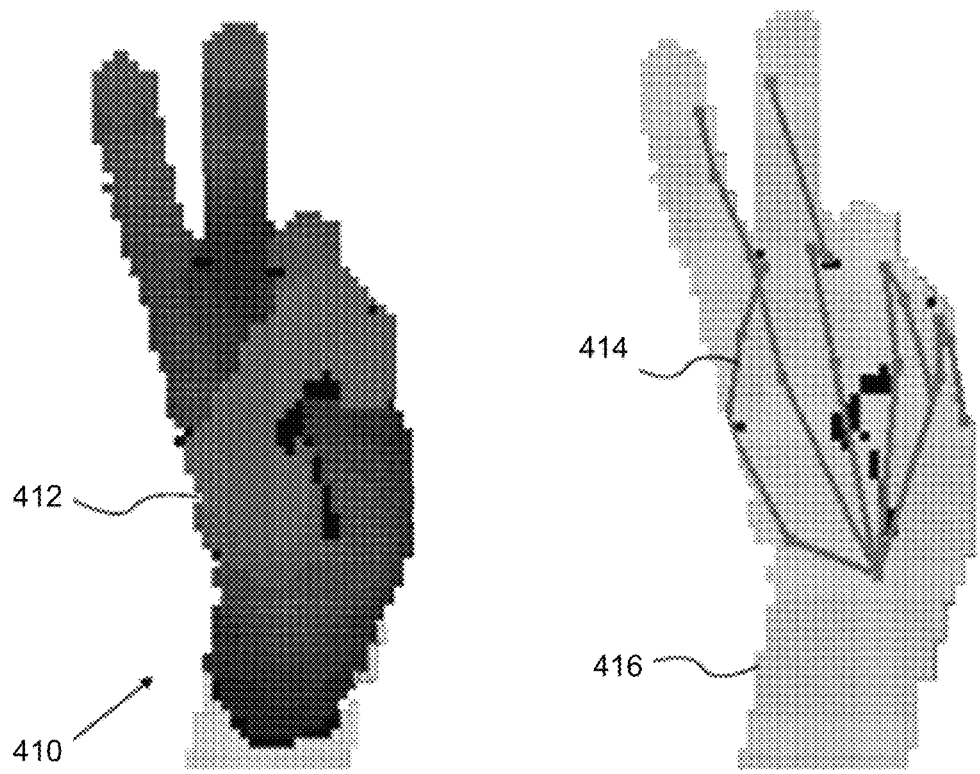

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands)

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
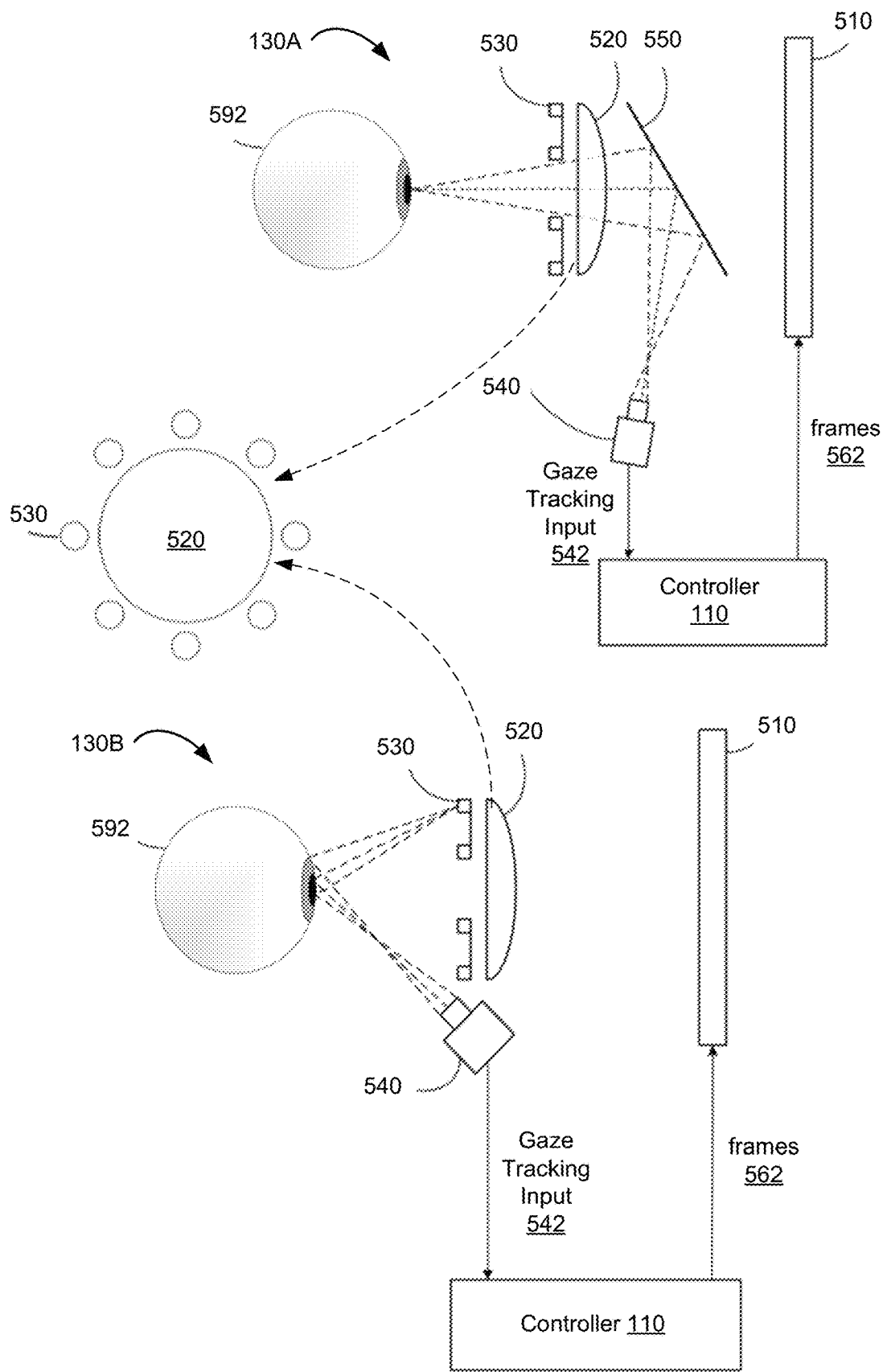
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
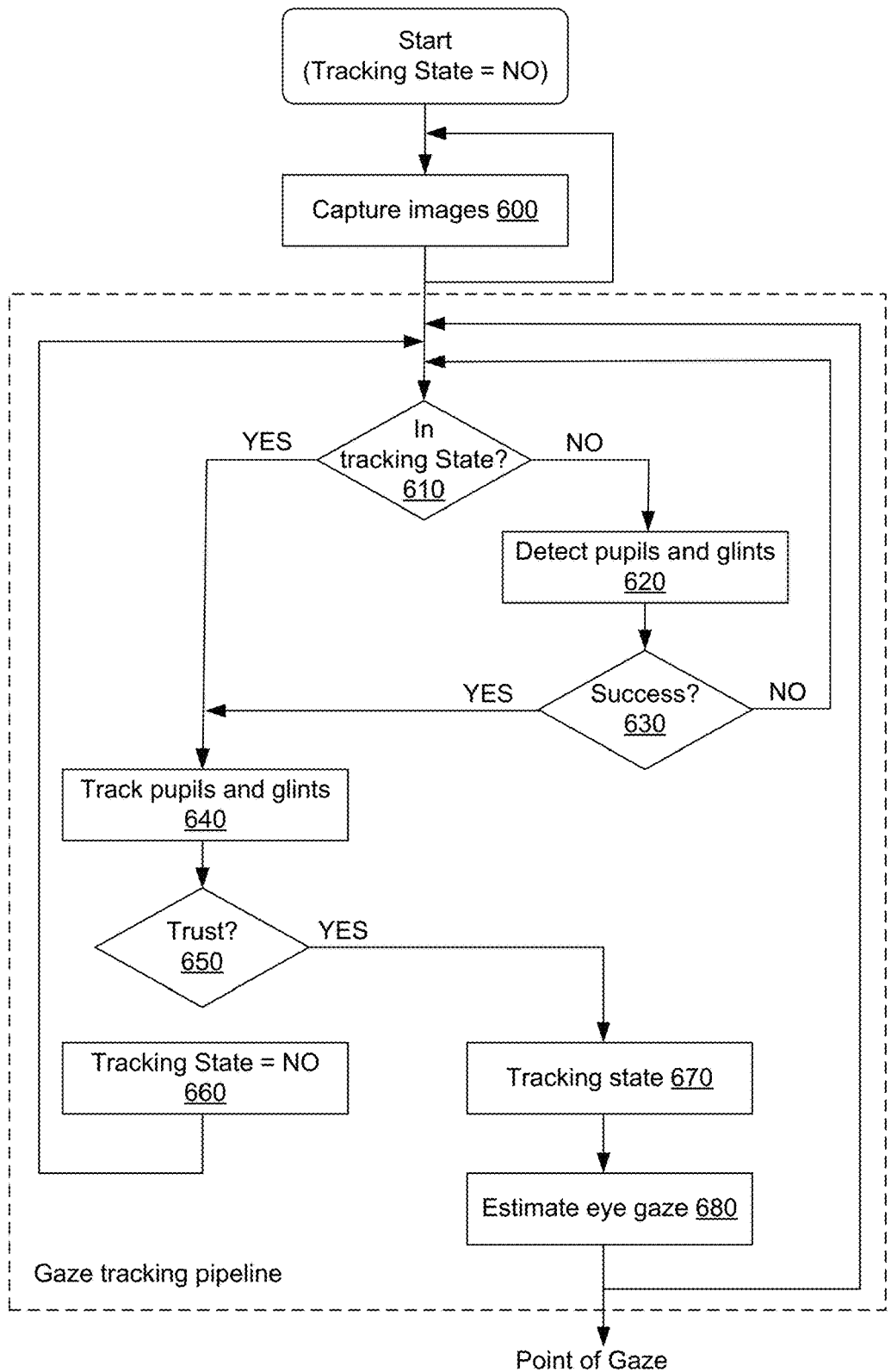
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660 and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of an computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

Similarly, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one or more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7D illustrate exemplary ways in which electronic devices 101a and/or 101b selectively de-emphasize a three-dimensional environment in which content is presented in accordance with some embodiments.

Figure 7A:
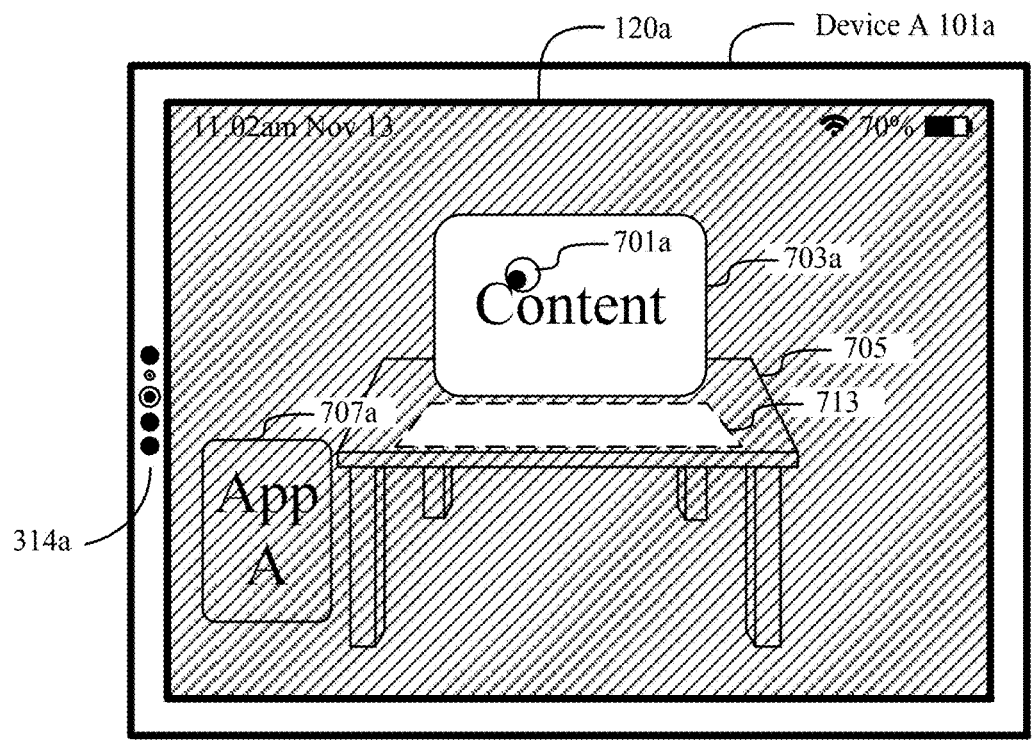
FIGS. 7A-7D illustrate exemplary ways in which electronic devices selectively de-emphasize a three-dimensional environment in which content is presented in accordance with some embodiments.
Figure 7A:
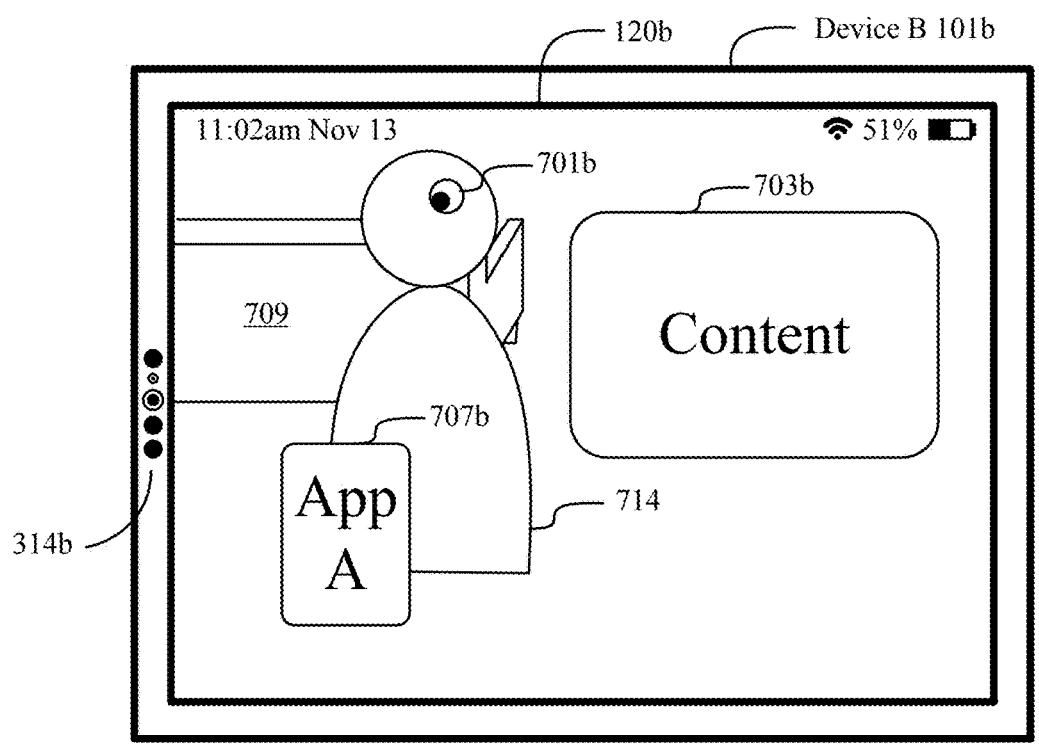

FIG. 7A illustrates electronic devices 101a and 101b displaying, via display generation components 120a and 120b, a three-dimensional environment. It should be understood that, in some embodiments, electronic devices 101a and/or 101b utilize one or more techniques described with reference to FIGS. 7A-7D in a two-dimensional environment or user interface without departing from the scope of the disclosure. As described above with reference to FIGS. 1-6, the electronic devices 101a and 1010b optionally include display generation components 120a and 120b (e.g., touch screens) and a plurality of image sensors 314a and 314b. The image sensors optionally include one or more of a visible light camera, an infrared camera, a depth sensor, or any other sensor the electronic device 101a and/or 101b would be able to use to capture one or more images of a user or a part of the user while the user interacts with the electronic devices 101a and/or 101b. In some embodiments, display generation components 120a and 120b are touch screens that are able to detect gestures and movements of a user's hand. In some embodiments, the user interfaces described below could also be implemented on a head-mounted display that includes a display generation component that displays the user interface to the user, and sensors to detect the physical environment and/or movements of the user's hands (e.g., external sensors facing outwards from the user), and/or gaze of the user (e.g., internal sensors facing inwards towards the face of the user).

FIGS. 7A-7D illustrate a first electronic device 101a and a second electronic device 101b displaying virtual content of a three-dimensional environment. In some embodiments, both electronic device 101a and 101b have access to the virtual objects in the three-dimensional environment and display one or more virtual objects and one or more physical objects present in the physical environment of the respective electronic device. In some embodiments, the two electronic devices 101a and 101b are able to present the same virtual objects of the three-dimensional environment while the electronic devices 101a and 101b are in a shared physical location (e.g., in the same room as one another) or while the electronic devices 101a and 101b are remote from each other (e.g., in different rooms, in different buildings, in different cities, in different countries). In some embodiments, while the electronic devices 101a and 101b present the same virtual objects in the three-dimensional environments, the electronic devices 101a and 101b are in communication with one another (e.g., via the internet or another network connection).

In some embodiments, the three-dimensional environments displayed by the electronic devices 101a and 101b include representations of real objects in the physical environments of the electronic devices 101a and 101b. For example, the first electronic device 101a presents a representation 705 of a table in the physical environment of the first electronic device 101a. In some embodiments, the representation 705 of the table is a photorealistic representation of the table displayed by display generation component 120a (e.g., video passthrough). In some embodiments, the representation 705 is a view of the table through a transparent portion of the display generation component 120a (e.g., true passthrough). As another example, the second electronic device 101b presents a representation 709 of a sofa in the physical environment of the second electronic device 101b and a representation 713 of another person in the physical environment of the second electronic device 101b. In some embodiments, the representation 709 of the sofa and the representation 713 of the person are photorealistic representations of the sofa and person displayed by display generation component 120b (e.g., video passthrough). In some embodiments, the representations 709 and 713 are a view of the sofa and person, respectively, through a transparent portion of the display generation component 120b (e.g., true passthrough). The first electronic device 101a optionally does not display the representation 709 of the sofa or the representation 713 of the person because the sofa and person are in the physical environment of the second electronic device 101b, not in the physical environment of the first electronic device 101a. The second electronic device 101b optionally does not display the representation 705 of the table because the table is in the physical environment of the first electronic device 101a, not in the physical environment of the second electronic device 101b.

Thus, in FIGS. 7A-7D, the electronic devices 101a and 101b are in different physical environments while presenting representations of the virtual objects in the three-dimensional environment. It should be understood that, in some embodiments, the electronic devices 101a and 101b are in the same physical environment without departing from the scope of the disclosure.

In FIG. 7A, the first electronic device 101a displays a representation 707a of an application and an item of content 703a in the three-dimensional environment. In some embodiments, the content 703a includes video content (e.g., video clip(s), television show, movie, etc.). Areas of the three-dimensional environment other than the content 703a are displayed, by device 101a, with a blurred and/or darkened appearance (e.g., relative to content 703a) because the gaze 701a of the user of the first electronic device 101a is directed to the item of content 703a. The electronic device 101a also displays a light spill 713 from content 703a on representation 705 of the table to simulate the light of the content 703a reflecting off of other (e.g., virtual and/or physical) objects in the three-dimensional environment (e.g., the representation 705 of the table). In some embodiments, the light spill 713 is only displayed by device 101a while the content 703a is playing and is not displayed while the content 703a is paused. In some embodiments, the amount of light spill 713 depends on the degree to which the three-dimensional environment is de-emphasized relative to content 703a. For example, if the amount of de-emphasis is relatively high, the intensity of the light spill is relatively high and if the amount of de-emphasis is relatively low, the intensity of the light spill is relatively low. The second electronic device 101b also displays the content 703b and the representation of the application 707b. In some embodiments, the content 703a displayed by the first electronic device 101a is the same as the content 703b displayed by the second electronic device and playback of the content is synchronized between the two devices 101a and 101b.

In FIG. 7A, the three-dimensional environment displayed by the second electronic device 101b is not blurred or darkened (e.g., relative to content 703b). In some embodiments the second electronic device 101b forgoes blurring and/or darkening the three-dimensional environment because another person 714 is present in the physical environment of the second electronic device 101b. In some embodiments the second electronic device 101b additionally or alternatively forgoes blurring and/or darkening the three-dimensional environment because the gaze 701b of the user of the second electronic device 101b is not directed to the content 703b. As shown in FIG. 7A, the gaze 701b of the user of the electronic device 101b is directed to the person 713 in the physical environment of the second electronic device 101b, and not to content 703b. Thus, although the first electronic device 101a and the second electronic device 101b display representations of the same content and synchronize the playback of the content, the amount of de-emphasis of the rest of the three-dimensional environment (e.g., relative to content 703a and 703b, respectively) is independent for each device 101a and 101b based on the gaze of the users of the electronic devices 101a and 101b in some embodiments. Moreover, as shown in FIG. 7A, the second electronic device 101b optionally forgoes display of a virtual light spill (e.g., similar to virtual light spill 713 displayed by electronic device 101a) associated with content 703b while displaying the content 703b in the three-dimensional environment that is not blurred or darkened relative to content 703b.

In some embodiments, the electronic devices 101a and 101b transition from displaying the three-dimensional environment without blurring or darkening regions other than the content 703a or 703b to blurring and/or darkening regions of the three-dimensional environment other than the content 703a or 703b in response to detecting the gaze of the user move from a location other than the content 703a or 703b to the content 703a or 703b. In some embodiments, the electronic devices 101a and 101b do not blur and/or darken the three-dimensional environment until a threshold time (e.g., 1, 2, 3, 4, 5, 7, 10, etc. seconds) has passed since the gaze of the user has been directed to the content 703a or 703b. In some embodiments, the electronic devices 101a and 101b transition from displaying regions of the three-dimensional environment other than the content 703a or 703b with a blurred and/or darkened appearance to displaying the three-dimensional environment without blurring or darkening portions of the three-dimensional environment in response to detecting the gaze of the user move away from the content 703a or 703b to a region of the three-dimensional environment other than the content 703a or 703b.

Figure 7B:
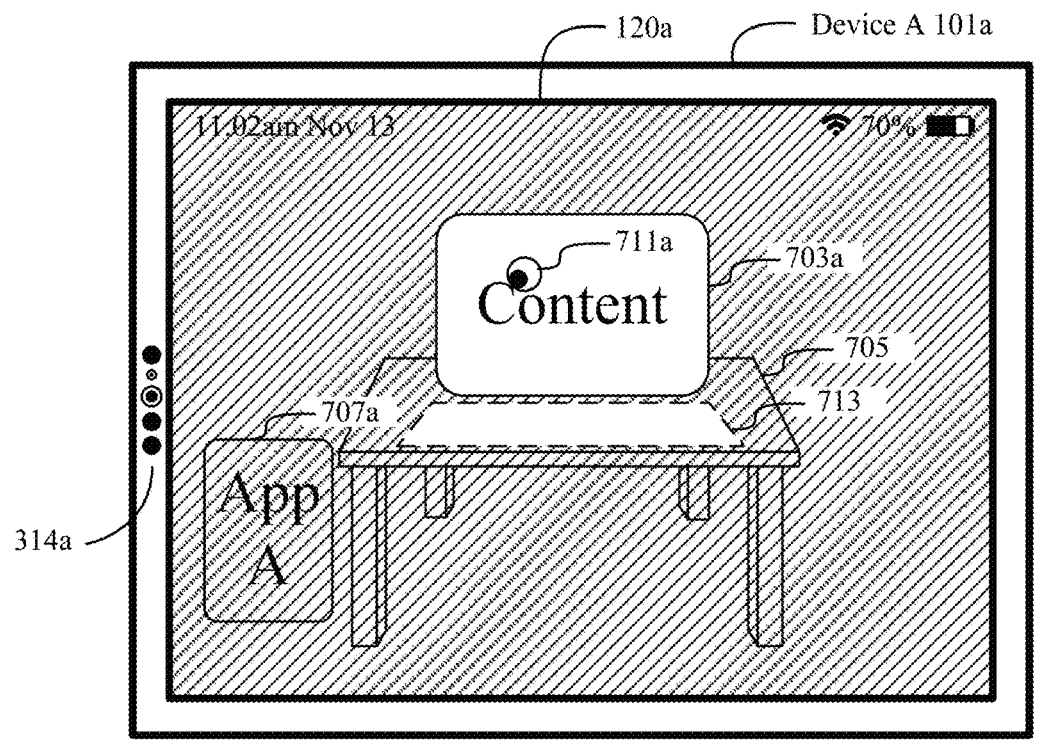
Figure 7B:
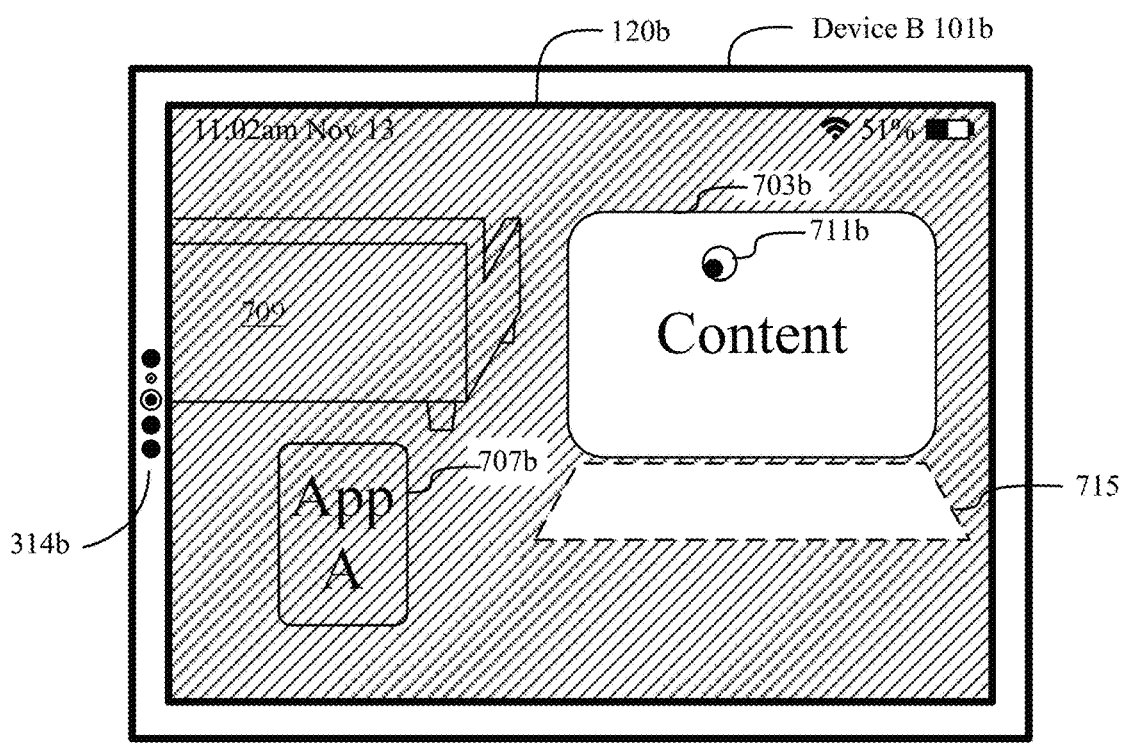
Figure 7C:
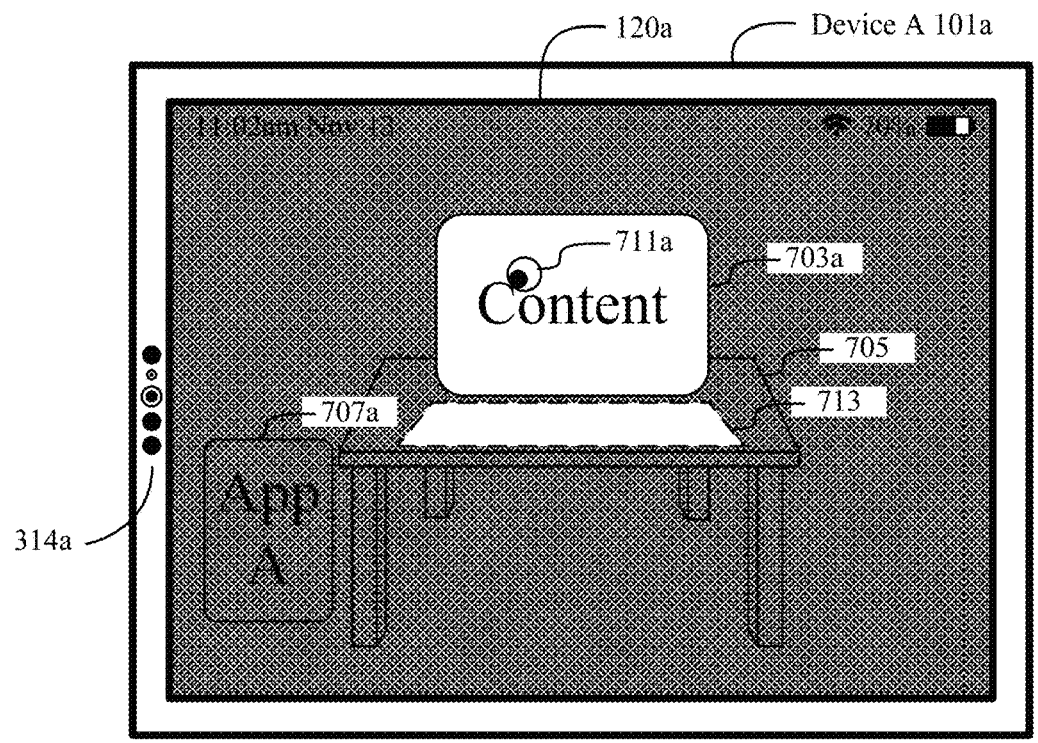
Figure 7C:
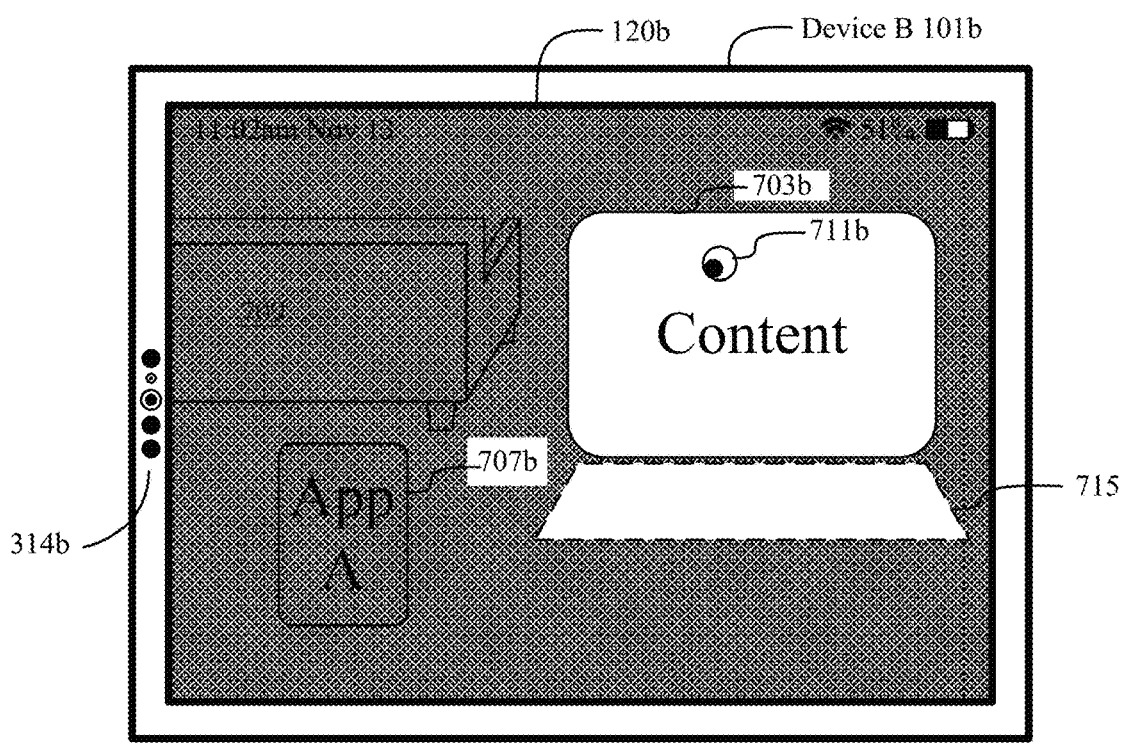

In some embodiments, as shown in FIGS. 7B-7C, while the gaze of both users is directed to the content 703a and 703b, the amount of de-emphasis applied by devices 101a and 101b of the rest of the three-dimensional environment is the same for both the first electronic device 101a and the second electronic device 101b. Referring to FIG. 7B, the gaze 711a of the user of the first electronic device 101a is directed to the content 703a, and the gaze 711b of the user of the second electronic device 101b is directed to the content 703b. While the gaze 711a of the user of the first electronic device 101a is directed to the content 703a, the first electronic device 101a displays areas of the three-dimensional environment other than the content 703a with a blurred and/or darkened appearance. Likewise, while the gaze 711b of the user of the second electronic device 101b is directed to the content 703b, the second electronic device 101b displays the areas of the three-dimensional environment other than the content 703b with a blurred and/or darkened appearance that is blurred and/or darkened to the same extent to which the three-dimensional environment is blurred and/or darkened by the first electronic device 101a. In FIG. 7B, the first electronic device 101a also displays a virtual light spill 713 from the content 703a on the representation 705 of the table in the three-dimensional environment of the first electronic device 101a, and the second electronic device 101b displays a virtual light spill 715 from the content 703b on the floor of the physical environment of the second electronic device 101b. In some embodiments, the light spills 713 and 715 are only displayed while the content 703a and 703b is playing and are not displayed while the content 703a and 703b is paused or otherwise not playing (e.g., while devices 101a and 101b are displaying a content browsing user interface within user interface objects 703a and 703b). In some embodiments, light spills 713 and 715 are displayed with different magnitudes/intensities depending on whether content 703a and 703b is playing or not playing. For example, the light spills 713 and 715 are displayed with greater magnitudes/intensities while content 703a and 703b is playing than while content 703a and 703b is paused or otherwise not playing. In some embodiments, the electronic device 101a and 101b display the virtual light spills 713 and 715 on surface(s) of virtual object(s) in addition to displaying virtual light spills 713 and 715 on representations of real objects in the physical environments of the electronic devices 101a and 101b.

FIG. 7C illustrates the first electronic device 101a and the second electronic device 101b displaying the content 703a and 703b in a three-dimensional environment that is more blurred and/or more darkened than the three-dimensional environment in FIG. 7B. In FIG. 7C, the gaze 711a of the user of the first electronic device 101a is directed to the content 703a and the gaze 711b of the user of the second electronic device 101b is directed to the content 703b. In FIG. 7C, while the gaze 711a of the user of the first electronic device 101a is directed to the content 703a, the first electronic device 101a displays areas of the three-dimensional environment other than the content 703a with a blurred and/or darkened appearance. Likewise, in FIG. 7C, while the gaze 711b of the user of the second electronic device 101b is directed to the content 703b, the second electronic device 101b displays the areas of the three-dimensional environment other than the content 703b with a blurred and/or darkened appearance that is blurred and/or darkened to the same extent to which the three-dimensional environment is blurred and/or darkened by the first electronic device 101a. In FIG. 7C, the first electronic device 101a displays a virtual light spill 713 from the content 703a on the representation 705 of the table in the three-dimensional environment of the first electronic device 101a, and the second electronic device 101b displays a virtual light spill 715 from the content 703b on the floor of the physical environment of the second electronic device 101b.

In some embodiments, the amount of de-emphasis (e.g., blurring and/or darkening) of the three-dimensional environment in which the content 703a or 703b is presented while the gaze of the user is directed to the content depends on whether the content 703a and 703b is currently playing or currently paused. For example, while the content 703a and 703b is paused, the electronic devices 101a and 101b present the three-dimensional environment shown in FIG. 7B and, while the content 703a and 703b is playing, the electronic device 101a and 101b present the three-dimensional environment shown in FIG. 7C. In some embodiments, the electronic devices 101a and 101b increase the amount of darkening of the three-dimensional environment while the content 703a and 703b is playing, but the amount of blur of the three-dimensional environment is the same amount regardless of whether the content 703a and 703b is paused or playing.

In some embodiments, the amount of de-emphasis (e.g., blurring and/or darkening) of the three-dimensional environment in which the content 703a or 703b is presented while the gaze of the user is directed to the content depends on the type of content that is being presented. For example, the electronic devices 101a and 101b apply the amount of de-emphasis illustrated in FIG. 7B when presenting video clips (e.g., from websites other than streaming services or social media) but apply the amount of de-emphasis in FIG. 7C (e.g., greater de-emphasis) when presenting television shows or movies.

In some embodiments, the amount of de-emphasis (e.g., blurring and/or darkening) of the three-dimensional environment in which the content 703a or 703b is presented while the gaze of the user is directed to the content depends on one or more user-defined settings at devices 101a and/or 101b. For example, while a setting for applying a relatively low amount of de-emphasis is active at a given device, the electronic devices 101a and/or 101b apply the amount of de-emphasis illustrated in FIG. 7B, but while a setting for applying a relative high amount of de-emphasis is active at a given device, the electronic devices 101a and/or 101b apply the amount of de-emphasis illustrated in FIG. 7C. In some embodiments, the setting is synchronized across the first electronic device 101a and the second electronic device 101b while the electronic devices present representations of the same virtual objects. In some embodiments, as will be described in more detail below with reference to FIG. 7D, the amount of de-emphasis applied by the first electronic device 101a is different from the amount of de-emphasis applied by the second electronic device 101b due to differences in user-defined settings and/or differences in ambient lighting conditions of the physical environments of the first electronic device 101a and the second electronic device 101b.

Figure 7D:
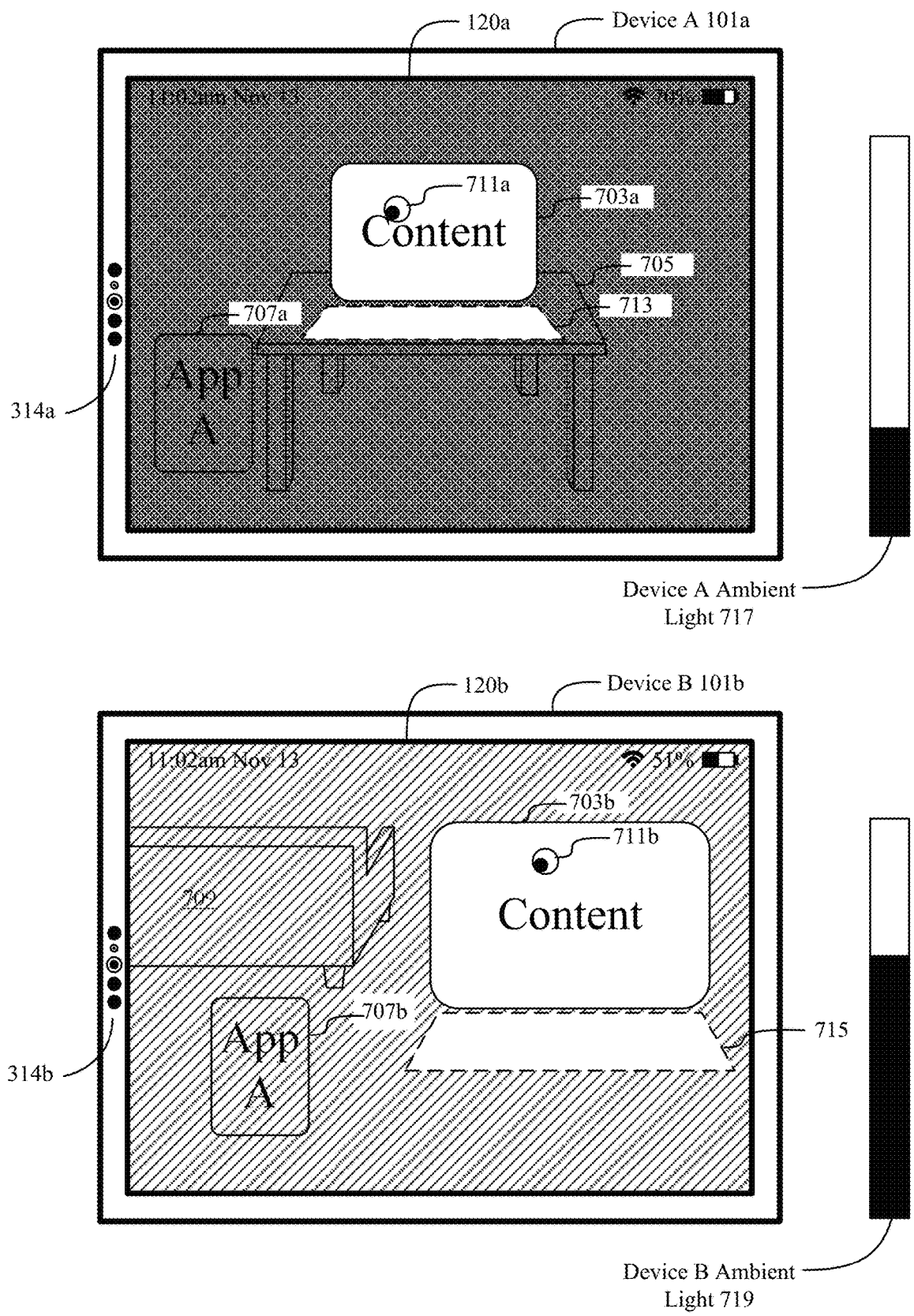

In FIG. 7D, the amount of de-emphasis of the three-dimensional environment relative to the content 703a presented by first electronic device 101a is greater than the degree of de-emphasis of the three-dimensional environment relative to the content 703b presented by the second electronic device 101b. In some embodiments, the amounts of de-emphasis are different because the first electronic device 101a applies a greater amount of de-emphasis than the amount of de-emphasis applied by the second electronic device 101b. In some embodiments, the discrepancy in the amount of de-emphasis is caused by differences in user-defined settings active on the electronic devices 101a and 101b. For example, a relatively high de-emphasis setting is active on the first electronic device 101a and a relatively low de-emphasis setting is active on the second electronic device 101bd. In some embodiments, the amount of de-emphasis applied by the first electronic device 101a is less than the amount of de-emphasis applied by the second electronic device 101b, but the amount of de-emphasis of the first electronic device 101a optionally appears to be greater than the amount of de-emphasis of the second electronic device 101b because the ambient light 717 in the physical environment of the first electronic device 101a is darker than the ambient light 719 in the physical environment of the second electronic device 101b. In some embodiments, the virtual light spill 713 applied by the first electronic device 101a is more intense than the virtual light spill 715 applied by the second electronic device 101b because the amount of de-emphasis of the first electronic device 101a is greater than the amount of de-emphasis of the second electronic device 101b. In some embodiments, the intensities of the light spills 713 and 715 are the same.

FIGS. 8A-8K is a flowchart illustrating a method 800 of selectively de-emphasizing a three-dimensional environment in which content is presented in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, method 800 is performed at a first electronic device in communication with a first display generation component and one or more input devices, including an eye tracking device (e.g., a mobile device (e.g., a tablet, a smartphone, a media player, or a wearable device), or a computer). In some embodiments, the first display generation component is a display integrated with the first electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the first electronic device. Examples of input devices include a touch screen, mouse (e.g., external), trackpad (optionally integrated or external), touchpad (optionally integrated or external), remote control device (e.g., external), another mobile device (e.g., separate from the first electronic device), a handheld device (e.g., external), a controller (e.g., external), a camera, a depth sensor, an eye tracking device, and/or a motion sensor (e.g., a hand tracking device, a hand motion sensor), etc. In some embodiments, the first electronic device is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, such as in FIG. 7A, the electronic device (e.g., 101a or 101b) displays (802a), via the first display generation component, a user interface that includes a user interface object (e.g., 703a) and a region surrounding the user interface object, wherein the user interface object (e.g., 703a) includes respective content. In some embodiments, the content includes one or more images, audio content, and/or video content. In some embodiments, the user interface and/or user interface object is displayed in a three-dimensional environment that is generated, displayed, or otherwise caused to be viewable by the first device (e.g., the three-dimensional environment is a computer-generated reality (XR) environment such as a virtual reality (VR) environment, a mixed reality (MR) environment, or an augmented reality (AR) environment, etc.). In some embodiments, the region surrounding the user interface object is a three-dimensional region of the three-dimensional environment. The region surrounding the user interface object optionally includes one or more representations of virtual objects (e.g., other user interface objects, content, etc.) and/or one or more representations of real objects in the physical environment of the first electronic device. In some embodiments, the representations of real objects are photo-realistic representations of real objects (e.g., pass-through video) and/or portions of the real objects visible through a transparent portion of the first display generation component. In some embodiments, the user interface object is overlaid on/over one or more portions of the three-dimensional environment (e.g., the "region surrounding the user interface object") that are behind the user interface object in the three-dimensional environment (e.g., from the perspective of a viewpoint into the three-dimensional environment associated with (e.g., displayed by) the first electronic device). In some embodiments, the user interface object is a content playback user interface such as described with reference to method 1000.

In some embodiments, while displaying the user interface, the electronic device (e.g., 101a, 101b) detects (802b), via the eye tracking device, that a gaze (e.g., 701a) of a first user is directed to the user interface object (e.g., 703a) for longer than a time threshold (e.g., 0.5, 1, 2, 3, 4, 5, etc. seconds).

In some embodiments, such as in FIG. 7A, in response to detecting that the gaze (e.g., 701a) of the first user is directed to the user interface object (e.g., 703a) for longer than the time threshold, in accordance with a determination that one or more characteristics (e.g., duration of content, source of content, playback status (e.g., paused or stopped vs. playing) of the content, type of content, etc.) of the respective content included in the user interface object (e.g., 703a) satisfy one or more first criteria, the electronic device (e.g., 101a) updates (802c) the user interface to visually deemphasize the region surrounding the user interface object (e.g., 703a) relative to the user interface object (e.g., 703a). In some embodiments, visually deemphasizing the region surrounding the user interface object includes blurring, darkening and/or reducing the contrast of the region and the objects in the region. In some embodiments, the amount of de-emphasis is greater while video content is playing than the amount of de-emphasis while the video content is paused. In some embodiments, the amount of de-emphasis is greater when the content is a first type of content (e.g., movies, television shows, content from content browsing applications) than the amount of de-emphasis when the content is a second type of content (e.g., video clips, content from websites and social media). In some embodiments, the amount of de-emphasis is greater for content that has a duration over a predetermined threshold (e.g., 5, 10, 15, 20, 25, 30, 45, etc. minutes) than the amount of de-emphasis when the content has a duration less than the predetermined threshold.

In some embodiments, such as in FIG. 7A, while the region surrounding the user interface object (e.g., 703a) is visually deemphasized relative to the user interface object (e.g., 703a) by the first amount, the electronic device (e.g., 101b) detects (802d), via the eye tracking device, that the gaze (e.g., 701b) of the first user is not directed to the user interface object (e.g., 703b) (e.g., the gaze of the user is directed to a different object in the three-dimensional environment or not directed towards the user interface, three-dimensional environment and/or display generation component).

In some embodiments, such as in FIG. 7A, in response to detecting that the gaze (e.g., 701b) of the first user is not directed to the user interface object (e.g., 703b), the electronic device (e.g., 101b) updates (802e) the user interface to decrease the amount by which the region surrounding the user interface object (e.g., 703a) is deemphasized relative to the user interface object (e.g., 703a). In some embodiments, the first electronic device decreases the visual de-emphasis in response to detecting the gaze of the user not directed to the user interface object for a predetermined time threshold (e.g., 0.5, 1, 2, 3, 4, 5, etc. seconds), and does not decrease the visual de-emphasis until the gaze of the first user is not directed to the user interface object for longer than the predetermined time period. In some embodiments, the first electronic device decreases the visual de-emphasis irrespective of how long the gaze of the user is not directed to the user interface object. In some embodiments, after decreasing the visual de-emphasis, the region surrounding the user interface object is no longer visually de-emphasized relative to the user interface object. In some embodiments, after decreasing the visual de-emphasis, the region surrounding the user interface object is still visually de-emphasized relative to the user interface object to an extent less than the de-emphasis prior to decreasing the de-emphasis. In some embodiments, de-emphasizing the surroundings of the user interface object includes modifying display of the surroundings of the user interface object (e.g., to blur or darken the user interface object). In some embodiments, de-emphasizing the surroundings of the user interface object includes modifying display of the user interface object (e.g., to brighten, lighten, enlarge, etc. the user interface object).

The above-described manner of de-emphasizing the region surrounding the user interface object in response to detecting the first user's gaze away from the user interface object provides an efficient way of improving the visibility of objects in the region surrounding the user interface object in response to detecting the gaze of the user away from the user interface object, which simplifies the interaction between the first user and the first electronic device and enhances the operability of the first electronic device and makes the user-device interface more efficient, which additionally reduces power usage and improves battery life of the first electronic device by enabling the first user to use the first electronic device more quickly and efficiently.

In some embodiments, such as in FIG. 7A, updating the user interface to visually deemphasize the region surrounding the user interface object (e.g., 703a) relative to the user interface object (e.g., 703a) by the first amount includes one or more of blurring the region surrounding the user interface object (e.g., 703a) or darkening the region surrounding the user interface object (e.g., 703a) (904a). In some embodiments, the amount of blur and/or darkening has a gradient where the amount of blurring and/or darkening is most prominent (e.g., greatest) closest to the user interface object and less prominent in areas of the region surrounding the user interface object that are further from the user interface object.

The above-described manner of blurring and/or darkening the region surrounding the user interface object provides an efficient way of de-emphasizing the region surrounding the user interface object relative to the user interface object without updating display of the user interface object, thereby decreasing distraction and cognitive burden experienced by the first user, which simplifies the interaction between the first user and the first electronic device and enhances the operability of the first electronic device and makes the user-device interface more efficient, which additionally reduces power usage and improves battery life of the first electronic device by enabling the first user to use the first electronic device more quickly and efficiently.

In some embodiments, such as in FIG. 7C, the one or more first criteria include a criterion that is satisfied when the respective content included in the user interface object (e.g., 703a) is playing (806a). In some embodiments, such as in FIG. 7B, in response to detecting that the gaze (e.g., 711a) of the first user is directed to the user interface object (e.g., 703a) for longer than the time threshold, in accordance with a determination that the one or more characteristics of the respective content satisfy one or more second criteria, including a criterion that is satisfied when the respective content is not playing (e.g., paused, displaying a content browsing user interface, etc.), the electronic device (e.g., 101a) updates the user interface to visually deemphasize the region surrounding the user interface object (e.g., 703a) relative to the user interface object (e.g., 703a) by a second amount, different from the first amount (806b). In some embodiments, the second amount is less than the first amount. In some embodiments, the first electronic device de-emphasizes the region surrounding the user interface object to a greater extent in response to the gaze of the first user being directed to the user interface object while the content included in the user interface object is playing than the extent to which the first electronic device de-emphasizes the surroundings of the user interface object relative to the user interface object while the content included in the user interface object is paused and the gaze is directed to the user interface object. In some embodiments, in response to a request to play the content that is currently paused (e.g., while the gaze of the first user is directed to the user interface object), the first electronic device increases the amount of de-emphasis of the surroundings of the user interface element (e.g., from the second amount) to the first amount of de-emphasis. In some embodiments, in response to a request to pause content that is currently playing (e.g., while the gaze of the user is directed to the user interface object), the first electronic device decreases the amount of de-emphasis of the surroundings of the user interface element (e.g., from the first amount) to the second amount.

The above-described manner of applying different amount of de-emphasis to the surroundings of the user interface element depending on whether the content in the user interface element is playing or not playing (e.g., paused) provides an efficient way of increasing the amount of de-emphasis while the content is playing without requiring user inputs do to so, which simplifies the interaction between the first user and the first electronic device and enhances the operability of the first electronic device and makes the user-device interface more efficient, which additionally reduces power usage and improves battery life of the first electronic device by enabling the first user to use the first electronic device more quickly and efficiently.

In some embodiments, such as in FIGS. 7B-7C, updating the user interface to visually deemphasize the region surrounding the user interface object (e.g., 703a) relative to the user interface object (e.g., 703a) by the first amount includes darkening the region surrounding the user interface object (e.g., 703a) more than visually deemphasizing, by the second amount, the region surrounding the user interface object (e.g., 703a) relative to the user interface object (e.g., 703a) (808a). In some embodiments, visually deemphasizing the region surrounding the user interface object relative to the user interface object by the second amount (e.g., while the content is paused) includes blurring the region surrounding the user interface object (e.g., without darkening the region surrounding the user interface object). In some embodiments, visually deemphasizing the region surrounding the user interface object relative to the user interface object by the first amount (e.g., while the content is playing) includes blurring and darkening the region surrounding the user interface object. In some embodiments, visually deemphasizing the region surrounding the user interface object relative to the user interface object by the second amount (e.g., while the content is paused) includes blurring the region surrounding the user interface object and darkening the region surrounding the user interface element by an amount of darkening that is less than the amount of darkening associated with deemphasizing the region by the first amount.

The above-described manner of darkening the region surrounding the user interface object more than deemphasizing by the first amount when deemphasizing the region surrounding the user interface object by the second amount provides an efficient way of increasing the amount of de-emphasis and amount of darkening while the content is playing without requiring user inputs do to so, which simplifies the interaction between the first user and the first electronic device and enhances the operability of the first electronic device and makes the user-device interface more efficient, which additionally reduces power usage and improves battery life of the first electronic device by enabling the first user to use the first electronic device more quickly and efficiently.

In some embodiments, such as in FIG. 7B, the user interface object (e.g., 703a) is included in a three-dimensional environment displayed by the first display generation component (e.g., 120a) (810a). In some embodiments, the three-dimensional environment is a computer-generated reality (XR) environment such as a virtual reality (VR) environment, a mixed reality (MR) environment, or an augmented reality (AR) environment, etc. In some embodiments, the region surrounding the user interface object is a three-dimensional region of the three-dimensional environment. The region surrounding the user interface object optionally includes one or more representations of virtual objects (e.g., other user interface objects, content, etc.) and/or one or more representations of real objects in the physical environment of the electronic device. In some embodiments, the representations of real objects are photorealistic representations of real objects (e.g., pass-through video) and/or portions of the real objects visible through a transparent portion of the display generation component. In some embodiments, the user interface object is overlaid on/over one or more portions of the three-dimensional environment (e.g., the "region surrounding the user interface object") that are behind the user interface object in the three-dimensional environment (e.g., from the perspective of a viewpoint into the three-dimensional environment associated with (e.g., displayed by) the electronic device). In some embodiments, the user interface object is displayed in a two-dimensional environment.

In some embodiments, such as in FIG. 7B, the three-dimensional environment is accessible to the first electronic device (e.g., 101a) and a second electronic device (e.g., 101b) (810b). In some embodiments, the second electronic device presents the three-dimensional environment from the perspective of a viewpoint into the three-dimensional environment associated with the second electronic device. In some embodiments, the electronic device and second electronic device are in communication via a network connection. In some embodiments, the electronic device and second electronic device are co-located (e.g., in the same room, building, etc.). In some embodiments, the electronic device and second electronic device are remote from one another (e.g., in different rooms, different buildings, different cities, etc.).

In some embodiments, such as in FIG. 7B, in response to detecting that the gaze (e.g., 711a) of the first user is directed to the user interface object (e.g., 703a) for longer than the time threshold (e.g., 0.5, 1, 2, 3, 4, 5, etc. seconds) and in accordance with the determination that the one or more characteristics of the respective content included in the user interface object (e.g., 703a) satisfy one or more first criteria (810c), in accordance with a determination that the user interface object (e.g., 703a) is content of a first type, the electronic device (e.g., 101a) updates (810d) the user interface to visually deemphasize the region surrounding the user interface object (e.g., 703a) relative to the user interface object (e.g., 703a) by a first amount. In some embodiments, types of content include movies, episodes of serialized content (e.g., television shows, other series), and video clips (e.g., from the internet, social media, messaging applications). In some embodiments, the first type of content include movies and episodes of serialized content and a second type of content includes video clips. In some embodiments, types of content are differentiated based on the duration of the content or source (e.g., a first content playback/streaming service, a second content playback/streaming service, a first social media network, a second social media network, messaging applications, a camera application of the electronic device, an image browsing application of the electronic device) of the content. In some embodiments, the first type of content is longer than the second type of content.

In some embodiments, such as in FIG. 7C, in response to detecting that the gaze (e.g., 711a) of the first user is directed to the user interface object (e.g., 703a) for longer than the time threshold (e.g., 0.5, 1, 2, 3, 4, 5, etc. seconds) and in accordance with the determination that the one or more characteristics of the respective content included in the user interface object (e.g., 703a) satisfy one or more first criteria (810c), in accordance with a determination that the user interface object (e.g., 703a) is content of a second type that is different from the first type, the electronic device 101a updates (810e) the user interface to visually deemphasize the region surrounding the user interface object (e.g., 703a) relative to the user interface object by a second amount that is different from the first amount. In some embodiments, the first and second amounts of de-emphasis differ in the degrees to which various de-emphasis techniques are applied (e.g., blurring, darkening, etc. the region surrounding the user interface element, brightening, lightening, enlarging, etc. the user interface element) and/or the number of de-emphasis techniques that are applied. In some embodiments, the first electronic device applies more de-emphasis when playing content items having a duration exceeding a threshold amount of time (e.g., 5, 10, 15, 20, 30, 45, 60, 90, etc. minutes) than the amount of de-emphasis applied when playing content items having a duration that is less than the threshold amount of time. In some embodiments, the first electronic device applies more de-emphasis when playing content items from content applications and streaming services than when playing content items from websites (e.g., other than content streaming websites), social media, and messages. In some embodiments, the first electronic device applies more de-emphasis when playing movies and television shows than when playing video clips from the internet.

In some embodiments, such as in FIG. 7C, when the gaze (e.g., 711b) of a second user of the second electronic device (e.g., 101b) is directed to the user interface object (e.g., 703a) for longer than the time threshold (e.g., 0.5, 1, 2, 3, 4, 5, etc. seconds) and in accordance with the determination that the one or more characteristics of the respective content included in the user interface object (e.g., 703a) satisfy one or more first criteria, the region surrounding the user interface object (e.g., 703a) in the three-dimensional environment is displayed, via a second display generation component (e.g., 120b) of the second electronic device (e.g., 101b), as visually deemphasized relative to the user interface object (e.g., 703a), including (810f), in accordance with a determination that the user interface object (e.g., 703b), displayed via the second display generation component (e.g., 120b) of the second electronic device (e.g., 101b), is content of the first type updating the user interface to visually deemphasize the region surrounding the user interface object (e.g., 703b), displayed via the second display generation component (e.g., 120b) of the second electronic device (e.g., 101b), relative to the user interface object (e.g., 703b) by a third amount that is different from the first amount (810g). In some embodiments, types of content include movies, episodes of serialized content (e.g., television shows, other series), and video clips (e.g., from the internet, social media, messaging applications). In some embodiments, the first type of content include movies and episodes of serialized content and a second type of content includes video clips. In some embodiments, types of content are differentiated based on the duration of the content or source (e.g., a first content playback/streaming service, a second content playback/streaming service, a first social media network, a second social media network, messaging applications, a camera application of the electronic device, an image browsing application of the electronic device) of the content. In some embodiments, the first type of content is longer than the second type of content.; and In some embodiments, such as in FIG. 7B, when the gaze (e.g., 711b) of a second user of the second electronic device (e.g., 101b) is directed to the user interface object (e.g., 703a) for longer than the time threshold (e.g., 0.5, 1, 2, 3, 4, 5, etc. seconds) and in accordance with the determination that the one or more characteristics of the respective content included in the user interface object (e.g., 703a) satisfy one or more first criteria, the region surrounding the user interface object (e.g., 703a) in the three-dimensional environment is displayed, via a second display generation component (e.g., 120b) of the second electronic device (e.g., 101b), as visually deemphasized relative to the user interface object (e.g., 703a), including (810f), in accordance with a determination that the user interface object (e.g., 703b), displayed via the second display generation component (e.g., 120b) of the second electronic device (e.g., 101b), is content of a second type that is different from the first type, updating the user interface to visually deemphasize the region surrounding the user interface object (e.g., 703b), displayed via the second display generation component (e.g., 120b) of the second electronic device (e.g., 101b), relative to the user interface object (e.g., 703b) by a fourth amount that is different from the second amount (810h). In some embodiments, the first and second amounts of de-emphasis differ in the degrees to which various de-emphasis techniques are applied (e.g., blurring, darkening, etc. the region surrounding the user interface element, brightening, lightening, enlarging, etc. the user interface element) and/or the number of de-emphasis techniques that are applied. In some embodiments, the first electronic device applies more de-emphasis when playing content items having a duration exceeding a threshold amount of time (e.g., 5, 10, 15, 20, 30, 45, 60, 90, etc. minutes) than the amount of de-emphasis applied when playing content items having a duration that is less than the threshold amount of time. In some embodiments, the first electronic device applies more de-emphasis when playing content items from content applications and streaming services than when playing content items from websites (e.g., other than content streaming websites), social media, and messages. In some embodiments, the first electronic device applies more de-emphasis when playing movies and television shows than when playing video clips from the internet.

The above-described manner of applying different amounts of de-emphasis depending on the type of content playing provides different experiences for different content types without requiring the user to provide inputs to modify the amount of de-emphasis applied, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIG. 7B, updating the user interface to visually deemphasize the region surrounding the user interface object (e.g., 703a) relative to the user interface object (e.g., 703a) includes (812a), in accordance with a determination that the user interface object (e.g., 703a) is content of a first type, updating the user interface to visually deemphasize the region surrounding the user interface object (e.g., 703a) relative to the user interface object by a first amount (812b). In some embodiments, types of content include movies, episodes of serialized content (e.g., television shows, other series), and video clips (e.g., from the internet, social media, messaging applications). In some embodiments, the first type of content include movies and episodes of serialized content and a second type of content includes video clips. In some embodiments, types of content are differentiated based on the duration of the content or source (e.g., a first content playback/streaming service, a second content playback/streaming service, a first social media network, a second social media network, messaging applications, a camera application of the electronic device, an image browsing application of the electronic device) of the content. In some embodiments, the first type of content is longer than the second type of content.

In some embodiments, such as in FIG. 7C, updating the user interface to visually deemphasize the region surrounding the user interface object (e.g., 703*a*) relative to the user interface object (e.g., 703*a*) includes (812*a*), in accordance with a determination that the user interface object (e.g., 703*a*) is content of a second type that is different from the first type, updating the user interface to visually deemphasize the region surrounding the user interface object (e.g., 703*a*) relative to the user interface object by a second amount that is different from the first amount (812*c*).

In some embodiments, the first and second amounts of de-emphasis differ in the degrees to which various de-emphasis techniques are applied (e.g., blurring, darkening, etc. the region surrounding the user interface element, brightening, lightening, enlarging, etc. the user interface element) and/or the number of de-emphasis techniques that are applied. In some embodiments, the first electronic device applies more de-emphasis when playing content items having a duration exceeding a threshold amount of time (e.g., 5, 10, 15, 20, 30, 45, 60, 90, etc. minutes) than the amount of de-emphasis applied when playing content items having a duration that is less than the threshold amount of time. In some embodiments, the first electronic device applies more de-emphasis when playing content items from content applications and streaming services than when playing content items from websites (e.g., other than content streaming websites), social media, and messages. In some embodiments, the first electronic device applies more de-emphasis when playing movies and television shows than when playing video clips from the internet.

The above-described manner of applying different amounts of de-emphasis depending on the type of content playing provides different experiences for different content types without requiring the first user to provide inputs to modify the amount of de-emphasis applied, which simplifies the interaction between the user and the first electronic device and enhances the operability of the first electronic device and makes the user-device interface more efficient, which additionally reduces power usage and improves battery life of the first electronic device by enabling the user to use the first electronic device more quickly and efficiently.

In some embodiments, such as in FIGS. 7B-7C, the content of the first type is longer than the content of the second type, and the first amount is greater than the second amount (814*a*). In some embodiments, the content of the first type has a duration exceeding a threshold amount of time (e.g., 5, 10, 15, 20, 30, 45, 60, 90, etc. minutes) and the second type of content has a duration that is less than the threshold amount of time. In some embodiments, applying the first amount of de-emphasis includes applying one or more de-emphasis techniques (e.g., blurring, darkening, etc. the region surrounding the user interface element, brightening, lightening, enlarging, etc. the user interface element) to a greater extent than the extent the one or more de-emphasis techniques are applied when applying the second amount of de-emphasis. In some embodiments, applying the first amount of de-emphasis includes applying one or more de-emphasis techniques (e.g., blurring, darkening, etc. the region surrounding the user interface element, brightening, lightening, enlarging, etc. the user interface element) not applied when applying the second amount of de-emphasis.

The above-described manner of applying more de-emphasis when playing longer content than the amount of emphasis applied when playing shorter content provides different experiences for different content types without requiring the first user to provide inputs to modify the amount of de-emphasis applied, which simplifies the interaction between the user and the first electronic device and enhances the operability of the first electronic device and makes the user-device interface more efficient, which additionally reduces power usage and improves battery life of the first electronic device by enabling the user to use the first electronic device more quickly and efficiently.

In some embodiments, updating the user interface to visually deemphasize the region surrounding the user interface object (e.g., 703*a*) relative to the user interface object (e.g., 703*a*) includes selecting an amount of the de-emphasis based on a user setting (816*a*). In some embodiments, the first and second respective amounts of de-emphasis differ in the degrees to which various de-emphasis techniques are applied (e.g., blurring, darkening, etc. the region surrounding the user interface element, brightening, lightening, enlarging, etc. the user interface element) and/or the number of de-emphasis techniques that are applied. For example, while a setting to deemphasize by blurring the region surrounding the user interface element is applied, the first electronic device blurs the region surrounding the user interface element when deemphasizing the region surrounding the user interface element by the first amount and while a setting to deemphasize by blurring and darkening the region surrounding the user interface element is applied, the first electronic device blurs and darkens the region surrounding the user interface element when deemphasizing the region surrounding the user interface element by the first amount. As another example, while a setting to deemphasize by a relatively small amount is active, the first electronic device blurs and darkens the region surrounding the user interface element less than the amount by which the first electronic device blurs and darkens the region surrounding the user interface element while a setting to deemphasize by a relatively large amount is active.

The above-described manner of modifying the amount of de-emphasis applied based on a user setting provides an efficient way of applying the first user's preferred amount of de-emphasis each time the de-emphasis is applied without requiring the user to provide inputs to modify the amount of de-emphasis each time the de-emphasis is applied, which simplifies the interaction between the first user and the first electronic device and enhances the operability of the first electronic device and makes the user-device interface more efficient, which additionally reduces power usage and improves battery life of the first electronic device by enabling the first user to use the first electronic device more quickly and efficiently.

In some embodiments, such as in FIG. 7D, the user interface object (e.g., 703*a*) is included in a three-dimensional environment displayed by the display generation component (e.g., 120*a*) (818*a*). In some embodiments, the three-dimensional environment is a computer-generated reality (XR) environment such as a virtual reality (VR) environment, a mixed reality (MR) environment, or an augmented reality (AR) environment, etc. In some embodiments, the region surrounding the user interface object is a three-dimensional region of the three-dimensional environment. The region surrounding the user interface object optionally includes one or more representations of virtual objects (e.g., other user interface objects, content, etc.) and/or one or more representations of real objects in the physical environment of the electronic device. In some embodiments, the representations of real objects are photo-realistic representations of real objects (e.g., pass-through video) and/or portions of the real objects visible through a transparent portion of the display generation component. In some embodiments, the user interface object is overlaid on/over one or more portions of the three-dimensional environment (e.g., the "region surrounding the user interface object") that are behind the user interface object in the three-dimensional environment (e.g., from the perspective of a viewpoint into the three-dimensional environment associated with (e.g., displayed by) the electronic device). In some embodiments, the user interface object is displayed in a two-dimensional environment.

In some embodiments, such as in FIG. 7D, the three-dimensional environment is accessible to the first electronic device (e.g., 101a) and a second electronic device (e.g., 101b) (818b). In some embodiments, the second electronic device presents the three-dimensional environment from the perspective of a viewpoint into the three-dimensional environment associated with the second electronic device. In some embodiments, the electronic device and second electronic device are in communication via a network connection. In some embodiments, the electronic device and second electronic device are co-located (e.g., in the same room, building, etc.). In some embodiments, the electronic device and second electronic device are remote from one another (e.g., in different rooms, different buildings, different cities, etc.).

In some embodiments, such as in FIG. 7D, in response to detecting that the gaze (e.g., 711a) of the first user is directed to the user interface object (e.g., 703a) for longer than the time threshold and in accordance with the determination that the one or more characteristics of the respective content included in the user interface object (e.g., 703a) satisfy one or more first criteria (818c), the region surrounding the user interface object (e.g., 703a) in the three-dimensional environment is displayed, via the first display generation component (e.g., 120a) of the first electronic device (e.g., 101a), as visually deemphasized relative to the user interface object (e.g., 703a) by a first amount (818d).

In some embodiments, such as in FIG. 7D, the region surrounding the user interface object (e.g., 703b) in the three-dimensional environment is displayed, via a second display generation component (e.g., 120b) of the second electronic device (e.g., 101b), as visually deemphasized relative to the user interface object (e.g., 703b) by a second amount, different from the first amount when the gaze (e.g., 711b) of a second user of the second electronic device (e.g., 101b) is directed to the user interface object (e.g., 703b) for longer than the time threshold and in accordance with the determination that the one or more characteristics of the respective content included in the user interface object (e.g., 703b) satisfy one or more first criteria (818e). In some embodiments, the first and second amounts of de-emphasis differ in the degrees to which various de-emphasis techniques are applied (e.g., blurring, darkening, etc. the region surrounding the user interface element, brightening, lightening, enlarging, etc. the user interface element) and/or the number of de-emphasis techniques that are applied. In some embodiments, the differences in the amount of de-emphasis are based on differences in lighting conditions in the physical environments of the two electronic devices. For example, if the first electronic device is in a physical environment with a higher degree of ambient brightness than the physical environment of the second electronic device, the first electronic device darkens the surroundings of the user interface element less than the second electronic device darkens the surroundings of the user interface element. In some embodiments, the differences between the amounts of de-emphasis are caused by differences in user settings at the two electronic devices.

The above-described manner of different electronic devices providing different amounts of de-emphasis provides an efficient way of preserving user preferences regarding de-emphasis when accessing content in an environment accessible to more than one user, which simplifies the interaction between the first user and the first electronic device and enhances the operability of the first electronic device and makes the user-device interface more efficient, which additionally reduces power usage and improves battery life of the first electronic device by enabling the first user to use the first electronic device more quickly and efficiently.

In some embodiments, such as in FIG. 7D, the region surrounding the user interface object (e.g., 703a) in the three-dimensional environment is displayed, via the first display generation component (e.g., 120a) of the first electronic device (e.g., 101a), as visually deemphasized relative to the user interface object (e.g., 703a) by the first amount in accordance with a value of a first user-defined setting at the first electronic device (e.g., 101a) being a first value (820a).

In some embodiments, such as in FIG. 7D, the region surrounding the user interface object (e.g., 703b) in the three-dimensional environment is displayed, via the second display generation component (e.g., 120b) of the second electronic device (e.g., 101b), as visually deemphasized relative to the user interface object (e.g., 703b) by the second amount in accordance with a value of the first user-defined setting at the second electronic device (e.g., 101b) being a second value, different from the first value (820b). In some embodiments, the first and second respective amounts of de-emphasis differ in the degrees to which various de-emphasis techniques are applied (e.g., blurring, darkening, etc. the region surrounding the user interface element, brightening, lightening, enlarging, etc. the user interface element) and/or the number of de-emphasis techniques that are applied. For example, while a setting to deemphasize by blurring the region surrounding the user interface element is applied, the first electronic device (or second electronic device) blurs the region surrounding the user interface element when deemphasizing the region surrounding the user interface element by the first amount and while a setting to deemphasize by blurring and darkening the region surrounding the user interface element is applied, the first electronic device (or second electronic device) blurs and darkens the region surrounding the user interface element when deemphasizing the region surrounding the user interface element by the first amount. As another example, while a setting to deemphasize by a relatively small amount is active, the first electronic device (or second electronic device) blurs and darkens the region surrounding the user interface element less than the amount by which the first electronic device (or second electronic device) blurs and darkens the region surrounding the user interface element while a setting to deemphasize by a relatively large amount is active. In some embodiments, the first electronic device and second electronic device have different de-emphasis settings active.

The above-described manner of the first electronic device and second electronic device deemphasizing the region surrounding the user interface object by different amounts due to differences in user-defined settings provides a way of maintaining user preferences while accessing the user interface element that is accessible to another device without providing inputs to do so, which simplifies the interaction between the users and the electronic devices and enhances the operability of the electronic devices and makes the user-device interfaces more efficient, which additionally reduces power usage and improves battery life of the electronic devices by enabling the users to use the electronic devices more quickly and efficiently.

In some embodiments, such as in FIG. 7D, the region surrounding the user interface object (e.g., 703a) in the three-dimensional environment is displayed, via the first display generation component (e.g., 120a) of the first electronic device (e.g., 101a), as visually deemphasized relative to the user interface object (e.g., 703a) by the first amount in accordance with a value of a first characteristic (e.g., brightness, ambient lighting conditions, etc.) of a physical environment at the first electronic device (e.g., 101a) being a first value (822a).

In some embodiments, such as in FIG. 7D, the region surrounding the user interface object (e.g., 703b) in the three-dimensional environment is displayed, via the second display generation component (e.g., 120b) of the second electronic device (e.g., 101b), as visually deemphasized relative to the user interface object (e.g., 703b) by the second amount in accordance with a value of the first characteristic (e.g., brightness, ambient lighting conditions, etc.) of a physical environment at the second electronic device (e.g., 101b) being a second value, different from the first value (822b). In some embodiments, the first and second respective amounts of de-emphasis differ in the degrees to which various de-emphasis techniques are applied (e.g., blurring, darkening, etc. the region surrounding the user interface element, brightening, lightening, enlarging, etc. the user interface element) and/or the number of de-emphasis techniques that are applied. In some embodiments, the electronic device that is in an environment with less ambient light de-emphasizes the region surrounding the user interface element less than the electronic device that is in an environment with more ambient light. In some embodiments, an electronic device that displays representations of one or more objects in the physical environment of the electronic device in the region surrounding the user interface element applies an amount of de-emphasis (e.g., darkening) that is at least as dark as the ambient lighting conditions in the physical environment of the electronic device. In some embodiments, an electronic device that displays representations of physical objects in the region surrounding the user interface object applies more de-emphasis than an electronic device that does not display representations of physical objects in the region surrounding the user interface object. In some embodiments, the electronic device that is in an environment with less ambient light de-emphasizes the region surrounding the user interface element less than the electronic device that is in an environment with more ambient light.

The above-described manner of the first electronic device and the second electronic device providing different amounts of de-emphasis based on a first characteristic of the physical environments of the first electronic devices provides an efficient way of the amount of de-emphasis of each electronic device to be independent from the characteristics of the physical environment of the other electronic device, thus enabling the electronic devices to apply appropriate amounts of de-emphasis (e.g., based on user-defined settings) even when the physical environments of the electronic devices are different (e.g., without requiring user inputs to do so), which simplifies the interaction between the users and the electronic devices and enhances the operability of the electronic devices and makes the user-device interfaces more efficient, which additionally reduces power usage and improves battery life of the electronic devices by enabling the users to use the electronic devices more quickly and efficiently.

In some embodiments, such as in FIG. 7B, the user interface object (e.g., 703a) is included in a three-dimensional environment displayed via the first display generation component (e.g., 120a) (824a). In some embodiments, the three-dimensional environment is a computer-generated reality (XR) environment such as a virtual reality (VR) environment, a mixed reality (MR) environment, or an augmented reality (AR) environment, etc. In some embodiments, the region surrounding the user interface object is a three-dimensional region of the three-dimensional environment. The region surrounding the user interface object optionally includes one or more representations of virtual objects (e.g., other user interface objects, content, etc.) and/or one or more representations of real objects in the physical environment of the first electronic device. In some embodiments, the representations of real objects are photo-realistic representations of real objects (e.g., pass-through video) and/or portions of the real objects visible through a transparent portion of the first display generation component. In some embodiments, the user interface object is overlaid on/over one or more portions of the three-dimensional environment (e.g., the "region surrounding the user interface object") that are behind the user interface object in the three-dimensional environment (e.g., from the perspective of a viewpoint into the three-dimensional environment associated with (e.g., displayed by) the first electronic device). In some embodiments, the user interface object is displayed in a two-dimensional environment.

In some embodiments, such as in FIG. 7B, the three-dimensional environment is accessible to the first electronic device (e.g., 101a) and a second electronic device (e.g., 101b) (824b). In some embodiments, the second electronic device presents the three-dimensional environment from the perspective of a viewpoint into the three-dimensional environment associated with the second electronic device. In some embodiments, the first electronic device and second electronic device are in communication via a network connection. In some embodiments, the first electronic device and second electronic device are co-located (e.g., in the same room, building, etc.). In some embodiments, the first electronic device and second electronic device are remote from one another (e.g., in different rooms, different buildings, different cities, etc.).

In some embodiments, such as in FIG. 7B, in response to detecting that the gaze (e.g., 711a) of the user is directed to the user interface object (e.g., 703a) for longer than the time threshold and in accordance with the determination that the one or more characteristics (e.g., duration of content, source of content, playback status (e.g., paused or stopped vs. playing) of the content, type of content, etc.) of the respective content included in the user interface object (e.g., 703a) satisfy the one or more first criteria (824c), the region surrounding the user interface object (e.g., 703a) in the three-dimensional environment is displayed, via the first display generation component (e.g., 120a) of the first electronic device (e.g., 101*a*), as visually deemphasized relative to the user interface object (e.g., 703*a*) by the first amount (824*d*).

In some embodiments, such as in FIG. 7B, while a gaze (e.g., 711*b*) of a second user of the second electronic device (e.g., 101*b*) is directed to the user interface object (e.g., 703*b*) for longer than the time threshold and the one or more characteristics of the respective content included in the user interface object (e.g., 703*b*) satisfy the one or more first criteria, the region surrounding the user interface object (e.g., 703*b*) in the three-dimensional environment is displayed, via a second display generation component (e.g., 120*b*) of the second electronic device (e.g., 101*b*), as visually deemphasized relative to the user interface object (e.g., 703*b*) by the first amount (824*e*). In some embodiments, the amount of de-emphasis applied to the region surrounding the user interface element by the first electronic device is the same as the amount of de-emphasis applied to the region surrounding the user interface element by the second electronic device. In some embodiments, the de-emphasis techniques (e.g., blurring, darkening, etc. the region surrounding the user interface element, brightening, lightening, enlarging, etc. the user interface element) applied by the first electronic device and the second electronic device are the same. In some embodiments, the first electronic device de-emphasizes the region surrounding the user interface element in response to detecting the gaze of the first user of the first electronic device directed to the user interface element and the second electronic device de-emphasizes the region surrounding the user interface element in response to detecting the gaze of the second user of the second electronic device directed to the user interface element, as described in more detail below. In some embodiments, the amount of de-emphasis applied by the first electronic device and the second electronic device is the same despite differences in characteristics of the physical environment of the electronic devices and/or differences in user settings at the electronic devices.

The above-described manner of the first electronic device and second electronic device visually de-emphasizing the region surrounding the user interface element by the same amount provides uniform user experiences at both electronic devices without requiring user inputs to adjust settings of the electronic devices, which simplifies the interaction between the users and the electronic devices and enhances the operability of the electronic devices and makes the user-device interface more efficient, which additionally reduces power usage and improves battery life of the electronic devices by enabling the user to use the electronic devices more quickly and efficiently.

In some embodiments, such as in FIG. 7A, the user interface object (e.g., 703*a*) is included in a three-dimensional environment displayed via the first display generation component (e.g., 120*a*) (826*a*). In some embodiments, the three-dimensional environment is a computer-generated reality (XR) environment such as a virtual reality (VR) environment, a mixed reality (MR) environment, or an augmented reality (AR) environment, etc. In some embodiments, the region surrounding the user interface object is a three-dimensional region of the three-dimensional environment. The region surrounding the user interface object optionally includes one or more representations of virtual objects (e.g., other user interface objects, content, etc.) and/or one or more representations of real objects in the physical environment of the electronic device. In some embodiments, the representations of real objects are photorealistic representations of real objects (e.g., pass-through video) and/or portions of the real objects visible through a transparent portion of the display generation component. In some embodiments, the user interface object is overlaid on/over one or more portions of the three-dimensional environment (e.g., the "region surrounding the user interface object") that are behind the user interface object in the three-dimensional environment (e.g., from the perspective of a viewpoint into the three-dimensional environment associated with (e.g., displayed by) the electronic device). In some embodiments, the user interface object is displayed in a two-dimensional environment.

In some embodiments, such as in FIG. 7A, the three-dimensional environment is accessible to the first electronic device (e.g., 101*a*) and a second electronic device (e.g., 101*b*) (826*b*). In some embodiments, the second electronic device presents the three-dimensional environment from the perspective of a viewpoint into the three-dimensional environment associated with the second electronic device. In some embodiments, the first electronic device and second electronic device are in communication via a network connection. In some embodiments, the first electronic device and second electronic device are co-located (e.g., in the same room, building, etc.). In some embodiments, the first electronic device and second electronic device are remote from one another (e.g., in different rooms, different buildings, different cities, etc.).

In some embodiments, such as in FIG. 7A, in accordance with a determination that an attention (e.g., gaze 701*a*) of the first user of the first electronic device (e.g., 101*a*) is directed to the user interface object (e.g., 703*a*) in the three-dimensional environment (e.g., irrespective of whether or not the attention of the user of the second electronic device is directed to the user interface object), the display of the three-dimensional environment at the electronic device (e.g., 101*a*) is updated to visually deemphasize the region surrounding the user interface object (e.g., 703*a*) relative to the user interface object (e.g., 703*a*) (826*c*). In some embodiments, the second electronic device forgoes deemphasizing the region surrounding the user interface element unless and until the attention of the user of the second electronic device is directed to the user interface object irrespective of whether the attention of the user of the electronic device is directed to the user interface object. In some embodiments, the electronic device determines whether the attention of the user of the electronic device is directed to the user interface element in the three-dimensional environment based on detecting, via an eye tracking device, a location in the three-dimensional environment to which the gaze of the user is directed. For example, in response to detecting that the user is looking at the user interface object, the electronic device visually deemphasizes the region surrounding the user interface object relative to the user interface object.

In some embodiments, such as in FIG. 7A, in accordance with a determination that the attention (e.g., gaze 701*b*) of the first user of the first electronic device (e.g., 101*b*) is not directed to the user interface object (e.g., 703*b*) in the three-dimensional environment (e.g., irrespective of whether or not the attention of the user of the second electronic device is directed to the user interface object), the display of the three-dimensional environment at the first electronic device (e.g., 101*b*) is not updated to visually deemphasize the region surrounding the user interface object (e.g., 703*b*) relative to the user interface object (e.g., 703*b*) (e.g., even if the attention of the user of the second electronic device is directed to the user interface object) (826*d*). In some embodiments, the electronic device forgoes deemphasizing the region surrounding the user interface element unless and until the attention of the user of the electronic device is directed to the user interface object irrespective of whether the attention of the user of the second electronic device is directed to the user interface object.

In some embodiments, such as in FIG. 7A, in accordance with a determination that an attention (e.g., gaze 701a) of a second user of the second electronic device (e.g., 101a) is directed to the user interface object (e.g., 703a) in the three-dimensional environment (e.g., irrespective of whether or not the attention of the user of the electronic device is directed to the user interface object), the display of the three-dimensional environment via a second display generation component (e.g., 120a) of the second electronic device is updated to visually deemphasize the region surrounding the user interface object (e.g., 703a) relative to the user interface object (e.g., 703a) (826e). In some embodiments, the first electronic device forgoes deemphasizing the region surrounding the user interface element unless and until the attention of the first user of the first electronic device is directed to the user interface object irrespective of whether the attention of the second user of the second electronic device is directed to the user interface object. In some embodiments, the second electronic device determines whether the attention of the user of the second electronic device is directed to the user interface element in the three-dimensional environment based on detecting, via an eye tracking device, a location in the three-dimensional environment to which the gaze of the first user is directed. For example, in response to detecting that the first user is looking at the user interface object, the second electronic device visually deemphasizes the region surrounding the user interface object relative to the user interface object.

In some embodiments, such as in FIG. 7A, in accordance with a determination that the attention (e.g., 701b) of the second user of the second electronic device (e.g., 101b) is not directed to the user interface object (e.g., 703b) in the three-dimensional environment (e.g., irrespective of whether or not the attention of the first user of the first electronic device is directed to the user interface object), the display of the three-dimensional environment via the second display generation component (e.g., 120b) of the second electronic device (e.g., 101b) is not updated to visually deemphasize the region surrounding the user interface object (e.g., 703b) relative to the user interface object (e.g., 703b) (e.g., even if the attention of the first user of the first electronic device is directed to the user interface object) (826f). In some embodiments, the second electronic device forgoes deemphasizing the region surrounding the user interface element unless and until the attention of the user of the second electronic device is directed to the user interface object irrespective of whether the attention of the first user of the first electronic device is directed to the user interface object. In some embodiments, the first electronic device and second electronic device deemphasize the region surrounding the user interface object relative to the user interface object based on whether the attention of the respective user is directed to the user interface object in a manner that is independent from whether or not the other electronic device is visually de-emphasizing the region surrounding the user interface object.

The above-described manner of each electronic device visually de-emphasizing the region surrounding the user interface object based on the attention of the user irrespective of the attention of the user of the other electronic device provides an efficient way of improving the visibility of the region surrounding the user interface object while the user's attention is not directed to the user interface object without distracting other users whose attention is directed to the user interface object, which simplifies the interaction between the users and the electronic devices and enhances the operability of the electronic devices and makes the user-device interface more efficient, which additionally reduces power usage and improves battery life of the electronic devices by enabling the user to use the electronic devices more quickly and efficiently.

In some embodiments, such as in FIG. 7A, the attention (e.g., gaze 701a) of the first user of the first electronic device (e.g., 101a) is directed to the user interface object (e.g., 703a) in the three-dimensional environment (e.g., and the first electronic device visually deemphasizes the region surrounding the user interface object relative to the user interface object) while the attention (e.g., gaze 701b) of the second user of the second electronic device (e.g., 101b) is not directed to the user interface object (e.g., 703b) in the three-dimensional environment (e.g., and the second electronic device forgoes deemphasizing the region surrounding the user interface object relative to the user interface object) (828a). In some embodiments, the first electronic device visually deemphasizes the region surrounding the user interface element relative to the user interface object while the second electronic device forgoes deemphasizing the region surrounding the user interface object. In some embodiments, the attention of the second user of the second electronic device is directed to the user interface object in the three-dimensional environment (e.g., and the second electronic device visually deemphasizes the region surrounding the user interface object relative to the user interface object) while the attention of the first user of the first electronic device is not directed to the user interface object in the three-dimensional environment (e.g., and the first electronic device forgoes deemphasizing the region surrounding the user interface object relative to the user interface object). In some embodiments, the second electronic device visually deemphasizes the region surrounding the user interface element relative to the user interface object while the electronic device forgoes deemphasizing the region surrounding the user interface object.

The above-described manner of the electronic devices visually deemphasizing the region surrounding the user interface object independently from each other provides an efficient way of improving the visibility of the region surrounding the user interface object while the user's attention is not directed to the user interface object without distracting other users whose attention is directed to the user interface object, which simplifies the interaction between the users and the electronic devices and enhances the operability of the electronic devices and makes the user-device interfaces more efficient, which additionally reduces power usage and improves battery life of the electronic devices by enabling the users to use the electronic devices more quickly and efficiently.

In some embodiments, such as in FIG. 7A, the user interface object (e.g., 703a) is included in a three-dimensional environment displayed by the first display generation component (e.g., 120a) (830a). In some embodiments, the three-dimensional environment is a computer-generated reality (XR) environment such as a virtual reality (VR) environment, a mixed reality (MR) environment, or an augmented reality (AR) environment, etc. In some embodiments, the region surrounding the user interface object is a three-dimensional region of the three-dimensional environment. The region surrounding the user interface object optionally includes one or more representations of virtual objects (e.g., other user interface objects, content, etc.)

and/or one or more representations of real objects in the physical environment of the first electronic device. In some embodiments, the representations of real objects are photo-realistic representations of real objects (e.g., pass-through video) and/or portions of the real objects visible through a transparent portion of the display generation component. In some embodiments, the user interface object is overlaid on/over one or more portions of the three-dimensional environment (e.g., the "region surrounding the user interface object") that are behind the user interface object in the three-dimensional environment (e.g., from the perspective of a viewpoint into the three-dimensional environment associated with (e.g., displayed by) the electronic device). In some embodiments, the user interface object is displayed in a two-dimensional environment.

In some embodiments, such as in FIG. 7A, while the gaze (e.g., 701a) of the first user is directed to the user interface object (e.g., 703a) and while displaying, via the first display generation component (e.g., 120a), the region surrounding the user interface object (e.g., 703a) visually deemphasized relative to the user interface object (e.g., 703a) by the first amount, the electronic device (e.g., 101b) detects (830b) that a person (e.g., 713) has entered the three-dimensional environment, such as in FIG. 7A (e.g., physical environment of the first electronic device, or the virtual environment displayed by the first electronic device). In some embodiments, the display generation component displays a representation of the person. In some embodiments, the representation of the person is a photorealistic representation of a person in the physical environment of the first electronic device (e.g., video passthrough or virtual passthrough). In some embodiments, the representation of the person is a view of a person in the physical environment of the electronic device through a transparent portion of the first display generation component (e.g., true passthrough). In some embodiments, the representation of the person is a virtual object representing a person not in the physical environment of the first electronic device (e.g., a representation, such as an avatar, of a person in the virtual environment of the electronic device).

In some embodiments, such as in FIG. 7A, in response to detecting that the person (e.g., 713) has entered the three-dimensional environment, the electronic device (e.g., 101b) updates (830c) the user interface to decrease the amount by which the region surrounding the user interface object (e.g., 703b) is deemphasized (e.g., even if the gaze of the user is still directed to the user interface object). In some embodiments, the de-emphasis is decreased in response to detecting a person less than the amount by which the de-emphasis is decreased in response to detecting the gaze of the user directed away from the user interface object. In some embodiments, the amount of de-emphasis of the region surrounding the user interface object is only decreased if person (e.g., or representation of the person) is within the region that has been deemphasized, and not in a region that has not been deemphasized (e.g., the de-emphasis only extends a predetermined distance (e.g., 10, 20, 30, 50, 75, 100, 500, etc. centimeters) around the object). In some embodiments, the first electronic device only decreases the de-emphasis of the region surrounding the user interface object if the person (e.g., or representation of the person) is obscured by or obscuring the user interface object.

The above-described manner of decreasing the amount by which the region surrounding the user interface object is deemphasized in response to detecting that a person has entered the three-dimensional environment provides an efficient way of indicating to the first user that the person has entered the three-dimensional environment by improving the visibility of the person, which simplifies the interaction between the user and the electronic device and enhances the operability of the electronic device and makes the user-device interface more efficient, which additionally reduces power usage and improves battery life of the first electronic device by enabling the first user to use the first electronic device more quickly and efficiently.

In some embodiments, such as in FIG. 7B, the user interface object (e.g., 703a) is included in a three-dimensional environment displayed via the first display generation component (e.g., 120a) that includes one or more portions (e.g., table 705) of a physical environment of the first electronic device (e.g., 101a) (832a). In some embodiments, the three-dimensional environment is a computer-generated reality (XR) environment such as a virtual reality (VR) environment, a mixed reality (MR) environment, or an augmented reality (AR) environment, etc. In some embodiments, the region surrounding the user interface object is a three-dimensional region of the three-dimensional environment. The region surrounding the user interface object optionally includes one or more representations of virtual objects (e.g., other user interface objects, content, etc.) and/or one or more representations of real objects in the physical environment of the electronic device. In some embodiments, the representations of real objects are photo-realistic representations of real objects (e.g., pass-through video) and/or portions of the real objects visible through a transparent portion of the first display generation component. In some embodiments, the user interface object is overlaid on/over one or more portions of the three-dimensional environment (e.g., the "region surrounding the user interface object") that are behind the user interface object in the three-dimensional environment (e.g., from the perspective of a viewpoint into the three-dimensional environment associated with (e.g., displayed by) the first electronic device). In some embodiments, the user interface object is displayed in a two-dimensional environment. In some embodiments, the first display generation component displays representations of the one or more portions of the physical environment of the electronic device (e.g., virtual passthrough or video passthrough). In some embodiments, one or more portions of the physical environment are visible through a transparent portion of the first display generation component (e.g., true passthrough).

In some embodiments, such as in FIG. 7B, while the respective content is playing, the electronic device (e.g., 101a) displays (832b), via the first display generation component (e.g., 120a), a lighting effect (e.g., 713) based on the respective content on the one or more portions of the physical environment of the first electronic device (e.g., 101a) (e.g., table 705) (e.g., irrespective of whether or not the gaze of the first user is directed to the user interface object). In some embodiments, the lighting effect simulates light generated from the respective content of the user interface object reflecting off of the one or more portions of the physical environment, such as light reflecting off of surfaces of tables or couches in the physical environment. In some embodiments the color, intensity, and/or pattern of light of the lighting effect change as the content plays such that the lighting effect corresponds to playback of the content.

In some embodiments, such as in FIG. 7B, while the respective content is not playing (e.g., paused), the electronic device (e.g., 101a) forgoes (832c) displaying the lighting effect (e.g., 713) based on the respective content on the one or more portions of the physical environment of the electronic device (e.g., 101a) (e.g., table 705) (e.g., irrespective of whether or not the gaze of the first user is directed to the user interface object). The above-described manner of ceasing to display the lighting effect while the respective content is not playing (e.g., paused) provides a way of improving the visibility of the one or more portions of the physical environment while the content is not playing without requiring a user input to do so, which simplifies the interaction between the first user and the first electronic device and enhances the operability of the first electronic device and makes the user-device interface more efficient, which additionally reduces power usage and improves battery life of the first electronic device by enabling the first user to use the first electronic device more quickly and efficiently.

In some embodiments, after detecting that the gaze (e.g., 701b) of the first user is not directed to the user interface object (e.g., 703b) and after decreasing the amount by which the region surrounding the user interface object (e.g., 703b) is deemphasized relative to the user interface object (e.g., 703b), such as in FIG. 7A, the electronic device (e.g., 101b) detects (834a), via the one or more input devices, an input including the gaze (e.g., 711b) of the first user directed to the user interface object (e.g., 703b), such as in FIG. 7B.

In some embodiments, such as in FIG. 7B, in response to detecting the input, the electronic device (e.g., 101b) updates (834b) the user interface to visually deemphasize the region surrounding the user interface object (e.g., 703b) relative to the user interface object (e.g., 703b). In some embodiments, each time the first electronic device detects the gaze of the first user directed to the user interface object (e.g., after detecting that the gaze of the first user is directed away from the user interface object), the first electronic device visually deemphasizes the region surrounding the user interface object relative to the user interface object. In some embodiments, each time the first electronic device visually deemphasizes the region surrounding the user interface object in response to detecting the gaze of the first user directed to the user interface object, the first electronic device deemphasizes the region surrounding the first user interface object by the same amount (e.g., if the user settings and lighting conditions remain the same). In some embodiments, each time the first electronic device detects the gaze of the first user directed away from the user interface object, the first electronic device decreases the amount by which the region surrounding the user interface is object is de-emphasized (e.g., by the same amount each time if the user settings and lighting conditions remain the same).

The above-described manner of visually deemphasizing the region surrounding the user interface object in response to detecting the gaze of the user move from not being directed to the user interface object to being directed to the user interface object provides an efficient way of automatically deemphasizing the region surrounding the user interface object while the first user is paying attention to the user interface object without requiring a user input to do so, which simplifies the interaction between the first user and the first electronic device and enhances the operability of the first electronic device and makes the user-device interface more efficient, which additionally reduces power usage and improves battery life of the first electronic device by enabling the first user to use the first electronic device more quickly and efficiently.

In some embodiments, such as in FIG. 7B, the input includes detecting the gaze (e.g., 711b) of the first user directed to the user interface object (e.g., 703b) for longer than the time threshold (e.g., 0.5, 1, 2, 3, 4, 5, etc. seconds) (836a). In some embodiments, each time the first electronic device detects the gaze of the first user directed to the user interface object (e.g., after detecting that the gaze of the first user is directed away from the user interface object), the first electronic device visually deemphasizes the region surrounding the user interface object relative to the user interface object in accordance with a determination that the gaze has been detected as directed to the user interface object for the time threshold. In some embodiments, the first electronic device does not de-emphasize the region surrounding the user interface object until the time threshold has been reached while the gaze of the first user is directed to the user interface object.

The above-described manner of deemphasizing the region surrounding the user interface element in response to detecting the gaze for the time threshold reduces the number of operations performed by the first electronic device by forgoing deemphasizing the region surrounding the user interface object when the gaze of the user has been detected for less than the threshold time (e.g., and possibly decreasing the amount of de-emphasis if the first user looks away from the user interface object in less than the threshold time) which reduces power usage and improves battery life of the first electronic device by enabling the user to use the first electronic device more quickly and efficiently.

FIGS. 9A-9C illustrate exemplary ways in which electronic devices 101a and 101b modify the boundaries of content in a user interface according to some embodiments.

FIG. 9A illustrates electronic devices 101a and 101b displaying, via display generation components 120a and 120b, a three-dimensional environment. It should be understood that, in some embodiments, electronic devices 101a and/or 101b utilize one or more techniques described with reference to FIGS. 9A-9C in a two-dimensional environment or user interface without departing from the scope of the disclosure. As described above with reference to FIGS. 1-6, the electronic devices 101a and 1010b optionally include display generation components 120a and 120b (e.g., touch screens) and a plurality of image sensors 314a and 314b. The image sensors optionally include one or more of a visible light camera, an infrared camera, a depth sensor, or any other sensor the electronic device 101a and/or 101b would be able to use to capture one or more images of a user or a part of the user while the user interacts with the electronic devices 101a and/or 101b. In some embodiments, display generation components 120a and 120b are touch screens that are able to detect gestures and movements of a user's hand. In some embodiments, the user interfaces described below could also be implemented on a head-mounted display that includes a display generation component that displays the user interface to the user, and sensors to detect the physical environment and/or movements of the user's hands (e.g., external sensors facing outwards from the user), and/or gaze of the user (e.g., internal sensors facing inwards towards the face of the user).

FIGS. 9A-9C illustrate a first electronic device 101a and a second electronic device 101b displaying virtual content in a user interface. In some embodiments, both electronic device 101a and 101b have access to the virtual objects in the user interface and display one or more virtual objects and one or more physical objects present in the physical environment of the respective electronic device. In some embodiments, the two electronic devices 101a and 101b are able to present the same virtual objects of the user interfaces while the electronic devices 101a and 101b are in a shared physical location (e.g., in the same room as one another) or while the electronic devices 101a and 101b are remote from each other (e.g., in different rooms, in different buildings, in different cities, in different countries). In some embodiments, while the electronic devices 101a and 101b present the same virtual objects in the user interface, the electronic devices 101a and 101b are in communication with one another (e.g., via the internet or another network connection).

In some embodiments, the user interfaces displayed by the electronic devices 101a and 101b include representations of real objects in the physical environments of the electronic devices 101a and 101b. For example, the first electronic device 101a presents a representation 905 of a table in the physical environment of the first electronic device 101a. In some embodiments, the representation 905 of the table is a photorealistic representation of the table displayed by display generation component 120a (e.g., video passthrough). In some embodiments, the representation 905 is a view of the table through a transparent portion of the display generation component 120a (e.g., true passthrough). As another example, the second electronic device 101b presents a representation 907 of a sofa in the physical environment of the second electronic device 101b. In some embodiments, the representation 907 of the sofa is a photorealistic representation of the sofa displayed by display generation component 120b (e.g., video passthrough). In some embodiments, the representation 907 is a view of the sofa through a transparent portion of the display generation component 120b (e.g., true passthrough). The first electronic device 101a optionally does not display the representation 709 of the sofa because the sofa is in the physical environment of the second electronic device 101b, not in the physical environment of the first electronic device 101a. The second electronic device 101b optionally does not display the representation 705 of the table because the table is in the physical environment of the first electronic device 101a, not in the physical environment of the second electronic device 101b.

Thus, in FIGS. 9A-9C, the electronic devices 101a and 101b are in different physical environments while presenting representations of the virtual objects in the user interface. It should be understood that, in some embodiments, the electronic devices 101a and 101b are in the same physical environment without departing from the scope of the disclosure.

In FIG. 9A, the first electronic device 101a displays an item of content 903a in the user interface and the second electronic device 101b displays the item of content 903b in the user interface. In some embodiments, the items of content 903a and 903b are the same item of video content (e.g., video clip, television show, movie) presented in a synchronized manner between the two electronic devices 101a and 101b. In FIG. 9A, the content 903a and 903b is paused and the first electronic device 101a displays the content 903a with rounded corners and the second electronic device 101b displays the content 903b with rounded corners. In some embodiments, the electronic devices 101a and 101b display the content 903a and 903b with rounded corners while the content is paused (or otherwise not playing content, such as while displaying a content browsing user interface). The first electronic device 101a further displays one or more playback controls overlaid on content 903a, such as a rewind option 909a, a play option 911a, a fast forward option 913a and a scrubber bar 914a associated with the content 903a. The second electronic device 101b further displays one or more playback controls overlaid on content 903b, such as a rewind option 909b, a play option 911b, a fast forward option 913b and a scrubber bar 914b associated with the content 903b.

In some embodiments, the electronic devices 101a and 101b display the content 903a and 903b with the rounded corners while the content 903a and 903b is paused irrespective of the location(s) of the gazes of the users in the user interface. For example, regardless of whether the user of the first electronic device 101a directs their gaze 901a to the content 903a or directs their gaze 901e away from the content 903a, the first electronic device 101a displays the content 903a with rounded corners while the content is paused (or otherwise not playing content). Likewise, for example, regardless of whether the user of the second electronic device 101b directs their gaze 902a to the content 903b or directs their gaze 902b away from the content 903b, the second electronic device 101b displays the content 903b with rounded corners while the content is paused (or otherwise not playing content).

In FIG. 9A, the user of the first electronic device 101a provides an input to initiate a process to move the content 903a in the user interface. As shown in FIG. 9A, detecting the input includes detecting the gaze 901a of the user directed to the content 903a while detecting a predetermined pose or gesture of the hand 909 of the user. For example, the user makes a pinch hand shape in which the thumb of the hand 909 is touching another finger of the hand 909. In some embodiments, the electronic device 101a requires that the user look at user interface element displayed proximate to content 903a (e.g., a bar displayed underneath content 903a) to move the content 903a in order to initiate a process to move the content, rather than initiating the process to move the content 903a in response to detecting the gaze 901a on the content 903a itself. In some embodiments, the user interface element to move the content 903a is only displayed by device 101a while the content 903a is paused (or otherwise not playing content) and is not displayed by device 101a while the content is playing.

FIG. 9B illustrates the user interface while the user of the first electronic device 101a moves the content 903a in the user interface. In FIG. 9B, the user of the first electronic device 101a maintains the pinch hand shape of hand 909 and maintains their gaze on the content 903a in the user interface. In some embodiments, the electronic device 101a updates the position of the content 903a in the displayed three-dimensional environment in accordance with movement of the user's hand 909 while the hand 909 maintains the pinch hand shape, and stops moving the content 903a in response to detecting the user stop making the pinch hand shape with hand 909. As shown in FIG. 9B, the second electronic device 101b also updates the displayed position of the content 903b in accordance with the input provided by the user of the first electronic device 101a. In FIG. 9B, the content 903a and 903b is currently paused but, in some embodiments, the electronic devices 101a and 101b display the content 903a and 903b with rounded corners while the content 903a and 903b is being moved irrespective of whether the content 903a and 903b is playing or paused.

FIG. 9C illustrates the electronic devices 101a and 101b displaying the content 903a and 903b while the content 903a and 903b is playing and is not being moved in the user interface. The first electronic device 101a displays a pause option 917a overlaid on content 903a instead of the play option 911a, displays the content 903a with square corners and updates display of options 909a, 913a, and/or 914a to fit with and/or conform to the updated boundaries of the content while the content 903a is playing. Likewise, the second electronic device 101b displays a pause option 917b overlaid on content 903b instead of the play option 911b, displays the content 903b with square corners and updates display of options 909*b*, 913*b*, and/or 914*b* to fit with and/or conform to the updated boundaries of the content while the content 903*b* is playing. For example, the sizes of options 909*a-b*, 917*a-b*, 913*a-b*, and 914*a-b* are larger while the content 903*a-b* is displayed with square corners, compared to while the content 903*a-b* is displayed with rounded corners. As another example, the space between each of options 909*a-b*, 917*a-b*, 913*a-b*, and 914*a-b* is greater while the content 903*a-b* is displayed with square corners, compared to while the content 903*a-b* is displayed with rounded corners. As another example, the locations of options 909*a-b*, 917*a-b*, 913*a-b*, and 914*a-b* are different while the content 903*a-b* is displayed with rounded corners compared to while the content 903*a-b* is displayed with square corners.

In some embodiments, while the content 903*a-b* is playing and not being moved, the electronic devices 101*a* and 101*b* display the content 903*a-b* with square corners irrespective of the gaze locations of the users of the electronic devices 101*a* and 101*b*. For example, the first electronic device 101*a* maintains display of the content 903*a* with square corners while the content 903*a* is playing and not being moved by either user, irrespective of whether the user looks at location 901*c* (e.g., corresponding to content 903*a*) or location 901*d* (e.g., not corresponding to content 903*a*). Likewise, for example, the second electronic device 101*b* maintains display of the content 903*b* with square corners while the content 903*b* is playing and not being moved by either user, irrespective of whether the user looks at location 901*d* (e.g., corresponding to content 903*b*) or location 901*e* (e.g., not corresponding to content 903*b*).

In some embodiments, in response to detecting an input to pause the content 903*a-b* (e.g., selection of option 917*a* or 917*b*), the electronic devices 101*a* and 101*b* pause the content 903*a-b* and display the content 903*a-b* with rounded corners, as shown in FIG. 9A. In some embodiments, in response to detecting an input to move the content 903*a-b*, the electronic devices 101*a* and 101*b* display the content 903*a-b* with rounded corners in FIG. 9B while the content 903*a-b* is being moved (e.g., and while the content 903*a-b* continues to play).

In some embodiments, the electronic devices 101*a* and 101*b* gradually transition between displaying the content 903*a* and 903*b* with rounded corners while the content is paused or being moved, and displaying the content 903*a* and 903*b* with square corners while the content is playing and not being moved. In some embodiments, the electronic devices 101*a* and 101*b* do not update the boundaries of the content 903*a* and 903*b* until a threshold time (e.g., 0.5, 1, 2, 3, 4, 5, 10, etc. seconds) has passed since transitioning between playing and pausing the content or transitioning between moving the content and not moving the content. In some embodiments, the electronic devices 101*a* and 101*b* animate the transition between square and rounded corners.

FIGS. 10A-10D is a flowchart illustrating a method 1000 of selectively de-emphasizing a three-dimensional environment in which content is presented in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In some embodiments, method 1000 is performed at an electronic device (e.g., 101*a*) in communication with a display generation component (e.g., 120*a*) and one or more input devices (e.g., a mobile device (e.g., a tablet, a smartphone, a media player, or a wearable device), or a computer. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc. In some embodiments, the electronic device is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, such as in FIG. 9A, the electronic device (e.g., 101*a*) displays (1002*a*), via the display generation component (e.g., 120*a*), a (e.g., video, audio, etc.) content playback user interface (e.g., 903*a*) (e.g., such as a content user interface as described with reference to method 800 or 1200), wherein the content playback user interface (e.g., 903*a*) is not playing content and is displayed with a boundary having a first shape (e.g., the shape of the video playback user interface while the video playback user interface is not playing video content is a rectangle with rounded corners). In some embodiments, the video playback user interface is not playing video content because the video content is paused, in a content item browsing mode, or in a mode in which the electronic device moves the video playback user interface in accordance with a user input corresponding to a request to move the video playback user interface (e.g., in the three-dimensional environment). In some embodiments, the paused video content occupies the entire video content playback user interface. In some embodiments, the paused video content is displayed with one or more playback control elements (e.g., selectable options to play, skip forward, or skip backwards in the content, a scrubber bar, etc.) overlaid on the paused video content. In some embodiments, in the browsing mode, the video content playback user interface concurrently includes a plurality of representations of items of video content that the electronic device is able to play in the video playback user interface (e.g., in response to detecting selection of one of the representations). In some embodiments, the video content playback user interface is displayed in a three-dimensional environment including representations of one or more additional virtual objects (e.g., application user interfaces, files, items of content, representations of users) and/or one or more representations of real objects. In some embodiments, the representations of real objects are photorealistic representations of the objects (e.g., pass-through video) in the physical environment of the electronic device or portions of real objects in the physical environment of the electronic device that are visible through a transparent portion of the display generation component. In some embodiments, the three-dimensional environment is a computer-generated reality (XR) environment such as a virtual reality (VR) environment, a mixed reality (MR) environment, or an augmented reality (AR) environment, etc. In some embodiments, the electronic device displays additional virtual objects, application user interfaces, files, content, operating system objects, and the like beyond the boundary of the video playback user interface.

In some embodiments, while displaying the content playback user interface (e.g., 903a in FIG. 9A) with the boundary having the first shape, the electronic device (e.g., 101a) receives (1002b) an indication of an input corresponding to a request to play respective content in the content playback user interface (e.g., 903a), such as selection of option 911a in FIG. 9A. In some embodiments, the electronic device receives the indication of the input by detecting the input with the one or more input devices in communication with the electronic device. In some embodiments, the input is selection of a selectable option (e.g., displayed within the video content playback user interface) to play an item of video content that had been paused while the electronic device displayed the video content playback user interface with the boundary having the first shape. In some embodiments, the input is selection of a representation of an item of content displayed in a content browsing mode of the video content playback user interface while the video content playback user interface was displayed with the boundary having the first shape. In some embodiments, the electronic device receives an indication of an input corresponding to a request to play the respective video content in the video content playback user interface that was received by one or more input devices in communication with a second electronic device that is in communication with the electronic device. For example, the first electronic device and the second electronic device are optionally in communication to display a shared three-dimensional environment accessible to both the users of the electronic device, and the second electronic device and the second electronic device optionally receives an input to play the respective video content.

In some embodiments, in response to receiving the input corresponding to the request to play the respective content (1002c), the electronic device (e.g., 101a) initiates (1002d) playback of the respective content in the content playback user interface (e.g., 903a), such as in FIG. 9C. In some embodiments, the respective, for example, video content occupies the entire video content playback user interface while the respective video content is playing.

In some embodiments, in response to receiving the input corresponding to the request to play the respective content (1002c), while playing the respective content, the electronic device (e.g., 101a) displays the (e.g., respective video content in the) content playback user interface (e.g., 903a) with a boundary having a second shape, different from the first shape (1002e). In some embodiments, while the electronic device is playing the respective video content in the video content playback user interface, the electronic device displays the video content playback user interface with a rectangular boundary with sharp corners. In some embodiments, while the electronic device is playing the respective video content in the video content playback user interface, the electronic device displays the video content playback user interface with a rectangular boundary with rounded corners that have a smaller radius of curvature than the radius of the corners of the boundary of the video content playback user interface while the electronic device is not playing video content in the video content playback user interface. In some embodiments, when transitioning between the two boundary shapes, the electronic device displays an animation of gradually changing the boundary shape and/or corner shape between the boundary and/or corner shapes described above. In some embodiments, if both the electronic device and a second electronic device have access to the content playback user interface, the electronic device displays the content playback user interface with the boundary having the second shape in response to an input to play the respective content irrespective of which electronic device detected the input to play the respective content. For example, if the second electronic device detects an input to play the respective content, both the electronic device and the second electronic device display the content playback user interface with the boundary having the second shape.

The above-described manner of updating the shape of the boundary of the video content playback user interface in response to the input corresponding to the request to play the video content provides an efficient way of indicating to the user the playback status of the content, reducing the amount of display area used for the video content playback user interface while the content is not playing, thereby reducing conflicts with other objects in the three-dimensional environment, and displaying the full content when the content is playing, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIG. 9A, the content playback user interface (e.g., 903a) is included in a three-dimensional environment displayed via the display generation component (e.g., 120a) (1004a). In some embodiments, the three-dimensional environment includes representations of virtual objects (e.g., content, user interface, control elements, virtual representations of real objects not in the physical environment of the electronic device) and representations of real objects in the physical environment of the electronic device. In some embodiments, the representations of real objects are photorealistic representations of real objects displayed by the display generation component (e.g., virtual passthrough or video passthrough) or views of the real objects through a transparent portion of the display generation component (e.g., true passthrough). In some embodiments, the three-dimensional environment is displayed from the viewpoint of the user of the electronic device at a location in the three-dimensional environment associated with the user of the electronic device. In some embodiments, the content playback user interface is displayed in a two-dimensional user interface presented by the display generation component.

In some embodiments, while displaying the content playback user interface (e.g., 903a) with the boundary having the second shape (e.g., and while playing the respective content in the content playback user interface) such as in FIG. 9C, the electronic device (e.g., 101a) receives (1005b) (e.g., via the one or more input devices) an indication of an input corresponding to a request to move the content playback user interface (e.g., 903a) in the three-dimensional environment, such as in FIG. 9A. In some embodiments, the content playback user interface is displayed in association with a user interface element that, when selected, causes the electronic device to initiate a process to move the content playback user interface in the three-dimensional environment. In some embodiments, the input corresponding to the request to move the content playback user interface includes detecting selection of the user interface element. In some embodiments, the request to move the content playback user interface includes movement of a predefined portion of the user (e.g., a hand of the user detected via a hand tracking device in communication with the electronic device) following selection of the content playback user interface or selection of an option to initiate a process to move the content playback user interface and the electronic device moves the content playback user interface in accordance with the movement of the predefined portion of the user.

In some embodiments, such as in FIG. 9B, while the input corresponding to the request to move the content playback user interface is being received (e.g., and while the content playback user interface is being moved in accordance with the input), the electronic device (e.g., 101a) displays (1004c), via the display generation component (e.g., 120a), the content playback user interface (e.g., 903a) with the boundary having the first shape. In some embodiments, regardless of whether or not the content is playing or paused, the electronic device displays the content playback user interface with the boundary having the first shape while it is being moved. In some embodiments, the electronic device detects at least a portion of the input corresponding to the request to move the content playback user interface while displaying the content playback user interface with the boundary having the first shape and, in response, the electronic device maintains display of the content playback user interface with the boundary having the first shape while moving the content playback user interface in accordance with the user input.

The above-described manner of updating the shape of the boundary of the content playback user interface while the content playback user interface is being moved in the three-dimensional environment provides an efficient way of conveying to the user that the content user interface is being moved and reducing the display area occupied by the content playback user interface, thus reducing conflicts with other elements in the three-dimensional environment during movement, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIG. 9A, the electronic device (e.g., 101a) displays (1006a), via the display generation component (e.g., 120), one or more control elements (e.g., 909a, 911a, 913a, 914a) associated with the content playback user interface (e.g., 903a) within the content playback user interface (e.g., 903a). For example, the control elements include one or more selectable options including one or more of an option to skip the content ahead by a predetermined amount of time (e.g., 5, 10, 15, 30, 60, etc. seconds), an option to skip the content back by a predetermined amount of time (e.g., 5, 10, 15, 30, 60, etc. seconds), an option to play/pause the content, a scrubber bar, audio volume controls (e.g., a slider or options to turn the volume up and down), and the like. In some embodiments, the control elements are displayed overlaid on the content. In some embodiments, the control elements are selectively displayed in response to detecting an input directed to the content playback user interface and cease to be displayed in response to detecting a predetermined time period (e.g., 1, 3, 5, 10, 15, 30, etc. seconds) pass without an input directed to the content playback user interface element being detected.

In some embodiments, such as in FIG. 9A, while displaying the content playback user interface (e.g., 903a) with the boundary having the first shape, the one or more control elements (e.g., 909a, 911a, 913a, 914a) are displayed in a first manner (e.g., size, shape, footprint, location) (1006b). In some embodiments, the one or more control elements are displayed along a respective edge of the content playback user interface (e.g., along the bottom edge) and while the content playback user interface has a boundary with a first shape, the respective edge has a first length and the one or more control elements are displayed at first respective sizes and/or with first respective positions within the content playback user interface to be oriented along the respective edge of the content playback user interface. In some embodiments, the content playback user interface has the boundary with the first shape because the content is paused and/or the content playback user interface is being moved in the three-dimensional environment in accordance with one or more user inputs.

In some embodiments, such as in FIG. 9C, while displaying the content playback user interface (e.g., 903a) with the boundary having the second shape, the one or more control elements (e.g., 909a, 917a, 913a, 914a) are displayed in a second manner (e.g., size, shape, footprint, location) different from the first manner (1006c). In some embodiments, the one or more control elements are displayed along a respective edge of the content playback user interface (e.g., along the bottom edge) and while the content playback user interface has a boundary with a second shape, the respective edge has a second length and the one or more control elements are displayed at second respective sizes (e.g., different from the first respective sizes) and/or with second respective positions (e.g., different from the first respective positions) within the content playback user interface to be oriented along the respective edge of the content playback user interface. In some embodiments, the content playback user interface has the boundary with the second shape because the content is playing and the content playback user interface is not being moved in the three-dimensional environment.

The above-described manner of updating the manner in which the control elements of the content playback user interface are displayed when updating the boundary of the content playback user interface provides an efficient way of expanding the control elements to improve legibility and/or interactivity when possible and contracting the control elements when possible (e.g., when the controls are less needed) to conserve display area for other elements displayed by the display generation component, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in response to receiving the input corresponding to the request to play the respective content (e.g., selection of user interface element 911*a* in FIG. 9A) and prior to displaying the content playback user interface (e.g., 903*a*) with the boundary having the second shape (1008*a*), such as in FIG. 9C (or in response to detecting the end of an input for moving the content playback user interface while the content is playing, or in response to any input that causes the electronic device to update the shape of the boundary of the content playback user interface from the first shape to the second shape), the electronic device (e.g., 101*a*) displays (1008*b*), via the display generation component (e.g., 120*a*), an animation of a gradual transition from displaying the content playback user interface (e.g., 903*a*) with the boundary having the first shape, such as in FIG. 9A to displaying the content playback user interface (e.g., 903*a*) with the boundary having the second shape, such as in FIG. 9C. In some embodiments, in response to an input to pause the video content (or an input to move the video content, or any input that causes the electronic device to update the boundary of the content playback user interface from second shape to the first shape), the electronic device displays an animation of a gradual transition from displaying the content playback user interface with the boundary having the second shape to displaying the content playback user interface with the boundary having the first shape. In some embodiments, the animated transition includes an animation of the boundary of the content playback user interface morphing from one shape to the other.

The above-described manner of animating the transition from displaying the content playback user interface with the boundary having the first shape to displaying the content playback user interface with the boundary having the second shape provides an efficient way of indicating to the user that the content playback user interface is transitioning from displaying paused content to displaying playing content, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently (e.g., by helping the user quickly pause the content if the request to play the content was in error and/or confirming the request to play the content, thus reducing the likelihood that the user provides additional inputs to play the content if it is otherwise unclear the request to play the content was received by the electronic device).

In some embodiments, the content playback user interface (e.g., 903*a*) is included in a three-dimensional environment displayed via the display generation component (1010*a*). In some embodiments, the three-dimensional environment includes representations of virtual objects (e.g., content, user interface, control elements, virtual representations of real objects not in the physical environment of the electronic device) and representations of real objects in the physical environment of the electronic device. In some embodiments, the representations of real objects are photorealistic representations of real objects displayed by the display generation component (e.g., virtual passthrough or video passthrough) or views of the real objects through a transparent portion of the display generation component (e.g., true passthrough). In some embodiments, the three-dimensional environment is displayed from the viewpoint of the user of the electronic device at a location in the three-dimensional environment associated with the user of the electronic device. In some embodiments, the content playback user interface is displayed in a two-dimensional user interface presented by the display generation component.

In some embodiments, while displaying the content playback user interface (e.g., 903*a*) while the content playback user interface is not playing content (e.g., while the content playback user interface is displayed with the boundary having the first shape), such as in FIG. 9A, the electronic device (e.g., 101*a*) displays (1010*b*), via the display generation component, a selectable user interface element in association with the content playback user interface (e.g., 903*a*) that, when selected, initiates a process to update a location of the content playback user interface within the three-dimensional environment (e.g., an option displayed proximate to the content playback user interface 903*a* in FIG. 9A). In some embodiments, the selectable user interface element is displayed beyond the boundary of the content playback user interface at a location proximate to the content playback user interface. In some embodiments, in response to detecting selection of the selectable user interface element, the electronic device initiates a process to move the content playback user interface element in accordance with movement of a predefined portion of the user (e.g., a hand, arm, or finger of the user detected by, for example, a hand tracking device). In some embodiments, detecting selection of the selectable user interface element includes detecting, via an eye tracking device, that the gaze of the user is directed to the selectable user interface element while detecting, via a hand tracking device, a hand of the user making a pinch hand shape (e.g., a hand shape in which the thumb touches one of the fingers of the hand). In some embodiments, the selectable user interface element is displayed proximate to an edge (e.g., the bottom edge) of the content playback user interface.

In some embodiments, such as in FIG. 9C, while displaying the content playback user interface (e.g., 903*a*) while the content playback user interface (e.g., 903*a*) is playing content (e.g., while the content playback user interface is displayed with the boundary having the second shape), the electronic device (e.g., 101*a*) forgoes (1010*c*) display of the selectable user interface element. In some embodiments, the selectable user interface element is displayed while the content playback user interface is playing content. In some embodiments, the electronic device ceases display of the selectable user interface element while the content is playing after no input directed to the content playback user interface has been detected for a predetermined period of time (e.g., 1, 2, 3, 5, 10, 15, 30, 60, etc. seconds). In some embodiments, the electronic device does not display the selectable user interface element while the content playback user interface is playing content unless and until an input corresponding to a request to display the selectable option is detected, such as secondary selection (e.g., right click, two finger touch, or similar) of the content playback user interface or an input to pause playback of the content, at which point the device (re)displays the selectable user interface element.

The above-described manner of forgoing display of the selectable user interface element while the content playback user interface is playing content provides an efficient way of reducing the display area used to display the content playback user interface and its associated elements, thus improving the ability of the electronic device to display other elements and reduces the cognitive burden on the user while playing the content, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the content playback user interface (e.g., 903*a* in FIG. 9A) is displayed in association with the selectable user interface element (e.g., the selectable user interface element is displayed within or external but proximate to the content playback user interface, such as external to and along a bottom edge of the content playback user interface) when the input corresponding to the request to play the respective content (e.g., selection of option 911*a* in FIG. 9A) is received (1012*a*).

In some embodiments, in response to receiving the input corresponding to the request to play the respective content (e.g., selection of option 911*a* in FIG. 9A), the electronic device (e.g., 101*a*) ceases display of the selectable user interface element (1012*b*). In some embodiments, the electronic device ceases display of the selectable user interface element in response to the request to play the respective content (e.g., after no input directed to the content playback user interface has been detected for a predetermined period of time (e.g., 1, 2, 3, 5, 10, 15, 30, 60, etc. seconds)). In some embodiments, the electronic device forgoes display of the selectable user interface element in response to the request to play the content unless and until an input corresponding to a request to display the selectable option is detected, such as secondary selection (e.g., right click, two finger touch, or similar) of the content playback user interface or an input to pause playback of the content, at which point the device (re)displays the selectable user interface element.

The above-described manner of forgoing display of the selectable user interface element in response to the request to play the content provides an efficient way of reducing the display area used to display the content playback user interface and its associated elements, thus improving the ability of the electronic device to display other elements and reduces the cognitive burden on the user while playing the content, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the electronic device displays the content playback user interface (e.g., 903*a*) with the boundary having the second shape, such as in FIG. 9C, in response to receiving the input corresponding to the request to play the respective content irrespective of a location of a gaze (e.g., 901*c*, 901*d*) of a user of the electronic device (1014*a*). In some embodiments, while the gaze of the user is directed to the content playback user interface, the electronic device displays the content playback user interface with the boundary having the second shape while the content playback user interface is playing content. In some embodiments, while the gaze of the user is directed away from the content playback user interface, the electronic device displays the content playback user interface with the boundary having the second shape while the content playback user interface is playing content. In some embodiments, while the gaze of the user is directed to the content playback user interface, the electronic device displays the content playback user interface with the boundary having the first shape while the content playback user interface is not playing content (e.g., the content is paused or the content playback user interface is browsing representations of content items). In some embodiments, while the gaze of the user is directed away from the content playback user interface, the electronic device displays the content playback user interface with the boundary having the first shape while the content playback user interface is not playing content. In some embodiments, the electronic device detects the location of the gaze of the user using an eye tracking device in communication with the electronic device.

The above-described manner of displaying the content playback user interface with the boundary having the second shape irrespective of the location of the gaze of the user of the electronic device provides an efficient way of reducing the operations performed by the electronic device while presenting the content playback user interface, which reduces power usage and improves battery life of the electronic device by reducing the number of times the electronic device updates the shape of the boundary of the content playback user interface.

In some embodiments, such as in FIG. 9A, the electronic device (e.g., 101*a*) is in communication with a second electronic device (e.g., 101*b*) that has access to the content playback user interface (e.g., 903*a*) (e.g., the electronic device and second electronic device are in communication via a network connection) (1016*a*). In some embodiments, the content playback user interface is displayed in a virtual (e.g., three-dimensional or two-dimensional) environment that both the electronic device and the second electronic device have access to (e.g., each device displays a respective viewpoint of the virtual environment that, for example, includes the content playback user interface). The virtual environment optionally includes one or more additional objects (e.g., additional to the content playback user interface) that both the electronic device and the second electronic device have access to. In some embodiments, the playback status and/or location of the content playback user interface in the virtual environment are synchronized between the electronic device and the second electronic device.

In some embodiments, such as in FIG. 9A, while the content playback user interface (e.g., 903*a*) is displayed, via the display generation component (e.g., 120*a*) of the electronic device (e.g., 101*a*), with the boundary having the first shape (e.g., while the content playback user interface is not playing content or a user of the electronic device or the second electronic device is moving the content playback user interface), the content playback user interface (e.g., 903*b*) is displayed, via a display generation component (e.g., 120*b*) of the second electronic device (e.g., 101*b*), with the boundary having the first shape (1016*b*).

In some embodiments, such as in FIG. 9C, while the content playback user interface (e.g., 903*a*) is displayed, via the display generation component (e.g., 120*a*) of the electronic device (e.g., 101*a*), with the boundary having the second shape (e.g., while the content playback user interface is playing content and is not being moved. In some embodiments, the input to initiate playback of the content in the content playback user interface was received at the electronic device. In some embodiments, the input to initiate playback of the content in the content playback user interface was received at the second electronic device), the content playback user interface (e.g., 903*b*) is displayed, via a display generation component (e.g., 120*b*) of the second electronic device (e.g., 101*b*) with the boundary having the second shape (1016*c*). In some embodiments, the shape of the boundary of the content playback user interface is synchronized between the two electronic devices. In some embodiments, the shape of the boundary of the content playback user interface displayed by the electronic device and the second electronic device is independent from whether or not the gaze of the user of the electronic device and/or the gaze of the user of the second electronic device is directed to the content playback user interface.

The above-described manner of synchronizing the boundary of the content playback user interface between the two electronic devices provides an efficient way of indicating the playback status of the content playback user interface across a plurality of devices, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

FIGS. 11A-11D illustrate examples of sharing content with one or more users in a three-dimensional environment in accordance with some embodiments of the disclosure.

Figure 11A:
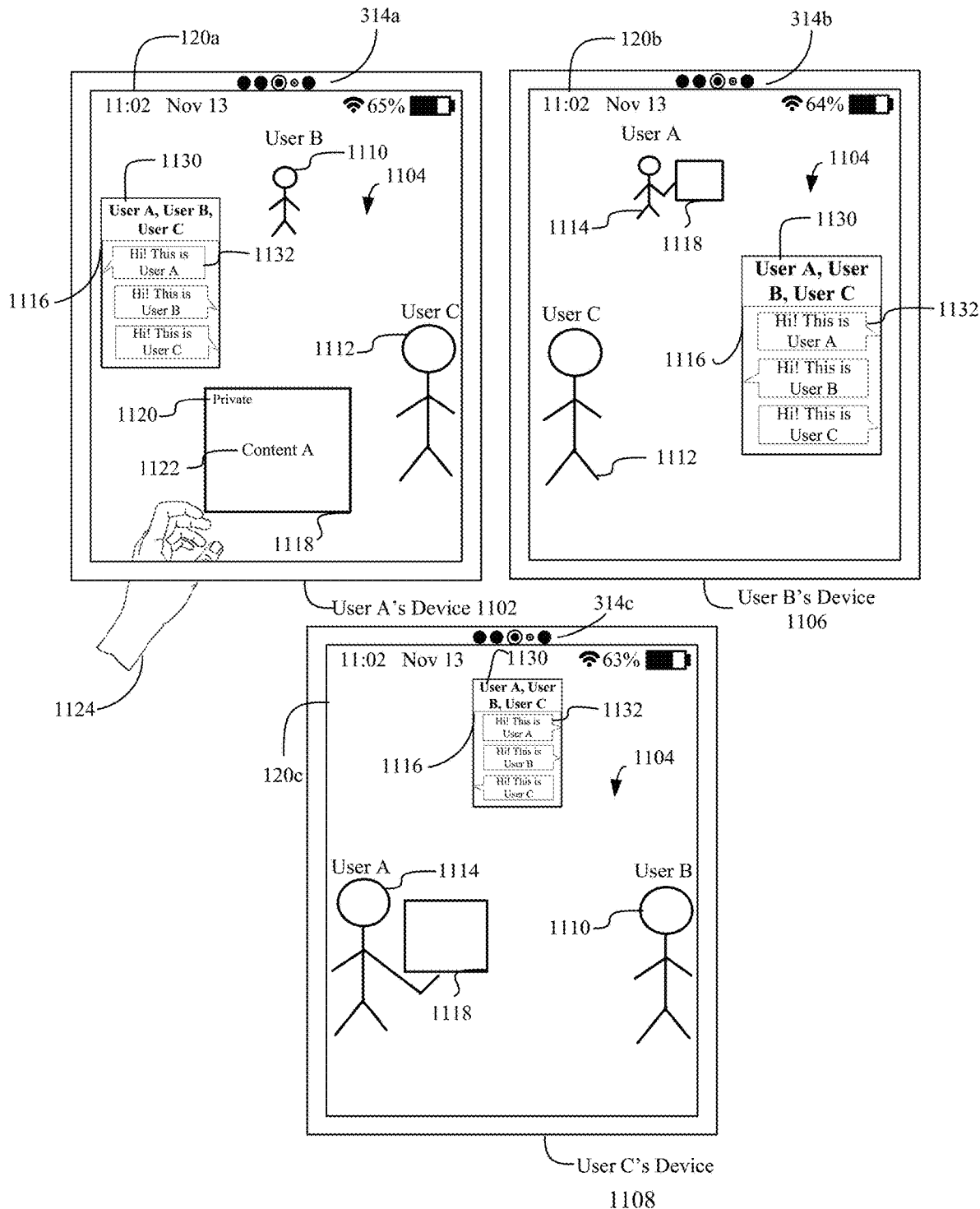
FIGS. 11A-11D illustrate exemplary ways in which electronic devices share content in a three-dimensional environment according to some embodiments.

FIG. 11A illustrates electronic devices 1102, 1106 and 1108 (e.g., electronic devices similar to electronic device 101), displaying, via their respective display generation component, different viewpoints of a three-dimensional environment 1104. In some embodiments, electronic devices 1102, 1106 and 1108 are associated with different users (e.g., in the same or different physical environments) that are associated with different positions in the three-dimensional environment 1104 displayed by the electronic devices 1102, 1106 and 1108. Therefore, electronic devices 1102, 1106 and 1108 optionally display different perspectives of the three-dimensional environment (e.g., from the respective positions of the respective users in the three-dimensional environment). It should be understood that, in some embodiments, electronic devices 1102, 1106 and/or 1108 utilize one or more techniques described with reference to FIGS. 11A-11D in a two-dimensional environment without departing from the scope of the disclosure. As described above with reference to FIGS. 1-6, the electronic devices 1102, 1106 and/or 1108 optionally include a display generation components 120a, 120b, 120c (e.g., a touch screen) and a plurality of image sensors 314a, 314b, 314c, respectively. The image sensors 314a, 314b, 314c optionally include one or more of a visible light camera, an infrared camera, a depth sensor, or any other sensors of the electronic devices 1102, 1106, 1108 that would be able to be used to capture one or more images of a user or part of the user while the users interact with electronic devices 1102, 1106, 1108. In some embodiments, the user interfaces shown below could also be implemented on a head-mounted display that includes a display generation component that displays the user interface to the user, and sensors to detect the physical environment and/or movements of the user's hands (e.g., external sensors facing outwards from the user), and/or gaze of the user (e.g., internal sensors facing inwards towards the face of the user).

In some embodiments, the three-dimensional environment 1104 includes representations of virtual objects (e.g., representations of video content, photos, files, documents, applications or the like), representations of users (e.g., at their respective associated positions in the three-dimensional environment 1104), and/or representations of physical objects (e.g., at their respective associated positions in the three-dimensional environment 1104) that are in the physical environments of one or more of the electronic devices 1102, 1106 and/or 1108 (e.g., shown via actual or digital pass-through). For example, in FIG. 11A, three-dimensional environment 1104 includes three users—User A, User B and User C—a representation of a messaging user interface 1116, and a virtual object 1118. Device 1102, associated with User A, displays a first viewpoint of three-dimensional environment 1104 (e.g., from the position associated with User A in the three-dimensional environment 1104, and oriented towards the positions associated with User B and User C in three-dimensional environment 1104, and the position of messaging user interface 1116 in three-dimensional environment 1104). Therefore, in FIG. 11A, device 1102 is displaying representations of User B 1110 and User C 1112 at their respective positions in the three-dimensional environment relative to the position of User A in the three-dimensional environment, and representations of virtual content including messaging user interface 1116. In some embodiments, messaging user interface 1116 is a user interface of a messaging application on the electronic devices 1102, 1106 and 1108, and allows users of the three-dimensional environment 1104 to send messages to other users in the three-dimensional environment 1104, allows for messages to be received from users in the three-dimensional environment 1104, and/or displays the messages in a messaging conversation between the users that are in the three-dimensional environment 1104. For example, in FIG. 11A, User A has sent a message 1132 that includes the text "Hi! This is User A" to message participants 1130 including User B and User C. As a result of User A having sent message 1132, devices 1106 and 1108—associated with User B and User C, respectively—receive and display the sent message 1132. Messages that are sent and received via messaging user interface 1116 are optionally displayed with different visual indications.

Further, in some embodiments, when a user interacts with a virtual object (e.g., by performing a particular gesture at a location in a physical environment corresponding to a location of the virtual object in the three-dimensional environment 1104), the representation of the user in the three-dimensional environment 1104 is updated accordingly to reflect the interaction of the user with the virtual object. For example, because hand 1124 of User A performs a gesture to hold virtual object 1118, which will be described in more detail later, device 1106 and 1108—associated with User B and User C, respectively—display the representation of User A 1114 holding the virtual object 1118, as shown in FIG. 11A.

Devices 1106 and 1108—associated with User B and User C, respectively—similarly display respective viewpoints of the three-dimensional environment 1104. For example, in FIG. 11A, device 1106 is displaying a second viewpoint of three-dimensional environment 1104 (e.g., from the position associated with User B in the three-dimensional environment 1104, and oriented towards the positions associated with User A and User C in three-dimensional environment 1104, and the position of messaging user interface 1116 in three-dimensional environment 1104). Therefore, in FIG. 11A, device 1106 is displaying representations of User A 1114 and User C 1112 at their respective positions in the three-dimensional environment relative to the position of User B in the three-dimensional environment, and representations of virtual content including messaging user interface 1116. Additionally, in FIG. 11A, device 1108 is displaying a third viewpoint of three-dimensional environment 1104 (e.g., from the position associated with User C in the three-dimensional environment 1104, and oriented towards the positions associated with User A and User B in three-dimensional environment 1104, and the position of messaging user interface 1116 in three-dimensional environment 1104). Therefore, in FIG. 11A, device 1108 is displaying representations of User A 1114 and User B 1110 at their respective positions in the three-dimensional environment relative to the position of User C in the three-dimensional environment, and representations of virtual content including messaging user interface 1116.

The representations of the users (e.g., User A 1114, User B 1110 and User C 1112) are optionally associated with physical users interacting with the three-dimensional environment 1104. For example, the representation of User B 1110 and the representation of User C 1112 in the three-dimensional environment 1104 are optionally associated with and/or are orientated based on a physical User B and a physical User C, respectively. In some embodiments, physical User A, User B, and/or User C (and the electronic devices of physical User A (e.g., device 1102), User B (e.g., device 1106), and/or User C (e.g., device 1108)) are at different physical locations, such that the users are not able to see and/or interact with each other in a physical environment, but are able to interact with each other in three-dimensional environment 1104.

In some embodiments, the one or more representations displayed in the three-dimensional environment 1104 float in the three-dimensional environment 1104 (e.g., not anchored or attached to a particular virtual and/or physical object) and/or are anchored to one or more representations of physical objects in the physical environments of devices 1102, 1106 and/or 1108 and/or anchored to one or more virtual objects. For example, messaging user interface 1116 is optionally displayed as floating in the three-dimensional environment 1104. In some embodiments, messaging user interface 1116 is displayed as anchored to an object (e.g., virtual or physical) in three-dimensional environment 1104.

In FIG. 11A, three-dimensional environment 1104 also includes virtual object 1118. Virtual object 1118 optionally includes content A 1122 (e.g., one or more photos from a photo library associated with User A, one or more videos from a video library associated with User A, one or more movies or television shows accessible via a subscription of User A to a content provider, etc.). In FIG. 11A, hand 1124 of User A (e.g., at device 1102) is holding or otherwise in control of virtual object 1118. For example, device 1102 detects that hand 1124 is in a pinching hand shape in which the thumb and forefinger of hand 1124 are touching one another while hand 1124 is within a threshold distance (e.g., 0.2, 0.5, 1, 2, 5, 10 cm) of virtual object 1118. Therefore, device 1102 displays a representation of hand 1124 (e.g., via digital and/or physical pass-through) holding or otherwise in control of virtual object 1118. In FIG. 11A, content A 1122 included in virtual object 1118 is displayed by device 1102.

In some embodiments, content A 1122 of virtual object 1118 can be designated as private or shared. When designated as private, content A 1122 of virtual object 1118 is optionally only displayed by device 1102, and is optionally not displayed by devices associated with other users in three-dimensional environment 1104 (e.g., devices 1106 and 1108). When shared, content A 1122 of virtual object 1118 is optionally displayed by device 1102 in addition to one or more devices associated with other users in three-dimensional environment 1104 (e.g., devices 1106 and 1108), depending on with whom content A 1122 is shared. In some embodiments, User A associated with device 1102 is able to designate content A 1122 as private or shared, as will be described in more detail below.

In some embodiments, the representations of virtual objects in three-dimensional environment 1104 optionally include an indication that the object is being shared or is not being shared with other users in the three-dimensional environment 1104. For example, in the embodiment of FIG. 11A where the content of virtual object 1118 is not being shared with other users in the three-dimensional environment 1104, an indicator 1120 is displayed by device 1102 overlaid on virtual object 1118 with the text "Private." Indicator 1120 is optionally displayed continuously as long as the content of virtual object 1118 is not being shared with other users in three-dimensional environment 1104, while in other embodiments, indicator 1120 is optionally only displayed by device 1102 when a physical user (e.g., User A) begins to interact with the virtual object 1118.

While the content of virtual object 1118 is not being shared with other users in the three-dimensional environment 1104, other users (e.g., users B and C) are optionally only able to view an outline of the virtual object 1118 and not the content included in the virtual object 1118 (e.g., content A 1122). For example, because virtual content 1118 is not being shared with others users in the three-dimensional environment 1104 in FIG. 11A (e.g., not shared with User B and User C), devices 1106 and 1108 associated with User B and User C, respectively, display an outline of the virtual object 1118, and do not display the content A 1122 associated with virtual object 1118. The outline of virtual object 1118 is optionally a representation that has the same shape and/or size as virtual object 1118 in three-dimensional environment 1104, and displayed at the same position in the three-dimensional environment 1104, but does not include the content of virtual object 1118 (e.g., a gray box or rectangle, when virtual object has the shape of a box or rectangle). For example, in FIG. 11A, device 1106 optionally displays an outline of virtual object 1118, being held by the representation of User A 1114, and device 1108 optionally displays an outline of virtual object 1118, being held by representation of User A 1114.

As shown in FIG. 11A, in the three-dimensional environment 1104 displayed by device 1102—associated with User A—User B is at a location in three-dimensional environment 1104 that is across from User A. Messaging user interface 1116 is at a location in the three-dimensional environment 1104 that is in front of and to the left of User A, and virtual object 1118 is at a location in the three-dimensional environment 1104 that is right in front of User A (e.g., in the hand of 1124 of User A). Thus, device 1102—associated with User A—displays: messaging user interface 1116 ahead and to the left, the representation of User C 1112 ahead and to the right, representation of User B 1110 ahead, and virtual object 1118 close and right in front of User A. Similarly, the devices of others users in the three-dimensional environment 1104 display the representations of users and virtual objects in accordance with their respective viewpoints in the three-dimensional environment 1104. Accordingly, device 1106—associated with User B—displays: messaging user interface 1116 ahead and to the right, the representation of User C 1112 ahead and to the left, the representation of User A 1110 ahead, and the virtual object 1118 being held by the representation of User A 1114. Finally, device 1108—associated with User C—displays: messaging user interface 1116 ahead, the representation of User B 1110 ahead and to the right, the representation of User A 1114 ahead and to the left, and the virtual object 1118 being held by the representation of User A 1114.

Further, as shown in FIG. 11A, virtual objects and/or representations of users are optionally displayed, at a given user's electronic device, in accordance with a distance that the user is from the virtual object and/or representation of a user in the three-dimensional environment 1104. For example, in the three-dimensional environment 1104 in FIG. 11A, virtual object 1118 is at a location closest to the location of User A. Thus, device 1102 displays virtual object 1118 at a relatively large size when compared to other virtual representations displayed by the electronic device 1102 of physical user A, and when compared to other displays of virtual object 1118 on other users' electronic devices (e.g., electronic device 1106 and electronic device 1108). Similarly, in the three-dimensional environment 1104 in FIG. 11A, messaging user interface 1116 is at a location closest to the location of User B. Thus, messaging user interface 1116 is displayed at relatively large size by device 1106 when compared to other virtual representations displayed by the electronic device 1106 of User B, and when compared to other displays of messaging user interface 1116 on other users' electronic devices (e.g., electronic device 1102 and electronic device 1108).

As described above, in some embodiments, users are able to interact with the virtual content displayed in a three-dimensional environment. For example, User A is able to interact with virtual object 1118 by moving hand 1124 to a location in the physical environment of device 1102 that corresponds to the location of the virtual object 1118 in the three-dimensional environment 1104. When the hand 1124 of User A moves to a location in the physical environment that corresponds to the location of the virtual object 1118 in the three-dimensional environment 1104, device 1102 is able to detect hand 1124 performing a particular gesture to select the virtual object 1118 (e.g., a pinching gesture, tapping gesture, etc.). In some embodiments, hand 1124 is able to select the virtual object 1118 by performing the particular gesture within a threshold distance (e.g., 0.2, 0.5, 1, 2, 5, 10 cm) of the virtual object 1118. Additionally, or alternatively, hand 1124 is optionally able to select the virtual object 1118 by performing the particular gesture within the threshold distance of a user interface element (e.g., grabber bar) that is displayed proximate to the virtual object 1118. In some embodiments, after selecting a virtual object and/or while the virtual object remains selected by hand 1124, the three-dimensional environment 1104 reflects that User A is holding the virtual object. For example, in response to and/or while hand 1124 of User A is selecting virtual object 1118, devices 1106 and 1108 associated with User B and User C, respectively, display the representation of User A 1114 holding the virtual object 1118.

In some embodiments, a user associated with the three-dimensional environment 1104 is able to initiate a process to share their content (e.g., content that is currently private) with others users in the three-dimensional environment 1104, as will be described with reference to FIGS. 11B and 11C. For example, a user is able to initiate a process to share their private content with a desired user by moving the virtual object containing their private content within a threshold distance of the desired user in the three-dimensional environment 1104 (e.g., moving the content within 0.2, 0.5, 1, 2, 4, 6, 10, etc. feet from the location of the desired user in the three-dimensional environment) using, for example, a "pushing" or "passing off" gesture, including extending their arm and hand that is controlling the virtual object towards the other user.

Figure 11B:
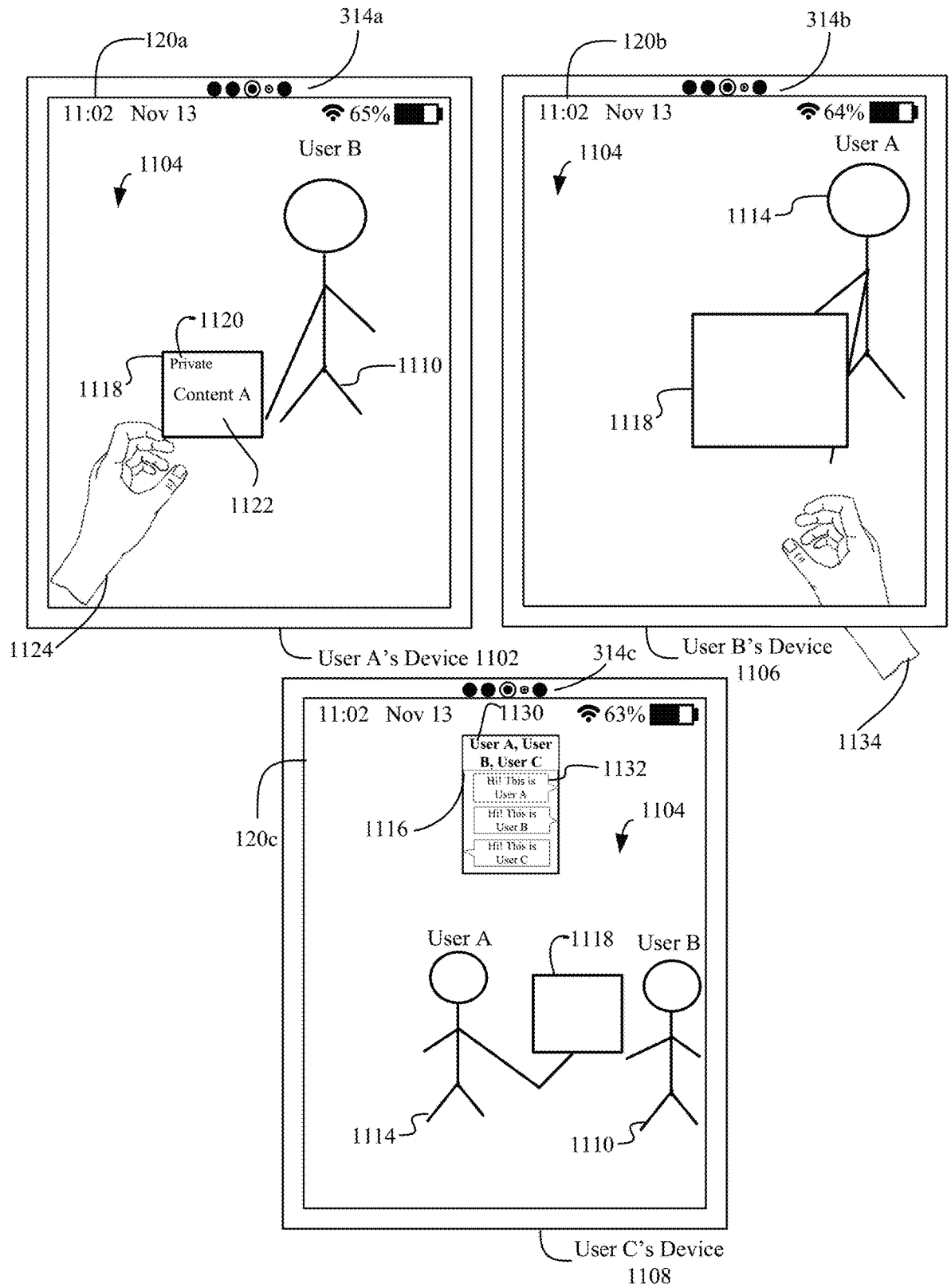

In particular, in FIG. 11B, while User A is holding a virtual object, User A is able to move the virtual object to a location in the three-dimensional environment 1104 corresponding to another user in the three-dimensional environment 1104. For example, while User A is holding virtual object 1118—as was described with reference to FIG. 11A—User A is able to move the virtual object 1118 proximate to the representation of User B 1110. Moving the virtual object proximate to a user in the three-dimensional environment optionally includes, while holding the virtual object (e.g., controlling the virtual object with hand 1124), walking to a location in the physical environment that is within a threshold distance of the location corresponding to the respective user in the three-dimensional environment (e.g., within 0, 0.2, 0.5, 1, 3, 5, 10, etc. feet of the representation of the respective user in the three-dimensional environment). Additionally, or alternatively, moving the virtual object proximate to a user in the three-dimensional environment optionally includes, while holding the virtual object (e.g., controlling the virtual object with hand 1124), extending an arm (e.g., the arm associated with the hand that is holding the object) towards a location of the representation of the respective user in the three-dimensional environment. For example, in FIG. 11B, User A has moved virtual object 1118 within the above-described threshold distance of the representation of User B 1110 by walking towards a location in the physical environment corresponding to the location of the representation of User B 1110 while holding the virtual object 1118 with hand 1124 and/or by extending the arm connected with the hand 1124 that is holding virtual object 1118 towards the location of the representation of User B 1110.

In some embodiments, when movement is detected by a user's electronic device, the three-dimensional environment is updated accordingly. For example, in response to device 1102 (associated with User A) detecting the movement(s) and/or gesture(s) performed by User A (e.g., walking towards and/or extending the virtual object towards the representation of User B 1110), device 1108—associated with User C—displays the representation of User A 1114 at their new location in the three-dimensional environment 1104, and also displays the representation of User A 1114 extending their arm (e.g., the arm holding the virtual object 1118) towards User B 1110, as shown in FIG. 11B. While device 1108 displays the representation of User A 1114 at their new location in the three-dimensional environment 1104, device 1108 continues to display messaging user interface 1116 and representation of User B 1110 in a manner similar to that of device 1108 in FIG. 11A, because those elements optionally did not move further away or closer to User C in response to the movement performed by User A. Similarly, in response to device 1102 detecting the movement(s) performed by User A (e.g., User A has walked closer to User B in the three-dimensional environment), device 1106—associated with User B—displays the representation of User A 1114 extending their arm (e.g., the arm holding the virtual object 1118) towards User B, and virtual object 1118 at their new locations in the three-dimensional environment 1104. The representation of User A 1114 and virtual object 1118 are displayed larger than they were by device 1106 of FIG. 11A, because both the representation of User A 1114 and virtual object 1118 have moved closer to User B in the three-dimensional environment 1104. The messaging user interface 1116 and representation of User C 1112 that were displayed by device 1106 in FIG. 11A are no longer being displayed by device 1106 in FIG. 11B, because the representation of User A 1114 has optionally moved to a location in front of the viewpoint associated with User B that obscures the view of these objects. Similarly, in response to device 1102 detecting that User A has walked closer to and/or extended their hand 1124 towards the representation of User B 1110, device 1102—associated with User A—displays virtual object 1118 closer to User B 1110 (e.g., further from the viewpoint associated with User A) than in FIG. 11A, and displays hand 1124 extending towards the representation of User B 1110. The messaging user interface 1116 and representation of User C 1112 displayed by device 1102 in FIG. 11A are no longer displayed by device 1102 in FIG. 11B, because User A has walked past the locations corresponding to these objects in the three-dimensional environment 1104. Thus, the messaging user interface 1116 and representation of User C 1112 are no longer in the field of view of the viewpoint associated with User A.

In some embodiments, after a user moves a virtual object within a threshold distance of a representation of a target user in the three-dimensional environment (e.g., using a "pushing" or "arm extension" gesture), the virtual object is displayed (e.g., by the device associated with the target user) with an indication that the target user is able to grab or otherwise interact with the virtual object. For example, because virtual object 1118 has been moved to a location in the three-dimensional environment 1104 that is within a threshold distance of User B 1110 (e.g., using a "pushing" or "arm extension" gesture), virtual object 1118 optionally is displayed by device 1106 with an indication that User B is able to grab the virtual object 1118 (e.g., with hand 1134 of User B). The indication that virtual object 1118 is available to be grabbed optionally includes displaying a user interface element proximate to the virtual object 1118 (e.g., a grabber bar displayed below virtual object 1118 that is able to be grabbed by hand 1134 to take control over virtual object 1118) and/or includes displaying the virtual object 1118 with one or more visual effects such as glowing, pulsing, fading in, spinning, or the like. In some embodiments, the indication that virtual object 1118 can be grabbed by the targeted user is displayed when the user sharing the object (e.g., User A) moves the virtual object 1118 object within the threshold distance described earlier (e.g., using a "pushing" or "arm extension" gesture) and when the device of the targeted user detected the targeted user begins reaching (e.g., via hand 1134 of User B) for the virtual object from the representation of the user sharing the respective object (e.g., by performing a reaching gesture similar to the extending gesture described with reference to FIG. 11A).

In some embodiments, when a user moves the virtual object to a location corresponding to another user in the three-dimensional environment 1104, the visual indication—indicating that the virtual object is available to be grabbed—is displayed only for that user, and not for other users in the three-dimensional environment 1104. For example, in response to User A moving the virtual object to a location corresponding to User B (e.g., using a "pushing" or "arm extension" gesture), the visual indication is displayed at the device associated with User B (e.g., device 1106) and not the device associated with User C (e.g., device 1108). Alternatively, in some embodiments, when a user moves a virtual object to a location corresponding to another user in the three-dimensional environment 1104 (e.g., using a "pushing" or "arm extension" gesture), the visual indication is displayed for all users in the three-dimensional environment 1104. For example, in response to User A moving the virtual object 1118 to a location corresponding to User B (e.g., using a "pushing" or "arm extension" gesture), the visual indication—indicating that the virtual object 1118 is available to be grabbed—is optionally displayed at the device associated with User B (e.g., device 1106) and the device associated with User C (e.g., device 1108).

Figure 11C:
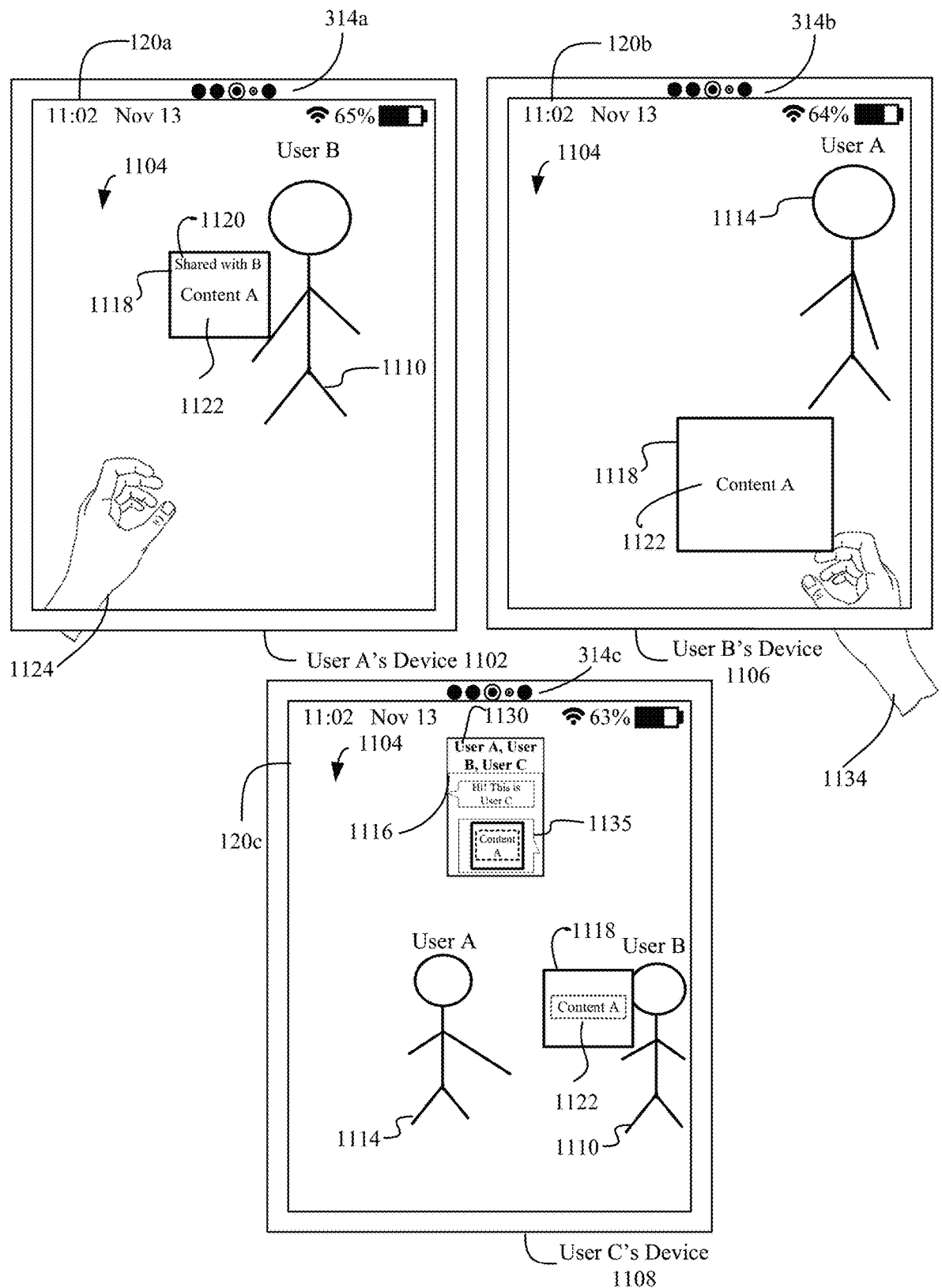

In some embodiments, after the user has moved the virtual object within the threshold distance of a target user (e.g., using a "pushing" or "arm extension" gesture) and/or after the virtual object is being displayed with the visual indication that the virtual object is able to be grabbed (e.g., displaying the virtual object with a grabber bar and/or visual effect), the device of the target user maintains display of the outline of the virtual object (e.g., without displaying the content included in the virtual object) until a hand of the target user(s) grabs the virtual object, as will be described in detail with reference to FIG. 11C. For example, in FIG. 11B, virtual object 1118 displayed by devices 1106 and 1108—associated with Users B and C, respectively—continues to be displayed as an outline of the virtual object 1118, without displaying content A 1122 included in virtual object 1118 and displayed by device 1102, because the hand 1134 of User B has not yet grabbed virtual object 1118 or otherwise gestured towards virtual object 1118. Therefore, device 1102—associated with User A—maintains display of the indication 1120 (e.g., "Private") that virtual object 1118 and/or content A 1122 is not being shared with others users in the three-dimensional environment 1104.

In some embodiments, after a user "pushes" a virtual object towards a target user (e.g., moving the virtual object within the threshold distance of a location of a target user in the three-dimensional environment, as was described with reference to FIG. 11B), a hand of the target user is able to grab (e.g., "pull") the virtual object 1118 from the representation of the user sharing the virtual object 1118 (e.g., by grabbing the virtual object 1118 with a pinching gesture and/or a tapping gesture with hand 1134 and/or by moving the virtual object 1118 closer to the target user), as will be described with reference to FIG. 11C. In FIG. 11C, device 1106 has detected hand 1134 of User B grab the virtual object 1118 from the representation of User A 1114 in the three-dimensional environment 1104. In response to hand 1134 of User B grabbing the virtual object 1118 from the representation of User A 1114, the representations of User B 1110 and User A 1114 in the three-dimensional environment 1104 are optionally updated accordingly. For example, devices 1102 and 1108—associated with User A and User C, respectively—display the representation of User B 1110 holding virtual object 1118, and devices 1106 and 1108—associated with User B and User C, respectively—display and the representation of User A 1114 no longer holding virtual object 1118.

In some embodiments, in response to a hand of a target user grabbing the virtual object, the content associated with the virtual object is optionally shared with only the user who grabbed the virtual object and not with other users in the three-dimensional environment. For example, in response to hand 1134 of User B grabbing the virtual object 1118, device 1106—associated with user B—begins to display content A 1122 associated with virtual object 1118, while device 1108—associated with User C—does not display the content A 1122. In some embodiments, in response to a hand of a target user grabbing the virtual object, the initial sharing user is optionally able to cause the content to be shared with all users in the three-dimensional environment 1104. For example, when hand 1134 of User B grabs virtual object 1118, a user interface element is optionally displayed, on User A's device 1102, which is selectable, by User A, to cause content A 1122 to be shared with all users in the three-dimensional environment 1104, and not just the target user (e.g., User B).

In some embodiments, when the hand 1134 of User B grabs virtual object 1118, content A 1122 is displayed by the electronic devices for all users in the three-dimensional environment, and not just the target user. For example, in response to hand 1134 of User B grabbing virtual object 1118, devices 1106 and 1108—associated with User B and User C, respectively—begin to display content A 1122 associated with virtual object 1118 (e.g., indicated by content A 1122 shown in a dashed box on device 1108 in FIG. 11C).

In some embodiments (e.g., where content becomes shared with all users in the three-dimensional environment 1104, such as via the selection of the selectable option to share with all users in the three-dimensional environment 1104 and/or via the automatic sharing to all users in the three-dimensional environment), the content optionally becomes shared/viewable in other channels/applications displayed in the three-dimensional environment 1104. For example, in response to User A sharing content A 1122 with Users B and/or C, a message 1135—including content A—is optionally sent by User A's device 1102 and received by the devices of Users B and/or C (e.g., devices 1106 and/or 1108, respectively). The message 1135 optionally includes a textual description of content A 1122, a representation of content A 1122, and/or content A 1122. Devices 1102, 1106 and/or 1108 optionally update messaging user interface 1116 to include message 1135, as shown in FIG. 11C. In some embodiments, the (e.g., message including the) content is only displayed in messaging user interface 1116 by the device associated with the user with which the content was shared, such as device 1106, and not by other devices, such as device 1108, associated with users with which the content was not shared. In such embodiments, message 1135 is optionally not displayed by device 1108 and/or content A within message 1135 is optionally not displayed by device 1108 (e.g., indicated by the dashed box surrounding content A in message 1135 on the display of device 1108). Sharing content in the three-dimensional environment 1104 optionally causes that content to be shared/accessible in other applications that are not currently displayed in the three-dimensional environment 1104. For example, if content A 1122 includes a photo, the photo of content A 1122 optionally becomes accessible in respective photo applications associated with (e.g., installed on) the devices of Users B and C.

When a user shares content (e.g., content that was previously private) with other user(s) in the three-dimensional 1104, the sharing status indicator (e.g., indicator 1120) for that respective content is optionally updated. For example, in FIG. 11C, because virtual object 1118 is being shared by User A with User B, indicator 1120 is optionally updated from displaying "Private", as shown in FIG. 11B, to displaying an indication that the virtual object is now being shared with User B (e.g., "Shared with B"). In some embodiments, if virtual object 1118 is shared with all users in the three-dimensional environment 1104, indicator 1120 is optionally updated to display an indication that the virtual object is being shared with all users in the three-dimensional environment 1104 (e.g., "Shared with B and C"). The user who is sharing content with other users (e.g., User A) is optionally able to discontinue sharing with one or more users in the three-dimensional environment 1104 (e.g., stop sharing with users in the three-dimensional environment). While sharing respective content with other users in the three-dimensional environment 1104, selectable options are optionally displayed, by device 1102, proximate to the virtual object 1118 that are selectable by User A to make the respective content private (e.g., not shared with other users in the three-dimensional environment 1104).

After sharing the content with a user in the three-dimensional environment 1104, the user sharing the content (e.g., User A) is optionally able to interact with the virtual object associated with the shared content (e.g., pick up, hold and/or move the virtual object to a new location in the three-dimensional environment). For example, after User B has grabbed virtual object 1118 from the representation of User A 1114, User A is optionally able to grab the virtual object from the representation of User B 1100 (e.g., using an arm extension and/or grabbing gesture with their hand 1124 within a threshold distance, such as 0.5, 1, 2, 5, 10, 20 cm, of the virtual object 1118) and move the virtual object 1118 to a new location in the environment by interacting with the virtual object 1118 via hand 1124. In some embodiments, content A 1122 continues to be shared with User B after User A grabs it, even though User A has moved the virtual object 1118 away from User B.

Shared content (e.g., content A 1122) is optionally displayed as oriented towards the viewpoints associated with users in the three-dimensional environment 1104. For example, if a virtual object is at a location in the three-dimensional environment 1104 that is between the representations of User A 1114 and User B 1110, devices 1102 and 1106—associated with User A and User B—will display virtual object 1118 at the same position in the three-dimensional environment 1104, but the content associated with the virtual object (e.g., content A 1122) will be oriented towards the respective users, such that both devices display the same view of content A 1122 (e.g., the "front" view of content A 1122).

In some embodiments, to share content with a user in the three-dimensional environment 1104, a user is not required to move the associated virtual object within a threshold distance of the target user (e.g., by using a "pushing" or "arm extension" gesture). In some embodiments, as described with reference to FIG. 11D, a menu 1136 is optionally displayed by device 1102 (e.g., and not by devices 1106 and 1108) proximate to the virtual object 1118 that includes selectable options 1138 that are selectable by User A to share object 1118 with and/or stop sharing object 1118 with all or particular users in the three-dimensional environment 1104. For example, instead of hand 1124 of User A moving the virtual object 1118 within a threshold distance of User B 1110 to initiate a process to share content A 1122, as was described with reference to FIG. 11B, hand 1124 is optionally able to interact with (e.g., by performing tapping gestures on those options 1138 with hand 1124 and/or by performing a pinching gesture with hand 1124) selectable options 1138 of menu 1136 to begin sharing content A 1122 with User B and/or User C.

Interacting with selectable options 1138 (e.g., selecting and/or deselecting) optionally includes toggling the selectable options 1138 with gaze and/or hand gestures of a user. For example, User A optionally begins to share content A 1122 with User B by toggling on, with a tap or pinch of hand 1124 and/or gaze of User A on, selectable option 1138 associated with User B, and optionally stops sharing content A 1122 with User B by toggling off, with a tap or pinch of hand 1124 and/or gaze of User A on, selectable option 1138 associated with User B. In some embodiments, menu 1136 is displayed, by a user's device continuously, while in other embodiments, menu 1136 is displayed by the user's device only when the user is interacting with the respective virtual object. In some embodiments, in FIG. 11D, in response to device 1102 detecting input from hand 1124 towards one or more of selectable options 1138 for sharing content A 1122 with one or more of User B and User C, devices 1106 and/or 1108 of User B and C, respectively, display content A 1122, and device 1102 updates indication 1120 to indicate the sharing, as described with reference to FIG. 11C. In some embodiments, devices 1102, 1106 and 1108 update messaging user interface 1116 to include a message including content A 1122, as described with reference to FIG. 11C.

FIGS. 12A-12H is a flowchart illustrating a method 1200 for sharing content in a three-dimensional environment according to some embodiments. In some embodiments, the method 1200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1200 are, optionally, combined and/or the order of some operations is, optionally, changed. In some embodiments, aspects/operations of methods 800, 1000, and 1200 may be interchanged, substituted, and/or added between these methods. For brevity, these details are not repeated here.

In some embodiments, method 1200 is performed at an electronic device (e.g., 1102) in communication with a display generation component (e.g., 120a) and one or more input devices (e.g., 314a), including a hand tracking device. For example, the electronic device is optionally a mobile device (e.g., a tablet, a smartphone, a media player, or a wearable device), or a computer. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc. In some embodiments, the electronic device is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, the electronic device (e.g., 1102) displays (1202a), via the display generation component, a three-dimensional environment (e.g., the three-dimensional environment is optionally a computer-generated reality (XR) environment such as a virtual reality (VR) environment, a mixed reality (MR) environment, or an augmented reality (AR) environment, etc.) that includes a representation of first content (e.g., a representation of video content, a representation of an image, application user interface, etc., or any representation of content such as described with reference to method 1000) and a representation of a first user, other than a user of the electronic device (e.g., an avatar corresponding to the first user at a location in the three-dimensional environment at which the first user is located), such as, for example, the three-dimensional environment 1104, virtual object 1118, and representation of User B 1110 in FIG. 11A. In some embodiments, the three-dimensional environment includes two or more users, including the user of the electronic device and the first user. In some embodiments, an electronic device associated with the first user displays an avatar of the user of the electronic device at a location in the three-dimensional environment at which the user of the electronic device is located. In some embodiments, the first content (e.g., 1118) is not accessible to the first user (e.g., in some embodiments, when the first content is not accessible to the first user, the electronic device associated with the first user does not display the first content (e.g., the first user is not able to view the content of the first content)). In some embodiments, when the first content is not accessible to the first user, the electronic device associated with the first user displays an outline, shape, or profile of the representation of the first content without displaying the first content within the outline, shape, or profile of the representation of the first content. In some embodiments, when the first content is not accessible to the first user, the electronic device associated with the first user does not display the outline, shape, or profile of the representation of the first content, in addition to not displaying the first content.

In some embodiments, such as in FIG. 11A, while displaying the three-dimensional environment (e.g., 1104), the electronic device (e.g., 1102) detects (1202b), via the one or more input devices, a first input including movement of the representation of first content (e.g., 1118) in the three-dimensional environment. For example, detecting that a hand of the user of the electronic device has grabbed and/or moved the representation of the first content toward the representation of the first user (e.g., away from the user) in the three-dimensional environment. In some embodiments, the electronic device displays a selectable user interface element adjacent to (e.g., below) the representation of the first content, and the first input includes detecting that the user has, with their hand, selected or grabbed the selectable user interface element, and while maintaining that selection, moved their hand toward the representation of the first user (e.g., away from the user).

In some embodiments, in response to detecting the first input (1202c), in accordance with a determination that the first input satisfies one or more criteria, the one or more criteria including that the first input includes movement of the representation of first content toward the representation of the first user in the three-dimensional environment (e.g., the first input moves the representation of the first content to within a threshold distance, such as 0.2, 0.5, 1, 2, 5, 10, 50 feet, of the representation of the first user and/or a representation of a hand of the first user in the three-dimensional environment), the electronic device (e.g., 1102) initiates (1202d) a process to make the first content (e.g., video content, an image, an application user interface, etc., or any content such as described with reference to methods 800 or 1000) accessible to the first user in the three-dimensional environment, such as, for example as described with reference to FIGS. 11A and 11B, when the hand 1124 of User A moves the virtual object 1118 towards User B 1110, a process to make virtual object 1118 accessible to User B is initiated. For example, allowing the electronic device associated with the first user to display the first content (e.g., the first user is able to view the first content). In some embodiments, if the electronic device was displaying only the outline, shape, or profile of the representation of the first content when the first content was not accessible to the first user, making the first content accessible to the first user causes the electronic device associated with the first user to fill-in the outline, shape, or profile of the representation of the first content with the first content. In some embodiments, making the first content accessible to the first user includes maintaining the accessibility of the first content to the user of the electronic device (e.g., the electronic device continues to display the representation of the first content, including the first content). In some embodiments, making the first content accessible to the first user includes ceasing the accessibility of the first content to the user of the electronic device (e.g., the electronic device ceases displaying the first content, and instead only displays the outline, shape, or profile of the representation of the first content). In some embodiments, in accordance with a determination that the first input does not satisfy the one or more criteria, the electronic device forgoes initiating the process to make the first content accessible to the first user.

The above-described manner of making content accessible to another user in a three-dimensional environment via movement of the content towards that other user provides an efficient way of sharing content with other users without the need for dedicated user interface elements for sharing that content, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in response to detecting the first input (1204*a*), in accordance with a determination that the first input does not satisfy the one or more criteria (e.g., in some embodiments, the one or more criteria includes a criterion that is not satisfied when the first input does not move the representation of the first content within a threshold distance, such as 0.2, 0.5, 1, 2, 5, 10, 50 feet, of a location of the representation of the first user in the three-dimensional environment. Additionally or alternatively, the one or more criteria includes a criterion that is not satisfied when the first input does not move the representation of the first content within a threshold distance (e.g., 0.2, 0.5, 1, 2, 5, 10, 50 feet) of a location of a representation of a hand of the first user in the three-dimensional environment. Additionally or alternatively, the one or more criteria includes a criterion that is not satisfied when the first input does not move the representation of the first content towards the representation of the first user. Additionally or alternatively, the one or more criteria includes a criterion that is not satisfied when the first input moves the representation of first content away from the representation of the first user.), the electronic device (e.g., 1102) forgoes (1204*b*) initiating the process to make the first content (e.g., 1118) accessible to the first user in the three-dimensional environment, such as, for example as described with reference to FIG. 11A, when the hand 1124 of User A has not moved the virtual object 1118 towards the representation of User B 1110, the process to share virtual object 1118 with User B is not initiated. For example, continuing to not allow the electronic device associated with the first user to display the first content (e.g., not allowing the first user to be able to view the first content), while the first content continues to be displayed by the electronic device of the user. In some embodiments, if the electronic device associated with the first user was displaying an outline, shape, and/or profile of the representation of the first content before or while determining that the first input did not satisfy the one or more criteria, the electronic device associated with the first user continues to display that outline, shape, or profile. In some embodiments, forgoing the process to make the first content accessible to the first user includes updating the three-dimensional environment to return the representation of the first content to its respective location in the three-dimensional environment prior to being moved by the first input (e.g., returning the first content to its original location in the three-dimensional environment). In some embodiments, forgoing the process to make the first content accessible to the first user includes maintaining display of the representation of the first content at its new location in the three-dimensional environment, in accordance with the movement of the first input. In some embodiments, forgoing the process to make the first content accessible to the first user includes continuing to display the outline, shape, and/or profile of the first content (e.g., representation of the first content) on the electronic device associated with the first user, but not displaying the respective content associated with the first content on the electronic device associated with the first user.

The above-described manner of forgoing sharing content in the three-dimensional environment provides an efficient way for a user to interact with and/or move objects in a three-dimensional environment without causing the content associated with those objects to be shared with other users in the three-dimensional environment, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, initiating the process to make the first content (e.g., 1118) accessible to the first user in the three-dimensional environment includes making the representation of the first content available for interaction by the first user in the three-dimensional environment (1206*a*), such as, for example as described with reference to FIG. 11B, after User A has moved the virtual object 1118 towards the representation of User B 1110 that satisfied the one or more first criteria, the virtual object 1118 becomes available for interaction with the hand 1134 of User B. For example, the electronic device associated with the first user responds to inputs from the first user directed towards the representation of the first content after the first input satisfies the one or more criteria. In some embodiments, making the first content available for interaction by the first user includes making the representation of the first content responsive to respective actions and/or hand gestures performed by the first user. For example, when the first content is available for interaction, a hand of the first user is able to perform a gesture (e.g., a grabbing or pinching gesture) to select the first content and/or move the first content to a new location in the three-dimensional environment. In some embodiments, before making the representation of the first content available for interaction by the first user, the electronic device associated with the first user does not respond to inputs (e.g., hand gesture or other types of inputs) directed to the first content. For example, if the electronic device associated with the first user detects input directed to the first content (e.g., a grabbing or pinching gesture), but the first content is not available for interaction, the electronic device associated with the first user does not respond to the detected input. In some embodiments, when the first content is available for interaction by the first user, the electronic device associated with the first user displays one or more selectable element(s) proximate to the first content (e.g., a grabber bar) that a user can direct a gesture towards (e.g., a grabbing or pinching gesture), which in turn allows interaction with (e.g., selection of) the representation of the first content. In some embodiments, when the one or more selectable elements are displayed proximate to the first content and the first user performs a gesture that is not with a threshold distance of the one or more selectable elements, that gesture does not allow interaction with (e.g., selection of) the representation of the first content.

The above-described manner of making the representation of the first content available for interaction provides an efficient way for sharing content with users in the three-dimensional environment without the need for dedicated user interface elements for making the content available for interaction, and not making the representation of the first content available for interaction before the one or more criteria are satisfied ensures that the content is not shared before the sharing user provides the required input for sharing, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first content (e.g., 1118) is not accessible to the first user before interaction by the first user with the representation of the first content that satisfies one or more second criteria (e.g., in some embodiments, the one or more second criteria include a criterion that is satisfied when a hand of the first user performs a gesture (e.g., a selecting, tapping, pinching, or grabbing gesture) within a threshold distance, such as 0.2, 0.5, 1, 2, 5, 10, 50 feet, of the representation of the first content. Additionally or alternatively, the one or more second criterion include a criterion that is satisfied when an arm of the first user performs a reaching out gesture towards the representation of the first content.) is detected, and the first content is accessible to the first user in response to the interaction by the first user with the representation of the first content that satisfies the one or more second criteria being detected (1208a), such as, for example as described with reference to FIGS. 11B and 11C, before the hand 1134 of User B grabs the virtual object 1118, the virtual object 1118 is not accessible to user B, and after hand 1134 of User B grabs the virtual object 1118, the virtual 1118 is accessible to User B. For example, the first content is not accessible to the first user (e.g., the electronic device associated with the first user does not display the first content) until an interaction by the first user satisfies the one or more second criteria. In some embodiments, when the first content is moved within a threshold distance of the representation first user, the representation of the first content, displayed by the electronic device associated with the first user, is an outline, shape, and/or profile of the first content until the first user performs an interaction that satisfies the one or more second criteria. In some embodiments, the one or more second criteria include a criterion that is satisfied when the first users performs a gesture (e.g., a grabbing gesture) within a threshold distance of one or more user interface elements displayed proximate to the representation of the first content. In some embodiments, when the first user performs an interaction that satisfies the one or more second criteria, the electronic device associated with the first user begins to display the first content (e.g., the first user is able to see the first content).

The above-described manner of making content available to users that interact with the content in a particular way provides an efficient way for sharing content with those users without the need for dedicated user interface elements via which the content sharing is completed, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIG. 11A, the three-dimensional environment further includes a representation of a second user (e.g., 1112), other than the user of the electronic device (1210a) (e.g., a representation of a user in the three-dimensional environment other than the representation of the first user and the representation of the user of the electronic device). Thus, in some embodiments, the three-dimensional environment is accessible by a plurality of electronic devices associated with the different users. In some embodiments, before the interaction by the first user with the representation of the first content that satisfies the one or more second criteria is detected, the first content (e.g., 1118) is not accessible to the first user and the second user (1210b) (e.g., before the first user provides an input that satisfies the second criteria, the electronic devices associated with the first user and second user display the representation (e.g., outline) of the first content, but does not display the first content itself), such as, for example as described with reference to FIG. 11B, before the hand 1134 of User B grabs the virtual object 1118, the virtual object 1118 is not accessible to User B and User C. In some embodiments, in response to the interaction by the first user with the representation of the first content (e.g., 1118) that satisfies the one or more second criteria being detected, the first content is accessible to the first user but is not accessible to the second user (1210c) (e.g., the electronic device associated with the first user displays the first content and the electronic device associated with the second user displays the outline of the first content), such as, for example as described with reference to FIG. 11C, after the hand 1134 of User B grabs the virtual object 1118, the virtual 1118 is accessible to User B, but is not accessible to User C. For example, the first content is shared with the users in the three-dimensional environment that interact with the first content in a way that satisfies the second criteria, and is not shared with users in the three-dimensional environment that did not interact with the representation of first content in a way that satisfied the second criteria. In some embodiments, the electronic device associated with the second user continues to display the representation (e.g., outline) of the first content until the second user interacts with the representation of the first content in a way that satisfies the one or more second criteria. In some embodiments, the first content is only shared with the user towards which the input of the user of the electronic device satisfies the one or more criteria, even if another user in the three-dimensional environment performs an input that would satisfy the one or more second criteria.

The above-described manner of making content available to only respective user(s) that interact with the content in a required way provides an efficient way for selectively sharing content in the three-dimensional environment, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in response to the interaction by the first user with the representation of the first content that satisfies the one or more second criteria being detected, the electronic device (e.g., 1110) displays (1212a), via the display generation component, a selectable option (e.g., a button, dialog box, pop-over menu including the selection option, etc.) that is selectable to initiate a process to make the first content (e.g., 1118) accessible to the first user and the second user in the three-dimensional environment (e.g., 1104), such as, for example as described with reference to FIG. 11C, after the hand 1134 of User B grabs the virtual object 1118, a selectable option is optionally displayed at User A's device 1102 that is selectable to share virtual object 1118 with Users B and C. For example, after the first user performs an interaction that satisfies the one or more second criteria, displaying, at the electronic device of the user, a selectable user interface element (e.g., a user interface element similar to the menu and selectable options described with reference to FIG. 11D) that is selectable to initiate a process to share the content with additional users in the three-dimensional environment (e.g., in addition to the first user). In some embodiments, in accordance with a determination that the user of the electronic device (e.g., the user initiating the sharing of the first content) selects the selectable option, the first content is shared with some or all users in the three-dimensional environment, in additional to the first user (e.g., the electronic devices of the particular users that the first content is being shared with display the first content). In some embodiments, in accordance with a determination that the user (e.g., the user sharing the first content) did not select the selectable option to initiate the process to share with some or all users in the three-dimensional environment, the first content continues to be shared with (e.g., accessible to) only the first user (e.g., the electronic device associated with the first user displays the first content, and the electronic devices of the additional users in the three-dimensional environment display an outline of the first content).

The above-described manner of making content accessible to additional users in the three-dimensional environment provides an efficient way for sharing content without requiring the user of the electronic device to initiate a process to share the content with each additional user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the three-dimensional environment (e.g., 1104) further includes a representation of a second user (e.g., 1112), other than the user of the electronic device (1214a) (e.g., a representation other than the user of the electronic device and the representation of the first user). In some embodiments, in response to the one or more criteria being satisfied, an indication (e.g., a grabber bar displayed proximate to (e.g., adjacent and below a lower edge of) the representation of the first content and/or other visual indication(s) such as the representation of the first content glowing or being highlighted) that the representation of the first content is available for interaction is displayed in the three-dimensional environment for the first user but not the second user (1214b), such as, for example as described with reference to FIG. 11B, after the hand 1124 of User A has moved virtual object 1118 towards the representation of User B 1110, an indication indicating that virtual object 1118 is available for interaction is optionally displayed beneath that the virtual object 1118 at User B's electronic device 1106, but is not displayed at User C's electronic device 1108. For example, in response to the user moving the representation of first content to a location in the three-dimensional environment and/or in a manner that satisfies the one or more criteria with respect to a particular user, the electronic device associated with that particular user displays the representation of the first content with the visual indication indicating the representation of the first content is available for interaction, and electronic devices associated with other users in the three-dimensional environment does not display the visual indication for the first content. In some embodiments, the representation of first content displayed at the electronic devices associated with the other users do not display the indication until the representation of the first content is moved to a location in the three-dimensional environment and/or in a manner that satisfies the one or more criteria with respect to each of the other users in the three-dimensional environment. In some embodiments, the indication—indicating the representation of the first content is available for interaction—is displayed until a particular user begins to interact with the representation of the first content. In some embodiments, the indication ceases display at the electronic device associated with the first user when the first user interacts with the representation of the first content.

The above-described manner of indicating that the content is available for interaction provides an efficient way to convey which content is available for interaction and which content is not available for interaction for a respective user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the three-dimensional environment further includes a representation of a second user (e.g., 1112), other than the user of the electronic device (1216a) (e.g., a representation other than the user of the electronic device and the representation of the first user). In some embodiments, in response to the one or more criteria being satisfied, an indication (e.g., a grabber bar displayed proximate to (e.g., adjacent and below a lower edge of) the representation of the first content and/or other visual indication(s) such as the representation of the first content glowing or being highlighted) that the representation of the first content is available for interaction is displayed in the three-dimensional environment for the first user and the second user (1216b), such as, for example as described with reference to FIG. 11B, after the hand 1124 of User A has moved virtual object 1118 towards the representation of User B 1110, an indication indicating that virtual object 1118 is available for interaction is optionally displayed beneath the virtual object 1118 at User B's electronic device 1106 and User C's electronic device 1108. For example, in response to the user moving the representation of the first content to a location in the three-dimensional environment and/or in a manner that satisfies the one or more criteria with respect to one user in three-dimensional environment, displaying at the electronic devices of additional or all users in three-dimensional environment, the representation of the first content with an indication indicating that the representation of the first content is available for interaction. In some embodiments, while the indication is being displayed with the representation of first content, the electronic devices of the first and second users will respond to inputs directed to the representation of the first content by the first user and/or the second user. In some embodiments, if the first user performs an interaction associated with the first content, the indication may cease displaying at the electronic device for that user, but continue displaying at the electronic devices of the other users that have not interacted with the representation of the first content. In some embodiments, if the first and/or second users perform respective inputs at their respective devices that satisfy the one or more second criteria, the first content is shared with the first and/or second user, respectively.

The above-described manner of indicating that the content is available for interaction provides an efficient way to make content available to all users in the three-dimensional environment in response to initiating a process to share with a particular user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while the first content (e.g., 1118) is not accessible to the first user in the three-dimensional environment (e.g., 1104), the first content is not displayed in the three-dimensional environment for the first user, and while the first content is accessible to the first user in the three-dimensional environment, the first content is displayed in the three-dimensional environment for the first user (1218*a*), such as, for example as described with reference to FIGS. 11A and 11C, when virtual object 1118 is not accessible to User B, content 1122 is not displayed at User B's electronic device 1106, and when virtual object 1118 is accessible to User B, content 1122 is displayed at User B's electronic device 1106. For example, until the first content is accessible to the first user, only the outline of the first content is displayed at the electronic device associated with the first user. In some embodiments. In some embodiments, when the first content is not accessible to the first user, the electronic device associated with the first user masks the view of the first content, and when the first content is accessible to the first user, the electronic device associated with the first user displays the first content. In some embodiments, if the first content is accessible to the first user and the first content is not accessible to a second user, the electronic device associated with the first user displays the first content and the electronic device associated with the second user masks and/or obscures the view of the first content.

The above-described manner of only displaying content for those with which it is shared provides an efficient way for allowing shared content to be displayed to users that have access to the shared content while not allowing unshared to be displayed to users, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as described with reference to FIG. 11A, while the first content (e.g., 1118) is not accessible to the first user in the three-dimensional environment (e.g., 1104), an indication of the first content is displayed in the three-dimensional environment for the first user (1220*a*). In some embodiments, the indication of the first content is displayed at a location in the three-dimensional environment that corresponds to a location at which the electronic device displays the representation of the first content in the three-dimensional environment, such as, for example as described with reference to FIG. 11A, when virtual 1118 is not accessible to User B, the electronic device of User B 1106 displays virtual object 1118 in the three-dimensional environment at the same location as the users that have access to virtual object 1118 (e.g., User A). For example, when the first content in the three-dimensional environment is not accessible to particular users, an indication is displayed at the electronic devices of those users instead of the first content. In some embodiments, the indication of the first content is displayed at the same location in the three-dimensional environment as the first content, but is different than the first content. In some embodiments, an electronic device associated with a second user that has access to the first content, displays the first content at its respective location in the three-dimensional environment, while the electronic device associated with the first user that does not have access to the first content, displays an indication of the first content at the location of first content in the three-dimensional environment. In some embodiments, the indication of the first content includes a placeholder image, a representation of the first content, a window, an outline of the first content, and/or shape that has the same shape/size as the first content, but not the content of the first content.

The above-described manner of displaying an indication of the first content at the location of the first content in the three-dimensional environment provides an efficient way to convey to users that the content exists in the three-dimensional environment even if those users do not have access to the content, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the process to make the first content (e.g., virtual object 1118) accessible to the first user in the three-dimensional environment (e.g., 1104) includes displaying an indication of the first content in the three-dimensional environment for the first user without displaying the first content in the three-dimensional environment for the first user (1222*a*), such as, for example as described with reference to FIG. 11B, after the hand 1124 of User A has moved virtual object 1118 towards the representation of User B 1110, an indication that the virtual object is available for interaction is optionally displayed beneath virtual object 1118 at User B's electronic device 1106, but content A 1122 is not displayed at User B's electronic device 1106. For example, the process of sharing the first content with the first user includes displaying, at the electronic device associated with the first user, an indication (e.g., outline of) of the first content. In some embodiments, the indication of the first content continues to be displayed at the electronic device associated with the first user until the first user performs an interaction with the first content (e.g., an input that satisfies the one or more second criteria). In some embodiments, after the first user performs an interaction with the first content (e.g., an input that satisfies the one or more second criteria), the indication of the first content is replaced with the first content by the electronic device associated with the first user.

The above-described manner of displaying an indication of the content while the content is in the process of being sharing with a respective user in the three-dimensional environment provides an efficient way for indicating that the content is not yet shared with the respective user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the process to make the first content (e.g., 1118) accessible to the first user in the three-dimensional environment (e.g., 1104) includes after displaying the indication of the first content without displaying the first content, displaying an animation of the first content becoming visible in the three-dimensional environment for the first user (1224*a*), such as, for example as described with reference to FIG. 11B, after the electronic device of User B 1106 displays the indication that the virtual object 1118 is available for interaction, virtual object 1118 is optionally displayed with an animation emphasizing that virtual object 1118 is available for interaction. For example, the process of sharing the first content with the first user includes displaying, at the electronic device associated with the first user, an animation as the first content is beginning to be displayed at the electronic device associated with the first user. In some embodiments, displaying the animation as the first content is beginning to be displayed includes fading the first content in (e.g., while fading out the outline or other indication of the first content) over a period of time and/or includes other visual animations such as filling the indication of the first content with the first content over a period of time. In some embodiments, the animation is displayed in response to the first user interacting with the first content (e.g., providing an input that satisfies the one or more second criteria).

The above-described manner of displaying an animation as the content is becoming visible to a particular user provides an efficient way to indicate that the content being displayed as newly-shared corresponds to the previously-displayed outline or indication of the content that is newly-shared, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, detecting the first input includes detecting extension of an arm of the user of the electronic device while a hand (e.g., 1124) on the arm is in a hand shape corresponding to holding the representation of the first content (1226*a*), such as, for example as described with reference to FIG. 11A, User A's electronic device 1102 detects that while hand 1124 is grabbing virtual object 1118, the arm of hand 1124 extend towards the location of the representation of User B 1110 in the three-dimensional environment. For example, the first input includes, while a hand of the user holds the representation of the first content (e.g., performing a pinch gesture at a location that corresponds to the representation of the first content and/or a location that corresponds to a selectable user interface element displayed proximate to the representation of the first content for moving the representation of the first content), an arm associated with the hand holding the first content extending towards the representation of the first user in the three-dimensional environment. In some embodiments, the first input further includes while holding the representation of the first content, detecting movement of (e.g., a walking motion of) the user walking towards a location corresponding to the representation of the first user.

The above-described input for sharing content provides an efficient way for a user that is sharing the content to initiate a process to share the content without the need for dedicated user interface elements for sharing that content, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while the first content (e.g., 1118) is accessible to the first user, the electronic device (e.g., 1102) displays (1228*a*), via the display generation component, an indication (e.g., 1120) that the first content is accessible to the first user, such as, for example as described with reference to FIG. 11C, when virtual 1118 is shared with User B, an indication 1120 overlaying virtual object 1118 is displayed that indicates virtual object 1118 is being shared with User B. For example, displaying an indication proximate to and/or overlaying the representation of the first content indicating that the first content is being shared with the first user. In some embodiments, the indication includes information (e.g., textual and/or graphical information) about the one or more users that the first content is being shared with (e.g., "shared with Abe and Bell"). In some embodiments, if the first content is not being shared with any user in the three-dimensional environment, no indication is displayed. Optionally, if the first content is not being shared with any user in the three-dimensional environment, an indication is displayed proximate to and/or overlaying the representation of the first content that indicates that no users have access to the first content (e.g., "Private"). In some embodiments, the visual indication is displayed continuously, while in other embodiments, the visual indication is displayed when the electronic device associated with the user detects an interaction with the representation of the first content.

The above-described manner of indicating with whom the content is being shared with provides an efficient way of displaying, to a user sharing the content, the users that have access to that content, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, after initiating the process to make the first content accessible to the first user and while the first content is accessible to the first user, the electronic device (e.g., 1110) detects (1230*a*), via the one or more input devices, a second input corresponding to the user of the electronic device taking control of the representation of the first content (e.g., interacting with the representation of the first content, such as detecting a hand of the user of the electronic device performing a pinching or grabbing gesture within a threshold distance, such as 0.1, 0.3, 0.5, 1, 5, 10 cm, of the representation of the first content while the first content is shared with the first user). In some embodiments, in response to detecting the second input, the electronic device displays (1230*b*), via the display generation component, the representation of the first content (e.g., 1118) controlled by the user of the electronic device while the first content remains accessible to the first user in the three-dimensional environment, such as, for example as described with reference to FIG. 11C, while the representation of User B 1110 is holding virtual object 1118, hand 1124 of User A optionally grabs virtual object 1118 from the representation of User B 1110. For example, after sharing the first content with the first user, a user of the electronic device is able to interact with the representation of the first content (e.g., pick up and/or move the representation of the first content to a new location in the three-dimensional environment). In some embodiments, while a user is interacting with the representation of the first content with the second input, the first content remains shared with the first user (e.g., the electronic device associated with the first user continues to display the first content). In some embodiments, the electronic device associated with the first user displays the representation of the user interacting with (e.g., holding) the representation of the first content. In some embodiments, while the user is interacting with the first content, the first user is unable to interact with the representation of the first content (e.g., the electronic device associated with the first user does not respond to inputs directed to the representation of the first content).

The above-described manner of maintaining the sharing of content provides an efficient way for interacting with the content after sharing the content with a user in the three-dimensional environment, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the three-dimensional environment (e.g., 1104) further includes a representation of second content (1232*a*) (e.g., a representation of content different than the representation of first content), such as, for example as described with reference to FIG. 11A, the three-dimensional optionally includes a virtual object in additional to virtual object 1118. In some embodiments, while the first content (e.g., 1118) is accessible to a user other than the user of the electronic device, the electronic device displays (1232*b*), via the display generation component, a visual indication (e.g., 1120) indicating that the first content is accessible to first one or more users other than the user of the electronic device, such as, for example as described with reference to FIG. 11C, when virtual object 1118 is accessible to User B, the indication 1120, displayed at User A's device 1102, provides an indication that the virtual object 1118 is accessible by User B ("Shared with B"). For example, displaying an indication proximate to and/or overlaying the representation of the first content indicating that the first content is being shared with one or more first users. In some embodiments, the indication includes information (e.g., textual and/or graphical information) about the one or more first users that the first content is being shared with. In some embodiments, the one or more first users are some or all of the users in the three-dimensional environment. In some embodiments, the visual indication is displayed continuously, while in other embodiments, the visual indication is displayed when the electronic device associated with user detects an interaction towards the representation of the first content. In some embodiments, while the first content is not accessible to a user other than the user of the electronic device, the electronic device displays (1232*c*), via the display generation component, a visual indication (e.g., 1120) indicating that the first content is not accessible to users other than the user of the electronic device, such as, for example as described with reference to FIG. 11B, when virtual object 1118 is not accessible to users in the three-dimensional environment, the indication 1120, displayed at User A's device 1102, provides an indication that the virtual object 1118 is not accessible to users in the three-dimensional environment. For example, if the first content is not being shared with any user in the three-dimensional environment, an indication is displayed proximate to and/or overlaying the representation of the first content that indicates that no users have access to the first content. In some embodiments, the visual indication indicating that the first content is not accessible to any user replaces the display of the visual indication indicating that the first content is accessible to one or more first users. In some embodiments, the visual indication is displayed continuously, while in other embodiments, the visual indication is displayed when the electronic device associated with user detects an interaction towards the representation of the first content. In some embodiments, while the second content is accessible to a user other than the user of the electronic device, the electronic device displays (1232*d*), via the display generation component, a visual indication indicating that the second content is accessible to second one or more users other than the user of the electronic device, such as, for example as described with reference to FIG. 11C, a second virtual object other than virtual object 1118 is optionally shared with one or more users in the three-dimensional environment, and an indicator similar to indicator 1120 is optionally displayed, at User A's device 1102, indicating which users have access to the second virtual object. For example, displaying an indication proximate to and/or overlaying the representation of the second content indicating that the second content is being shared with one or more second users. In some embodiments, the indication includes information (e.g., textual and/or graphical information) about the one or more second users that the first content is being shared with. In some embodiments, the one or more second users are different than the one or more first users or are a subset or a superset of the one or more first users. In some embodiments, the visual indication is displayed continuously, while in other embodiments, the visual indication is displayed when the electronic device associated with the user detects an interaction towards the representation of the second content. In some embodiments, while the second content is not accessible to a user other than the user of the electronic device, the electronic device displays (1232*e*), via the display generation component, a visual indication indicating that the second content is not accessible to users other than the user of the electronic device, such as, for example as described with reference to FIG. 11B, when the second virtual object is not accessible by users in the three-dimensional environment an indication similar to indicator 1120 is optionally displayed proximate to the second virtual object that indicates the second virtual object is not accessible by any users in the three-dimensional environment. For example, if the second content is not being shared with any user in the three-dimensional environment, an indication is displayed proximate to and/or overlaying the representation of the second content that indicates that no users have access to the second content. In some embodiments, the visual indication indicating that the second content is not accessible to any user replaces the display of the visual indication indicating that the second content is accessible to one or more second users. In some embodiments, the visual indication is displayed continuously, while in other embodiments, the visual indication is displayed when the electronic device associated with user detects an interaction towards the representation of the second content.

The above-described manner of separately displayed indications for respective content in the three-dimensional environment provides an efficient way for indicating with whom a given respective object and/or content are shared with, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the visual indication (e.g., 1120) indicating that the first content (e.g., 1118) is accessible to the first one or more users includes a visual indication of the first one or more users, and the visual indication indicating that the second content is accessible to the second one or more users includes a visual indication of the second one or more users (1234a), such as, for example as described with reference to FIG. 11C, the indicator 1120 associated with the virtual object 1118 includes a visual image of the users that have access to the virtual object 1118. Similarly, if FIG. 11C had a second virtual object that is also accessible by one or more users in the three-dimensional environment, an indication associated with the second virtual object optionally includes a visual image of the users that have access to the second virtual object. For example, the visual indication indicating that the first content is assessable to the one or more first users includes graphical and/or textual information about (e.g., identifying) the one or more first users the first content is accessible to, such as their names. In some embodiments, the graphical information of the visual indication includes an image that is associated with the one or more first users, such as a group image. In some embodiments, the graphical information of the indication indicating that the second content is accessible to the second one or more users includes a graphic associated with each first user the content is being shared with, such as an avatar image. In some embodiments, textual information of the visual indication includes a group name and/or the name of the first users the first content is shared with. For example, the visual indication includes graphical and/or textual information about the one or more second users the second content is accessible to. In some embodiments, the graphical information of the visual indication includes an image that is associated with the one or more second users, such as a group image. In some embodiments, the graphical information of the indication includes a graphic associated with each second user the content is being shared with, such as an avatar image. In some embodiments, textual information of the visual indication includes a group name and/or the name of the second users the first content is shared with.

The above-described manner of including a visual indication of the users provides an efficient way for indicating with whom the respective objects are shared, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, initiating the process to make the first content (e.g., 1118) accessible to the first user in the three-dimensional environment includes initiating a process to share the first content via an application (e.g., 1116) that is different from the three-dimensional environment (1236a), such as, for example as described with reference to FIG. 11C, when virtual object 1118 is shared with User B, virtual object 1118 is optionally shared in messaging application 1116. For example, when sharing the first content with a particular user, making the content available in applications related to the first content. In some embodiments, the first content is natively available in the relevant applications in response to the first content being shared with the first user. For example, in some embodiments, the first content includes a photo, and the photo corresponding to the first content is accessible via one or more photo applications associated with the first user in response to the first content being shared in the three-dimensional environment as described herein. Similarly, in applications where the user of the electronic device (e.g., the user initiating the process to share the first content) and the first user belong to a same channel, group, or thread, the first content is optionally shared via that channel, group, or thread. For example, in some embodiments where the user of the electronic and the first user are participants in a messaging group in a messaging application, the first content is shared in a message of that message group in response to the first content being shared in the three-dimensional environment as described herein. In some embodiments, the first content is shared in the three-dimensional environment with the users that are included in the messaging group in the messaging application, even if the user of the electronic device only provided the sharing input that satisfies the one or more criteria with respect to the first user. In some embodiments, if the message group includes participants that the content is not being shared with, the first content is optionally not shared in a message of that message group.

The above-described manner of sharing content in related applications provides an efficient way for users with which the content is being shared to access that content, other than accessing the content in the three-dimensional environment, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

Figure 11D:
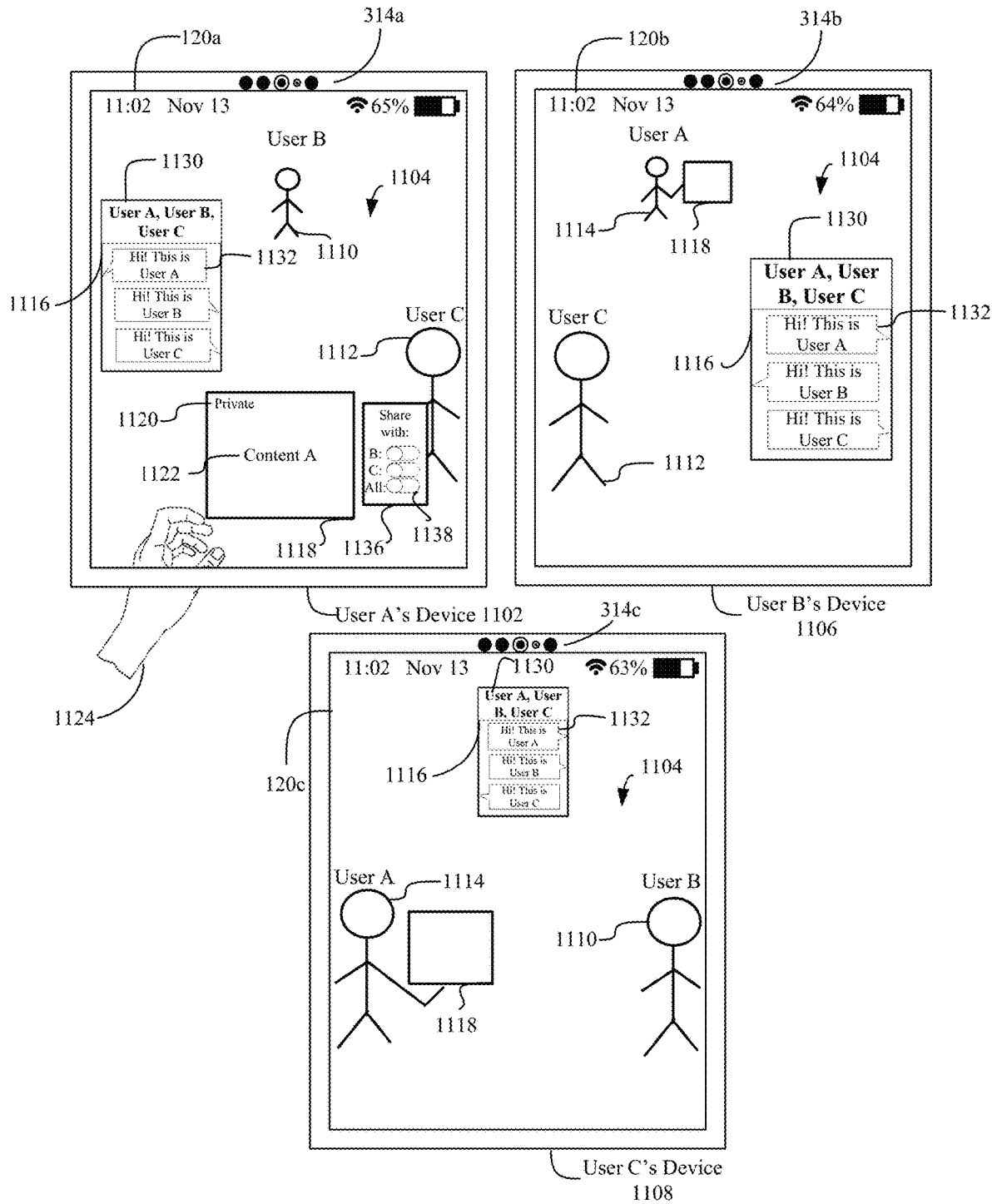
Figure 12A:
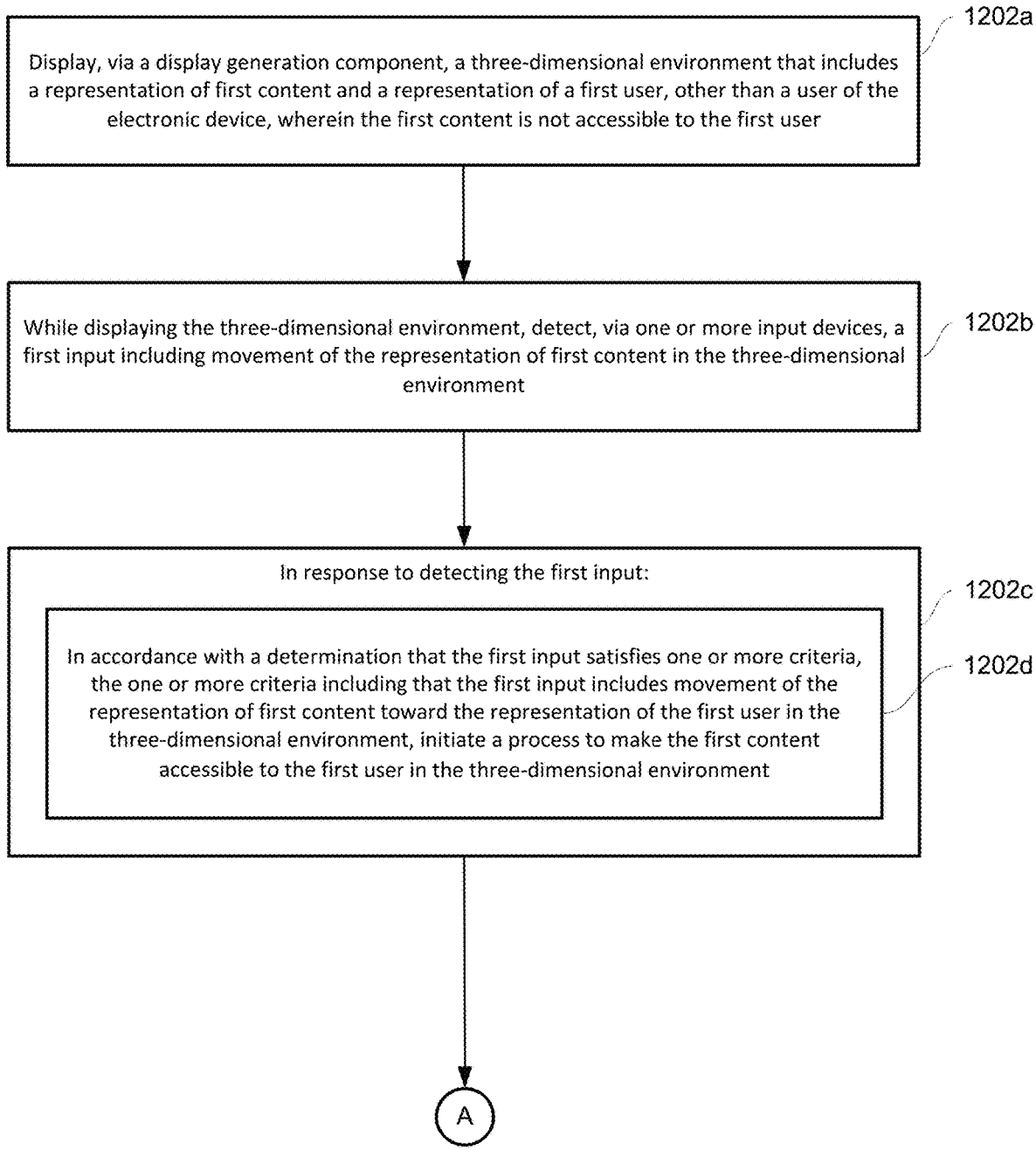
FIGS. 12A-12H is a flowchart illustrating a method for sharing content in a three-dimensional environment according to some embodiments.
Figure 12B:
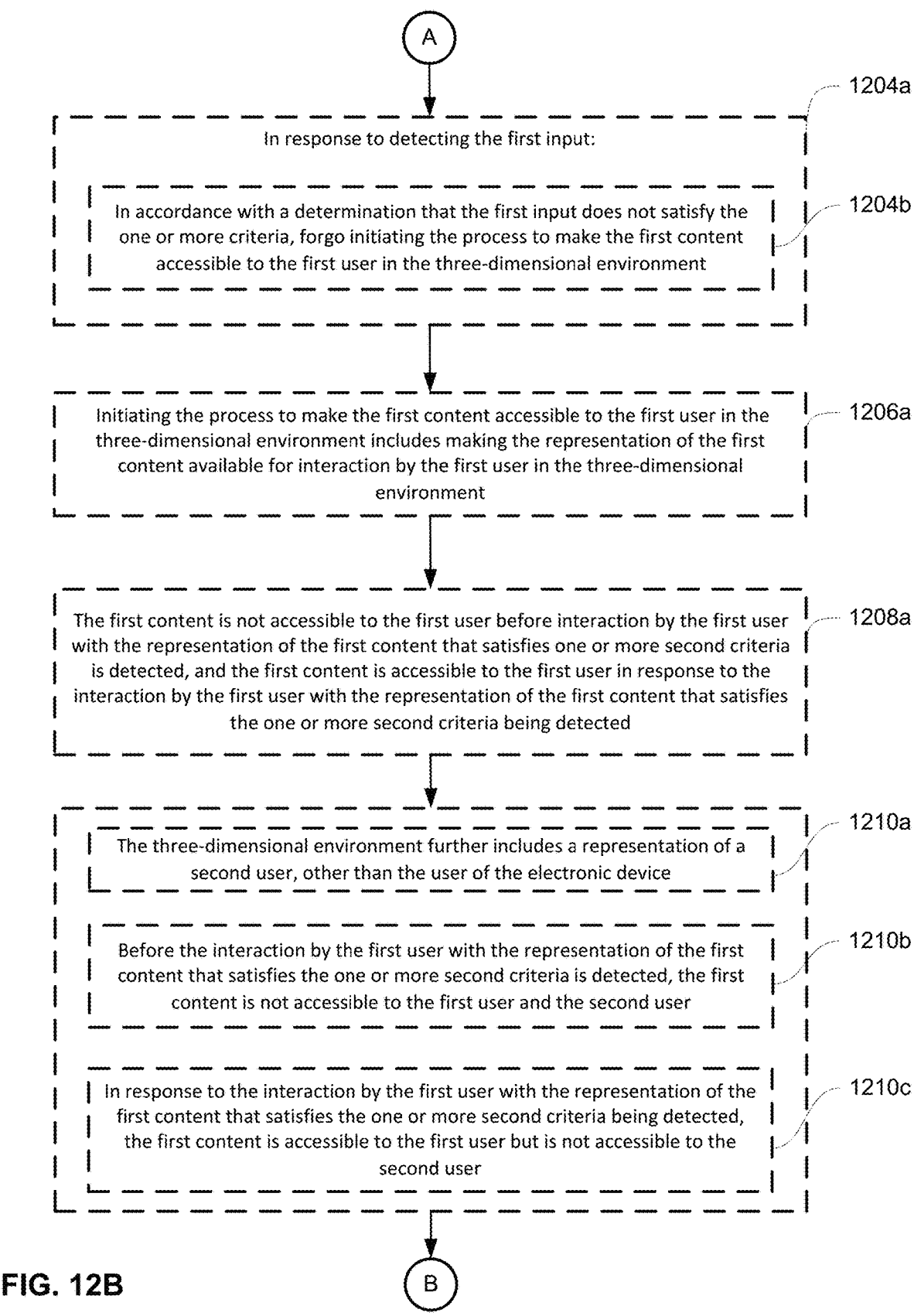
Figure 12C:
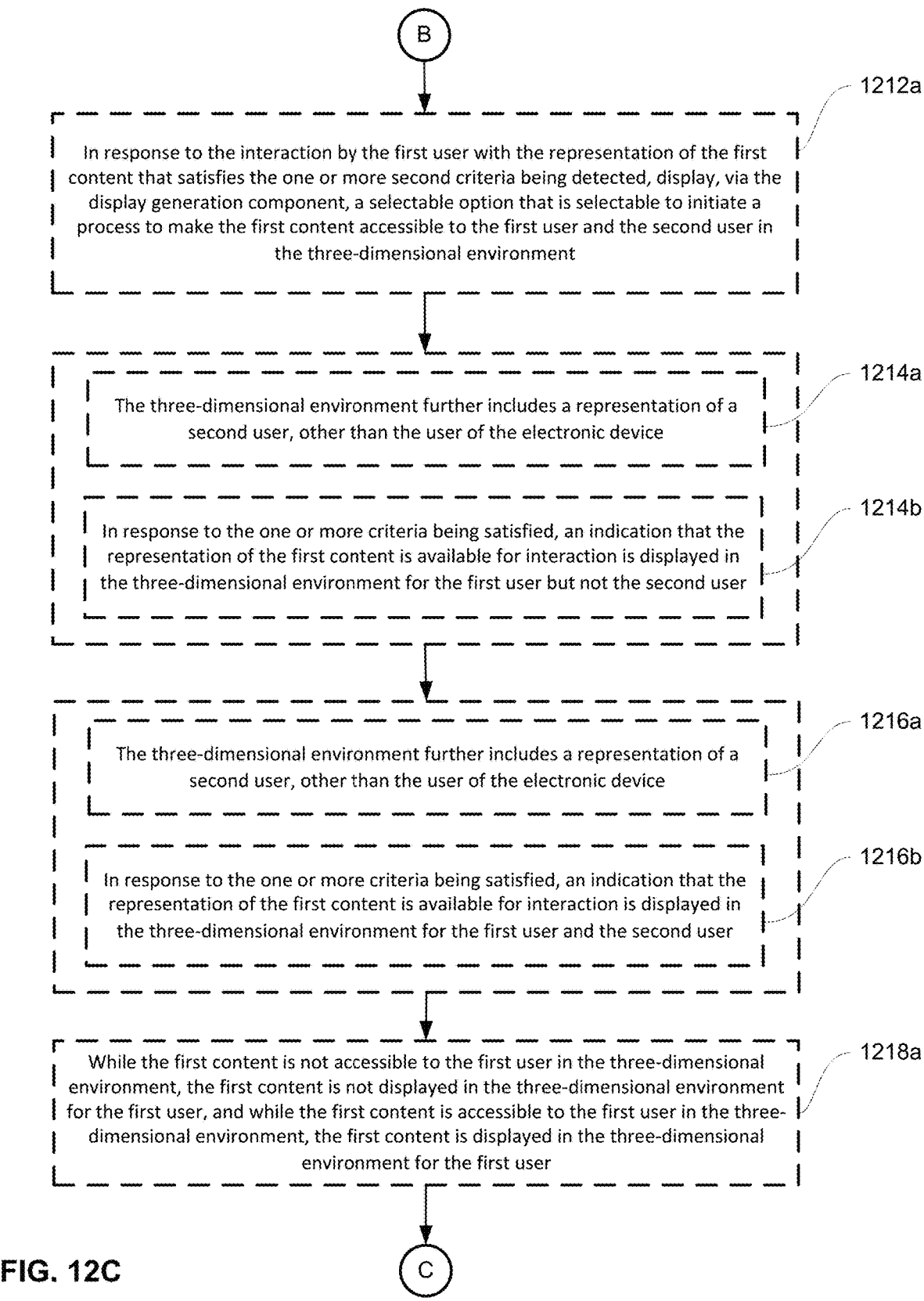
Figure 12D:
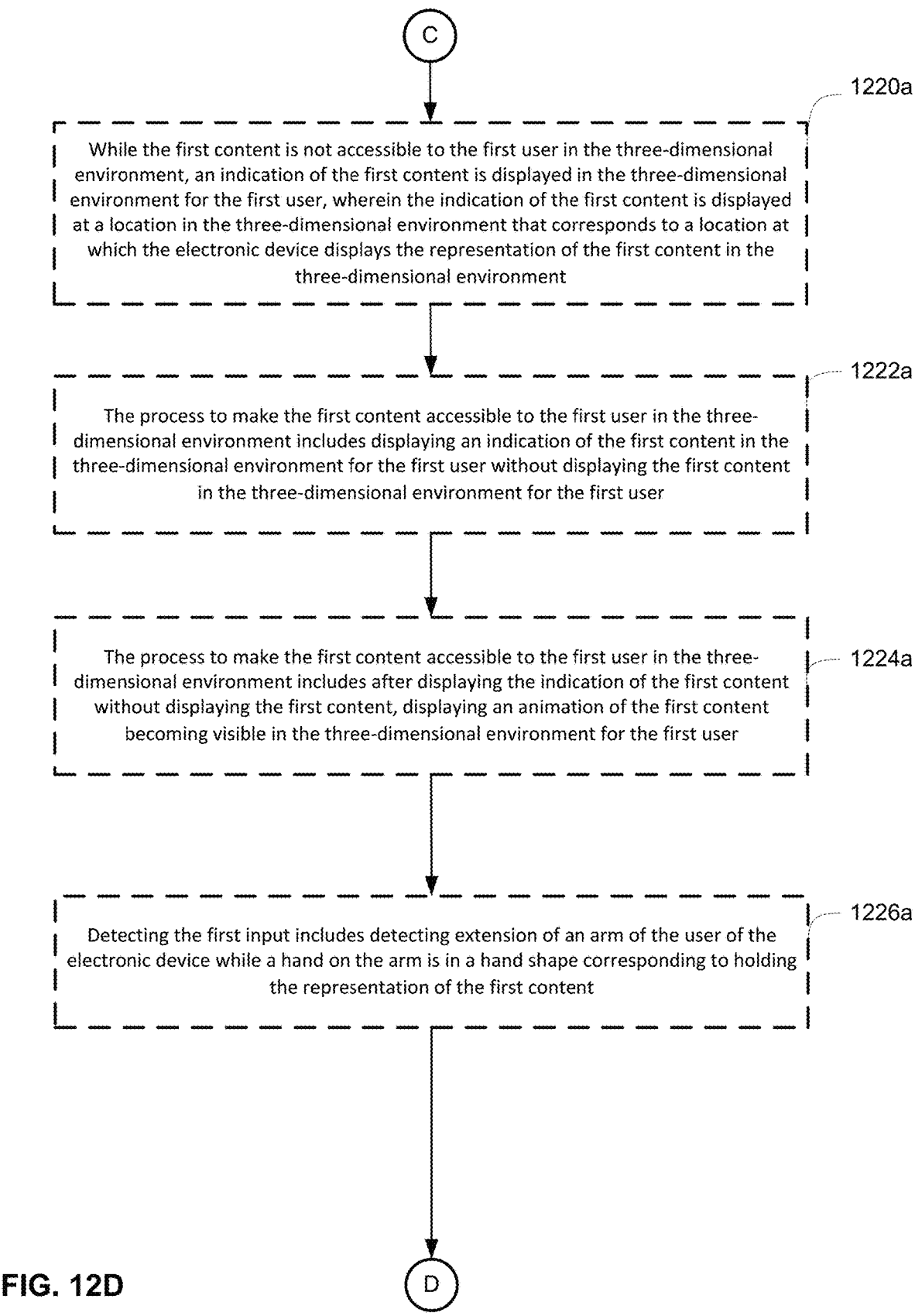
Figure 12E:
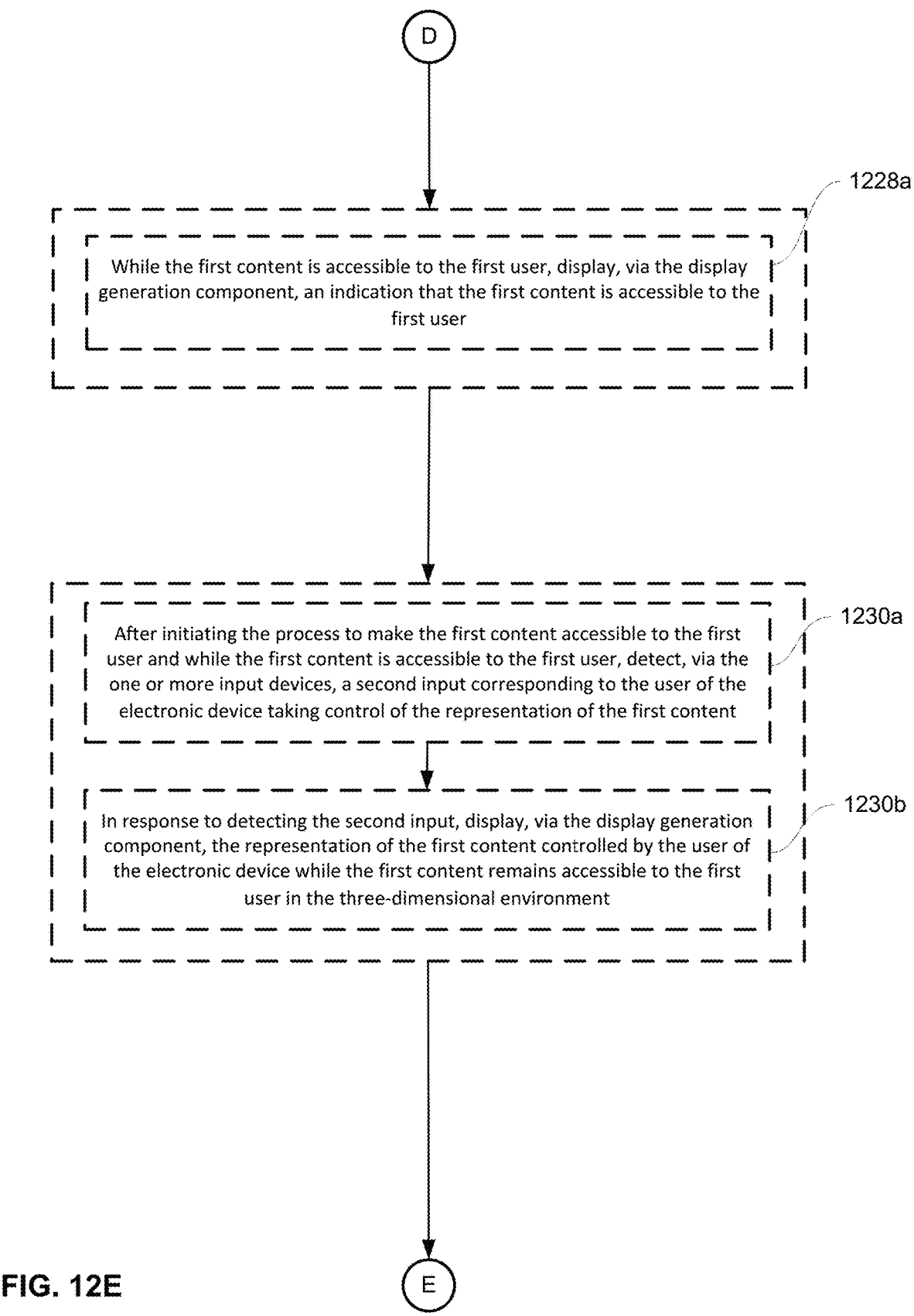
Figure 12F:
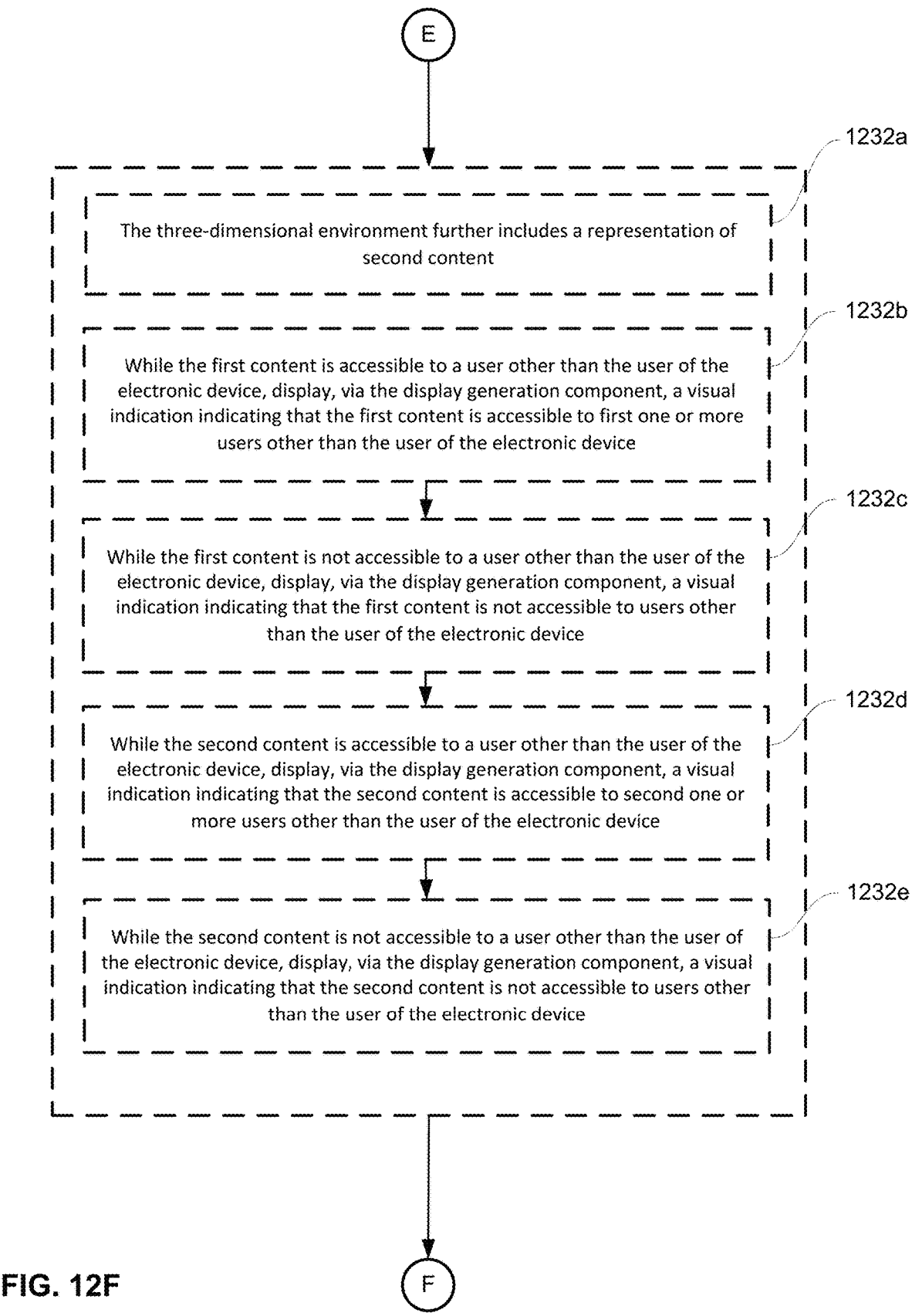
Figure 12G:
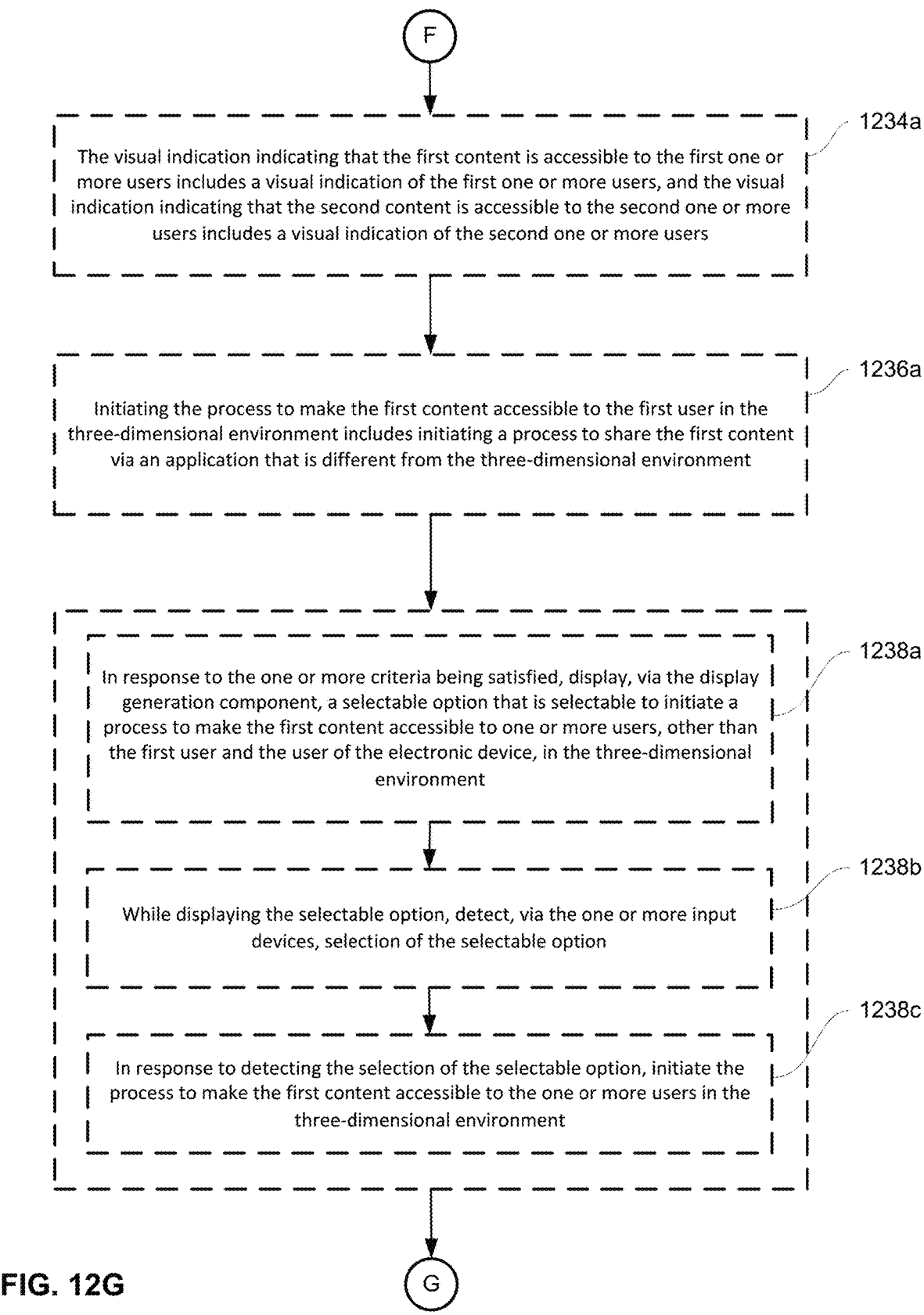
Figure 12H:
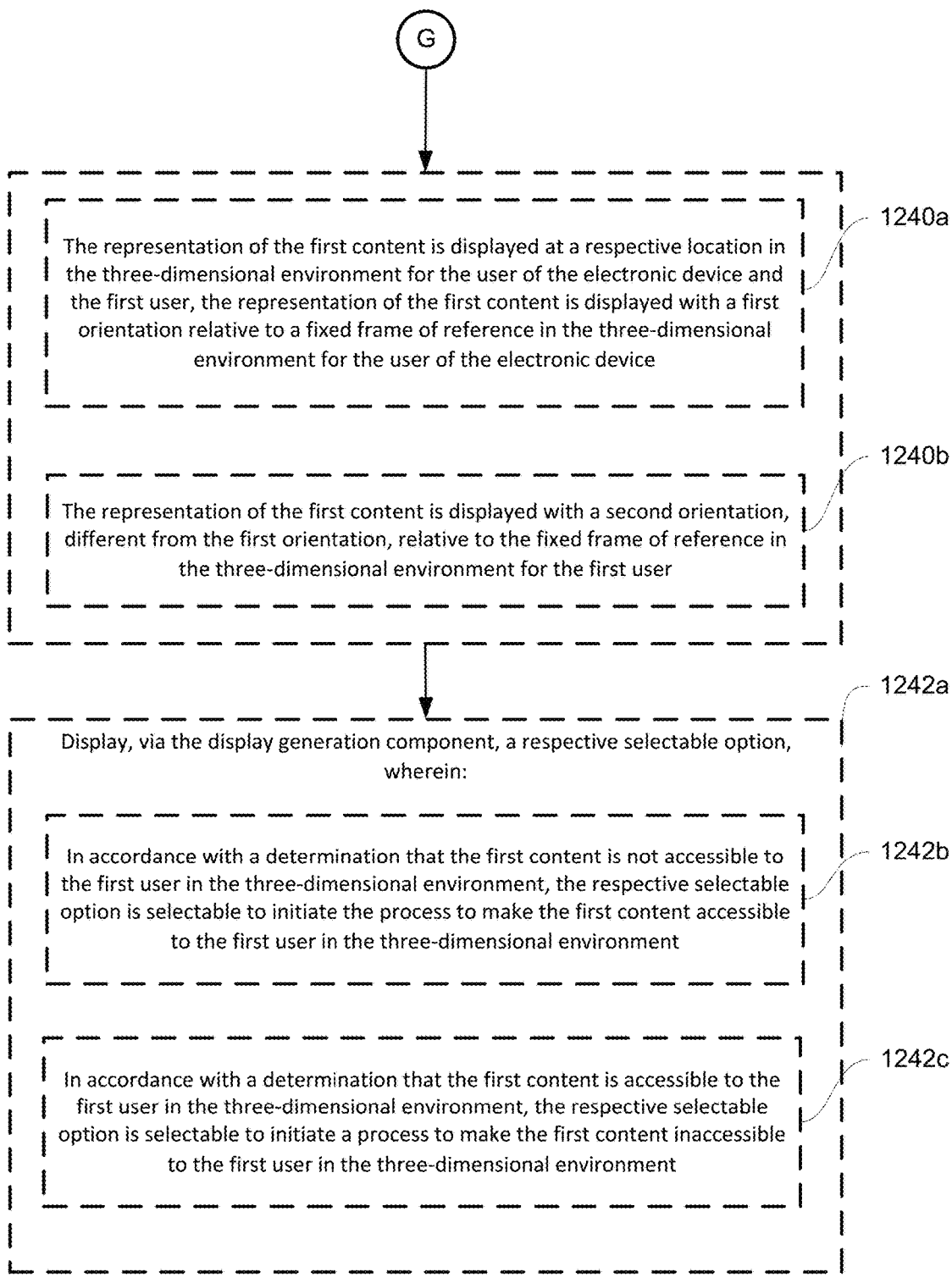

In some embodiments, such as in FIG. 11D, in response to the one or more criteria being satisfied, the electronic device (e.g., 1102) displays (1238a), via the display generation component, a selectable option (e.g., a selectable affordance, a selectable button in a menu, or a selectable option in a dialog prompt, etc.) that is selectable to initiate a process to make the first content accessible to one or more users, other than the first user and the user of the electronic device, in the three-dimensional environment, such as, for example as described with reference to FIG. 11A, selectable options similar to selectable options 1138 in FIG. 11D are optionally displayed that are selectable to share virtual object 1118 with one or more users in the three-dimensional environment in response to hand 1124 of User A grabbing virtual object 1118. For example, in response to the one or more criteria being satisfied, displaying at the electronic device associated with the user, a selectable option that is selectable to cause the first content to become accessible the to one or more other users in the three-dimensional environment (e.g., without the need to provide additional inputs that satisfy the one or more criteria). In some embodiments, while displaying the selectable option, the electronic device (e.g., 1102) detects (1238*b*), via the one or more input devices, selection of the selectable option (e.g., detecting, via one or more input devices, an input (e.g., hand gesture, gaze of the user, etc.) that selects the selectable option, such as a pinch gesture by the hand of the user or a pushdown or touchdown gesture on the selectable option with the forefinger of the hand of the user). In some embodiments, in response to detecting the selection of the selectable option, the electronic device (e.g., 1102) initiates (1238*c*) the process to make the first content (e.g., 1118) accessible to the one or more users in the three-dimensional environment. For example, in response to the user of the electronic device moving the representation of the first content towards the representation of the first user, displaying, at the electronic device of the user, a selectable option that is selectable to initiate a process to make the first content accessible to additional users in the three-dimensional environment (e.g., users other than the first user). In some embodiments, one or more selectable options are displayed at the electronic device of the user, such that the one or more selectable options are selectable to make the first content accessible to corresponding respective users in the three-dimensional environment (e.g., a different selectable option displayed for each user with which to share). In some embodiments, the selectable option is associated with a process to share with all users in the three-dimensional environment. In some embodiments, if the user of the electronic device does not select the selectable option to make the first content accessible to the one or more users in the three-dimensional environment, the first content continues to be accessible to only the first user and not to the additional users in the three-dimensional environment.

The above-described manner of displaying a selectable option—that is selectable to initiate a process to share with additional users—in response to making content accessible to a particular user provides an efficient way for the user of the electronic device to make the content accessible to additional users in the three-dimensional environment without requiring the user to satisfy the one or more criteria for each additional user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the representation of the first content is displayed at a respective location in the three-dimensional environment for the user of the electronic device and the first user (e.g., the electronic devices of the user and the first user display the first content at the same location in the three-dimensional environment), and the representation of the first content is displayed with a first orientation relative to a fixed frame of reference in the three-dimensional environment for the user of the electronic device (1240*a*) (e.g., the representation of the first content displayed at the electronic device of the user is oriented based on (e.g., towards) the viewpoint of the user). In some embodiments, the representation of the first content is displayed with a second orientation, different from the first orientation, relative to the fixed frame of reference in the three-dimensional environment for the first user (1240*b*), such as, for example as described with reference to FIG. 11C, the electronic devices of User A 1102 and User B 1106 display content A 1122 oriented towards the respective user while virtual object 1118 is at a position in the three-dimensional environment that is between User A and the representation of User B 1110 (e.g., the representation of the first content displayed at the electronic device of the first user is oriented based on (e.g., towards) the viewpoint of the first user). For example, the electronic devices associated with the user and the first user display the representation of the first content at the same location in the three-dimensional environment, but with the representation of the first content oriented differently. The electronic device of the user displays the representation of the first content with a first orientation based on the user's perspective of the three-dimensional environment, and the electronic device of the first user displays the representation of the first content with a second orientation based on the first user's perspective of the three-dimensional environment. In some embodiments where the user and the first user are at locations in the three-dimensional environment that are directly across from each other, both of the users see the representation of the first content at its respective location in the three-dimensional environment, but see the first content oriented towards them (e.g., both devices display the "front side" of the representation of the first content based on the user's perspective of the representation of the first content).

The above-described manner of displaying the orientation of the representation of the content provides an efficient way for ensuring visibility of content based on a user's viewpoint of the content, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the electronic device (e.g., 1102) displays (1242*a*), via the display generation component, a respective selectable option (e.g., a selectable affordance, a selectable button in a menu, or a selectable option in a dialog prompt, a toggle button, etc. In some embodiments, the respective selectable option is displayed within a selectable user interface element displayed proximate to the representation of the first content that is selectable to move the representation of the first content in the three-dimensional environment), and in accordance with a determination that the first content is not accessible to the first user in the three-dimensional environment, the respective selectable option is selectable to initiate the process to make the first content accessible to the first user in the three-dimensional environment (1242*b*) (e.g., the selectable option is selectable to share with a first user). In some embodiments, the electronic device (e.g., 1102) displays, via the display generation component, a respective selectable option, and in accordance with a determination that the first content is accessible to the first user in the three-dimensional environment, the respective selectable option is selectable to initiate a process to make the first content inaccessible to the first user in the three-dimensional environment (1242*c*) (e.g., the selectable option is selectable to stop sharing with a first user), such as, for example as described with reference to FIG. 11D, if the hand 1124 performs a gesture selecting the selectable option 1136 corresponding to the User B when virtual object 1118 is not accessible by User B, then virtual object 1118 becomes accessible to User B. Similarly, if the hand 1124 performs a gesture selecting the selectable option 1136 corresponding to the User B when virtual object 1118 is accessible by User B, then virtual object 1118 becomes inaccessible to User B. For example, while the user of the electronic device is interacting with the first content, displaying a selectable option that is configured to initiate a process to share the first content with a particular user if the first content is not accessible to that particular user, and that is configured to initiate a process to make the first content inaccessible to the first user if the first content is accessible to the particular user. In some embodiments, one or more selectable options are displayed proximate to the first content and are associated with different, corresponding respective users and/or a group of (e.g., some or all of) users in the three-dimensional environment (e.g., selection of different options initiates corresponding processes to share with different users in the three-dimensional environment). In some embodiments where the user is currently sharing the first content with the first user, the user optionally selects the selectable option to stop sharing the first content with the first user. Similarly, in some embodiments where the user is not currently sharing the first content with the first user, the user optionally selects the selectable option to start sharing the first content with the first user. In some embodiments, the one or more selectable options are displayed in a user interface element (e.g., grabber bar or sidebar) proximate to (e.g., beneath or to the side of) the first content.

The above-described manner controlling the accessibility of content in the three-dimensional environment provides an efficient way for managing which users in the three-dimensional environment have access to the content without the need to display dedicated options for sharing and ceasing sharing of the content, which simplifies the interaction between the user and the electronic device by not requiring the user to move the object in the three-dimensional environment to initiate a process to make the object accessible to one or more users in the three-dimensional environment and enhances the operability of the electronic device and makes the user-device interface more efficient, which additionally reduces power usage and improves battery life of the electronic device by enabling the user to use the electronic device more quickly and efficiently.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

What is claimed is:

1. A method comprising:
at an electronic device in communication with a display generation component and one or more input devices, including a hand tracking device:
displaying, via the display generation component, a three-dimensional environment that includes a representation of first content, a representation of a first user, other than a user of the electronic device, and a representation of a second user, other than the user of the electronic device and different from the first user, wherein the first content is not accessible to the first user or to the second user;
while displaying the three-dimensional environment, detecting, via the one or more input devices, a first input including movement of the representation of first content in the three-dimensional environment; and
in response to detecting the first input:
in accordance with a determination that the first input satisfies one or more criteria, the one or more criteria including that the first input includes movement of the representation of first content toward the representation of the first user in the three-dimensional environment, initiating a process to make the first content accessible to the first user in the three-dimensional environment but not to the second user in the three-dimensional environment.

2. The method of claim 1, further comprising:
in response to detecting the first input:
in accordance with a determination that the first input does not satisfy the one or more criteria, forgo initiating the process to make the first content accessible to the first user in the three-dimensional environment.

3. The method of claim 1, wherein initiating the process to make the first content accessible to the first user in the three-dimensional environment includes making the representation of the first content available for interaction by the first user in the three-dimensional environment.

4. The method of claim 3, wherein the first content is not accessible to the first user before interaction by the first user with the representation of the first content that satisfies one or more second criteria is detected, and the first content is accessible to the first user in response to the interaction by the first user with the representation of the first content that satisfies the one or more second criteria being detected.

5. The method of claim 3, wherein:
in response to the one or more criteria being satisfied, an indication that the representation of the first content is available for interaction is displayed in the three-dimensional environment for the first user but not the second user.

6. The method of claim 1, further comprising:
in response to the interaction by the first user with the representation of the first content that satisfies the one or more second criteria being detected, displaying, via the display generation component, a selectable option that is selectable to initiate a process to make the first content accessible to the first user and the second user in the three-dimensional environment.

7. The method of claim 1, wherein while the first content is not accessible to the first user in the three-dimensional environment, the first content is not displayed in the three-dimensional environment for the first user, and while the first content is accessible to the first user in the three-dimensional environment, the first content is displayed in the three-dimensional environment for the first user.

8. The method of claim 7, wherein while the first content is not accessible to the first user in the three-dimensional environment, an indication of the first content is displayed in the three-dimensional environment for the first user, wherein the indication of the first content is displayed at a location in the three-dimensional environment that corresponds to a location at which the electronic device displays the representation of the first content in the three-dimensional environment.

9. The method of claim 1, wherein the process to make the first content accessible to the first user in the three-dimensional environment includes displaying an indication of the first content in the three-dimensional environment for the first user without displaying the first content in the three-dimensional environment for the first user.

10. The method of claim 9, wherein the process to make the first content accessible to the first user in the three-dimensional environment includes after displaying the indication of the first content without displaying the first content, displaying an animation of the first content becoming visible in the three-dimensional environment for the first user.

11. The method of claim 1, wherein detecting the first input includes detecting extension of an arm of the user of the electronic device while a hand on the arm is in a hand shape corresponding to holding the representation of the first content.

12. The method of claim 1, further comprising:
while the first content is accessible to the first user, displaying, via the display generation component, an indication that the first content is accessible to the first user.

13. The method of claim 1, further comprising:
after initiating the process to make the first content accessible to the first user and while the first content is accessible to the first user, detecting, via the one or more input devices, a second input corresponding to the user of the electronic device taking control of the representation of the first content; and
in response to detecting the second input, displaying, via the display generation component, the representation of the first content controlled by the user of the electronic device while the first content remains accessible to the first user in the three-dimensional environment.

14. The method of claim 1, wherein the three-dimensional environment further includes a representation of second content, the method further comprising:
while the first content is accessible to a user other than the user of the electronic device, displaying, via the display generation component, a visual indication indicating that the first content is accessible to first one or more users other than the user of the electronic device;

while the first content is not accessible to a user other than the user of the electronic device, displaying, via the display generation component, a visual indication indicating that the first content is not accessible to users other than the user of the electronic device;

while the second content is accessible to a user other than the user of the electronic device, displaying, via the display generation component, a visual indication indicating that the second content is accessible to second one or more users other than the user of the electronic device; and while the second content is not accessible to a user other than the user of the electronic device, displaying, via the display generation component, a visual indication indicating that the second content is not accessible to users other than the user of the electronic device.

15. The method of claim 14, wherein:

the visual indication indicating that the first content is accessible to the first one or more users includes a visual indication of the first one or more users, and the visual indication indicating that the second content is accessible to the second one or more users includes a visual indication of the second one or more users.

16. The method of claim 1, wherein initiating the process to make the first content accessible to the first user in the three-dimensional environment includes initiating a process to share the first content via an application that is different from the three-dimensional environment.

17. The method of claim 1, further comprising:

in response to the one or more criteria being satisfied, displaying, via the display generation component, a selectable option that is selectable to initiate a process to make the first content accessible to one or more users, other than the first user and the user of the electronic device, in the three-dimensional environment;

while displaying the selectable option, detecting, via the one or more input devices, selection of the selectable option; and in response to detecting the selection of the selectable option, initiating the process to make the first content accessible to the one or more users in the three-dimensional environment.

18. The method of claim 1, wherein:

the representation of the first content is displayed at a respective location in the three-dimensional environment for the user of the electronic device and the first user, the representation of the first content is displayed with a first orientation relative to a fixed frame of reference in the three-dimensional environment for the user of the electronic device, and the representation of the first content is displayed with a second orientation, different from the first orientation, relative to the fixed frame of reference in the three-dimensional environment for the first user.

19. The method of claim 1, further comprising:

displaying, via the display generation component, a respective selectable option, wherein:

in accordance with a determination that the first content is not accessible to the first user in the three-dimensional environment, the respective selectable option is selectable to initiate the process to make the first content accessible to the first user in the three-dimensional environment, and in accordance with a determination that the first content is accessible to the first user in the three-dimensional environment, the respective selectable option is selectable to initiate a process to make the first content inaccessible to the first user in the three-dimensional environment.

20. An electronic device, comprising:

one or more processors;

memory; and one or more programs, wherein the one or more programs are stored in the memory and configured to be executed by the one or more processors, the one or more programs including instructions for:

displaying, via a display generation component, a three-dimensional environment that includes a representation of first content, a representation of a first user, other than a user of the electronic device, and a representation of a second user, other than the user of the electronic device and different from the first user wherein the first content is not accessible to the first user or o the second user;

while displaying the three-dimensional environment, detecting, via one or more input devices, a first input including movement of the representation of first content in the three-dimensional environment; and in response to detecting the first input:

in accordance with a determination that the first input satisfies one or more criteria, the one or more criteria including that the first input includes movement of the representation of first content toward the representation of the first user in the three-dimensional environment, initiating a process to make the first content accessible to the first user in the three-dimensional environment but not to the second user in the three-dimensional environment.

21. The electronic device of claim 20, wherein the one or more programs further include instructions for:

in response to detecting the first input:

in accordance with a determination that the first input does not satisfy the one or more criteria, forgo initiating the process to make the first content accessible to the first user in the three-dimensional environment.

22. The electronic device of claim 20, wherein initiating the process to make the first content accessible to the first user in the three-dimensional environment includes making the representation of the first content available for interaction by the first user in the three-dimensional environment.

23. The electronic device of claim 22, wherein the first content is not accessible to the first user before interaction by the first user with the representation of the first content that satisfies one or more second criteria is detected, and the first content is accessible to the first user in response to the interaction by the first user with the representation of the first content that satisfies the one or more second criteria being detected.

24. The electronic device of claim 20, wherein the one or more programs further include instructions for:

in response to the interaction by the first user with the representation of the first content that satisfies the one or more second criteria being detected, displaying, via the display generation component, a selectable option that is selectable to initiate a process to make the first content accessible to the first user and the second user in the three-dimensional environment.

25. The electronic device of claim 22, wherein:
in response to the one or more criteria being satisfied, an indication that the representation of the first content is available for interaction is displayed in the three-dimensional environment for the first user but not the second user.

26. The electronic device of claim 20, wherein while the first content is not accessible to the first user in the three-dimensional environment, the first content is not displayed in the three-dimensional environment for the first user, and while the first content is accessible to the first user in the three-dimensional environment, the first content is displayed in the three-dimensional environment for the first user.

27. The method of claim 26, wherein while the first content is not accessible to the first user in the three-dimensional environment, an indication of the first content is displayed in the three-dimensional environment for the first user, wherein the indication of the first content is displayed at a location in the three-dimensional environment that corresponds to a location at which the electronic device displays the representation of the first content in the three-dimensional environment.

28. The electronic device of claim 20, wherein the process to make the first content accessible to the first user in the three-dimensional environment includes displaying an indication of the first content in the three-dimensional environment for the first user without displaying the first content in the three-dimensional environment for the first user.

29. The method of claim 28, wherein the process to make the first content accessible to the first user in the three-dimensional environment includes after displaying the indication of the first content without displaying the first content, displaying an animation of the first content becoming visible in the three-dimensional environment for the first user.

30. The electronic device of claim 20, wherein detecting the first input includes detecting extension of an arm of the user of the electronic device while a hand on the arm is in a hand shape corresponding to holding the representation of the first content.

31. The electronic device of claim 20, wherein the one or more programs further include instructions for:
while the first content is accessible to the first user, displaying, via the display generation component, an indication that the first content is accessible to the first user.

32. The electronic device of claim 20, wherein the one or more programs further include instructions for:
after initiating the process to make the first content accessible to the first user and while the first content is accessible to the first user, detecting, via the one or more input devices, a second input corresponding to the user of the electronic device taking control of the representation of the first content; and
in response to detecting the second input, displaying, via the display generation component, the representation of the first content controlled by the user of the electronic device while the first content remains accessible to the first user in the three-dimensional environment.

33. The electronic device of claim 20, wherein the three-dimensional environment further includes a representation of second content, the one or more programs further include instructions for:
while the first content is accessible to a user other than the user of the electronic device, displaying, via the display generation component, a visual indication indicating that the first content is accessible to first one or more users other than the user of the electronic device;
while the first content is not accessible to a user other than the user of the electronic device, displaying, via the display generation component, a visual indication indicating that the first content is not accessible to users other than the user of the electronic device;
while the second content is accessible to a user other than the user of the electronic device, displaying, via the display generation component, a visual indication indicating that the second content is accessible to second one or more users other than the user of the electronic device; and
while the second content is not accessible to a user other than the user of the electronic device, displaying, via the display generation component, a visual indication indicating that the second content is not accessible to users other than the user of the electronic device.

34. The method of claim 33, wherein:
the visual indication indicating that the first content is accessible to the first one or more users includes a visual indication of the first one or more users, and the visual indication indicating that the second content is accessible to the second one or more users includes a visual indication of the second one or more users.

35. The electronic device of claim 20, wherein initiating the process to make the first content accessible to the first user in the three-dimensional environment includes initiating a process to share the first content via an application that is different from the three-dimensional environment.

36. The electronic device of claim 20, wherein the one or more programs further include instructions for:
in response to the one or more criteria being satisfied, displaying, via the display generation component, a selectable option that is selectable to initiate a process to make the first content accessible to one or more users, other than the first user and the user of the electronic device, in the three-dimensional environment;
while displaying the selectable option, detecting, via the one or more input devices, selection of the selectable option; and
in response to detecting the selection of the selectable option, initiating the process to make the first content accessible to the one or more users in the three-dimensional environment.

37. The electronic device of claim 20, wherein:
the representation of the first content is displayed at a respective location in the three-dimensional environment for the user of the electronic device and the first user,
the representation of the first content is displayed with a first orientation relative to a fixed frame of reference in the three-dimensional environment for the user of the electronic device, and
the representation of the first content is displayed with a second orientation, different from the first orientation, relative to the fixed frame of reference in the three-dimensional environment for the first user.

38. The electronic device of claim 20, wherein the one or more programs further include instructions for:
displaying, via the display generation component, a respective selectable option, wherein:
in accordance with a determination that the first content is not accessible to the first user in the three-dimensional environment, the respective selectable option is selectable to initiate the process to make the first content accessible to the first user in the three-dimensional environment, and in accordance with a determination that the first content is accessible to the first user in the three-dimensional environment, the respective selectable option is selectable to initiate a process to make the first content inaccessible to the first user in the three-dimensional environment.

39. A non-transitory computer readable storage medium storing one or more programs, the one or more programs comprising instructions, which when executed by one or more processors of an electronic device, cause the electronic device to perform a method comprising:

displaying, via a display generation component, a three-dimensional environment that includes a representation of first content, a representation of a first user, other than a user of the electronic device, and a representation of a second user, other than the user of the electronic device and different from the first user, wherein the first content is not accessible to the first user or to the second user;

while displaying the three-dimensional environment, detecting, via one or more input devices, a first input including movement of the representation of first content in the three-dimensional environment; and in response to detecting the first input:
in accordance with a determination that the first input satisfies one or more criteria, the one or more criteria including that the first input includes movement of the representation of first content toward the representation of the first user in the three-dimensional environment, initiating a process to make the first content accessible to the first user in the three-dimensional environment but not to the second user in the three-dimensional environment.

40. The non-transitory computer readable storage medium of claim 39, wherein the method further comprises:
in response to detecting the first input:
in accordance with a determination that the first input does not satisfy the one or more criteria, forgo initiating the process to make the first content accessible to the first user in the three-dimensional environment.

41. The non-transitory computer readable storage medium of claim 39, wherein initiating the process to make the first content accessible to the first user in the three-dimensional environment includes making the representation of the first content available for interaction by the first user in the three-dimensional environment.

42. The non-transitory computer readable storage medium of claim 41, wherein the first content is not accessible to the first user before interaction by the first user with the representation of the first content that satisfies one or more second criteria is detected, and the first content is accessible to the first user in response to the interaction by the first user with the representation of the first content that satisfies the one or more second criteria being detected.

43. The non-transitory computer readable storage medium of claim 39, wherein the method further comprises:
in response to the interaction by the first user with the representation of the first content that satisfies the one or more second criteria being detected, displaying, via the display generation component, a selectable option that is selectable to initiate a process to make the first content accessible to the first user and the second user in the three-dimensional environment.

44. The non-transitory computer readable storage medium of claim 41, wherein:
in response to the one or more criteria being satisfied, an indication that the representation of the first content is available for interaction is displayed in the three-dimensional environment for the first user but not the second user.

45. The non-transitory computer readable storage medium of claim 39, wherein while the first content is not accessible to the first user in the three-dimensional environment, the first content is not displayed in the three-dimensional environment for the first user, and while the first content is accessible to the first user in the three-dimensional environment, the first content is displayed in the three-dimensional environment for the first user.

46. The method of claim 45, wherein while the first content is not accessible to the first user in the three-dimensional environment, an indication of the first content is displayed in the three-dimensional environment for the first user, wherein the indication of the first content is displayed at a location in the three-dimensional environment that corresponds to a location at which the electronic device displays the representation of the first content in the three-dimensional environment.

47. The non-transitory computer readable storage medium of claim 39, wherein the process to make the first content accessible to the first user in the three-dimensional environment includes displaying an indication of the first content in the three-dimensional environment for the first user without displaying the first content in the three-dimensional environment for the first user.

48. The method of claim 47, wherein the process to make the first content accessible to the first user in the three-dimensional environment includes after displaying the indication of the first content without displaying the first content, displaying an animation of the first content becoming visible in the three-dimensional environment for the first user.

49. The non-transitory computer readable storage medium of claim 39, wherein detecting the first input includes detecting extension of an arm of the user of the electronic device while a hand on the arm is in a hand shape corresponding to holding the representation of the first content.

50. The non-transitory computer readable storage medium of claim 39, wherein the method further comprises:
while the first content is accessible to the first user, displaying, via the display generation component, an indication that the first content is accessible to the first user.

51. The non-transitory computer readable storage medium of claim 39, wherein the method further comprises:
after initiating the process to make the first content accessible to the first user and while the first content is accessible to the first user, detecting, via the one or more input devices, a second input corresponding to the user of the electronic device taking control of the representation of the first content; and
in response to detecting the second input, displaying, via the display generation component, the representation of the first content controlled by the user of the electronic device while the first content remains accessible to the first user in the three-dimensional environment.

52. The non-transitory computer readable storage medium of claim 39, wherein the three-dimensional environment further includes a representation of second content, the method further comprises:
while the first content is accessible to a user other than the user of the electronic device, displaying, via the display generation component, a visual indication indicating that the first content is accessible to first one or more users other than the user of the electronic device;

while the first content is not accessible to a user other than the user of the electronic device, displaying, via the display generation component, a visual indication indicating that the first content is not accessible to users other than the user of the electronic device;

while the second content is accessible to a user other than the user of the electronic device, displaying, via the display generation component, a visual indication indicating that the second content is accessible to second one or more users other than the user of the electronic device; and while the second content is not accessible to a user other than the user of the electronic device, displaying, via the display generation component, a visual indication indicating that the second content is not accessible to users other than the user of the electronic device.

53. The method of claim 52, wherein:

the visual indication indicating that the first content is accessible to the first one or more users includes a visual indication of the first one or more users, and the visual indication indicating that the second content is accessible to the second one or more users includes a visual indication of the second one or more users.

54. The non-transitory computer readable storage medium of claim 39, wherein initiating the process to make the first content accessible to the first user in the three-dimensional environment includes initiating a process to share the first content via an application that is different from the three-dimensional environment.

55. The non-transitory computer readable storage medium of claim 39, wherein the method further comprises:

in response to the one or more criteria being satisfied, displaying, via the display generation component, a selectable option that is selectable to initiate a process to make the first content accessible to one or more users, other than the first user and the user of the electronic device, in the three-dimensional environment;

while displaying the selectable option, detecting, via the one or more input devices, selection of the selectable option; and in response to detecting the selection of the selectable option, initiating the process to make the first content accessible to the one or more users in the three-dimensional environment.

56. The non-transitory computer readable storage medium of claim 39, wherein:

the representation of the first content is displayed at a respective location in the three-dimensional environment for the user of the electronic device and the first user, the representation of the first content is displayed with a first orientation relative to a fixed frame of reference in the three-dimensional environment for the user of the electronic device, and the representation of the first content is displayed with a second orientation, different from the first orientation, relative to the fixed frame of reference in the three-dimensional environment for the first user.

57. The non-transitory computer readable storage medium of claim 39, wherein the method further comprises:

displaying, via the display generation component, a respective selectable option, wherein:

in accordance with a determination that the first content is not accessible to the first user in the three-dimensional environment, the respective selectable option is selectable to initiate the process to make the first content accessible to the first user in the three-dimensional environment, and in accordance with a determination that the first content is accessible to the first user in the three-dimensional environment, the respective selectable option is selectable to initiate a process to make the first content inaccessible to the first user in the three-dimensional environment.

* * * * *